(12) United States Patent
Mochizuki et al.

(10) Patent No.: US 9,832,672 B2
(45) Date of Patent: Nov. 28, 2017

(54) COMMUNICATION SYSTEM

(71) Applicant: Mitsubishi Electric Corporation, Chiyoda-ku (JP)

(72) Inventors: Mitsuru Mochizuki, Tokyo (JP); Miho Maeda, Tokyo (JP); Shinsuke Uga, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 163 days.

(21) Appl. No.: 14/396,535

(22) PCT Filed: Apr. 23, 2013

(86) PCT No.: PCT/JP2013/061874
§ 371 (c)(1),
(2) Date: Oct. 23, 2014

(87) PCT Pub. No.: WO2013/161798
PCT Pub. Date: Oct. 31, 2013

(65) Prior Publication Data
US 2015/0092554 A1   Apr. 2, 2015

(30) Foreign Application Priority Data

Apr. 27, 2012  (JP) ................. 2012-103541

(51) Int. Cl.
*H04W 24/10* (2009.01)
*H04W 28/08* (2009.01)
(Continued)

(52) U.S. Cl.
CPC ........... *H04W 24/10* (2013.01); *H04W 28/08* (2013.01); *H04W 76/046* (2013.01);
(Continued)

(58) Field of Classification Search
None
See application file for complete search history.

(56) References Cited

U.S. PATENT DOCUMENTS 8,477,811 B2   7/2013  Kitazoe
2003/0128676 A1*  7/2003  Lee .................... H04L 12/2856
                                                        370/328
(Continued)

FOREIGN PATENT DOCUMENTS

CN   101808407 A   8/2010
JP   2008-85829    4/2008
(Continued)

OTHER PUBLICATIONS

Extended European Search Report dated Oct. 30, 2015 in Patent Application No. 13780997.6.
(Continued)

*Primary Examiner* — Christopher Crutchfield
*Assistant Examiner* — Alan Lindenbaum
(74) *Attorney, Agent, or Firm* — Oblon, McClelland, Maier & Neustadt, L.L.P.

(57) ABSTRACT

In a communication system, an eNB and a UE transmit and receive a UE monitoring message for confirming the state of the UE in a predetermined UE monitoring period. For example, in UE monitoring periods, a UE monitoring procedure is performed, so that the UE transmits the UE monitoring message to the eNB. Upon receipt of the UE monitoring message, the eNB transmits delivery confirmation information to the UE. The UE monitoring period is set as, for example, a period shorter than a TAU period. This allows the UE monitoring process to confirm the state of the UE even if the TAU period is lengthened. The eNB may transmit the UE monitoring message to the UE.

17 Claims, 65 Drawing Sheets

(51) Int. Cl.
*H04W 88/06* (2009.01)
*H04W 76/04* (2009.01)
*H04W 60/02* (2009.01)
*H04W 84/04* (2009.01)

(52) U.S. Cl.
CPC ............ *H04W 88/06* (2013.01); *H04W 60/02* (2013.01); *H04W 76/045* (2013.01); *H04W 76/048* (2013.01); *H04W 84/045* (2013.01)

(56) References Cited

U.S. PATENT DOCUMENTS

| | | | |
|---|---|---|---|
| 2009/0197589 A1* | 8/2009 | Kitazoe | H04W 76/045 455/422.1 |
| 2009/0262686 A1 | 10/2009 | Ebata et al. | |
| 2011/0207465 A1 | 8/2011 | Dwyer et al. | |
| 2012/0030280 A1 | 2/2012 | Wang et al. | |
| 2013/0039287 A1* | 2/2013 | Rayavarapu | H04W 76/048 370/329 |
| 2013/0208699 A1 | 8/2013 | Hakkinen et al. | |
| 2013/0308578 A1 | 11/2013 | Dwyer et al. | |

FOREIGN PATENT DOCUMENTS

| | | |
|---|---|---|
| JP | 2011-511584 A | 4/2011 |
| WO | 2009/097602 A1 | 8/2009 |
| WO | 2011/098163 A1 | 8/2011 |
| WO | WO 2012/034580 A1 | 3/2012 |

OTHER PUBLICATIONS

International Search Report dated Jul. 30, 2013, in PCT/JP2013/061874, filed Apr. 23, 2013.
"Connectionless approaches to supporting Diverse Data Applications", IP Wireless Inc., 3GPP TSG RAN WG2, Meeting #77, R2-120444, Feb. 6-10, 2012, 5 pages.
"Evolved Universal Terrestrial Radio Access (E-UTRA) and Evolved Universal Terrestrial Radio Access Network (E-UTRAN)", 3GPP TS 36.300 V10.5.0, Stage 2, Release 10, Sep. 2011, 194 pages.
"Evolved Universal Terrestrial Radio Access (E-UTRA); Radio Resource Control (RRC)", 3GPP TS 36.331 V10.3.0, Protocol specification, Release 10, Sep. 2011, 296 pages.
"Evolved Universal Terrestrial Radio Access (E-UTRA); User Equipment (UE) procedures in idle mode", 3GPP TS 36.304 V10.3.0, Release 10, Sep. 2011, 33 pages.
"Architecture aspects of Home NodeB and Home eNodeB", 3GPP TR 23.830 V9.0.0, Release 9, Sep. 2009, 55 pages.
"LS on HNB/HeNB Open Access Mode", 3GPP TGS-SA1 #42, S1-083461, Release 9, Oct. 13-17, 2008, 2 pages.
"LS on CSG cell identification", 3GPP TSG-RAN WG 2 Meeting #62, R2-082899, May 5-9, 2008, 2 pages.
"Evolved Universal Terrestrial Radio Access (E-UTRA); Further advancements for E-UTRA physical layer aspects", 3GPP TR 36.814 V9.0.0, Release 9, Mar. 2010, 104 pages.
"Feasibility study for Further Advancements for E-UTRA (LTE-Advanced)", 3GPP TR 36.912 V10.0.0, Release 10, Mar. 2011, 253 pages.
"Evolved Universal Terrestrial Radio Access (E-UTRA); User Equipment (UE) radio transmission and reception", 3GPP TS 36.101 V10.3.0, Release 10, Jun. 2011, 238 pages.
"Coordinated multi-point operation for LTE physical layer aspects", 3GPP TR 36.819 V11.0.0, Release 11, Sep. 2011, 68 pages.
"System Improvements for Machine-Type Communications", 3GPP TR 23.888 V1.6.0, Release 11, Nov. 2011, 161 pages.
"Study on non-MTC Mobile Data Applications Impacts", 3GPP TR 22.801 V12.0.0, Release 12, Dec. 2011, 22 pages.
"General Packet Radio Service (GPRS) enhancements for Evolved Universal Terrestrial Radio Access Network (E-UTRAN) access", 3GPP TS 23.401 V11.0.0, Release 11, Dec. 2011, 286 pages.
"Non-Access-Stratum (NAS) protocol for Evolved Packet System (EPS)", 3GPP TS 24.301 V11.1.0, Stage 3, Release 11, Dec. 2011, 326 pages.
"MTC small data identification mechanism for non-SMS Small Data Transmission Solution", Mediatek Inc., SA WG2 Meeting #87, S2-114341, Oct. 10-14, 2011, 8 pages.
Evolved Universal Terrestrial Radio Access Network (E-UTRAN); S1 Application Protocol (S1AP), 3GPP TS 36.413 V10.4.0, Release 10, Dec. 2011, 255 pages.
International Preliminary Report on Patentability and Written Opinion dated Nov. 6, 2014 in PCT/JP2013/061874 with English language translation.
Office Action dated Apr. 11, 2017, in Japanese Patent Application No. 2014-512599 (with partial English language translation).
Office Action issued Jun. 13, 2017, in Japanese Patent Application No. 2014-512599 *(with partial English language translation)*.
Office Action issued Jul. 27, 2017, in Chinese Patent Application No. 201380021938.5 *(with partial English language translation)*.

* cited by examiner

F I G . 2
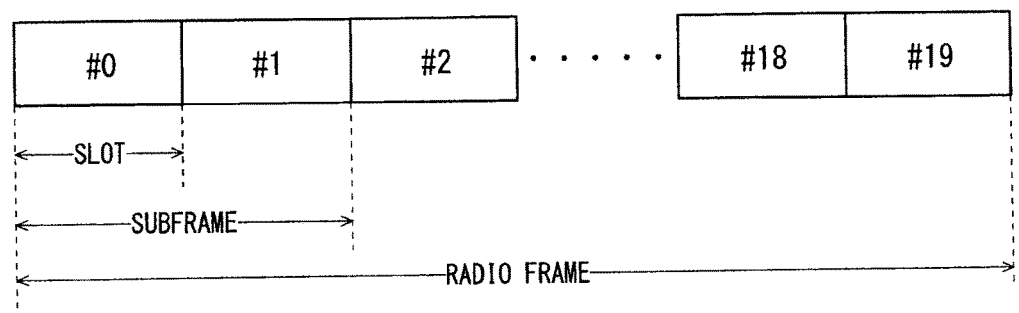

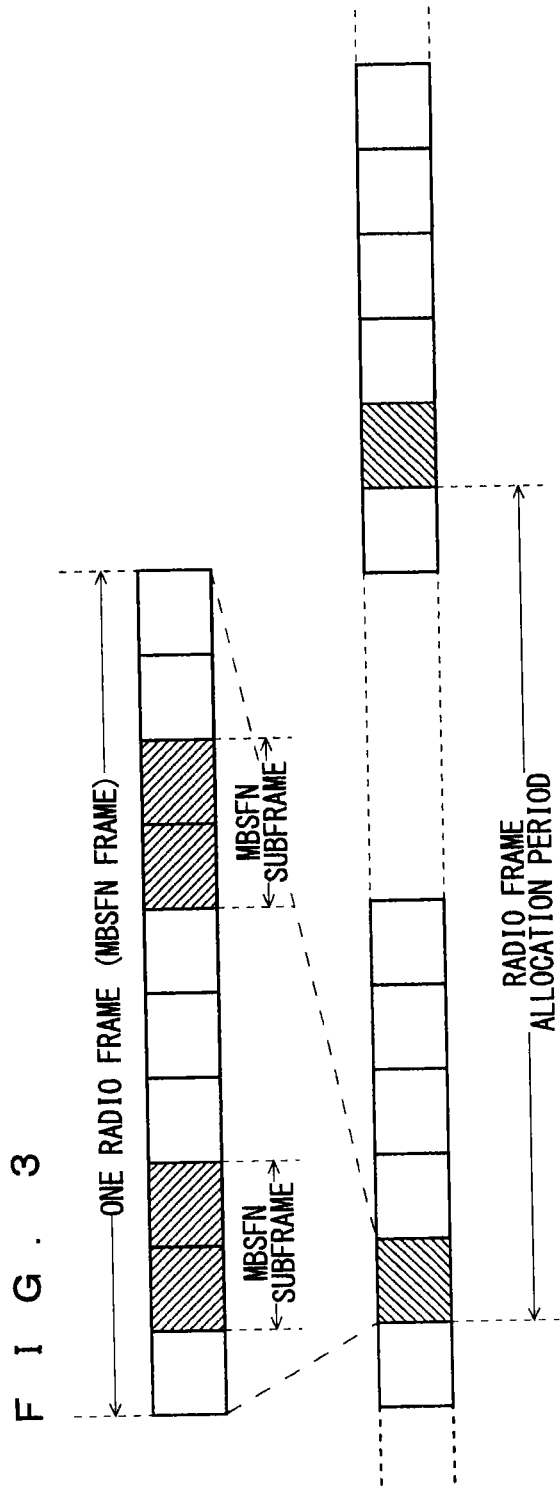
F I G. 3

F I G. 4
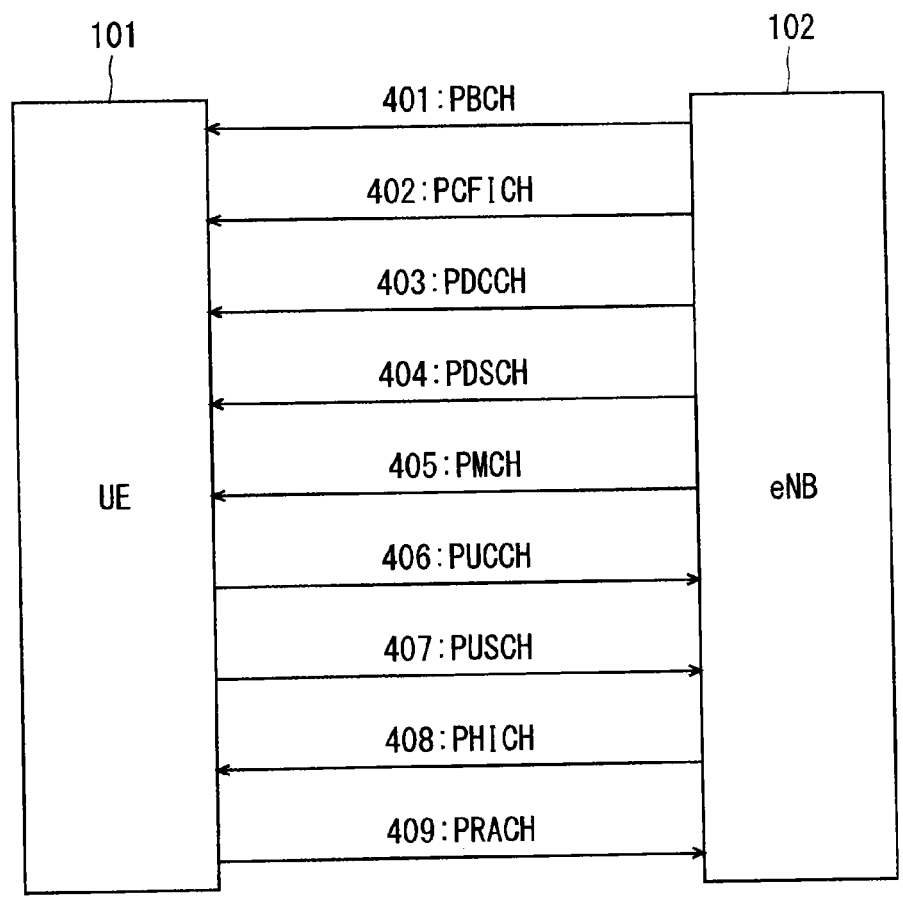

FIG. 5
(A)
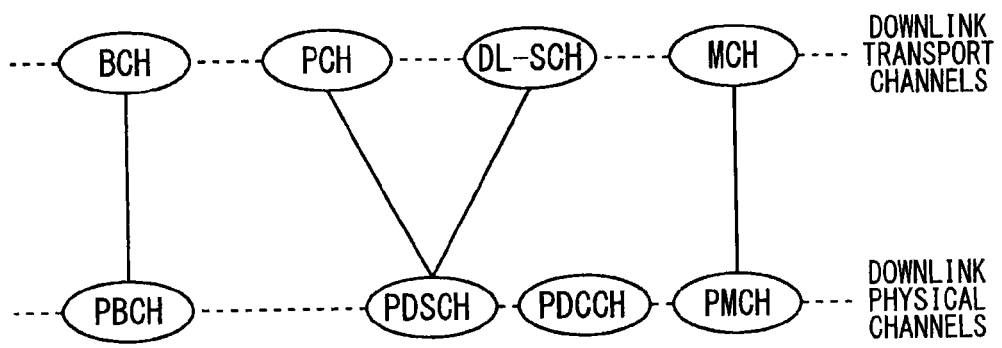
(B)
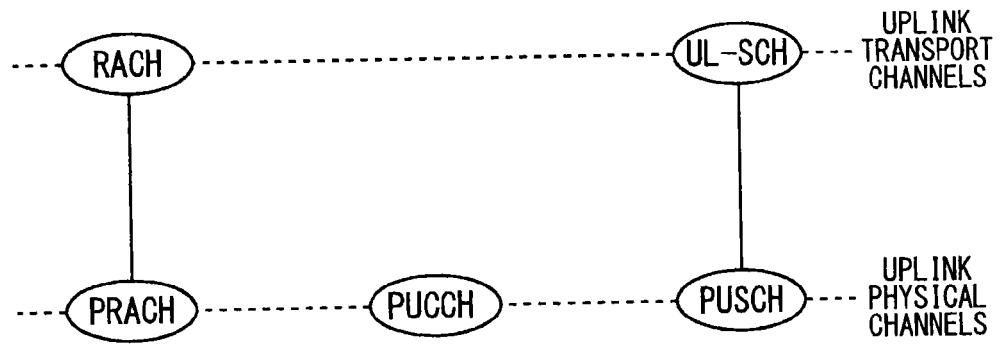

FIG. 6
(A)
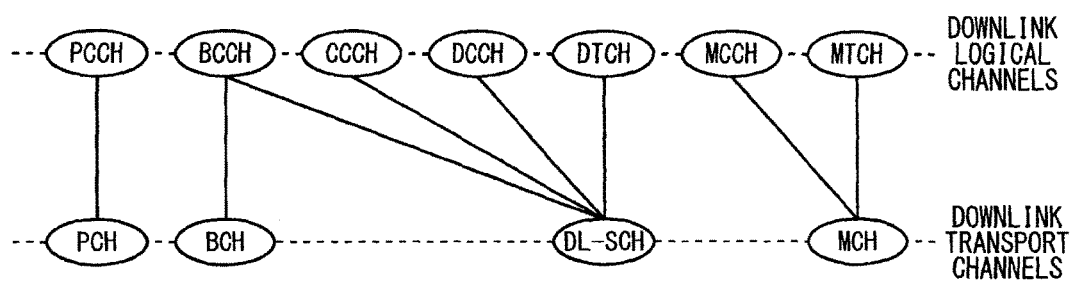
(B)
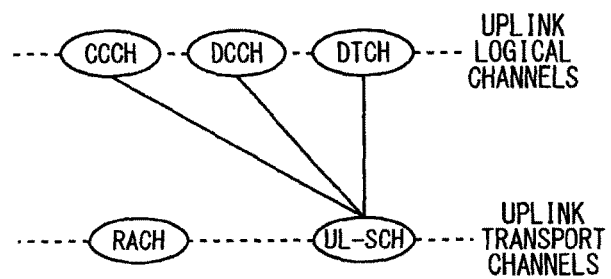

F I G . 1 0
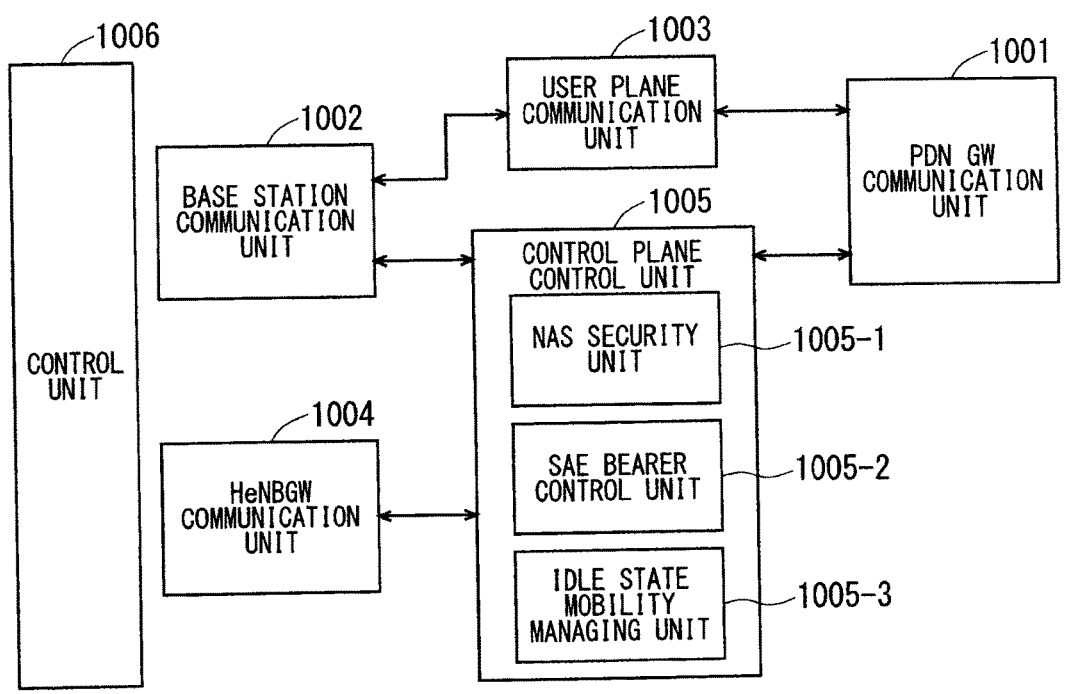

F I G . 1 1
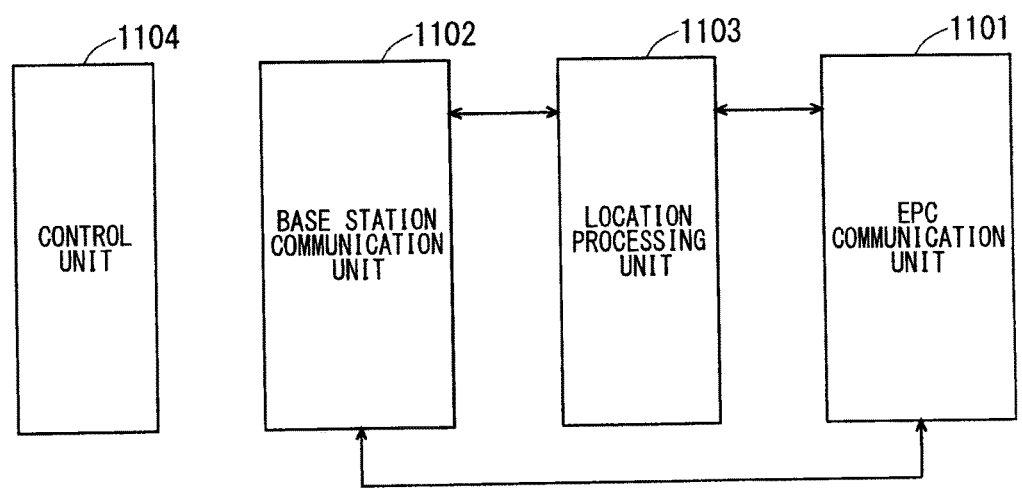

F I G . 1 2
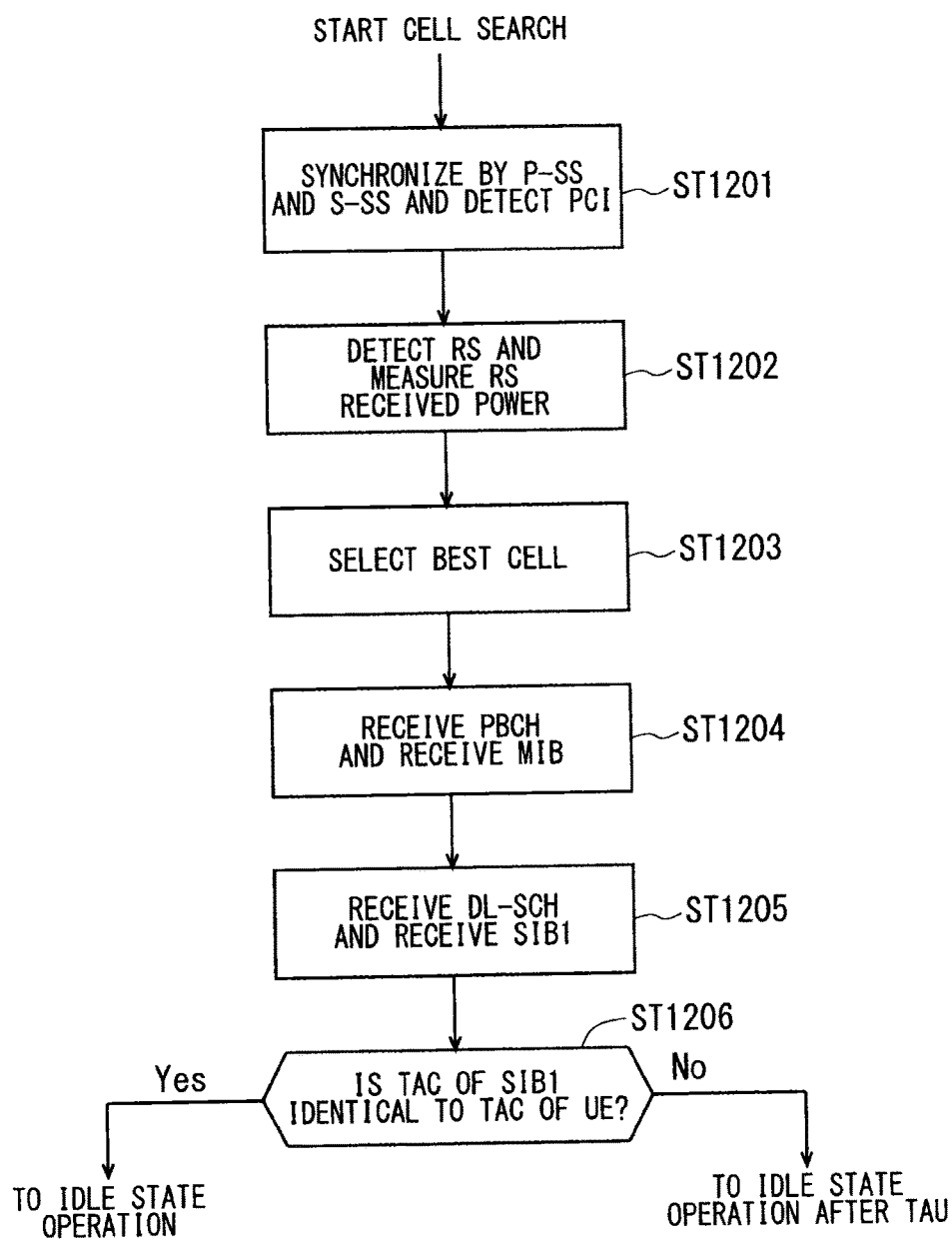

F I G. 1 6
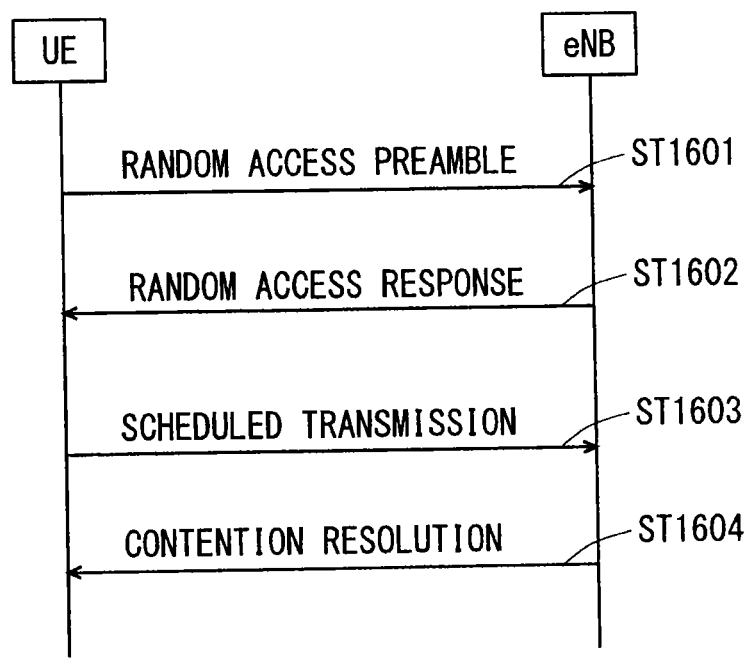

F I G. 1 9
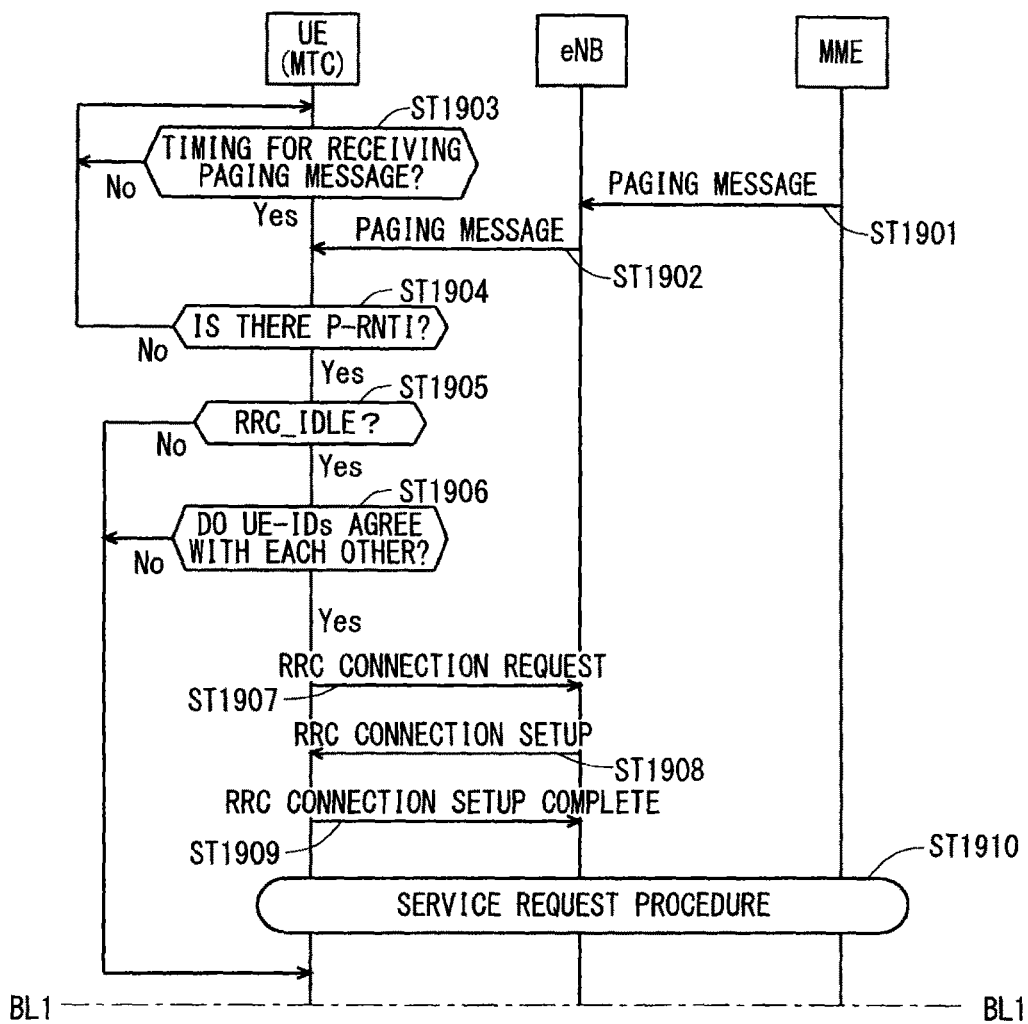

F I G . 2 0
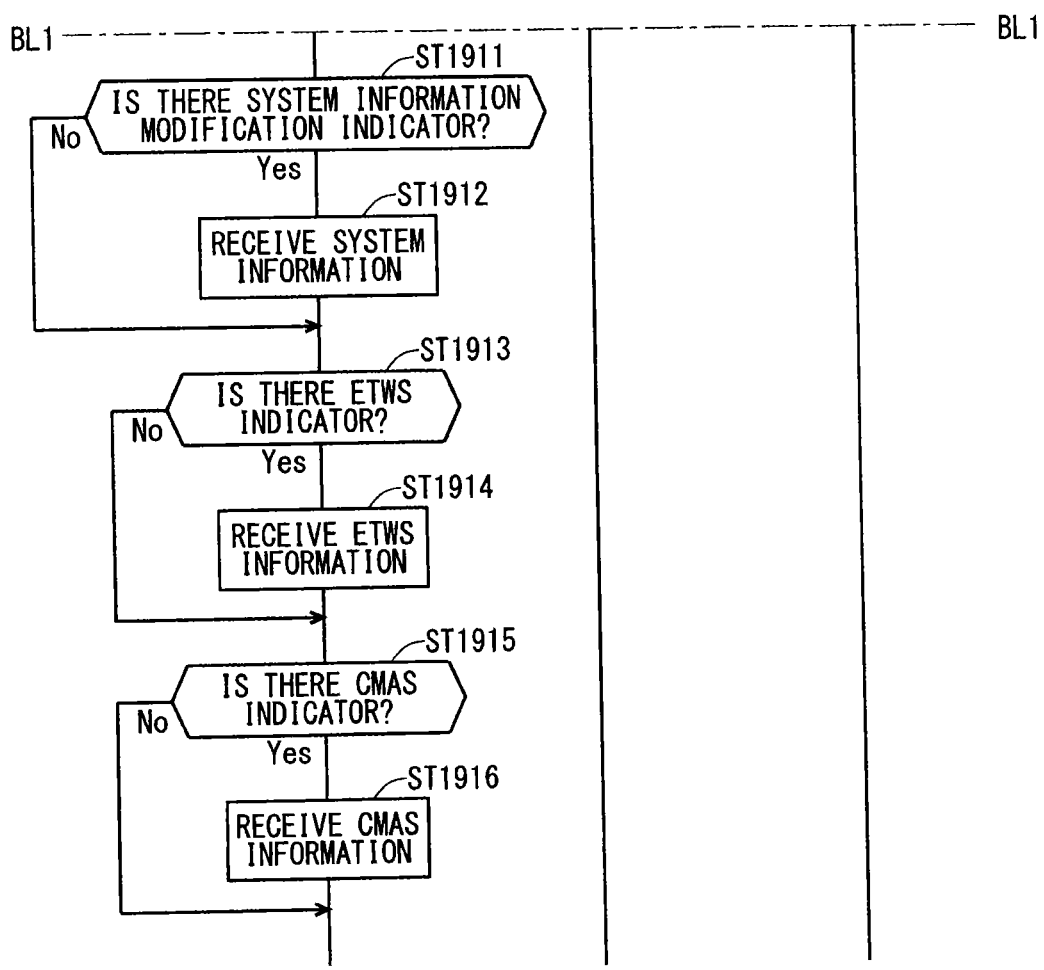

F I G . 2 3
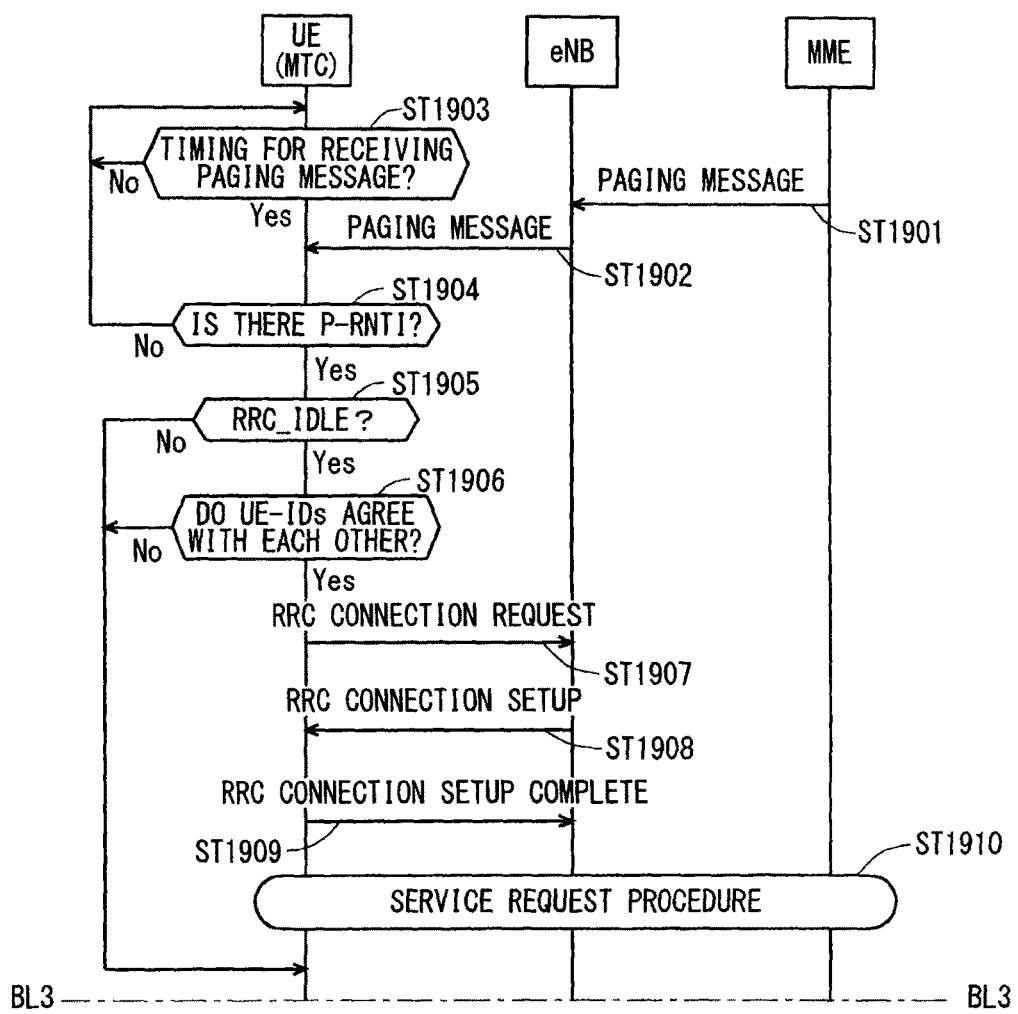

F I G. 2 5
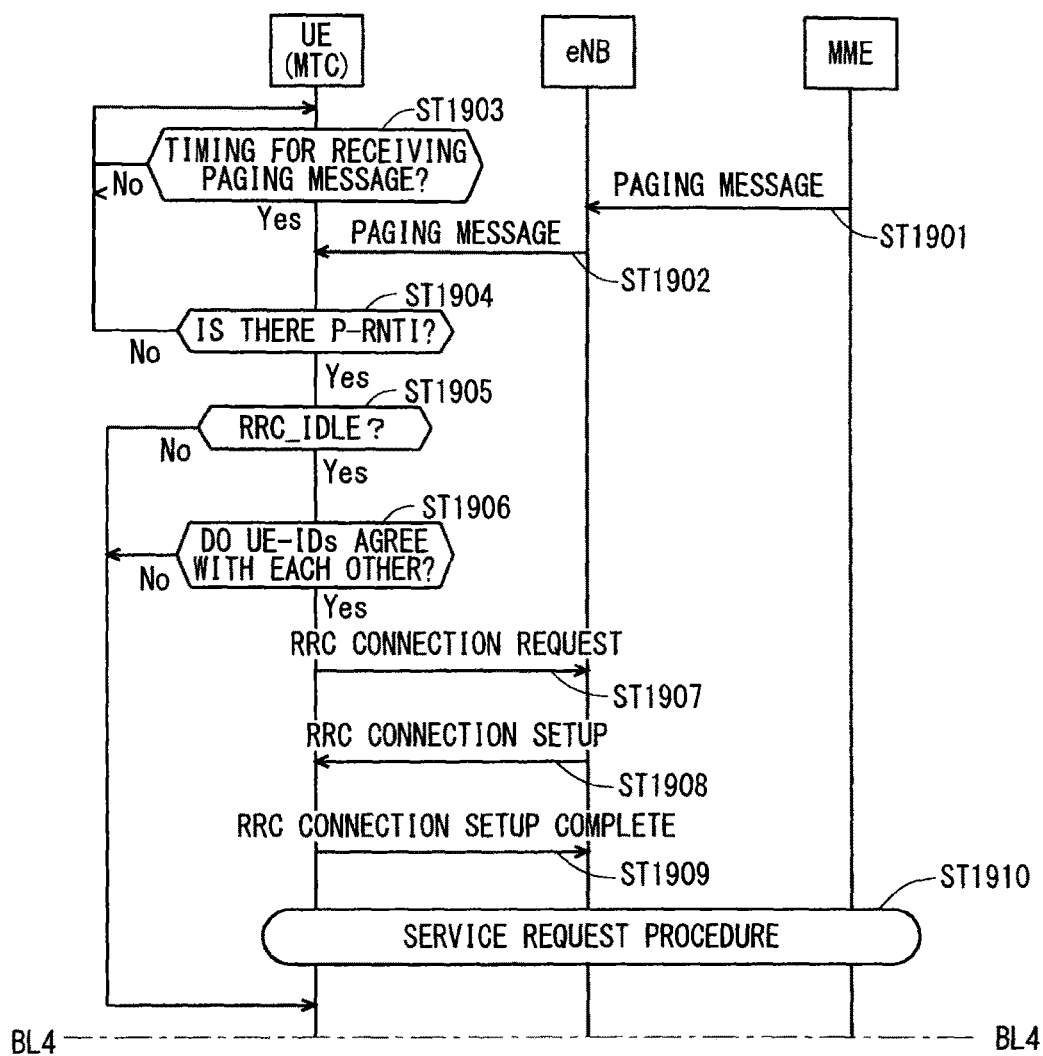

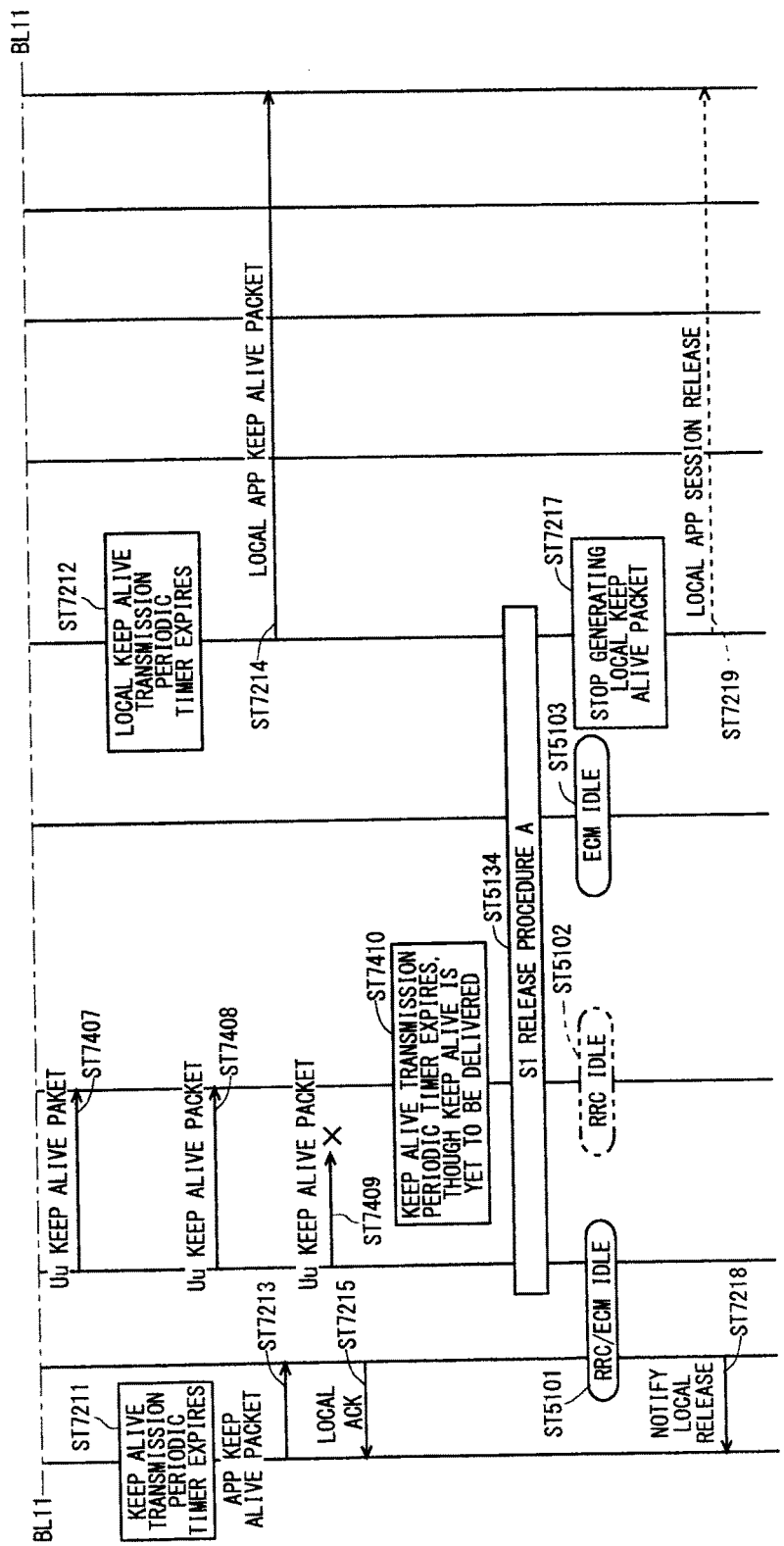
F I G. 39

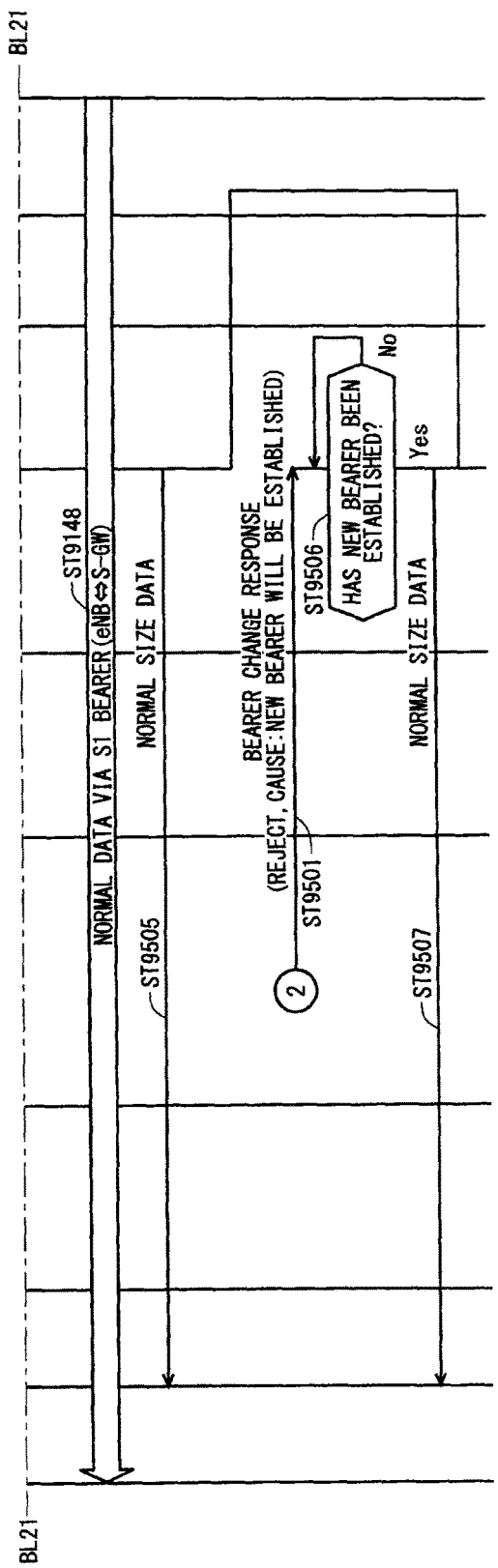
F I G. 56

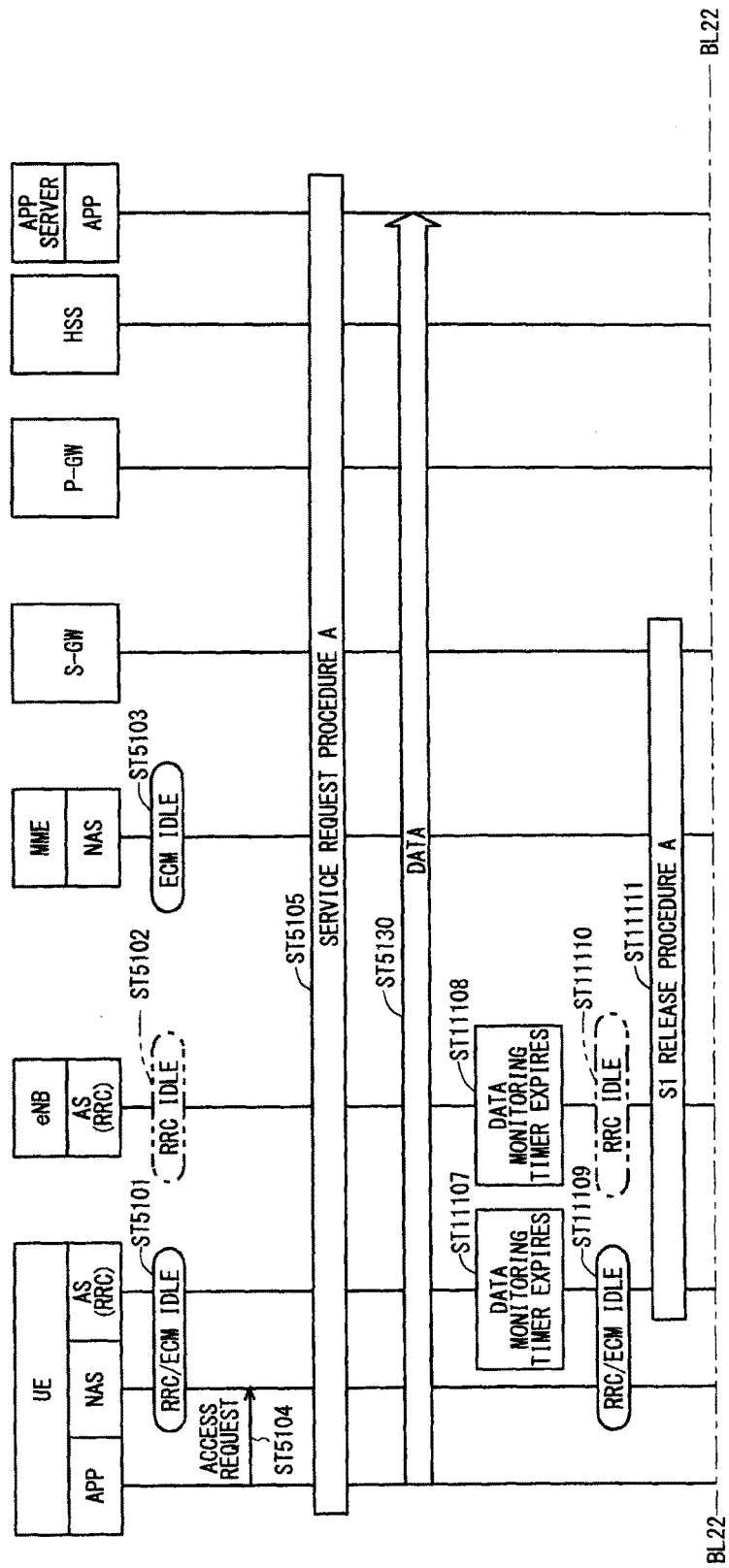
F I G . 5 7

COMMUNICATION SYSTEM

TECHNICAL FIELD

The present invention relates to a mobile communication system including a base station device to be connected to a network, and a communication terminal device capable of radio communication with the base station device.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio areas and system architecture evolution (SAE) regarding the overall system configuration including a core network and a radio access network (hereinafter, also referred to as a network) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single carrier frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access network (E-UTRAN), respectively, in the LTE communication system. Also in the radio access network, the base station that communicates with a mobile terminal (user quipment (UE)) being a communication terminal device is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in the LTE communication system. The E-MBMS service is broadcast multimedia service. The E-MBMS service is merely referred to as MBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The current decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod}=\text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIG. 5 described below, resource allocation information for a paging channel (PCH) being one of the transport channels shown in FIG. 5, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in a mobile communication system. The following five types of downlink reference signals are defined: cell-specific reference signals (CRSs), MBSFN reference signals, data demodulation reference signals (DM-RSs) being UE-specific reference signals, positioning reference signals (PRSs), and channel-state information reference signals (CSI-RSs). The physical layer measurement objects of a user equipment include reference symbol received power (RSRP).

The transport channels described in Non-Patent Document 1 (Chapter 5) will be described with reference to FIG. 5. FIG. 5 is a diagram illustrating transport channels used in the LTE communication system. Part (A) of FIG. 5 shows mapping between downlink transport channels and downlink physical channels. Part (B) of FIG. 5 shows mapping between uplink transport channels and uplink physical channels.

A broadcast channel (BCH) among the downlink transport channels shown in part (A) of FIG. 5 is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in part (B) of FIG. 5. The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. In the case where the receiver fails to successfully decode the received data, in other words, in the case where a cyclic redundancy check (CRC) error occurs (CRC=NG), the receiver transmits "Nack" to the transmitter. The transmitter that has received "Nack" retransmits the data. In the case where the receiver successfully decodes the received data, in other words, in the case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIG. 6. FIG. 6 is a diagram illustrating logical channels used in an LTE communication system. part (A) of FIG. 6 shows mapping between downlink logical channels and downlink transport channels. part (B) of FIG. 6 shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a point-to-point channel that transmits dedicated control information between a user equipment and a network. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below. The CSG cell will be described below (see Chapter 3.1 of Non-Patent Document 3).

The closed subscriber group (CSG) cell is a cell in which subscribers who are allowed to use are specified by an operator (also referred to as a "cell for specific subscribers"). The specified subscribers are allowed to access one or more cells of a public land mobile network (PLMN). One or more cells in which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whiltelist or an allowed CSG list as well. As to the access of user equipments through a CSG cell, the MME performs access control (see Chapter 4.3.1.2 of Non-Patent Document 4). Specific examples of the access of user equipments include attach, combined attach, detach, service request, and a tracking area update procedure (see Chapter 4.3.1.2 of Non-Patent Document 4).

The service types of a user equipment in an idle state will be described below (see Chapter 4.3 of Non-Patent Document 3). The service types of user equipments in an idle state include a limited service, standard service (normal service), and operator service. The limited service includes emergency calls, earthquake and tsunami warning system (ETWS), and commercial mobile alert system (CMAS) on an acceptable cell described below. The standard service (also referred to as normal service) is a public service on a suitable cell described below. The operator service includes a service for operators only on a reserved cell described below.

A "suitable cell" will be described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;
(b) the cell is part of a tracking area (TA), not part of the list of "forbidden LAs for roaming", where the cell needs to fulfill (1) above;
(c) the cell shall fulfill the cell selection criteria; and
(d) for a cell specified as CSG cell by system information (SI), the CSG-ID is part of a "CSG whitelist" of the UE, that is, is contained in the CSG whitelist of the UE.

An "acceptable cell" will be described below. The "acceptable cell" is the cell on which a UE may camp to obtain limited service. Such a cell shall fulfill the all following requirements (1) and (2).

(1) The cell is not a prohibited cell (also referred to as a "barred cell").
(2) The cell fulfills the cell selection criteria.

"Barred cell" is indicated in the system information. "Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell".

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 5 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. To being served by a base station means to take the base station as a serving cell.

Non-Patent Document 6 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 7 and 8).

As to the LTE-A system, it is studied that a relay and a relay node (RN) are supported for achieving a high data rate, high cell-edge throughput, new coverage area, and the like. The relay node being a relay device is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP is also connectable to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency band, and a link from an RN to a DeNB and a link from a UE to an RN are also time-division multiplexed at one frequency band. In a relay, accordingly, the transmission of the relay is prevented from interfering the reception of its own relay.

Not only a normal eNB (macro cell) but also so-called local nodes such as pico eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 9 describes the frequency bands.

Carrier aggregation (CA) is studied in the LTE-A system, in which two or more component carriers (CCs) are aggregated to support wider transmission bandwidths up to 100 MHz.

A UE supporting Release 8 or 9 of 3GPP, which supports LTE, is capable of transmission and reception on only one CC corresponding to one serving cell. Meanwhile, it is conceivable that a UE supporting Release 10 of 3GPP may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure the number of uplink CCs (UL CCs) more than the number of downlink CCs (DL CCs). The CCs configured by the same eNBs do not need to provide the same coverage. The CC is compatible with Release 8 or 9 of 3GPP.

In CA, an independent HARQ entity is provided per serving cell in uplink as well as downlink. A transport block is generated per TTI for each serving cell. Each transport block and HARQ retransmission are mapped to a single serving cell.

In the case where CA is configured, a UE has single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The above-mentioned LTE Advanced (LTE-A) is studied as a further advanced communication system regarding radio areas in 3GPP (see Non-Patent Documents 7 and 8). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Document 10.

CoMP is the technique of expanding the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into joint transmission (JT) and dynamic point selection (DPS). DPS includes dynamic cell selection (DCS). In JT, the PDSCH is transmitted from multiple points, specifically, part of or entire CoMP cooperating set, at a time. In DPS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission and reception at multiple points. In some cases, the unit and cell that perform coordinated multiple point transmission are also referred to as a multi-point unit and a multi-point cell, respectively.

PRIOR ART DOCUMENTS

Non-Patent Documents

Non-Patent Document 1: 3GPP TS 36.300 V10.5.0
Non-Patent Document 2: 3GPP TS 36.331 V10.3.0
Non-Patent Document 3: 3GPP TS 36.304 V10.3.0 Chapter 3.1, Chapter 4.3, Chapter 5.2.4
Non-Patent Document 4: 3GPP TR 23.830 V9.0.0
Non-Patent Document 5: 3GPP S1-083461
Non-Patent Document 6: 3GPP R2-082899
Non-Patent Document 7: 3GPP TR 36.814 V9.0.0
Non-Patent Document 8: 3GPP TR 36.912 V10.0.0
Non-Patent Document 9: 3GPP TS 36.101 V10.3.0
Non-Patent Document 10: 3GPP TR 36.819 V11.0.0
Non-Patent Document 11: 3GPP TR 23.888 V1.6.0
Non-Patent Document 12: 3GPP TR 22.801 V12.0.0
Non-Patent Document 13: 3GPP TS 23.401 V11.0.0
Non-Patent Document 14: 3GPP TR 24.301 V11.1.0
Non-Patent Document 15: 3GPP R2-120444
Non-Patent Document 16: 3GPP S2-114341

SUMMARY OF INVENTION

Problems to be Solved by the Invention

With the development of cellular radio communications, typified by the standard of 3GPP described above, communications between applications in various manners using a radio network are currently performed or are expected to be performed. Examples of such communications include machine type communication (abbreviated as MTC) in 3GPP and communication between applications assumed to be cable communication described in IEEE 802.3 standard.

Such applications are used in the environments and manners different from those in conventional mobile communications, causing various challenges and problems.

The communication terminal devices (hereinafter, referred to as "MTC terminals") that perform MTC are assumed to be used, for example, installed for gas metering, animals, and the like (see Non-Patent Document 11). In such cases, the MTC terminals are battery-driven, and accordingly, it should be assumed that the batteries are difficult to be replaced or re-charged. This requires much lower power consumption than a normal communication terminal device. Additionally, the MTC terminal needs to be monitored because it involves a risk of being stolen or broken.

For an application different from MTC, in the communications with a hypertext transfer protocol (HTTP) and a transmission control protocol (TCP), packets having a small data volume (hereinafter, referred to as "keep-alive packets") may be regularly transmitted to only monitor the session connection between the applications which are end-end in communication (see "Non-Patent Document 12"). On this occasion, the communication terminal device may need to regularly perform connection processing, specifically, calling processing to transmit keep-alive packets.

The connection procedure uses the system resources in the radio access network, unfortunately increasing the radio resources and the processing load of a communication node. Further, the connection procedure regularly performed will increase the power consumption of the communication terminal device.

The present invention has an object to provide a communication system capable of confirming the state of a communication terminal device with reduced processing load and reduced power consumption.

Means to Solve the Problems

A communication system of the present invention includes a base station device to be connected to a network and a communication terminal device to be connected to the base station device so as to perform radio communication, wherein the base station device and the communication terminal device transmit and receive a monitoring message for confirming a state of the communication terminal device to and from each other in a predetermined monitoring period.

Effects of the Invention

The communication system of the present invention can confirm the state of a communication terminal device with reduced processing load and reduced power consumption.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a diagram illustrating the configuration of a radio frame used in the LTE communication system.

FIG. 3 is a diagram illustrating the configuration of an MBSFN frame.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 10 is a block diagram showing the configuration of an MME unit 73 of FIG. 7 being an MME according to the present invention.

FIG. 11 is a block diagram showing the configuration of a HeNBGW 74 of FIG. 7 being a HeNBGW according to the present invention.

FIG. 12 is a flowchart showing an outline from a cell search to an idle state operation performed by a user equipment (UE) in the LTE communication system.

FIG. 16 is a diagram showing an exemplary sequence of a random access procedure.

FIG. 19 is a diagram showing an exemplary sequence of a paging procedure in the LTE communication system.

FIG. 20 is another diagram showing the exemplary sequence of the paging procedure in the LTE communication system.

FIG. 23 is a diagram showing another exemplary sequence of the communication system in the fifth modification of the first embodiment.

FIG. 25 is a diagram showing still another exemplary sequence of the communication system in the fifth modification of the first embodiment.

FIG. 39 is another diagram showing the exemplary sequence of the communication system in the fourth embodiment.

FIG. 56 is still another diagram showing the other exemplary sequence of the communication system in the first modification of the sixth embodiment.

FIG. 57 is a diagram showing a sequence for describing a problem in a seventh embodiment.

DESCRIPTION OF EMBODIMENTS

First Embodiment

Figure 7:
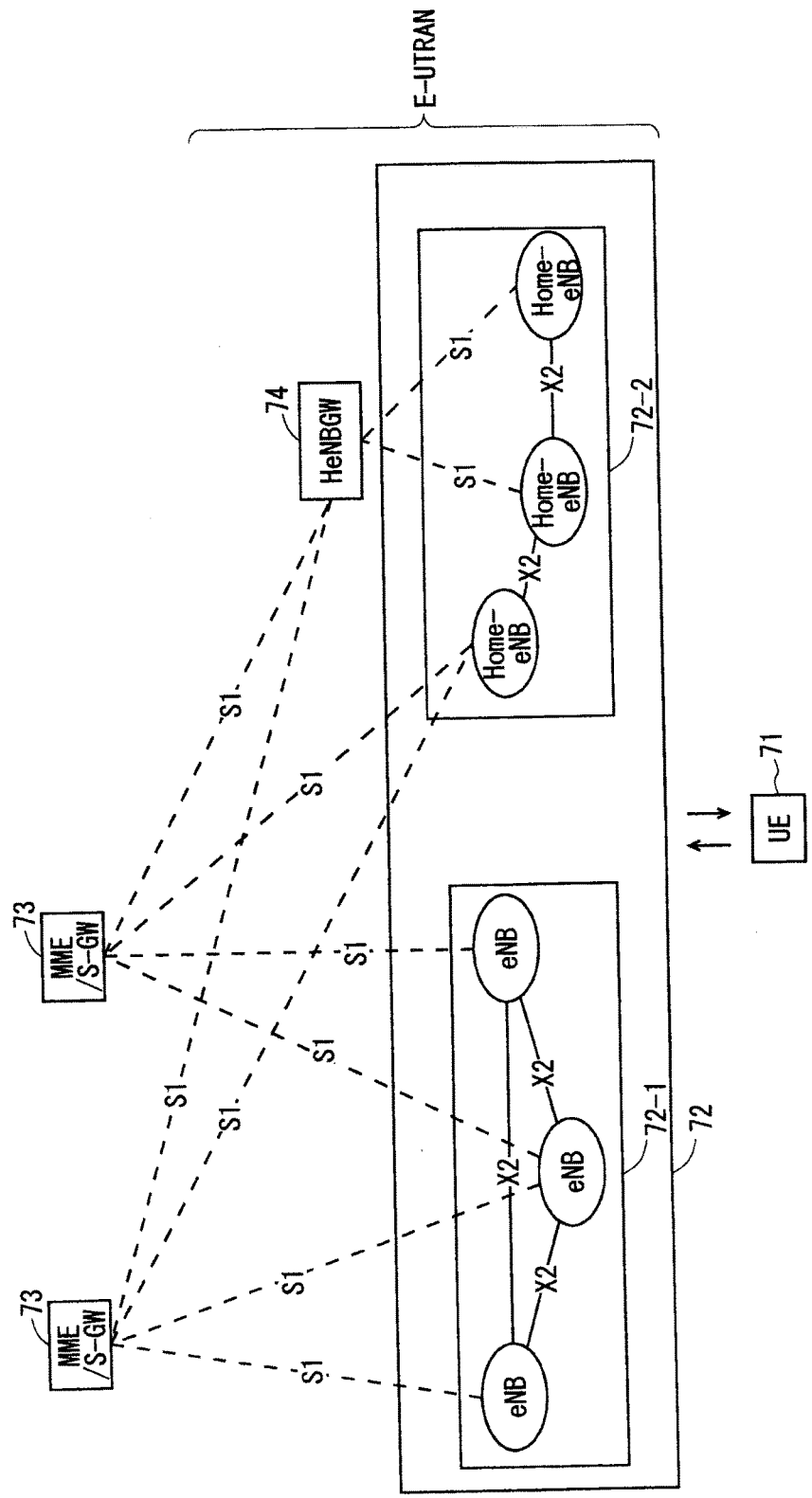
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, proposes the configuration as shown in FIG. 7 (see Chapter 4.6.1 of Non-Patent Document 1).

FIG. 7 will be described. A mobile terminal device being a communication terminal device (hereinafter, referred to as a "user equipment" or "UE") 71 is capable of performing radio communication with a base station device (hereinafter, referred to as a "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which communication is allowed with the user equipment (UE) 71. The Home-eNB 72-2 has a relatively small-scale coverage as the coverage.

The eNB 72-1 is connected to an MME/S-GW unit (hereinafter, also referred to as an "MME unit") 73 including an MME, S-GW, or MME and S-GW through an S1 interface, and control information is communicated between the eNB 72-1 and the MME unit 73. A plurality of MME units 73 may be connected to one eNB 72-1. The MME unit 73 is included in an EPC being a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB gateway (HeNBGW) 74. The Home-eNBs 72-2 are connected to the HeNBGW 74 by means of the S1 interface, and the HeNBGW 74 is connected to the MME units 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connection between the user equipment (UE) 71 and the eNB 72-1 or Home-eNB 72-2 being a base station. The MME units 73 and HeNBGW are included in the EPC being a core network.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the eNB 72-1. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The HeNBGW 74 does not support the mobility to the Home-eNB 72-2 or the mobility from the Home-eNB 72-2 that spans a plurality of MME units 73. The Home-eNB 72-2 constitutes and supports a single cell.

The base station device supports a single cell alone, such as the Home-eNB 72-2, which is not limited thereto. One base station device may support a plurality of cells. In the case where one base station device supports a plurality of cells, every cell functions as a base station device.

Figure 8:
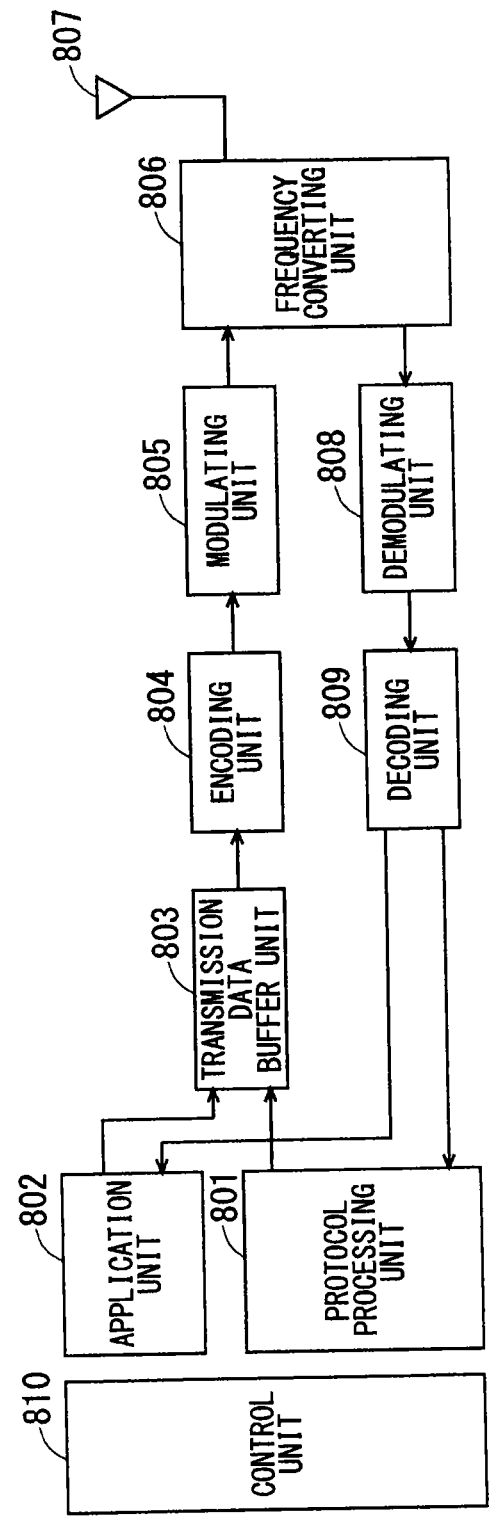
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and is then converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 8, the control unit 810 is connected to the respective units 801 to 809.

Figure 9:
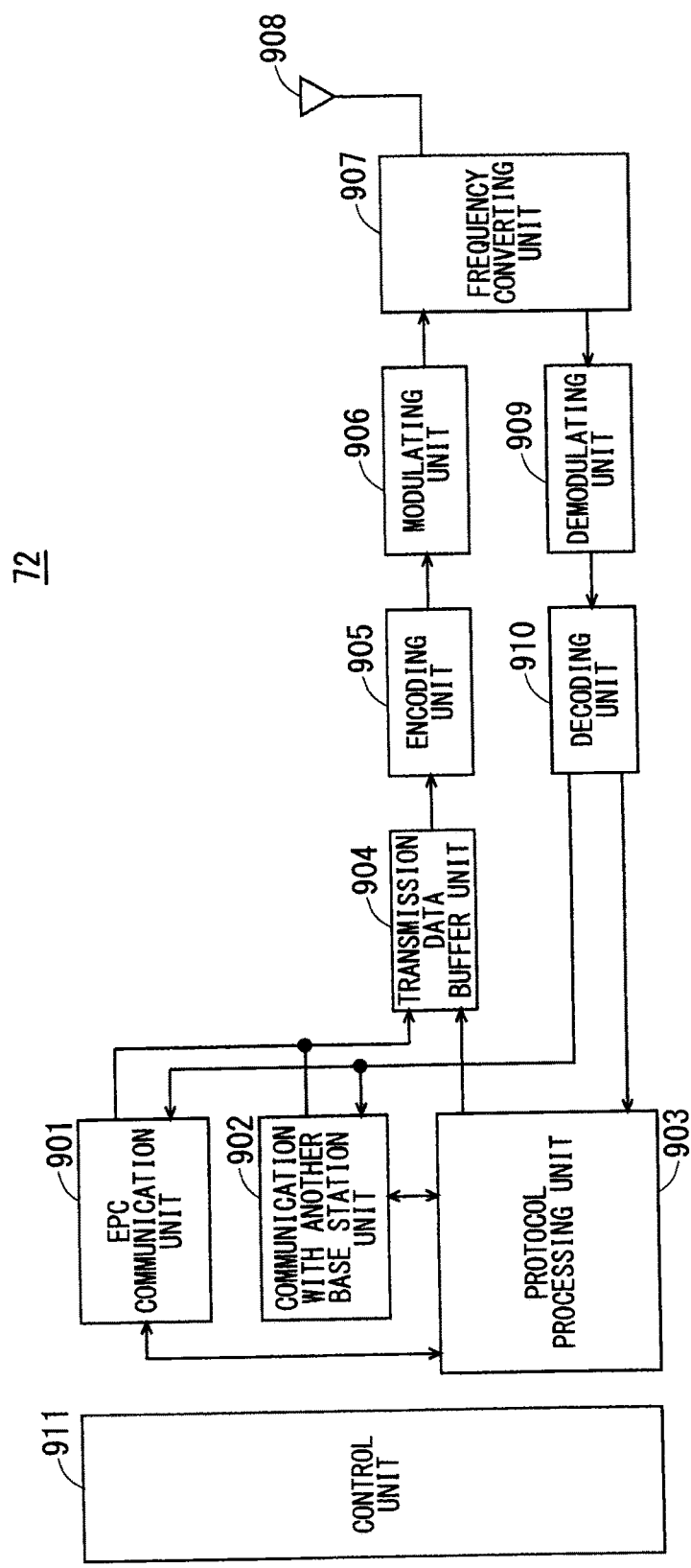
FIG. 9 is a block diagram showing the configuration of a base station 72 of FIG. 7 being a base station according to the present invention.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission and reception between the base station 72 and the EPCs (such as MME unit 73 and HeNBGW 74). A communication with another base station unit 902 performs data transmission and reception to/from another base station. The EPC communication unit 901 and the communication with another base station unit 902 respectively transmit and receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, EPC communication unit 901, or communication with another base station unit 902, while the user data is passed to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in the case of connection to the HeNBGW 74. The Home-eNB 72-2 is connected only to one HeNBGW 74. That is, in the case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of by the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission and reception between the MME 73*a* and a PDN GW. A base station communication unit 1002 performs data transmission and reception between the MME 73*a* and the base station 72 by means of the S1 interface. In the case where the data received from the PDN GW is user data, the user data is passed from the PDN GW communication unit 1001 to the base station communication unit 1002 through a user plane communication unit 1003 and is then transmitted to one or a plurality of base stations 72. In the case where the data received from the base station 72 is user data, the user data is passed from the base station communication unit 1002 to the PDN GW communication unit 1001 through the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception of the interface (IF) between the MME 73*a* and the HeNBGW 74 according to an information type. The control data received from the HeNBGW communication unit 1004 is passed from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3, and other unit, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in an idle state, addition, deletion, update, and search of a tracking area (TA) of one or a plurality of user equipments 71 being served thereby, and tracking area list (TA list) management.

The MME 73*a* begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73*a*, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, one or a plurality of CSG-IDs with which user registration has been performed by a user equipment may be stored in the whitelist. The above-mentioned management related to the CSG may be performed by another part of the MME 73*a*. A series of processes by the MME 73*a* is controlled by a control unit 1006. This means that, though not shown in FIG. 10, the control unit 1006 is connected to the respective units 1001 to 1005.

The function of the MME 73*a* currently under discussion of 3GPP will be described below (see Chapter 4.6.2 of Non-Patent Document 1). The MME 73*a* performs access control for one or a plurality of user equipments being members of closed subscriber groups (CSGs). The MME 73*a* recognizes the execution of paging optimization as an option.

FIG. 11 is a block diagram showing the configuration of the HeNBGW 74 of FIG. 7 being a HeNBGW according to the present invention. An EPC communication unit 1101 performs data transmission and reception between the HeNBGW 74 and the MME 73*a* by means of the S1 interface. A base station communication unit 1102 performs data transmission and reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73*a* through the EPC communication unit 1101. The data processed by the location processing unit 1103 is passed to the base station communication unit 1102 and is passed to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP will be described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73*a*. When the HeNBGW 74 is deployed, the procedure that is not associated with the user equipment 71 is communicated between the Home-eNB 72-2 and the HeNBGW 74 and between the HeNBGW 74 and the MME 73*a*. The X2 interface is not set between the HeNBGW 74 and another node. The HeNBGW 74 recognizes the execution of paging optimization as an option.

An example of a cell search method in a mobile communication system will be described next. FIG. 12 is a flowchart showing an outline from a cell search to an idle state operation performed by a user equipment (UE) in the LTE communication system. When starting a cell search, in Step ST1201, the user equipment synchronizes the slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. These 504 ways are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, cell having the highest RS received power, that is, best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information on cell selection, and scheduling information about other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area (TA) list that has already been possessed by the user equipment. The tracking area (TA) list is also referred to as a TAI list. TAI is a TA identity and is formed of a mobile country code (MCC), a mobile network code (MNC), and a tracking area code (TAC). MCC is a country code. MNC is a network code. TAC is a TA code number.

In the case where the TAC received in Step ST1205 is identical to the TAC included in the tracking area (TA) list as a result of the comparison of Step ST1206, the user equipment enters an idle state operation in the cell. In the case where the TAC received in Step ST1205 is not included in the tracking area (TA) list as a result of the comparison, the user equipment requires a core network (EPC) including MME and the like to change a tracking area (TA) through the cell for performing tracking area update (TAU).

The core network updates the tracking area (TA) list based on an identification number (such as a UE-ID) of the user equipment transmitted from the user equipment with a TAU request signal. The core network transmits the updated tracking area (TA) list to the user equipment. The user equipment rewrites (updates) the TAC list of the user equipment based on the received tracking area (TA) list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may contain a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as the CSG cell in some cases. The user equipment registered with the CSG cell has a whitelist. Specifically, the whitelist is stored in the subscriber identity module (SIM) or USIM. The whitelist stores the CSG information of the CSG cell with which the user equipment has been registered. Specific examples of the CSG information may include CSG-ID, tracking area identity (TAT), and TAC. Any one of the CSG-ID and TAC is adequate as long as they are associated with each other. Alternatively, ECGI is adequate as long as the CSG-ID and TAC are associated with ECGI.

As can be seen from the above, the user equipment that has no whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

The HeNB and HNB are required to support various services. For example, in certain service, an operator causes the predetermined HeNB and HNB to register user equipments therein and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. A large number of closed subscriber group (CSG) cells are required to be installed in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells.

The HeNB/HNB is required not only to complement the communication out of the coverage of the macro cell (area complementing HeNB/HNB) but also to support various services as described above (service providing HeNB/HNB). This also leads to a case where the HeNB/HNB is installed within the coverage of the macro cell.

The problem to be solved in the first embodiment will be again described below. For example, for MTC, measures taken to extend the periods of the location area update (LAU) procedure, routing area update (RAU) procedure, and tracking area update (TAU) procedure are disclosed to reduce power consumption (see Chapter 6.20 of Non-Patent Document 11).

Figure 13:
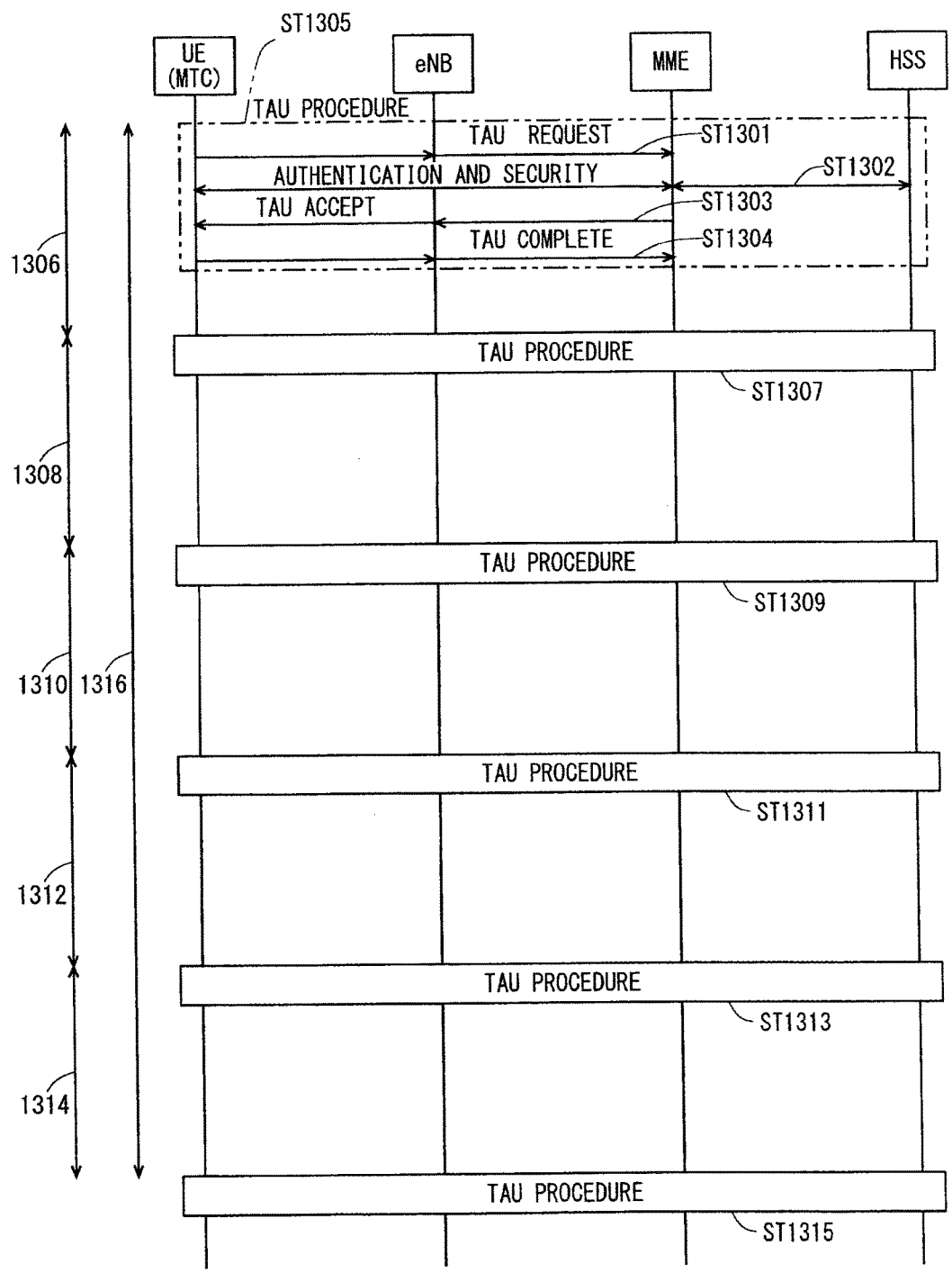
FIG. 13 is a diagram showing an exemplary sequence of a TAU procedure performed periodically in the LTE communication system.

FIG. 13 is a diagram showing an exemplary sequence of a TAU procedure to be performed periodically in an LTE communication system (see Non-Patent Document 13).

In Step ST1301, the UE notifies the MME of a TAU request message via the eNB. Specifically, the UE notifies the TAU request message using a non-access-stratum (NAS) protocol (see Non-Patent Document 14).

In Step ST1302, the MME performs the authentication and security control processes of the UE using the information of the home subscriber server (HSS).

In the case of allowing a TAU request, in Step ST1303, the MME that has received the TAU request message from the UE in Step ST1301 notifies the UE of a TAU accept message via the eNB. Specifically, the MME notifies the TAU accept message using the non-access-stratum (NAS) protocol (see Non-Patent Document 14).

In Step ST1304, the UE that has received the TAU accept message from the MME in Step ST1303 notifies the MME of a TAU complete message via the eNB. Specifically, the UE notifies the TAU complete message using the non-access stratum (NAS) protocol (see Non-Patent Document 14).

The processes of Steps ST1301 to ST1304 are collectively treated as Step ST1305, and the procedure of Step ST1305 is referred to as a TAU procedure.

As an example, the case in which TAU is performed per set period of a periodic TAU timer will be described as follows. The period of TAU to be performed periodically is set in the periodic TAU timer.

In the case where a period 1306 of TAU of the periodic TAU timer expires, in Step ST1307, a TAU procedure is performed. In Step ST1307, the processes similar to the processes of Steps ST1301 to ST1304 described above are performed.

In the case where a period 1308 of TAU of the periodic TAU timer expires, in Step ST1309, a TAU procedure is performed. In Step ST1309, the processes similar to the processes of Steps ST1301 to ST1304 described above are performed.

In the following, similarly, in the case where a period 1310 of TAU of the periodic TAU timer expires, in Step ST1311, the TAU procedure is performed. When a period 1312 of TAU of the periodic TAU timer expires, in Step ST1313, the TAU procedure is performed. In the case where a period 1314 of TAU of the periodic TAU timer expires, in Step ST1315, the TAU procedure is performed.

Next, description will be given of the case where a measure against lengthened period of TAU to be performed periodically is taken to reduce the power consumption of the MTC.

For example, the case in which TAU is performed per set period of the long periodic TAU timer will be described as follows. The period of TAU to be performed periodically is set in the long periodic TAU timer. The period of TAU to be set in the long periodic TAU timer is longer than the period of TAU to be set in the above-mentioned periodic TAU timer.

In the case where a period 1316 of TAU of the long periodic TAU timer expires, in Step ST1315, the TAU procedure is performed. In Step ST1315, the processes similar to the processes of Steps ST1301 to ST1304 described above are performed.

The periods of the LAU procedure, RAU procedure, and TAU procedure to be performed periodically are lengthened as described above, whereby, for example, the TAU procedures of Steps ST1307, ST1309, ST1311, and ST1313 of FIG. 13 can be omitted. This leads to lower power consumption in MTC or the like.

However, if the periods of the LAU procedure, RAU procedure, and TAU procedure to be performed periodically are lengthened, the process such as monitoring or monitoring movements by a network is not be performed, which is performed in the TAU procedures of Steps ST1307, ST1309, ST1311, and ST1313 of FIG. 13. This leads to a problem that monitoring and monitoring of movements will be adversely affected.

The solution in the first embodiment will be described below. A UE monitoring message between the UE and the eNB is provided. The UE periodically transmits a UE monitoring message to the eNB. In the case of receiving the UE monitoring message from the UE within the period, the eNB judges that a UE has been detected. In the case of not receiving the UE monitoring message from the UE within the period, the eNB judges that the UE has not been detected. The above-mentioned use of the UE monitoring message allows for, even if the period of the TAU procedure is lengthened, monitoring at the frequency of occurrence at which monitoring is required.

In the following description, the period in which the UE transmits a UE monitoring message to the eNB may also be referred to as "UE monitoring period".

The UE may transmit a UE monitoring message after the timer expires or when the timer expires. This timer may also be referred to as a "UE monitoring timer".

Although description will be given below mainly of the UE monitoring period, a UE monitoring timer can also be used.

In the case of receiving the UE monitoring message transmitted from the UE, the eNB may transmit delivery confirmation information to the UE. Or, in the case of receiving the UE monitoring message from the UE within the period, the eNB may transmit delivery confirmation information to the UE. Specific examples of the delivery confirmation information include a response message (ACK) at an RLC layer. The delivery confirmation information may be a status PDU.

The eNB may use a UE monitoring message to make judgment on whether or a UE exists (hereinafter, also referred to as "non-detection judgment"). In the case of judging that no UE exists, that is, a UE has not been detected, the eNB may perform the non-detection procedure.

The following seven (1) to (7) will be disclosed as specific examples of the non-detection judgment.

(1) In the case of not having received a UE monitoring message within the period, the eNB judges that a UE has not been detected. In the case of having received a UE monitoring message within the period, the eNB judges that the UE exists, that is, a UE has been detected.

(2) In the case of not having received a UE monitoring message successively within the period, a predetermined number of times, the eNB judges that a UE has not been detected. The predetermined number of times may be determined statically or semi-statically. In the case where the predetermined number of times is determined semi-statically, the UE may be notified of the predetermined number of times from the eNB or via the eNB.

The following four (2-1) to (2-4) will be disclosed as specific examples of the method of notifying a predetermined number of times.

(2-1) A predetermined number of times is notified in the broadcast information.

(2-2) A predetermined number of times is notified in the dedicated information.

(2-3) A predetermined number of times is notified in the TAU procedure, specifically, in a TAU accept message or the like.

(2-4) A predetermined number of times is notified in the attach procedure, specifically, in the attach accept, RRC connection reconfiguration message, or the like.

(3) In the case of not having received a UE monitoring message within a predetermined period, the eNB judges that a UE has not been detected. The predetermined period may be set longer than the period in which the UE transmits a UE monitoring message. The predetermined period may be determined statically or semi-statically. If the predetermined period is determined semi-statically, the UE may be notified of the predetermined period from the eNB or via the eNB. A specific example of the method of notifying a predetermined period is similar to that of the method of notifying a predetermined number of times in the specific example (2) of the non-detection judgment, which will not be described here.

(4) The periodic LAU procedure, RAU procedure, or TAU procedure may be used together. In the case of having received a UE monitoring message within the period, the eNB judges that a UE has been detected. In the case of not having received a UE monitoring message within the period, the eNB notifies the MME. The MME judges that a UE has been detected in the case where the TAU procedure has been performed within the period. The MME judges that a UE has not been detected in the case where the TAU procedure has not been performed within the period. Thus, also in the case where the eNB does not receives a UE monitoring message because the UE has moved out of the coverage of the eNB, the MME can perform an appropriate procedure. That is, the MME can appropriately judge that a UE has been detected.

(5) In the case of not having received a UE monitoring message within the period, the eNB may transmit this (hereinafter, also referred to as "notification of UE monitoring message parameters") to a neighbor eNB. The notification of UE monitoring message parameters may be transmitted to a neighbor eNB by means of an X2 interface or S1 interface.

The neighbor eNB that has received the notification of UE monitoring message parameters starts receiving the UE monitoring message from the UE. The neighbor eNB that has received the UE monitoring message from the UE notifies the eNB, which has transmitted the notification of UE monitoring message parameters, that it has received the UE monitoring message. The neighbor eNB that has not received a UE monitoring message from the UE notifies the eNB, which has transmitted the notification of UE monitoring message parameters, that it will not receive a UE monitoring message.

In the case of having received from the neighbor eNB the notification that it has received a UE monitoring message, the eNB judges that a UE has been detected. In the case of having received from the neighbor eNB the notification that it will not receive a UE monitoring message or in the case of not having received a UE monitoring message from a neighbor eNB, the eNB judges that the UE has not been detected.

The following two (5-1) and (5-2) will be disclosed as specific examples of the method of transmitting the notification of UE monitoring message parameters.

(5-1) An X2 signal or X2 message is newly provided. Or, an S1 signal or S1 message is newly provided.

(5-2) The existing X2 signal or X2 message is used. Or, the existing S1 signal or S1 message is provided. Compared with the specific example (5-1), the specific example (5-2) is effective in that no additional signal needs to be provided. The specific example (5-2) can prevent the communication system from becoming complicated.

The following four (5-a) to (5-d) will be disclosed as specific examples of the parameters to be mapped to the X2 signal or S1 signal.

(5-a) Identification number (such as UE-ID) of the user equipment.

(5-b) Indication that the user equipment is a UE that transmits a UE monitoring message to the eNB, which may be an indication of MTC.

(5-c) UE monitoring period.

(5-d) Combination of (5-a) to (5-c) above.

The specific example (5) allows a UE to be detected appropriately also in the case where the eNB does not receive a UE monitoring message because the UE has moved out of the coverage of the eNB. The specific example (5) can also achieve an effect that the UE can continuously transmit a UE monitoring message to an eNB being a moving destination, on the same condition such as the same period. Moreover, the specific example (5) can achieve an effect that the eNB being a moving destination and the UE need not to newly exchange parameters but the UE can continuously transmit a UE monitoring message, to thereby prevent a control delay.

(6) After judging that a UE has not been detected in (1) to (5) above, the UE is notified of paging. In the case where there is a response from the UE, it is judged that a UE has been detected. In the case where there is no response from the UE, it is judged that a UE has not been detected.

(7) Combination of (1) to (6) above.

The following three (1) to (3) will be disclosed as specific examples of the non-detection procedure.

(1) The eNB notifies a predetermined notification destination that a UE has not been detected. Specific examples of the predetermined notification destination include an operation administration and maintenance (OAM), an application server, and an MTC server.

(2) The detach procedure is started. The detach procedure is used as a trigger.

(3) Combination of (1) and (2) above.

The following four (1) to (4) will be disclosed as specific examples of the purpose of the UE notifying the eNB of a UE monitoring message.

(1) To inform a partner that the UE is "alive", that is, keeps alive.

(2) To inform a partner that the UE exists.

(3) To inform that the UE is not down. To inform that the UE is properly operating.

(4) Combination of (1) to (3) above.

The following four (1) to (4) will be disclosed as specific examples of the UE monitoring message.

(1) Message at only a Uu point. The Uu point is an interface point between the UE and eNB, between the UE and HeNB, or between the UE and RN. In the specific example (1), TAU is notified from the UE to the MME, which serves as a message relating to a Uu point and an S1 point (see Steps ST1301, ST1302, ST1303, and ST1304 of FIG. 13). The specific example (1) reduces the communication time between the UE and eNB, leading to the lower power consumption of the UE.

(2) Message not required to be notified a higher-level entity for the eNB. Specific examples of the higher-level entity include MME and HSS. In the specific example (2), TAU serves as a message required to be notified the MME and HSS, differently from the UE monitoring message (see Steps ST1301 and ST1302 of FIG. 13). The specific example (2) reduces the communication time between the UE and eNB, leading to the lower power consumption of the UE.

(3) RRC message. In the specific example (3), TAU serves as a NAS message, differently from the UE monitoring message.

(4) Combination of (1) to (3) above.

The following two (1) and (2) will be disclosed as specific examples of the case in which the UE monitoring message is an RRC message.

(1) An RRC signal or RRC message is newly provided.

(2) The existing RRC signal or RRC message is used. Compared with the specific example (1), the specific example (2) is effective in that a new signal needs not to be provided. The specific example (2) can prevent the communication system from becoming complicated.

The following four (1) to (4) will be disclosed as specific examples of the parameters to be newly mapped to the RRC signal.

(1) Indication that, for example, the parameter is a UE monitoring message, the UE is "alive", the UE keeps alive, the UE exists, the UE is not down, or the UE is normally operating.

(2) UE identity. The UE identity may be a user equipment identity (UE-ID) or an international mobile subscriber identity (IMSI).

(3) Sequence number, which may be a sequence number to be incremented per transmission or a sequence number for enhancing security. For example, security can be enhanced as follows; even if a cipher key is stolen, the message cannot be decrypted unless the sequence number is accurate. The sequence number to be initialized in the TAU procedure or the like can prevent a considerable increase in the bit count required for transmitting a sequence number.

(4) Combination of (1) to (3) above.

Next, a specific example of the case in which the existing RRC signal is used will be disclosed. A measurement report message is used.

Specific examples of the parameters required to be added to the existing RRC signaling include the indication that the parameter is a UE monitoring message, the UE is "alive", the UE keeps alive, the UE exists, the UE is not down, and the UE is normally operating.

The UE monitoring message may be transmitted as the data encrypted with a cipher key accepted in the TAU authentication procedure. This enables the eNB to detect a UE monitoring message associated with illegal UE spoofing unless the cipher key and the sequence number for enhancing security are decrypted. The cipher key may be changed appropriately during the TAU authentication procedure, in consideration of the traffic and period.

Alternatively, a message authentication code may be added to perform message authentication.

If detecting UE spoofing, the eNB may perform the procedure according to the operation policy of the service provider (hereinafter, referred to as "illegal UE detection procedure"). The following three (1) to (3) will be disclosed as specific examples of the illegal UE detection procedure.

(1) The eNB notifies a predetermined notification destination that an illegal UE has been detected. Specific examples of the predetermined notification destination include an OAM, application server, and MTC server.

(2) The detach procedure is started. The detach procedure is used as a trigger.

(3) Combination of (1) and (2) above.

The following four (1) to (4) will be disclosed as specific examples of the method of setting a UE monitoring period.

(1) Notification is made in the broadcast information. In this specific example (1), notification needs not to be made per UE, achieving an effect that radio resources can be used effectively.

(2) Notification is made in the dedicated information. In this specific example (2), a set value can be determined per UE, allowing for the construction of a flexible communication system.

(3) Notification is made in the TAU procedure. Specifically, notification is made in a TAU accept message or the like.

(4) Notification is made in the attach procedure. Specifically, notification is made in the attach accept message, RRC connection reconfiguration, or the like.

The following two (1) and (2) will be disclosed as specific examples of the operation in the case where the UE monitoring period and the period of TAU to be performed periodically expire simultaneously.

(1) The UE monitoring procedure and the TAU procedure are both performed. The specific example (1) can determine the procedure per period, resulting in an effect that control can be prevented from becoming complicated.

(2) The TAU procedure may be performed without performing the UE monitoring procedure. In the specific example (2), the UE needs not to transmit a UE monitoring message. The network can monitor the UE in the TAU procedure, whereby omitting the transmission of a UE monitoring message results in an effect that the power consumption of the UE can be reduced.

Specific examples of the set values of the UE monitoring period and the period of TAU to be performed periodically include values set in the periodic TAU timer.

The period of TAU to be performed periodically may be an integral multiple of the UE monitoring period or an inverse multiple of the integer (1/integral multiple) thereof. This causes the UE monitoring period and the period of TAU to be performed periodically to simultaneously expire more frequently, increasing a possibility that the power consumption of the UE can be effectively reduced.

The following four (1) to (4) will be disclosed as specific examples of the set value of the UE monitoring period.

(1) Number of radio frames.

(2) Number of subframes.

(3) In the case where the UE monitoring period is an integral multiple of the period of TAU to be periodically executed or an inverse multiple of the integer (1/integral multiple) thereof, the "integer" is treated as a set value of the UE monitoring period.

(4) Combination of (1) to (3) above.

Figure 14:
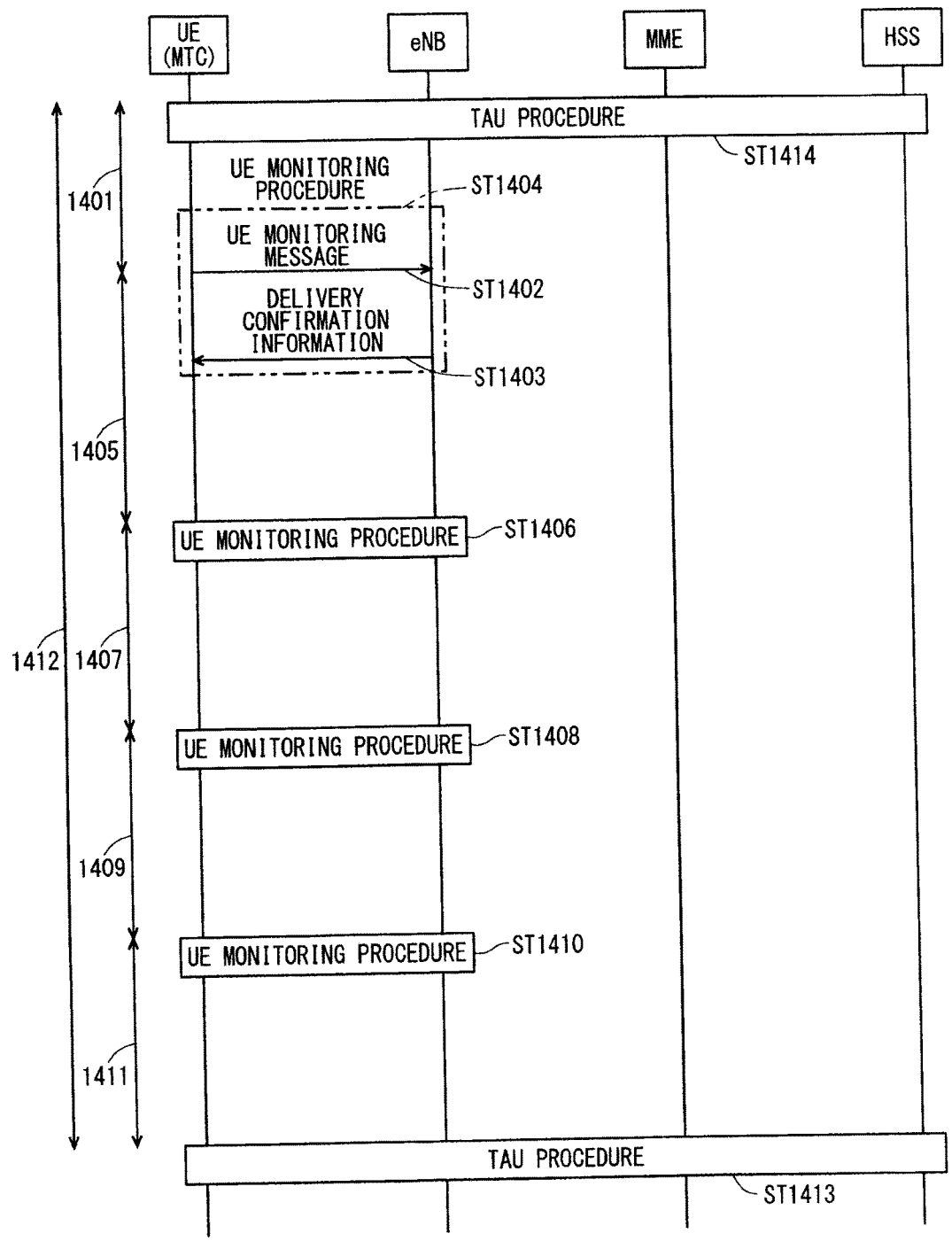
FIG. 14 is a diagram showing an exemplary sequence of a communication system in a first embodiment.

Next, a specific example of the sequence of the communication system in the first embodiment will be described with reference to FIG. 14. FIG. 14 is a diagram showing an exemplary sequence of the communication system in the first embodiment. FIG. 14 shows the sequence in the case where the UE transmits a UE monitoring message per UE monitoring period. The sequence shown in FIG. 14 is similar to the sequence shown in FIG. 13, and thus, the same steps will be denoted by the same step numbers and common description will be skipped.

In Step ST1414, the TAU procedure is performed as in Step ST1305 described above.

In Step ST1402, the UE notifies the eNB of a UE monitoring message in a UE monitoring period 1401.

In Step ST1403, the eNB that has received the UE monitoring message in Step ST1402 transmits delivery confirmation information to the UE.

The processes of Steps ST1402 and ST1403 are collectively treated as Step ST1404, and the procedure of Step ST1404 is referred to as a UE monitoring procedure.

In Step ST1406, the UE monitoring procedure is performed between the UE and the eNB in a UE monitoring period 1405.

In Step ST1408, the UE monitoring procedure is performed between the UE and the eNB in a UE monitoring period 1407.

In Step ST1410, the UE monitoring procedure is performed between the UE and the eNB in a UE monitoring period 1409.

In the case where a UE monitoring period 1411 and a period 1412 of TAU to be performed periodically occur simultaneously, the TAU procedure is performed in Step ST1413.

The first embodiment described above can achieve the following effect. Newly providing a UE monitoring procedure allows for monitoring through the UE monitoring procedure even if the period of the periodic TAU procedure is lengthened.

The UE monitoring procedure is configured to consume less power than the TAU procedure, resulting in an effect of lower power consumption.

The UE monitoring period and the period of TAU can be set individually. This results in an effect that the TAU procedure can be operated flexibly.

Through the procedures above, the consumption power of the communication terminal device can be reduced, and monitoring and movement monitoring by the network are enabled.

The communication system of this embodiment can confirm the state of the UE with reduced processing load and reduced power consumption.

In this embodiment, the UE monitoring message is transmitted from the UE to the eNB, and the eNB judges the state of the UE based on whether or not it has received the UE monitoring message from the UE. This achieves a communication system capable of confirming the state of the UE with reduced processing load and reduced power consumption as described above.

First Modification of First Embodiment

A first modification of the first embodiment will describe a further improvement of the first embodiment described above. This modification will mainly describe a difference from the solution in the first embodiment described above and will not describe a similarity to the first embodiment.

In the case of receiving a UE monitoring message from the UE, the eNB transmits, to the UE, a response message to the UE monitoring message. In the first modification, the response message may be ciphered. Contrary to the delivery confirmation information being a simple confirmation message, for example, the ACK information in the first embodiment, in the first modification, a response message ciphered for the UE monitoring message is transmitted, to thereby detect eNB spoofing by the UE.

The response message to the UE monitoring message may be an RRC message. The following two (1) and (2) will be disclosed as specific examples of the case in which the response message to the UE monitoring message is an RRC message.

(1) An RRC signal or RRC message is newly provided.

(2) The existing RRC signal or RRC message is used. Compared with the specific example (1), the specific example (2) is effective in that a new signal needs not to be provided. The specific example (2) can prevent the communication system from becoming complicated.

The following four (1) to (4) will be disclosed as specific examples of the parameters to be newly mapped to an RRC signal.

(1) Indication that the parameter is a response message to a UE monitoring message.

(2) Cell identity, specifically, which may be PCI, CGI, or ECGI.

(3) Sequence number, which may be a sequence number to be incremented per transmission or a sequence number for enhancing security. For example, security can be enhanced as follows; even if a cipher key is stolen, the message cannot be decrypted unless the sequence number is accurate. The sequence number to be initialized in the TAU procedure or the like can prevent a considerable increase in the bit count required for transmitting a sequence number.

(4) Combination of (1) to (3) above.

Next, a specific example of the case in which the existing RRC signal will be used is disclosed. The RRC connection reconfiguration message is used.

Specific examples of the parameters required to be added to the existing RRC signaling include the indication that the parameter is a response message to a UE monitoring message. The indication that the parameter is a response message to a UE monitoring message may be included in a parameter of "cause" set in the existing RRC signaling to be notified.

The response message to the UE monitoring message may be transmitted as the data ciphered with the cipher key accepted in the TAU authentication procedure. As a result, unless the cipher key and the sequence number for enhancing security are decoded, the UE can detect a response message to a UE monitoring message by illegal eNB spoofing. The cipher key may be appropriately changed during the TAU authentication procedure in consideration of the traffic and period.

A message authentication code may be added for message authentication.

In the case of detecting eNB spoofing, the UE may perform the procedure according to the operation policy of the service provider (hereinafter, referred to as "illegal eNB detection procedure"). Specific examples of the illegal eNB detection procedure include the deletion of internal information.

Next, a specific example of the sequence of the communication system in the first modification of the first embodiment will be described with reference to FIG. 14.

In Step ST1403, the eNB that has received the UE monitoring message in Step ST1402 transmits, to the UE, a response message to the UE monitoring message.

The first modification of the first embodiment described above can achieve the following effect in addition to the effects of the first embodiment: eNB spoofing by the UE can be detected.

Second Modification of First Embodiment

A second modification of the first embodiment will disclose another solution to the same problem as that of the first embodiment. The solution in the second modification of the first embodiment will be described below. This modification will mainly describe a difference from the solution of the first embodiment described above and will not describe a similarity to the first embodiment.

In this modification, a UE monitoring message between the UE and the eNB is provided. The eNB periodically transmits the UE monitoring message to the UE. In the case of receiving the UE monitoring message, the UE notifies the eNB of delivery confirmation information. In the case of receiving the delivery confirmation information, the eNB judges that a UE has been detected. In the case of not receiving the delivery confirmation information, the eNB judges that a UE has not been detected. The use of a UE monitoring message in this manner enables monitoring at the frequency of occurrence at which monitoring is required even if the period of a TAU procedure is lengthened.

In the description below, the period in which the eNB transmits a UE monitoring message to the UE may also be referred to as a "UE monitoring period".

The eNB may transmit a UE monitoring message after a timer expires or when a timer expires. This timer may also be referred to as a "UE monitoring timer".

While description will be given mainly of a UE monitoring period, the UE monitoring timer can also be used.

Specific examples of the delivery confirmation information include a response message (ACK) at an RLC layer. The delivery confirmation information may be a status PDU.

The eNB may make a judgment on whether or not the UE exists (hereinafter, also referred to as "non-detection judgment") using the delivery confirmation information corresponding to the UE monitoring message. In the case of judging that no UE exists, that is, judging that a UE has not been detected, the eNB may perform the non-detection procedure.

The following six (1) to (6) will be disclosed as specific examples of the non-detection judgment.

(1) In the case of not receiving the delivery confirmation information within the period, the eNB judges that a UE has not been detected. In the case of receiving the delivery confirmation information within the period, the eNB judges that the UE exists, that is, a UE has been detected.

(2) In the case of not having received the delivery confirmation information successively within the period, a predetermined number of times, the eNB judges that the UE has not been detected. The predetermined number of times may be determined statically or semi-statically. In the case where the predetermined number of times is determined semi-statically, the UE may be notified of the predetermined number of times from the eNB or via the eNB.

The following four (2-1) to (2-4) will be disclosed as specific examples of the method of notifying a predetermined number of times.

(2-1) Notification is made in the broadcast information.
(2-2) Notification is made in the dedicated information.
(2-3) Notification is made in the TAU procedure. Specifically, notification is made in a TAU accept message or the like.
(2-4) Notification is made in the attach procedure. Specifically, notification is made in an attach accept message, RRC connection reconfiguration message, or the like.

(3) In the case of not receiving the delivery confirmation information within a predetermined period, the eNB judges that a UE has not been detected. The predetermined period may be set to be longer than the period in which the UE transmits a UE monitoring message. The predetermined period may be determined statically or semi-statically. In the case where the predetermined period is determined semi-statically, the UE may be notified of the predetermined period from the eNB or via the eNB. Specific examples of the method of notifying a predetermined period are similar to those of the method of notifying a predetermined number of times in the specific example (2) for the non-detection judgment, which will not be described here.

(4) A periodic LAU procedure, RAU procedure, or TAU procedure may be used together. In the case of receiving delivery confirmation information within the period, the eNB judges that a UE has been detected. In the case of not receiving the delivery confirmation information within the period, the eNB notifies the MME. In the case where the TAU procedure has been performed within the period, the MME judges that a UE has been detected. In the case where the TAU procedure has not been performed within the period, the MME judges that a UE has not been detected.

Thus, also in the case where the eNB does not receives a UE monitoring message because the UE has moved out of the coverage of the eNB, the MME can perform an appropriate procedure. That is, the MME can appropriately judge that a UE has been detected.

(5) After judging that a UE has not been detected in (1) to (4) above, the eNB notifies this UE of paging. If there is a response from the UE, the eNB judges that a UE has been detected. If there is no response from the UE, the eNB judges that a UE has not been detected.

(6) Combination of (1) to (5) described above.

Specific examples of the non-detection procedure are similar to those of the first embodiment described above, which will not be described here.

In the case of not receiving the UE monitoring message within the period, the UE may notify the eNB of that. This allows the eNB or the network to detect an abnormality.

The following four (1) to (4) will be disclosed as specific examples of the purpose of the eNB notifying the UE of a UE monitoring message.

(1) Inquiry of whether the UE is "alive".
(2) Inquiry of whether the UE exists.
(3) Inquiry of whether the UE is normally operating.
(4) Combination of (1) to (3) described above.

The following three (1) to (3) will be disclosed as specific examples of the UE monitoring message.

(1) Message at only a Uu point. The Uu point is an interface point between the UE and eNB, between the UE and HeNB, or between the UE and RN.
(2) RRC message. In this example (2), TAU serves as a NAS message differently from the UE monitoring message.
(3) Combination of (1) and (2) above.

The following two (1) and (2) will be disclosed as specific examples of the case in which the UE monitoring message is an RRC message.

(1) An RRC signal or RRC message is newly provided.
(2) The existing RRC signal or RRC message is used. Compared with the specific example (1), the specific example (2) is effective in that a new signal needs not to be provided. The specific example (2) can prevent the communication system from becoming complicated.

The following four (1) to (4) will be disclosed as specific examples of the parameters to be newly mapped to the RRC signal.

(1) Indication that a parameter is an inquiry of whether, for example, the UE is "alive", whether the UE exists, or the UE is normally operating.
(2) Cell identity, specifically, which may be PCI, CGI, or ECGI.
(3) Sequence number, which may be a sequence number to be incremented per transmission or a sequence number for enhancing security. For example, security can be enhanced as follows; even if a cipher key is stolen, the message cannot be decrypted unless the sequence number is accurate. The sequence number to be initialized in the TAU procedure or the like can prevent a considerable increase in the bit count required for transmitting a sequence number.
(4) Combination of (1) to (3) above.

Next, specific examples of the case in which the existing RRC signal is used will be disclosed below. An RRC connection reconfiguration message is used.

Specific examples of the parameters required to be added to the existing RRC signaling include the inquiry of whether the UE is "alive", the UE exists, or the UE is normally operating.

The UE monitoring message may be transmitted as the data ciphered with the cipher key accepted in the TAU authentication procedure. Unless the cipher key and the sequence number for enhancing security are decrypted, the UE can detect a UE monitoring message due to illegal eNB spoofing. The cipher key may be appropriately changed in the TAU authentication procedure in consideration of the traffic and period.

Or, a message authentication code may be added for message authentication.

If detecting eNB spoofing, the UE may perform the illegal eNB detection procedure according to the operation policy of the service provider. Specific examples of the illegal eNB detection process include the deletion of internal information.

The following five (1) to (5) will be disclosed as specific examples of the set value of the UE monitoring period.
(1) Number of radio frames.
(2) Number of subframes.
(3) In the case where the UE monitoring period is an integral multiple of the period of TAU to be periodically executed or an inverse multiple of the integer (1/integral multiple) thereof, the "integer" is a set value of the UE monitoring period.
(4) Timing is made identical to the timing for receiving a paging message. Or, the timing for receiving a paging message is an integral multiple of the UE monitoring period or an inverse multiple of the integer (1/integral multiple) thereof.

Specific examples of the case in which the timing is made identical to the timing for receiving a paging message include a case in which a paging frame (PF) or paging occasion (PO) is used in the UE monitoring period (see Non-Patent Document 3). This eliminates the need to set a UE monitoring period anew, achieving an effect that radio resources can be effectively used.

As the operation of the UE, the timing for receiving a paging message is made identical to the timing for receiving a UE monitoring message. This reduces the timings at which the UE turns on the power source of a receiver circuit. Therefore, an effect that the power consumption of the UE is reduced can be achieved.
(5) Combination of (1) to (4) above.

Figure 15:
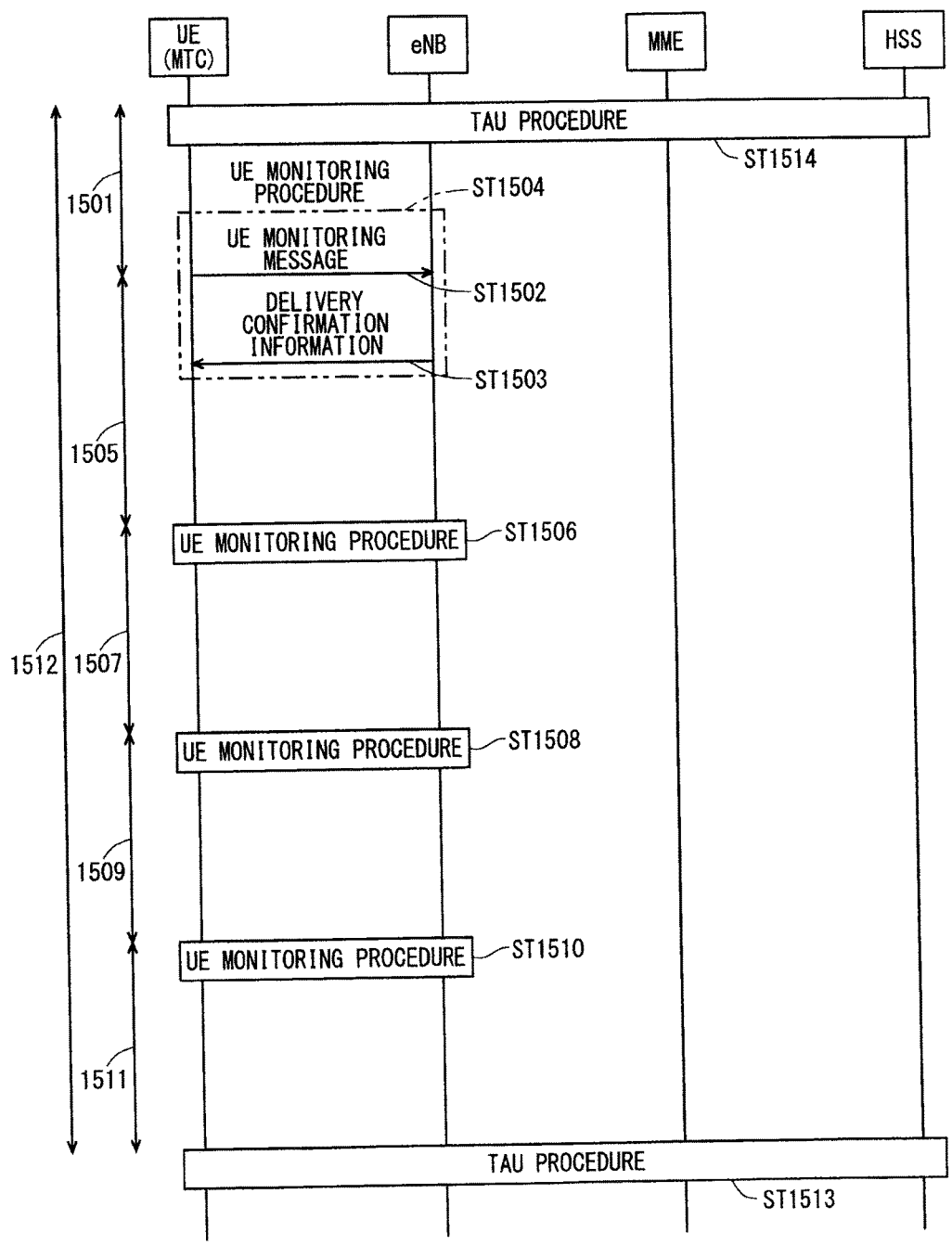
FIG. 15 is a diagram showing an exemplary sequence of a communication system in a second modification of the first embodiment.

Next, a specific example of the sequence of a communication system in the second modification of the first embodiment will be described with reference to FIG. 15. FIG. 15 is a diagram showing an exemplary sequence of the communication system in the second modification of the first embodiment. FIG. 15 shows the sequence in the case in which the eNB transmits a UE monitoring message per UE monitoring period. The sequence shown in FIG. 15 is similar to the sequence shown in FIG. 13, and thus, the same steps will be denoted by the same step numbers and common description will be skipped.

In Step ST1502, the eNB notifies the UE of a UE monitoring message in a UE monitoring period 1501.

In Step ST1503, the UE that has received the UE monitoring message in Step ST1502 transmits delivery confirmation information to the eNB.

The processes of Steps ST1502 and ST1503 described above are collectively referred to as Step ST1504, and the procedure of Step ST1504 is referred to as a UE monitoring procedure.

In Step ST1506, the UE monitoring procedure is performed between the UE and eNB in a UE monitoring period 1505.

In Step ST1508, the UE monitoring procedure is performed between the UE and eNB in a UE monitoring period 1507.

In Step ST1510, the UE monitoring procedure is performed between the UE and eNB in a UE monitoring period 1509.

In the case where a UE monitoring period 1511 and a period 1512 of TAU to be performed periodically occur simultaneously, the TAU procedure is performed in Step ST1513.

The second modification of the first embodiment can achieve similar effects to those of the first embodiment described above.

Third Modification of First Embodiment

A third modification of the first embodiment will describe a further improvement of the second modification of the first embodiment described above. This modification will mainly describe a difference from the solution in the second modification of the first embodiment described above and will not describe a similarity to the second modification of the first embodiment.

In the case of receiving a UE monitoring message from the eNB, the UE transmits, to the eNB, a response message to the UE monitoring message. In this modification, the response message may be ciphered. Unlike a confirmation message with the simple delivery confirmation information in the second modification of the first embodiment, for example, unlike ACK information, in the third modification, a response message to the UE monitoring message is transmitted, allowing for detection of UE spoofing by the eNB.

The response message to a UE monitoring message may be treated as an RRC message. The following two (1) and (2) will be disclosed as specific examples of the case in which the response message to a UE monitoring message is an RRC message.
(1) An RRC signal or RRC message is newly provided.
(2) The existing RRC signal or RRC message is used. Compared with the specific example (1), the specific example (2) is effective in that a new signal needs not to be provided. The specific example (2) can prevent the communication system from becoming complicated.

The following four (1) to (4) will be disclosed as specific examples of the parameters to be newly mapped to an RRC signal.
(1) Indication that the parameter is a response message to a UE monitoring message.
(2) UE Identity, specifically, which may be a UE-ID or IMSI.
(3) Sequence number, which may be a sequence number to be incremented per transmission or a sequence number for enhancing security. For example, security can be enhanced as follows; even if a cipher key is stolen, the message cannot be decrypted unless the sequence number is accurate. The sequence number to be initialized in the TAU procedure or the like can prevent a considerable increase in the bit count required for transmitting a sequence number.
(4) Combination of (1) to (3) above.

Next, a specific example in the case in which the existing RRC signal is used will be disclosed. An RRC connection reconfiguration complete message is used.

Specific examples of the parameters required to be added to the existing RRC signaling include the indication that the parameter is a response message to the UE monitoring message. Indication that the parameter is a response message to the UE monitoring message may be included in the parameter of the "establishment cause" set in the existing RRC signaling to be notified.

The response message to a UE monitoring message may be transmitted as the data ciphered with the cipher key accepted in the TAU authentication procedure. This allows the eNB to detect a response message to a UE monitoring message due to illegal UE spoofing unless the cipher key and the sequence number for enhancing security are deciphered. The cipher key may be appropriately changed in the TAU authentication procedure in consideration of the traffic and period.

A message authentication code may be added for message authentication.

If detecting UE spoofing, the eNB may perform the illegal UE detection procedure according to the operation policy of the service provider. Specific examples of the illegal UE detection procedure are similar to those of the first embodiment described above, which will not be described here.

Next, a specific example of the sequence of a communication system in the third modification of the first embodiment will be described with reference to FIG. 15.

In Step ST1503, the UE that has received the UE monitoring message in Step ST1502 transmits, to the eNB, a response message to the UE monitoring message.

The third modification of the first embodiment described above can achieve the following effect in addition to the effects of the second modification of the first embodiment. UE spoofing by the eNB can be detected.

Fourth Modification of First Embodiment

A fourth modification of the first embodiment will disclose another solution to the problem same as that of the first embodiment described above. The solution in the fourth modification of the first embodiment will be described below.

In this modification, the UE periodically transmits a UE monitoring message to the eNB without establishing an RRC connection. In other words, the UE periodically transmits a UE monitoring message to the eNB in the RRC_idle state (RRC_Idle). This does not require the procedure of establishing and releasing an RRC connection, resulting in an effect that the power consumption of the UE can be reduced and an effect that radio resources can be effectively used.

Specific examples of the method of transmitting a UE monitoring message without establishing an RRC connection include the method of transmitting a UE monitoring message during a random access procedure. This method needs not to provide a new procedure, resulting in an effect that the communication system can be prevented from becoming complicated.

The existing random access procedure will be described with reference to FIG. 16 (see Non-Patent Document 1). FIG. 16 is a diagram showing an exemplary sequence of a random access procedure.

In Step ST1601, the UE transmits a random access preamble to the eNB.

In Step ST1602, the eNB transmits a random access response to the UE. A random access-radio network temporary identity (RA-RNTI) on the PDCCH is addressed. DL-SCH allows for, for example, allocation of timing alignment (TA), initial uplink grant, and cell radio network temporary identifier (C-RNTI).

In Step ST1603, the UE transmits a scheduled transmission to the eNB. An initial access is performed. The RRC layer transmits an RRC connection request. C-RNTI of the UE is notified.

In Step ST1604, the eNB transmits contention resolution to the UE. C-RNTI on the PDCCH is addressed for UE in RRC connection.

The following two (1) and (2) will be disclosed as specific examples of the method of transmitting a UE monitoring message during the RACH procedure.

(1) A random access preamble is used. Specific examples of the parameters required to be added include the indication that the parameter is a UE monitoring message, the UE is "alive", the UE keeps alive, the UE exists, the UE is not down, and the UE is normally operating.

(2) A scheduled transmission message is used. More specifically, an RRC connection request message is used (see Non-Patent Document 2). Specific examples of the parameters required to be added include the indication that the parameter is a UE monitoring message, the UE is "alive", the UE keeps alive, the UE exists, the UE is not down, and the UE is normally operating. These may be included in the parameters of the establishment cause" set in the message to be notified.

The following two (1) and (2) will be disclosed as specific examples of the method of transmitting a response message to the UE monitoring message during the RACH procedure.

(1) A random access response is used. Specific examples of the parameters required to be added include a response message to the UE monitoring message.

(2) A contention resolution message is used. More specifically, an RRC connection setup message is used. Specific examples of the parameters required to be added include the indication that the parameter is a response message to the UE monitoring message.

Figure 17:
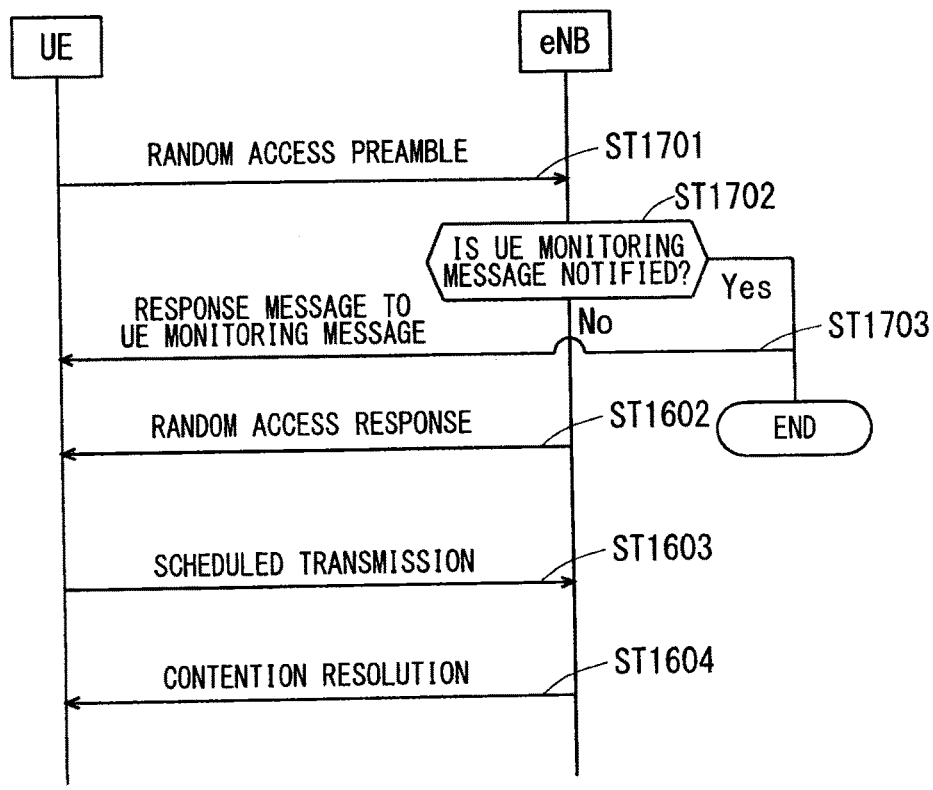
FIG. 17 is a diagram showing an exemplary sequence of a communication system in a fourth modification of the first embodiment.

Next, specific examples of the sequence of a communication system in the fourth modification of the first embodiment will be described with reference to FIG. 17. FIG. 17 is a diagram showing an exemplary sequence of the communication system in the fourth modification of the first embodiment. FIG. 17 shows the sequence in the case of notifying a UE monitoring message using a random access preamble. The sequence shown in FIG. 17 is similar to the sequence shown in FIG. 16, and thus, the same steps will be denoted by the same step numbers and common description will be skipped.

In Step ST1701, the UE transmits a UE monitoring message to the eNB using a random access preamble.

In Step ST1702, the eNB judges whether or not a UE monitoring message is notified in the random access preamble received in Step ST1701. The eNB moves to Step ST1703 in the case of judging that the UE monitoring message is notified in the random access preamble in Step ST1702 or moves to Step ST1602 in the case of judging that the UE monitoring message is not notified in the random access preamble in Step ST1702.

Specifically, in the case where the random access preamble does not include the indication of a UE monitoring message, the eNB judges that it is not for notifying a UE monitoring message and then moves to Step ST1602. In other words, the eNB moves to a normal random access procedure. In the case where the random access preamble includes the indication of a UE monitoring message, the eNB judges that a UE monitoring message is notified and then moves to Step ST1703.

In Step ST1703, the eNB transmits, to the UE, delivery confirmation information to the UE monitoring message. Specific examples of the delivery confirmation information include a response message at an RLC layer. The delivery confirmation information may be a status PDU. The delivery confirmation information to the UE monitoring message may be transmitted using a random access response. Then, the procedure ends. That is, the processes for RRC connection to be performed in Steps ST1602 and ST1604 will not be performed.

Figure 18:
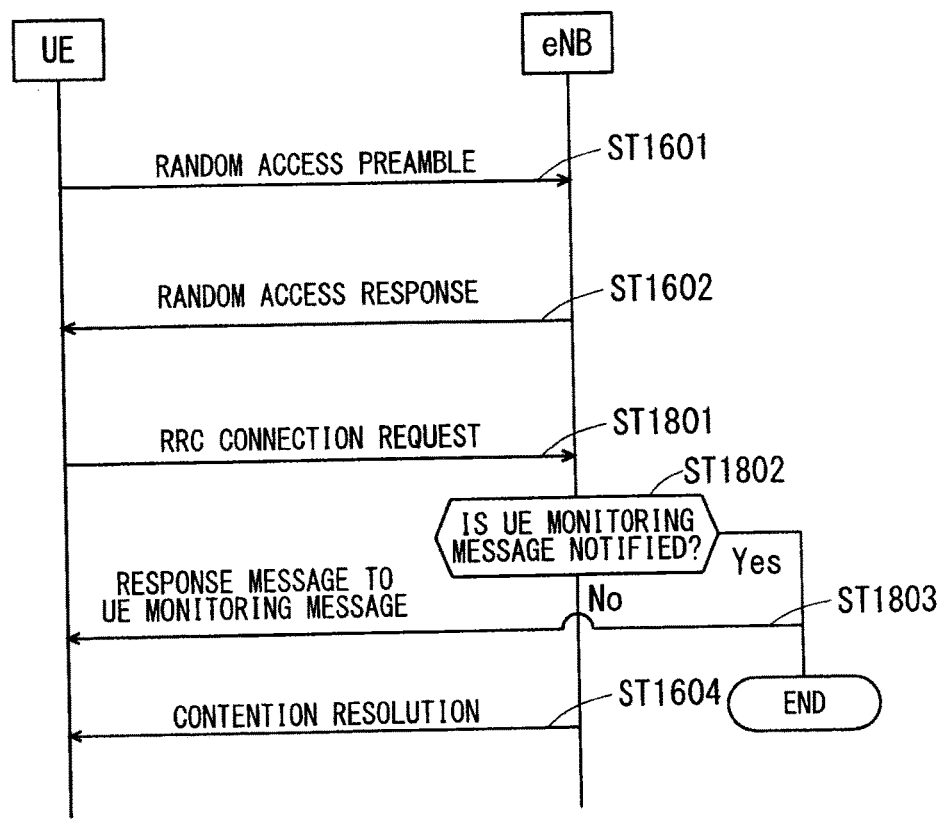
FIG. 18 is a diagram showing another exemplary sequence of the communication system in the fourth modification of the first embodiment.

Next, a specific example of the sequence of the communication system in the fourth modification of the first embodiment will be described with reference to FIG. 18. FIG. 18 is a diagram showing another exemplary sequence of the communication system in the fourth modification of the first embodiment. FIG. 18 shows the sequence in the case where the UE monitoring message is notified using an RRC connection request. The sequence shown in FIG. 18 is similar to the sequences shown in FIGS. 16 and 17, and thus, the same steps will be denoted by the same step numbers and common description will be skipped.

In Step ST1801, the UE transmits a UE monitoring message to the eNB using an RRC connection request.

In Step ST1802, the eNB judges whether or not the UE monitoring message is notified in the RRC connection request received in Step ST1801. The eNB moves to Step ST1803 in the case of judging that the UE monitoring message is notified in the RRC connection request in Step ST1802 or moves to Step ST1604 in the case of judging that the UE monitoring message is not notified in the RRC connection request in Step ST1802.

Specifically, in the case where the RRC connection request does not include the indication of the UE monitoring message, the eNB judges that it is not for notifying a UE monitoring message and then moves to Step ST1604. In other words, the eNB moves to a normal random access procedure. In the case where the RRC connection request includes the indication of the UE monitoring message, the eNB judges that the RRC connection request is notified and then moves to Step ST1803.

In Step ST1803, the eNB transmits, to the UE, a response message to the UE monitoring message. The response message to the UE monitoring message may be transmitted using an RRC connection setup. After that, the procedure ends. In other words, the process for RRC connection to be performed in, for example, Step ST1604 will not be performed.

There is a message indicating an overload of the MME as the message to be notified the eNB from the MME. This message is an "Overload START" message on the S1 interface (see 3GPP TS36.413 V10.4.0). The operation required for the eNB that has received the "Overload START" message by the MME is notified as the information element of the "Overload START" message, as "Overload Action" (see 3GPP TS36.413 V10.4.0). "Overload Action" mainly defines that RRC connection is rejected to an RRC connection request.

With the existing technique, the MME cannot prohibit the message notification from the UE to the eNB using this modification in which a message is notified without establishing an RRC connection to the eNB. If the MME is overloaded, a problem arises.

As the solution to this problem, a parameter, which prohibits message notification from being performed without establishing an RRC connection, is added to "Overload Action". As a result, if the MME is overloaded, message notification to be performed without establishing an RRC connection can be prohibited.

The fourth modification of the first embodiment can be used in combination with the first embodiment or the first modification of the first embodiment described above.

The fourth modification of the first embodiment described above can achieve the following effects as well as the effects of the first embodiment. The procedure of establishing and releasing an RRC connection is not necessary, resulting in an effect that the power consumption of the UE can be reduced and an effect that radio resources can be effectively used.

Fifth Modification of First Embodiment

A fifth modification of the first embodiment will disclose another solution to the same problem as that of the first embodiment described above. The solution in the fifth modification of the first embodiment will be described below.

In this modification, the eNB periodically transmits a UE monitoring message to the UE without establishing an RRC connection. In other words, the eNB periodically transmits a UE monitoring message to the UE in the RRC_idle state (RRC_Idle). This does not require the procedure of establishing and releasing an RRC connection, resulting in an effect that the power consumption of the UE can be reduced and an effect that radio resources can be effectively used.

Specific examples of the method of transmitting a UE monitoring message without establishing an RRC connection include the method of transmitting a UE monitoring message during the paging procedure. This method needs not to provide a new procedure, resulting in an effect that the communication system can be prevented from becoming complicated.

The existing paging procedure will be described with reference to FIGS. 19 and 20 (see Non-Patent Document 2). FIGS. 19 and 20 are diagrams showing an exemplary sequence of a paging procedure in an LTE communication system. FIGS. 19 and 20 are continuous with each other at a boundary BL1.

In Step ST1901, the MME transmits a paging message directed to the UE to the eNB belonging to the tracking area in which the UE is located.

In Step ST1902, the eNB transmits the paging message received in Step ST1901 to the UE within its coverage.

In Step ST1903, the UE judges whether or not the timing is one at which the paging message is received. The UE moves to Step ST1904 in the case of judging that it is the timing at which the paging message is received in Step ST1903 or repeats the process of Step ST1903 in the case of judging that it is not the timing at which the paging message is received in Step ST1903.

In Step ST1904, the UE receives the PDCCH at the timing at which the paging message is received and then judges whether or not the PDCCH includes a paging-radio network temporary identity (P-RNTI). In other words, the UE judges whether or not the P-RNTI is addressed. The UE moves to Step ST1905 in the case of judging that the PDCCH includes P-RNTI in Step ST1904 or returns to Step ST1903 in the case of judging that the PDCCH does not include P-RNTI.

In Step ST1905, the UE judges whether or not it is in RRC_IDLE. The UE moves to Step ST1906 in the case of judging that it is in RRC_IDLE in Step ST1905 or moves to Step ST1911 of FIG. 20 in the case of judging that it is not in RRC_IDLE.

In Step ST1906, the UE judges whether or not the UE-ID in the paging message agrees with the own UE-ID. A paging message is a message to be mapped to the PCCH being a logical channel, mapped to the PCH being a transport channel, and mapped to the PDSCH being a physical channel. The UE moves to Step ST1907 in the case of judging that the UE-ID in the paging message agrees with the own UE-ID in Step ST1906 or moves to Step ST1911 of FIG. 20 in the case of judging that the UE-ID in the paging message does not agree with the own UE-ID in Step ST1906.

In Step ST1907, the UE transmits an RRC connection request message to the eNB.

In Step ST1908, the eNB transmits an RRC connection setup message to the UE.

In Step ST1909, the UE transmits an RRC connection setup complete message to the eNB.

In Step ST1910, the UE, eNB, and MME perform a service request procedure using the RRC connection established in Steps ST1907 to ST1909.

In Step ST1911, the UE judges whether or not the paging message includes a system information modification indicator being the information indicative of a change in system information. The UE moves to Step ST1912 in the case of judging that the paging message includes a system information modification indicator in Step ST1911 or moves to Step ST1913 in the case of judging that the paging message does not include a system information modification indicator in Step ST1911.

In Step ST1912, the UE receives the system information and then moves to Step ST1913.

In Step ST1913, the UE judges whether or not the paging message includes an earthquake and tsunami warning system indicator (ETWS indicator). The UE moves to Step ST1914 in the case of judging that the paging message includes an ETWS indicator in Step ST1913 or moves to Step ST1915 in the case of judging that the paging message includes no ETWS indicator in Step ST1913.

In Step ST1914, the UE receives ETWS information. The ETWS information is mapped to specific system information. When receiving the ETWS information, the UE moves to Step ST1915.

In Step ST1915, the UE judges whether or not the paging message includes a commercial mobile alert service indicator (CMAS indicator). The UE moves to Step ST1916 in the case of judging that the paging message includes a CMAS indicator in Step ST1915 or ends the procedure in the case of judging that the paging message includes no CMAS indicator in Step ST1915.

In Step ST1916, the UE receives CMAS information. The CMAS information is mapped to specific system information. Upon receipt of the CMAS information, the UE ends the procedure.

The following three (1) to (3) will be disclosed as specific examples of the method of transmitting a UE monitoring message during the paging procedure.

(1) An identity for notifying the presence or absence of a UE monitoring message is provided in the PDCCH. The identity is, for example, a multimedia broadcast/multicast service radio network temporary identity (M-RNTI). The UE receives the PDCCH in the UE monitoring period and then judges whether or not the PDCCH includes M-RNTI. In other words, the UE judges whether or not the M-RNTI is addressed. In the case of judging that the PDCCH includes M-RNTI, the UE judges that it has received the UE monitoring message. In the case of judging that the PDCCH includes no M-RNTI, the UE judges that it has not received a UE monitoring message. Differently from the specific examples (2) and (3) described below, the specific example (1) is not required to receive a paging message, resulting in an effect that a control delay can be prevented.

(2) An indicator showing the transmission of a UE monitoring message is mapped to the paging message. The UE judges whether or not the paging message includes an indicator showing the transmission of a UE monitoring message. In the case of judging that the paging message includes an indicator showing the transmission of a UE monitoring message, the UE judges that it has received the UE monitoring message. In the case of judging that the paging message includes no indicator showing the transmission of a UE monitoring message, the UE judges that it has not received the UE monitoring message. Differently from the specific example (1) above, the specific example (2) can use P-RNTI together to reduce the number of times the UE decodes the PDCCH, resulting in an effect that the UE load can be reduced.

(3) A UE monitoring message is mapped to a paging message. Specific examples of the parameters required to be added include the indication that the parameter is an inquiry of whether the UE is "alive", the UE exists, and the UE is normally operating. Unlike the specific example (1) above, the specific example (3) can use P-RNTI together to reduce the number of times the UE decodes the PDCCH, resulting in an effect that the UE load can be reduced.

Specific examples of the method of transmitting a response message to a UE monitoring message during the RACH procedure include the method of transmitting a response message during the service request procedure. Specific examples of the parameters required to be added include the indication that the parameter is a response message to a UE monitoring message.

Specific examples of the method of transmitting during the service request procedure include the method of transmitting during the RACH procedure in the service request procedure. Specific examples of the parameters required to be added include a response message to a UE monitoring message.

The following two (1) and (2) will be disclosed as specific examples of the method of transmitting a response message during the RACH procedure in the service request procedure.

(1) A random access preamble is used. Specific examples of the parameters required to be added include the indication that that parameter is a response message to a UE monitoring message.

(2) A scheduled transmission message is used. More specifically, an RRC connection request message is used (see Non-Patent Document 2). Specific examples of the parameters required to be added include the indication that the parameter is a response message to the UE monitoring message. The indication that the parameter is a response message to the UE monitoring message may be included in "establishment cause" set in the message to be notified.

Figure 21:
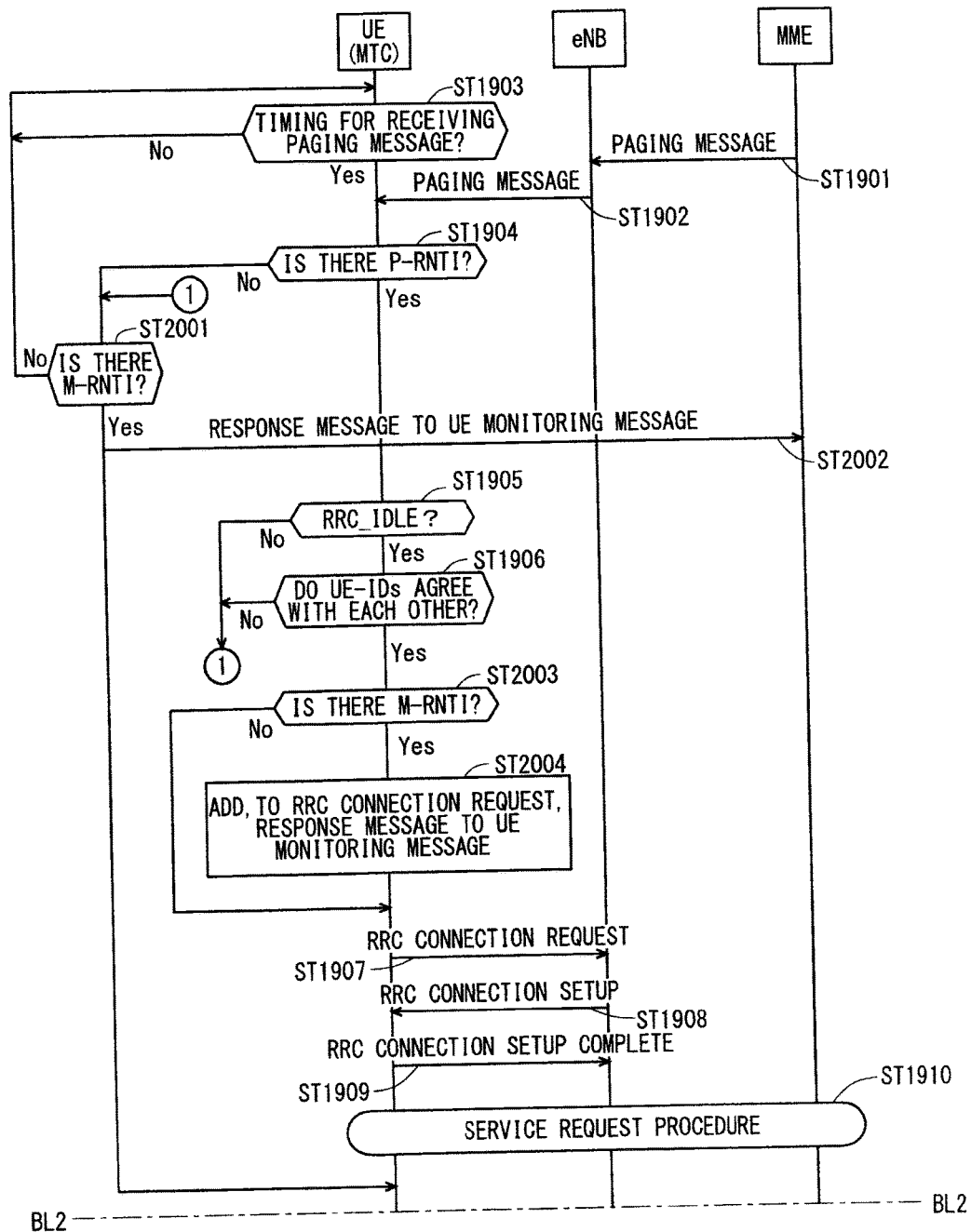
FIG. 21 is a diagram showing an exemplary sequence of a communication system in a fifth modification of the first embodiment.
Figure 22:
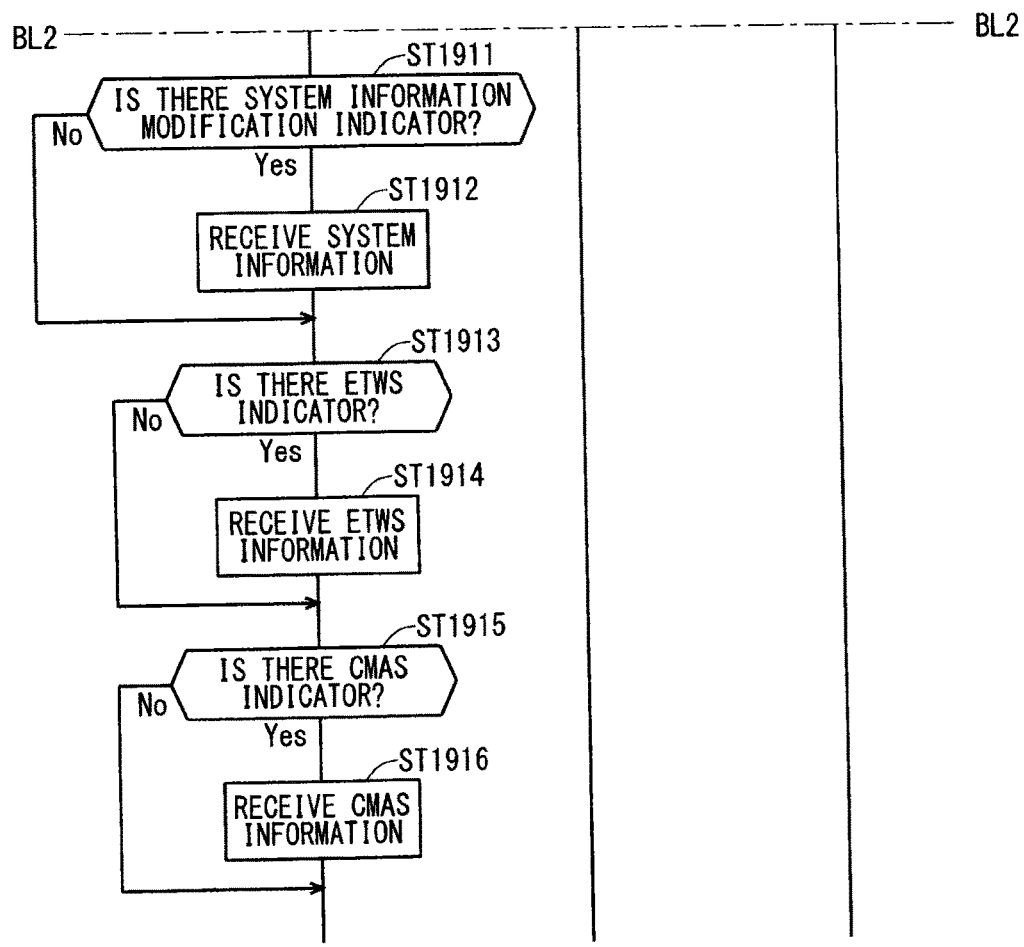
FIG. 22 is another diagram showing the exemplary sequence of the communication system in the fifth modification of the first embodiment.

Next, a specific example of a sequence of a communication system in the fifth modification of the first embodiment will be described with reference to FIGS. 21 and 22. FIGS. 21 and 22 are diagrams showing an exemplary sequence of the communication system in the fifth modification of the first embodiment. FIGS. 21 and 22 are continuous with each other at a boundary BL2. FIGS. 21 and 22 show the sequence in the case where the PDCCH is newly provided with the identity for notifying the presence or absence of a UE monitoring message to notify a UE monitoring message. The sequence shown in FIGS. 21 and 22 is similar to the sequence shown in FIGS. 19 and 20, and thus, the same steps will be denoted by the same step numbers and common description will be skipped.

In Step ST1904, the UE receives the PDCCH at the timing for receiving a paging message and then judges whether or not the PDCCH includes P-RNTI. In other words, the UE judges whether or not the P-RNTI is addressed. The UE moves to Step ST1905 in the case of judging that the PDCCH includes P-RNTI in Step ST1904 or moves to Step ST2001 in the case of judging that the PDCCH includes no P-RNTI in Step ST1904.

In Step ST1905, the UE judges whether or not it is in RRC_IDLE. The UE moves to Step ST1906 in the case of judging that it is in RRC_IDLE in Step ST1905 or moves to Step ST2001 in the case of judging that it is not in RRC_IDLE in Step ST1905.

In Step ST1906, the UE judges whether or not the UE-ID of the paging message agrees with the own UE-ID. The UE moves to Step ST2003 in the case of judging that the UE-ID of the paging message agrees with the own UE-ID in Step ST1906 or moves to Step ST2001 in the case of judging that the UE-ID of the paging message does not agree with the own UE-ID.

In Step ST2001, the UE judges whether or not the PDCCH includes M-RNTI. In other words, the UE judges whether or not M-RNTI is addressed. The UE moves to Step ST2002 in the case of judging that the PDCCH includes M-RNTI in Step ST2001 or returns to Step ST1903 in the case of judging that the PDCCH includes no M-RNTI in Step ST2001.

In Step ST2002, the UE transmits, to the MME, a response message to the UE monitoring message. The response message to the UE monitoring message may be transmitted in a random access preamble, a scheduled transmission, or an RRC connection request. After that, the UE moves to Step ST1911 of FIG. 22.

In Step ST2003, the UE judges whether or not the PDCCH includes M-RNTI. In other words, the UE judges whether or not M-RNTI is addressed. The UE moves to Step ST2004 in the case of judging that the PDCCH includes M-RNTI in Step ST2003 or moves to Step ST1907 in the case of judging that the PDCCH has no M-RNTI in Step ST2003.

In Step ST2004, the UE adds, to the RRC connection request, a response message to the UE monitoring message.

The response message to the UE monitoring message may be added to a normal response message to paging. The response message to the UE monitoring message may be added to a random access preamble or a scheduled transmission. After that, the UE moves to Step ST1907.

Figure 24:
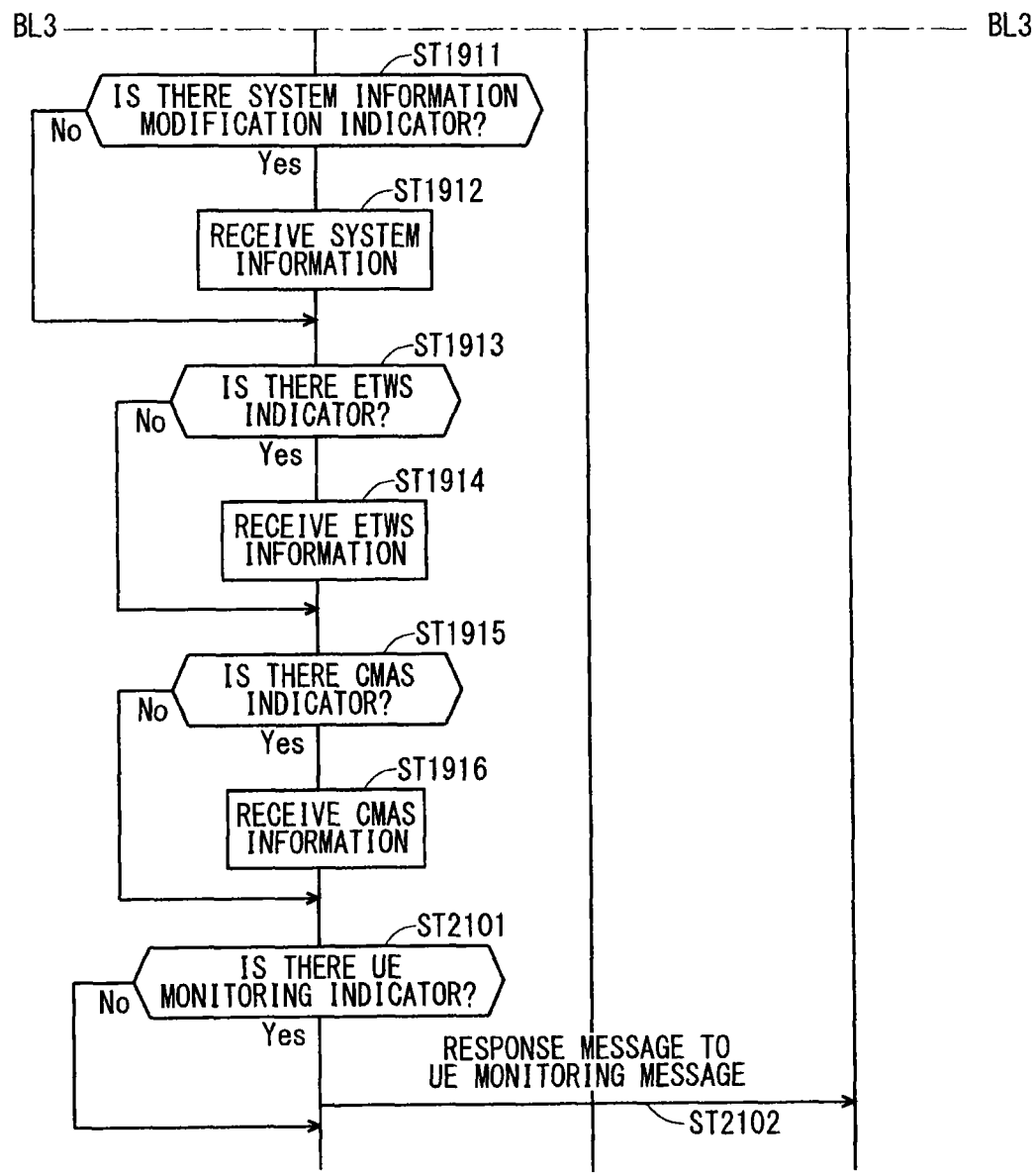
FIG. 24 is another diagram showing the other exemplary sequence of the communication system in the fifth modification of the first embodiment.

A specific example of the sequence of the communication system in the fifth modification of the first embodiment will be described with reference to FIGS. 23 and 24. FIGS. 23 and 24 are diagrams showing another exemplary sequence of the communication system in the fifth modification of the first embodiment. FIGS. 23 and 24 are continuous with each other at a boundary BL3. FIGS. 23 and 24 show the sequence in the case where an indicator showing the transmission of a UE monitoring message (also referred to as a "UE monitoring indicator") to the paging message, to thereby notify a UE monitoring message. The sequence shown in FIGS. 23 and 24 is similar to the sequence shown in FIGS. 19 and 20, and thus, the same steps will be denoted by the same step numbers and common description will be skipped.

In Step ST2101 of FIG. 24, the UE judges whether or not the paging message includes a UE monitoring indicator. The UE moves to Step ST2102 in the case of judging that the paging message includes a UE monitoring indicator in Step ST2101 or ends the procedure in the case of judging that the paging message includes no UE monitoring indicator in Step ST2101.

In Step ST2102, the UE transmits, to the MME, a response message to the UE monitoring message. The response message to the UE monitoring message may be transmitted in a random access preamble, a scheduled transmission, or an RRC connection request.

Figure 26:
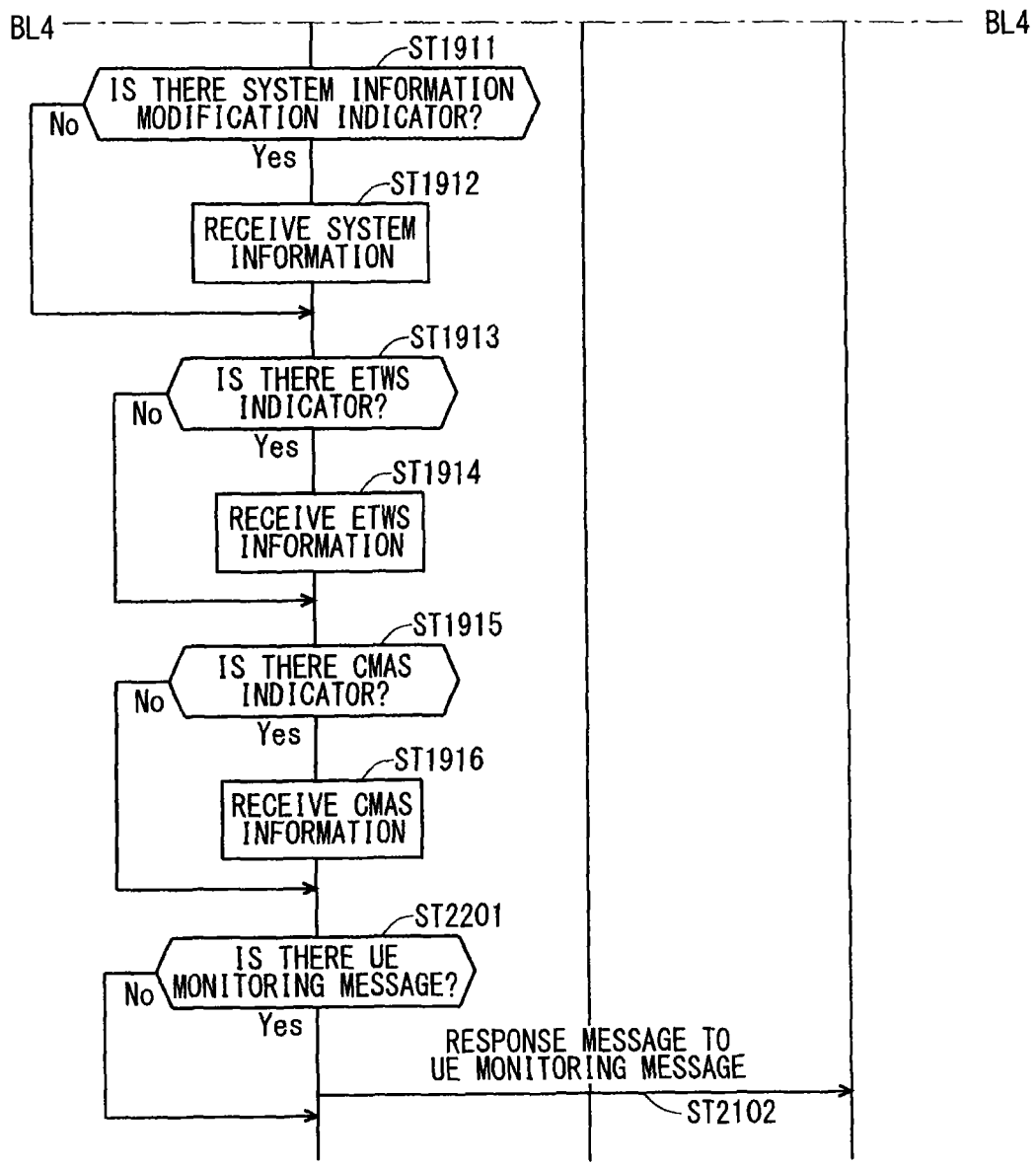
FIG. 26 is another diagram showing the still another exemplary sequence of the communication system in the fifth modification of the first embodiment.

Next, a specific example of the sequence of the communication system in the fifth modification of the first embodiment will be described with reference to FIGS. 25 and 26. FIGS. 25 and 26 are diagrams showing another exemplary sequence of the communication system in the fifth modification of the first embodiment. FIGS. 25 and 26 are continuous with each other at a boundary BL4. FIGS. 25 and 26 show the sequence in the case where the UE monitoring message is mapped to the paging message to notify a UE monitoring message. The sequence shown in FIGS. 25 and 26 is similar to the sequence shown in FIGS. 19 and 20, and thus, the same steps will be denoted by the same step numbers and common description will be skipped.

In Step ST2201 of FIG. 26, the UE judges whether or not the UE monitoring message is mapped to the paging message. In other words, the UE judges whether or not the paging message includes a UE monitoring message. The UE moves to Step ST2102 in the case of judging that the paging message includes a UE monitoring message in Step ST2201 or ends the procedure in the case of judging that the paging message includes no UE monitoring message in Step ST2201.

The fifth modification of the first embodiment can be used in combination with the second modification of the first embodiment or the third modification of the first embodiment.

The fifth modification of the first embodiment can achieve the following effects in addition to the effects of the first embodiment: the effect that the procedure of establishing and releasing an RRC connection is not required, leading to lower power consumption of the UE, and the effect that radio resources can be effectively used.

Sixth Modification of First Embodiment

A sixth modification of the first embodiment will describe a further improvement of the first embodiment described above. This modification will mainly describe a difference from the solution in the first embodiment described above and will not describe a similarity to the first embodiment.

In this modification, the delivery confirmation information from an eNB to a UE includes the information on the system of the eNB or the network to which the eNB belongs.

The following four (1) to (4) will be disclosed as specific examples of the information on the system.

(1) Status information or regulatory information. The following three (1-1) to (1-3) will be disclosed as specific examples of the status information and regulatory information: (1-1) whether an eNB or a network to which the eNB belongs is normal or abnormal, (1-2) whether an eNB or a network to which the eNB belongs is congested or is not congested, and (1-3) whether an eNB or a network to which the eNB belongs is available or unavailable.

(2) System information per se, which may be part of the system information.

(3) Date and time when (1) or (2) above has been changed.

(4) Combination of (1) to (3) above.

The sixth modification of the first embodiment can be used in combination with the first modification of the first embodiment, the second modification of the first embodiment, the third modification of the first embodiment, the fourth modification of the first embodiment, or the fifth modification of the first embodiment described above.

In the case where the sixth modification of the first embodiment is combined with the first modification of the first embodiment, the response message to the UE monitoring message may include the information on the eNB or a network-side system to which the eNB belongs.

In the case where the sixth modification of the first embodiment is combined with the second modification of the first embodiment or the third modification of the first embodiment, the UE monitoring message from the eNB to the UE may include the information on an eNB or the network-side system to which the eNB belongs.

The sixth modification of the first embodiment can achieve the following effect in addition to the effects of the first embodiment: the UE can obtain the information on an eNB or a network-side system to which the eNB belongs in a UE monitoring period.

Second Embodiment

The problem to be solved in a second embodiment will be described below. The current E-UTRAN specifications of 3GPP do not define the way of notifying the E-UTRAN of an RRC connection release originating from the UE in the RRC_ CONNECTED state. This leads to a problem if the UE moves to the RRC_IDLE state in response to an instruction from an application of the UE, the RRC state of the UE and the RRC state of the E-UTRAN do not agree with each other, and the E-UTRAN unnecessarily keeps system resources.

Figure 27:
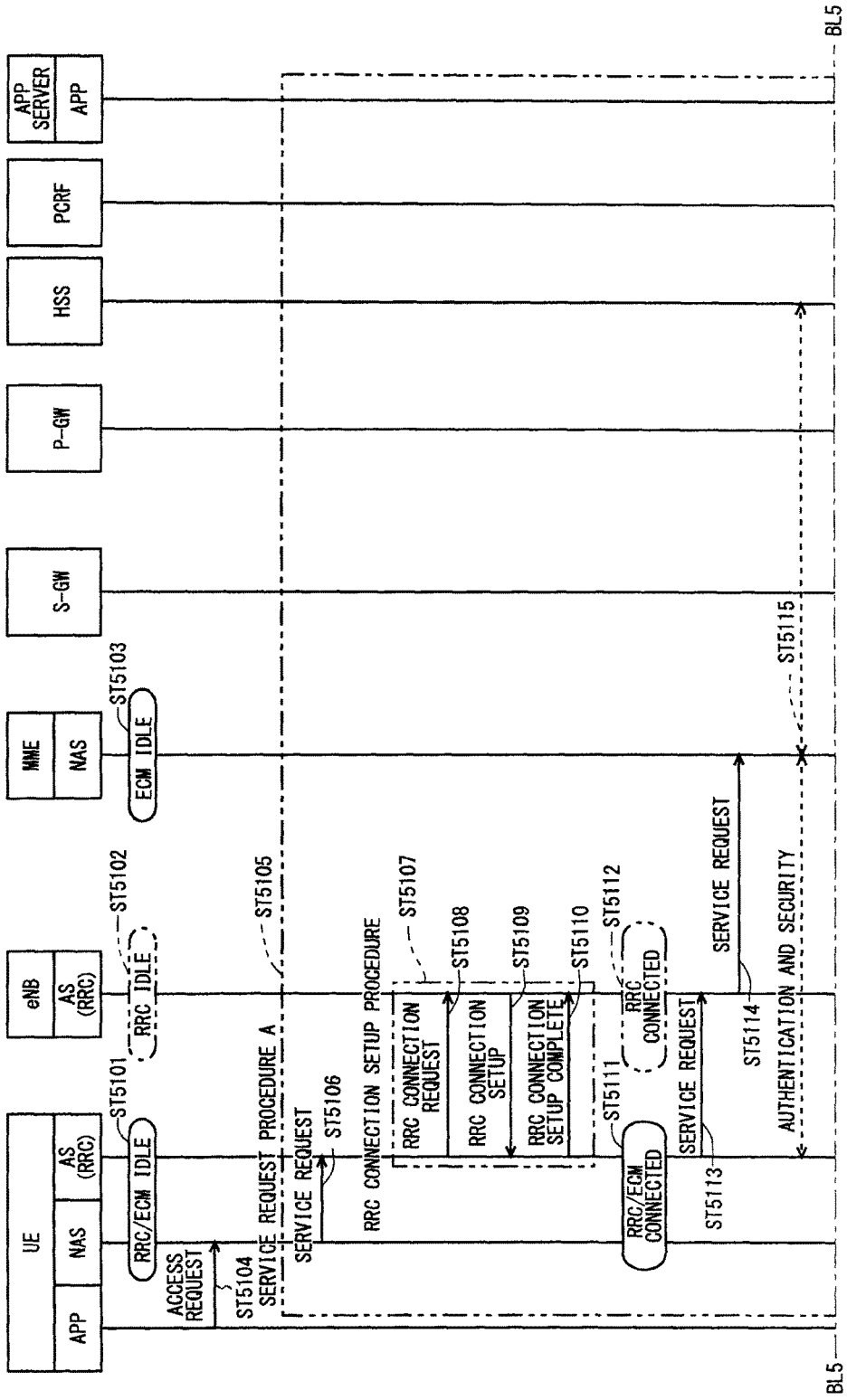
FIG. 27 is a diagram showing a sequence for describing a problem to be solved in a second embodiment.
Figure 28:
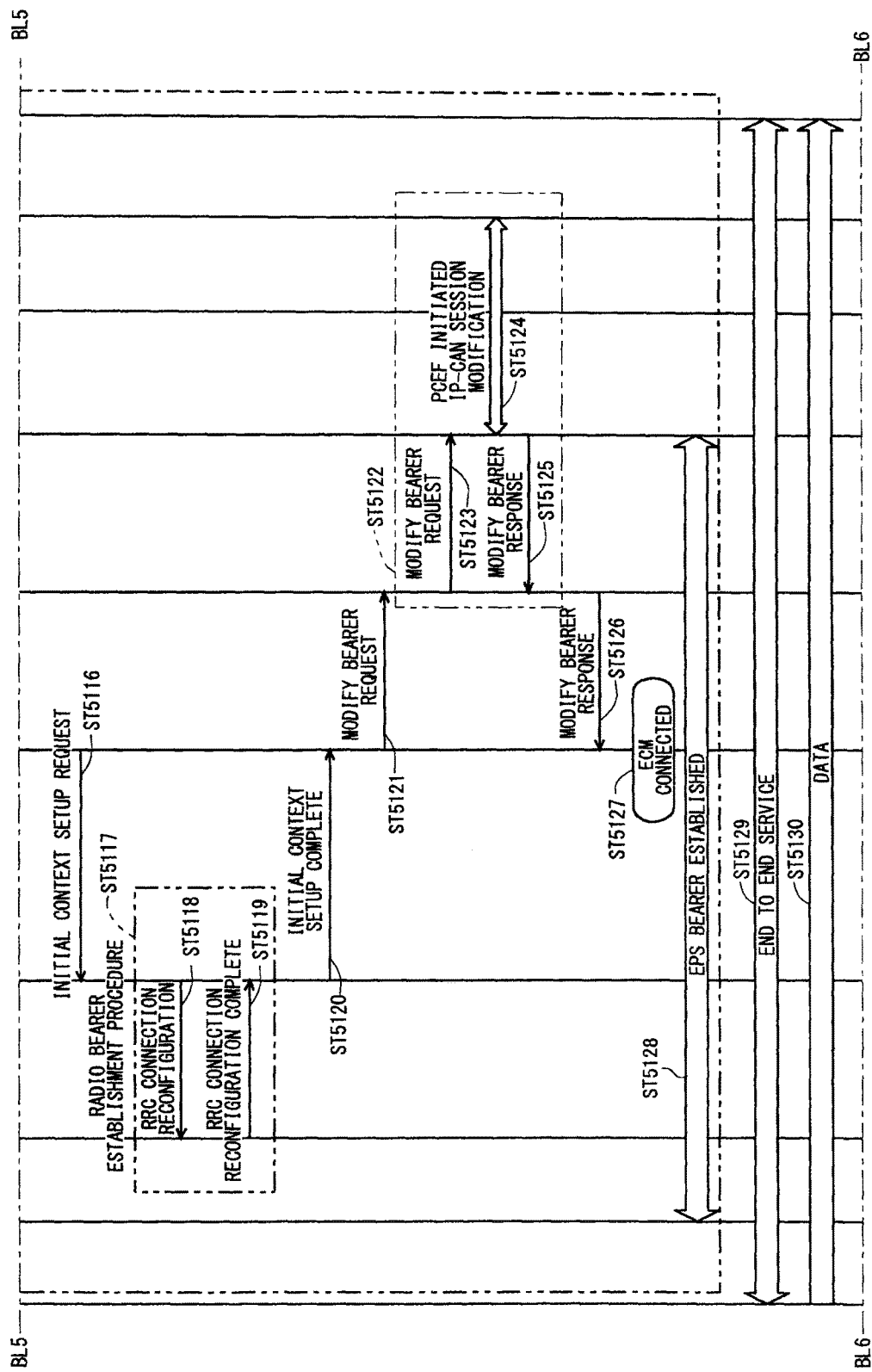
FIG. 28 is another diagram showing the sequence for describing the problem to be solved in the second embodiment.
Figure 29:
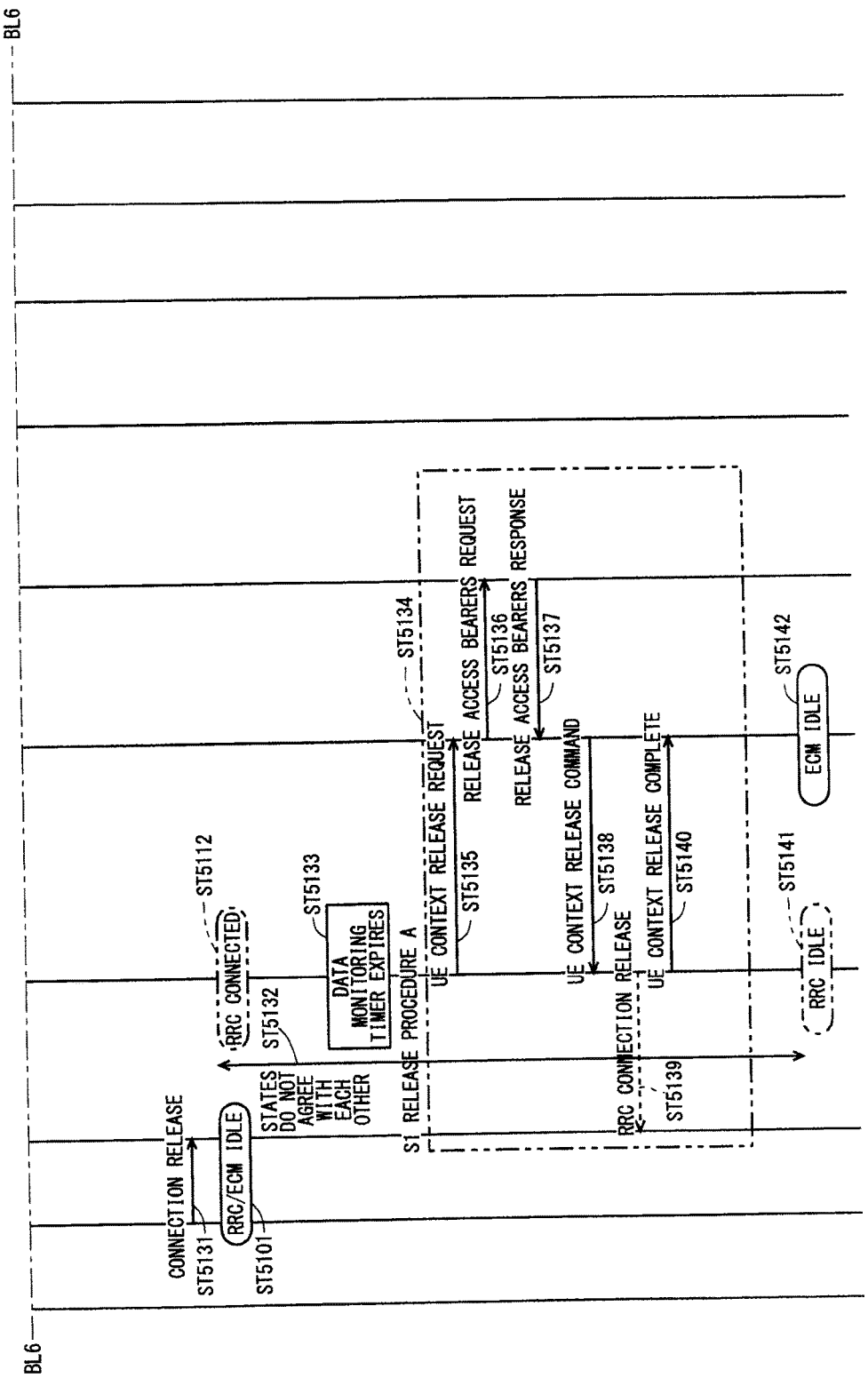
FIG. 29 is still another diagram showing the sequence for describing the problem to be solved in the second embodiment.

FIGS. 27 to 29 are diagrams showing a sequence for describing the problem to be solved in the second embodiment. FIGS. 27 and 28 are continuous with each other at a boundary BL5. FIGS. 28 and 29 are continuous with each other at a boundary BL6.

The UE has an application (hereinafter, also referred to as "APP") to be executed on TCP/IP.

FIGS. 27 to 29 show the case in which the UE is in the RRC_IDLE state and EPS connection management (ECM)_IDLE state in Step ST5101, the eNB is in the RRC_IDLE state to the UE in Step ST5102, and the MME is in the ECM_IDLE state to the UE in Step ST5103. The RRC state of the eNB refers to the RRC state of a target UE assumed by the eNB (hereinafter, also merely referred to as the "RRC state of an eNB").

In the case where the application of the UE starts access, in Step ST5104, the application of the UE issues an access request to the NAS of the UE. In Step ST5105, the UE activates a service request procedure A according to this access request.

A specific example of the service request procedure A of Step ST5105 will be described below. In Step ST5106, the NAS of the UE issues a service request to an access stratum (AS (RRC)).

In Step ST5107 including the processes of Steps ST5108 to ST5110, the UE performs an RRC connection setup procedure between the eNB and itself.

In Step ST5108, the AS (RRC) of the UE notifies the eNB of an RRC connection request. In Step ST5109, the eNB notifies the AS (RRC) of the UE of the RRC connection setup. In Step ST5110, the AS (RRC) of the UE notifies the AS (RRC) of the UE of an RRC connection setup complete.

After the completion of the RRC connection setup procedure in Step ST5107 as described above, in Step ST5111, the UE moves to the RRC_CONNECTED state and the ECM_CONNECTED state. Meanwhile, in Step ST5112, the eNB enters the RRC_CONNECTED state to the UE.

After the RRC connection is established between the UE and the eNB and they move to the RRC_CONNECTED state, in Step ST5113, the UE notifies the eNB of a service request message.

In Step ST5114, the eNB that has received the service request message notifies the MME of the service request message.

In Step ST5115, the (authentication) procedure and the security control procedure are performed among the UE, MME, and HSS.

For rendering the radio bearer and the S1 bearer active, in Step ST5116 of FIG. 28, the MME notifies the eNB of an initial context setup request message.

In Step ST5117 including the processes of Steps ST5118 and ST5119, the eNB that has received the initial context setup request message performs a radio bearer establishment procedure between the UE and itself.

In Step ST5118, the eNB notifies the UE of an RRC connection reconfiguration message. In Step ST5119, the UE notifies the eNB of an RRC connection reconfiguration complete message.

In Step ST5120, the eNB, which has established the radio bearer and the S1 bearer between the UE and itself as described above, notifies the MME of an initial context setup complete message.

In Step ST5121, the MME that has received the initial context setup complete message notifies the S-GW of a modify bearer request message.

The S-GW that has received the modify bearer request message performs a procedure of Step ST5122 including the processes of Steps ST5123 to ST5125. Specifically, in Step ST5123, the S-GW notifies the P-GW of a modify bearer request message. In Step ST5124, the P-GW that has received the bearer request message performs IP connection access network (IP-CAN) session control between a policy and charging rule function (PCFR) and itself, according to the bearer request message. Specifically, the P-GW makes a session modification of the IP-CAN. The session modification of the IP-CAN may also be referred to as a "PCEF initiated IP-CAN session modification".

In Step ST5126, the S-GW that has received the modify bearer response message in Step ST5125 notifies the MME of a modify bearer response message.

In Step ST5127, the MME that has received the modify bearer response message moves to the ECM_CONNECTED state to the UE. Or, upon establishment of the S1 connection with the UE, the MME may move to the ECM_CONNECTED state to the UE. The MME recognizes that the S1 connection with the UE has been established by receiving an initial context setup complete message in Step ST5120.

Through these procedures, an EPS bearer is established between the UE and P-GW in Step ST5128.

Upon establishment of the EPS bearer through the service request procedure of Step ST5105, in Step ST5129, end-to-end service is executed between the UE and application server (APP server). Then, in Step ST5130, application data is communicated from the UE to the application server.

The means for notifying the E-UTRAN of an RRC connection release originating from the UE by the UE and eNB in the RRC_CONNECTED state is not defined in LTE. Therefore, the RRC_CONNECTED state is kept between the UE and eNB unless the network activates an RRC connection release, so that the ECM_CONNECTED state between the UE and MME is kept.

The network cannot recognize the presence or absence of the generation of data in the application of the UE. Thus, even if the data has not been generated in the application on the UE, the network cannot recognize that situation and accordingly cannot activate an RRC connection release procedure immediately. The network continuously keeps the RRC_CONNECTED state between the UE and eNB and keeps the ECM_CONNECTED state between the UE and MME.

To solve this problem, the network may judge whether or not data transmission and reception have been performed during a predetermined period and, if the data transmission and reception have not been performed, may activate the S1 release procedure. This allows the network to release the RRC connection and S1 bearer, causes the UE and the eNB to shift to the RRC_IDLE state, and causes the UE and MME to shift to the ECM_IDLE state.

Even if the above-mentioned procedure has been performed, however, in the case of, for example, moving to RRC_IDLE in response to the instruction from the application of the UE, the UE shifts to the RRC_IDLE state but the E-UTRAN keeps the RRC_CONNECTED state. This leads to a problem that the RRC state of the UE and the state of the E-UTRAN do not agree with each other, and the E-UTRAN unnecessarily keeps securing system resources.

An example in which the RRC states do not agree with each other will be described with reference to FIGS. 27 to 29. For example, if data has not been generated in the application of the UE, in Step ST5131 of FIG. 29, the NAS of the UE notifies the AS of an instruction for connection release.

In Step ST5101, the UE performs an RRC connection release procedure and then moves to RRC_IDLE. With moving to RRC_IDLE, the UE may move to ECM_IDLE. The network, however, cannot recognize this state, and thus, the eNB keeps the RRC_CONNECTED state in Step ST5112.

The eNB monitors whether or not the data transmission and reception have been performed and, in the case where the data transmission and reception have not been performed during a predetermined period, the eNB activates an S1 release procedure A of Step ST5134. A data monitoring timer is provided for a predetermined period and, in Step ST5133, the eNB judges whether or not the data monitoring timer has expired.

In the S1 release procedure A, the processes of Steps ST5135 to ST5140 are performed. In Step ST5135, the eNB notifies the MME of a UE context release request. In Step ST5136, the MME notifies the S-GW of a release access bearers request. In Step ST5137, the S-GW notifies the MME of a release access bearers response. In Step ST5138, the MME notifies the eNB of a UE context release command. In Step ST5139, the eNB notifies the UE of an RRC connection release. In Step ST5140, the eNB notifies the MME of a UE context release complete. As a result, the radio bearer, S1 bearer, and EPS bearer for the UE are released. The eNB moves to the RRC_IDLE state in Step ST5141, and the MME moves to the ECM_IDLE state in Step ST5142.

As described above, if the application data is not generated, the UE moves to the RRC/ECM_IDLE state in Step ST5101. Meanwhile, the eNB and MME do not activate the S1 release procedure and keep the RRC_CONNECTED state and the ECM_CONNECTED state until the data monitoring timer expires. Therefore, as shown in Step ST5132, a period occurs, during which the states of the UE, eNB, and MME disagree with one another.

The solution in the second embodiment will be described below. A message for notifying the RRC connection state of the UE (hereinafter, also referred to as "Uu keep alive indication", "Uu keep alive ind", or "uu-keep-alive") between the UE and eNB is provided.

The UE periodically transmits "Uu keep alive ind" to the eNB. The eNB may use "Uu keep alive ind" to judge the RRC state of the UE (hereinafter, also referred to as "RRC state judgment"). A specific example of RRC state judgment will be described below.

In the case where the UE moves to RRC_IDLE in response to an instruction from the application of the UE, the periodic transmission of "Uu keep alive ind" from the UE to the eNB stops. Thus, if the RRC state of the UE is not RRC_CONNECTED, that is, is RRC_IDLE, the eNB can make a judgment. This solves the problem that the RRC states of the UE and network (E-UTRAN) do not agree with each other and the E-UTRAN unnecessarily keeps securing system resources.

The period in which the UE transmits "Uu keep alive ind" to the eNB may be referred to as a "Uu keep alive ind" transmission period. The UE may transmit "Uu keep alive ind" after the timer expires or when the timer expires. This timer may also be referred to as a "Uu keep alive ind" transmission timer.

Although description will be mainly given of the "Uu keep alive ind" transmission period, the "Uu keep alive ind" transmission timer can be used.

In the case of receiving "Uu keep alive ind", the eNB may transmit delivery confirmation information. Or, in the case of receiving "Uu keep alive ind" within the period, the eNB may transmit delivery confirmation information. Specific examples of the delivery confirmation information include a response message (ACK) at an RLC layer. The delivery confirmation information may be a status PDU.

The following three (1) to (3) will be disclosed as specific examples of the purpose of the UE notifying the eNB of "Uu keep alive ind".

(1) To inform "RRC_CONNECTED".
(2) To request keeping "RRC_CONNECTED".
(3) Combination of (1) and (2) above.

The following four (1) to (4) will be disclosed as specific examples of the RRC state judgment.

(1) In the case of not receiving "Uu keep alive ind" in the "Uu keep alive ind" transmission period, the eNB judges that the UE is in RRC_IDLE, that the UE has moved from RRC_CONNECTED to RRC_IDLE, or that the UE does not request to keep RRC_CONNECTED (hereinafter, also collectively referred to as "judges that the UE is in RRC_IDLE"). In the case of receiving "Uu keep alive ind" in the "Uu keep alive ind" transmission period, the eNB judges that the UE is in RRC_CONNECTED, that the UE keeps RRC_CONNECTED, or that the UE requests to keep RRC_CONNECTED (hereinafter, also collectively referred to as "judges that the UE is in RRC_CONNECTED"). The methods of determining and notifying the "Uu keep alive ind" transmission period will be described below.

(2) In the case of not having received "Uu keep alive ind" successively within the "Uu keep alive ind" transmission period, a predetermined number of times, the eNB judges that the UE is in RRC_IDLE. The predetermined number of times may be determined statically or semi-statically. The methods of determining and notifying a predetermined number of times will be described below.

(3) In the case of not having received "Uu keep alive ind" during a predetermined period, the eNB judges that the UE is in RRC_IDLE. The predetermined period may be set to be longer than the "Uu keep alive ind" transmission period. The predetermined period may be determined statically or semi-statically. The methods of determining and notifying a predetermined period may be described below. The predetermined period may be set as the data monitoring timer. Within the period in which the UE requests to keep "RRC_CONNECTED", accordingly, the eNB can be prevented from activating to move to RRC_IDLE, upon expiration of the data monitoring timer of the eNB. This keeps the RRC_CONNECTED state between the UE and eNB. The data monitoring timer is started in the case of receiving data at a Uu point. In the case of newly receiving data at the Uu point, the data monitoring timer is stopped and is reset, and is then started. The following three (3-1) to (3-3) will be disclosed as specific examples of the data at the Uu point: (3-1) data at the RRC level, (3-2) data at an NAS level, and (3-3) combination of (3-1) and (3-2) above.

(4) The combination of the above-mentioned (1) to (3).

Specific examples of the entity that determines the "Uu keep alive ind" transmission period include a UE, an eNB, and an APP server (application).

The following six (1) to (6) will be disclosed as specific examples of the method of determining a "Uu keep alive ind" transmission period of the UE.

(1) The transmission period may be determined depending on an application. The NAS of the UE may determine the "Uu keep alive ind" transmission period from such as the QoS, QCI, bearer information, and session timer that is required from the application. Or, to only monitor the session connection between applications which are end-end in communication, the transmission period may be the period in which a packet with a small data volume (hereinafter referred to as a "keep-alive packet") is regularly transmitted or may be an inverse multiple of the integer (1/integral multiple) of the above-mentioned period.

(2) The transmission period may be determined depending on a DRX cycle to be notified from the eNB. The "Uu keep alive ind" transmission period may be an integral multiple of the DRX cycle or an inverse multiple of the integer (1/integral multiple) of the DRX cycle. This causes the DRX cycle, which is a timing at which the UE in RRC_CONNECTED monitors the PDCCH, and the "Uu keep alive ind" transmission period, which is a timing at which the UE transmits "Uu keep alive ind", to agree with each other to the extent possible, achieving an effect that the power consumption of the UE can be reduced.

(3) The transmission period may be determined depending on a data monitoring timer notified from the eNB. The "Uu keep alive ind" transmission period may have a value smaller than that of the data monitoring timer. Within the period in which the UE requests to keep "RRC_CONNECTED", accordingly, the eNB can be prevented from activating to move to RRC_IDLE, upon expiration of the data monitoring timer of the eNB.

(4) The transmission period may be determined depending on an effective period of timing advance. The "Uu keep alive ind" transmission period may be an integral multiple of the effective period of timing advance or an inverse multiple of the integer (1/integral multiple) of the effective period of timing advance. This causes the effective period of timing advance, which is a timing at which the UE in RRC_CONNECTED performs the RACH procedure, and the "Uu keep alive ind" transmission period, which is a timing at which the UE transmits "Uu keep alive ind", to agree with each other to the extent possible, achieving an effect that the power consumption of the UE can be reduced.

(5) The transmission period is determined from the load status of the UE or the remaining battery life. For a high load status or a low remaining battery life, the "Uu keep alive ind" transmission period is lengthened. For a low load status or a high remaining battery life, the "Uu keep alive ind" transmission period is shortened or is set as usual. This allows for taking a measure against the cases in which the load of the UE decreases or the remaining battery life is low.

(6) Combination of (1) to (5) above.

The following two (1) and (2) will be disclosed as specific examples of the method of notifying the eNB of the "Uu keep alive ind" transmission period determined by the UE.

(1) The transmission period is notified together with "Uu keep alive ind". The transmission period may be notified per "Uu keep alive ind" or may be notified in the first notification alone. Unlike the case in which the transmission period is notified in every notification, the case in which the transmission period is notified in the first notification leads to an effect that the amount of information is reduced.

(2) The transmission period is notified prior to the transmission of "Uu keep alive ind", which may be notified once. Unlike the specific example (1), an effect that an eNB can prepare for receiving "Uu keep alive ind" can be achieved. The following two (2-1) and (2-2) will be disclosed as specific examples thereof.

(2-1) RRC signaling or NAS signaling is newly provided.

(2-2) The existing RRC signaling or NAS signaling is used. Compared with the specific example (2-1), the specific example (2-2) is effective in that a new signal needs not to be provided. The specific example (2-2) can prevent the communication system from becoming complicated.

The following four (1) to (4) will be disclosed as specific examples of the parameters to be newly mapped to RRC signaling or NAS signaling.

(1) "Uu keep alive ind" transmission period.

(2) UE identity, specifically, which may be UE-ID or IMSI.

(3) Information on an application server being a connection destination.

(4) Combination of (1) to (3) above.

Specific examples of the case in which the existing RRC signal is used include the case in which an RRC connection reconfiguration "RRC Connection Request" message is used.

Specific examples of the parameters required to be added to the existing RRC signaling include (1) "Uu keep alive ind" transmission period and "(2) information on an application server being a connection destination.

Specific examples of the case in which the existing NAS signal is used include the case in which a service request "Service Request" message is used.

Specific examples of the parameters required to be added to the existing NAS signaling include (1) "Uu keep alive ind" transmission period and (2) information on an application server being a connection destination.

The following five (1) to (5) will be disclosed as specific examples of the method of determining the "Uu keep alive ind" transmission period of the eNB.

(1) The transmission period may be determined depending on the DRX cycle. The "Uu keep alive ind" transmission period may be an integral multiple of the DRX cycle or an inverse multiple of the integer (1/integral multiple) of the DRX cycle. This causes the DRX cycle, which is a timing at which the UE in RRC_CONNECTED monitors the PDCCH, and the "Uu keep alive ind" transmission period, which is a timing at which the UE transmits "Uu keep alive ind", to agree with each other to the extent possible, achieving an effect that the power consumption of the UE can be reduced.

(2) The transmission period may be determined depending on a data monitoring timer or a session timer of an application. The "Uu keep alive ind" transmission period may have a value shorter than that of the data monitoring timer. Therefore, while the UE requests to keep "RRC_CONNECTED", the eNB can be prevented from being activated to move to RRC_IDLE upon expiration of the data monitoring timer by the eNB.

(3) The transmission period may be determined depending on an effective period of timing advance. The "Uu keep alive ind" transmission period may be an integral multiple of the effective period of timing advance or an inverse multiple of the integer (1/integral multiple) of the effective period of timing advance. This causes the effective period of timing advance, which is a timing at which the UE in RRC_CONNECTED performs the RACH procedure, and the "Uu keep alive ind" transmission period, which is a timing at which the UE transmits "Uu keep alive ind", to agree with each other to the extent possible, achieving an effect that the power consumption of the UE can be reduced.

(4) The transmission period may be determined depending on the load status of an eNB or the load status of a network. For a high load status, the "Uu keep alive ind" transmission period is lengthened or the "Uu keep alive ind" transmission is prohibited, in other words, the "Uu keep alive ind" transmission is made infinite. For a low load status, the "Uu keep alive ind" transmission period is shortened or is set as usual. This reduces the loads of the eNB and network. For the load status of the network, the message indicating the overload of the MME exists, which is notified from the MME to the eNB. An "Overload START" message on an S1 interface may be used. Parameters regarding "Uu keep alive ind" may be added to "Overload Action". Parameters that prohibit "Uu keep alive ind" may be added.

(5) Combination of (1) to (4) above.

The following six (1) to (6) will be disclosed as specific examples of the method of notifying the UE of the "Uu keep alive ind" transmission period determined by the eNB.

(1) The transmission period is notified in the broadcast information.

(2) The transmission period is notified in the dedicated information.

(3) The transmission period is notified in the TAU procedure, specific examples of which include the method of notifying in, for example, "TAU Accept".

(4) The transmission period is notified in the attach procedure, specific examples of which include the method of notifying in, for example, "Attach Accept" and "RRC Connection Reconfiguration".

(5) The transmission period is notified in the RRC connection setup procedure, specific examples of which include the method of notifying in, for example, "RRC Connection Setup".

(6) The transmission period is notified in the service request procedure, specific examples of which include the method of notifying in, for example, "RRC Connection Reconfiguration".

Specific examples of the method of determining the "Uu keep alive ind" transmission period of an APP server will be disclosed below.

The transmission period may be determined depending on an application. The "Uu keep alive ind" transmission period may be determined from such as the QoS, QCI, bearer information, session timer, or the like required from the application. To only monitor the session connection between applications which are end-end in communication, the transmission period may be a period in which a packet having a small data volume (hereinafter, referred to as a "keep-alive packet") is regularly transmitted or may be an inverse multiple of the integer (1/integral multiple) of the above-mentioned period.

The "Uu keep alive ind" transmission period determined by the APP server is notified the eNB and is also notified the UE via the eNB.

Specific examples of the entity that determines a predetermined number of times include a UE, an eNB, and an APP server (application).

The following three (1) to (3) will be disclosed as specific examples of the method of determining a predetermined number of times by the UE.

(1) A predetermined number of times may be determined depending on an application. The NAS of the UE may determine a predetermined number of times from the QoS, QCI, bearer information, session timer, or the like requested from the application. To only monitor the session connection between applications which are end-end in communication, a predetermined number of times may be the period in which a packet having a small data volume (hereinafter, referred to as a "keep-alive packet") is regularly transmitted or may be a "UE keep alive ind" transmission period.

(2) A predetermined number of times may be determined depending on a data monitoring timer to be notified from the eNB. A predetermined number of times may be a data monitoring timer or a "Uu keep alive ind" transmission period. This prevents the eNB from being activated to move to RRC_IDLE while the UE requests to keep "RRC_CONNECTED".

(3) Combination of (1) and (2) above.

Specific examples of the method of notifying the eNB of the predetermined number of times determined by the UE are similar to specific examples of the method of notifying the eNB of the "Uu keep alive ind" transmission period determined by the UE, which will not be described here.

Specific examples of the method of determining a predetermined number of times by the eNB will be disclosed below. A predetermined number of times may be determined depending on a data monitoring timer or a session timer of an application. A predetermined number of times may be a data monitoring timer or the "Uu keep alive ind" transmission period. This prevents the eNB from being activated to move to RRC_IDLE while the UE requests to keep "RRC_CONNECTED".

Specific examples of the method of notifying the UE of the predetermined number of times determined by the eNB are similar to the specific examples of the method of notifying the UE of the "Uu keep alive ind" transmission period determined by the eNB, which will not be described here.

Specific examples of the method of determining a predetermined number of times by an APP server will be disclosed below. A predetermined number of times may be determined depending on an application. A predetermined number of times may be determined from the QoS, QCI, bearer information, session timer, or the like requested from the application. To only monitor the session connection between applications which are end-end in communication, a predetermined number of times may be the period in which a packet having a small data volume (hereinafter, referred to as a "keep-alive packet") is regularly transmitted or a may be a "UE keep alive ind" transmission period.

The predetermined number of times determined by the APP server is notified the eNB and is also notified the UE via the eNB.

Specific examples of the entity that determines a predetermined period include a UE, an eNB, and an APP server (application).

The following six (1) to (6) will be disclosed as specific examples of the method of determining a predetermined period by the UE.

(1) A predetermined period may be determined depending on an application. The NAS of the UE may determine a predetermined period from the QoS, QCI, bearer information, session timer, or the like requested from an application. To only monitor the session connection between applications which are end-end in communication, a predetermined period may be the period in which a packet having a small data volume (hereinafter, referred to as a "keep-alive packet") is regularly transmitted or may be an inverse multiple of the integer (1/integral multiple) of the above-mentioned period. The data volume, data transmission period, or the like described above may be notified another node as a predetermined period without a change. A predetermined period may be a period in which the NAS of the UE requests RRC_CONNECTED or a period in which RRC_CONNECTED is expected from the QoS, QCI, bearer information, or the like requested from the application.

(2) A predetermined period may be determined depending on a DRX cycle notified from the eNB. A predetermined period may be an integral multiple of the DRX cycle or an inverse multiple of the integer (1/integral multiple) of the DRX cycle. This causes the DRX cycle, which is a timing at which the UE in RRC_CONNECTED monitors the PDCCH, and a predetermined period, which is a timing at which the UE transmits "Uu keep alive ind", to agree with each other to the extent possible, achieving an effect that the power consumption of the UE can be reduced.

(3) A predetermined period may be determined depending on a data monitoring timer notified from the eNB. A predetermined period may have a value smaller than that of the data monitoring timer. This prevents, while the UE requests to keep "RRC_CONNECTED", the eNB from being activated to move to RRC_IDLE upon expiration of the data monitoring timer by the eNB.

(4) A predetermined period may be determined depending on an effective period of timing advance. A predetermined period may be an integral multiple of the effective period of timing advance or an inverse multiple of the integer (1/integral multiple) of the effective period of timing advance. This causes the effective period of timing advance, which is a timing at which the UE in RRC_CONNECTED performs the RACH procedure, and a predetermined period, which is a timing at which the UE transmits "Uu keep alive ind", to agree with each other to the extent possible, achieving an effect that the power consumption of the UE can be reduced.

(5) A predetermined period is determined depending on the load status of a UE or the remaining battery life. For a high load status or a low remaining battery life, a predetermined period is lengthened. For a low load status or a high remaining battery life, a predetermined period is shortened or is set as usual. Therefore, a measure can be taken in the case where the load of the UE decreases or the remaining battery life is low.

(6) Combination of (1) to (5) above.

Specific examples of the method of determining a predetermined period by the eNB are similar to those of the method of determining the "Uu keep alive ind" transmission period by the eNB, which will not be described here.

Specific examples of the method of determining a predetermined period by the APP server will be described below. A predetermined period may be determined depending on an application. A predetermined period may be determined from the QoS, QCI, bearer information, session timer, or the like requested from the application. To only monitor the session connection between applications which are end-end in communication, a predetermined period may be the period in which a packet having a small data volume (hereinafter, referred to as a "keep-alive packet") is regularly transmitted or an inverse multiple of the integer (1/integral multiple) of the above-mentioned period. The above-mentioned data volume, data transmission period, or the like may be notified another node as a predetermined period without a change. The period in which the NAS of the UE requests RRC_CONNECTED or the period in which RRC_CONNECTED is expected may be set as a predetermined period from the QoS, QCI, bearer information, or the like requested from the application.

The method of notifying per determining entity is similar to the methods of determining and notifying a "Uu keep alive ind" transmission period, which will not be described here.

In the case of judging that the UE is in RRC_IDLE as a result of judging an RRC state, the eNB may perform the procedure of moving to IDLE. The following three (1) to (3) will be disclosed as specific examples of the procedure of moving to IDLE.

(1) The system resources, which are secured for CONNECTED of the UE by the E-UTRAN, will be released. Specific examples of the system resources include a radio bearer, an S1 bearer, and an EPS bearer for the UE. Specific examples of the releasing method include activation of an S1 release procedure by the eNB, the UE context release procedure for the MME by the eNB, the access bearer release procedure for the S-GW, and the RRC connection release procedure for the UE by the eNB.

(2) The ECM state of the network is moved to ECM_IDLE. The ECM state of the MME is moved to ECM_IDLE. Specific examples of the shifting method are similar to the specific examples of the releasing method (1) described above, which will not be described here.

(3) The RRC state of the network is moved to RRC_IDLE. The RRC state of the eNB is moved to RRC_IDLE. Specific examples of the moving method are similar to the specific examples of the releasing method (1) described above, which will not be described here.

The following four (1) to (4) will be disclosed as specific examples of "Uu keep alive ind".

(1) Message at only a Uu point. The Uu point is an interface point between the UE and eNB, between the UE and HeNB, or between the UE and RN.

(2) Message not required to be notified a higher-layer entity for the eNB. Specific examples of the higher-layer entity include MME and HSS.

(3) RRC message.

(4) Combination of (1) to (3) above.

The following two (1) and (2) will be disclosed as specific examples in the case where "Uu keep alive ind" is an RRC message.

(1) An RRC signal or RRC message is newly provided.

(2) The existing RRC signal or RRC message is used. Compared with the specific example (1), the specific example (2) is effective in that a new signal needs not to be provided. The specific example (2) can prevent the communication system from becoming complicated.

The following seven (1) to (7) will be disclosed as specific examples of the parameters to be newly mapped to an RRC signal.

(1) The indication that, for example, parameter is "Uu keep alive ind", the parameter is "RRC_CONNECTED", and the parameter requests to keep "RRC_CONNECTED".

(2) UE identity, specifically, which may be UE-ID or IMSI.

(3) Sequence number, which may be a sequence number to be incremented per transmission or a sequence number for enhancing security. For example, security can be enhanced as follows; even if a cipher key is stolen, the message cannot be decrypted unless the sequence number is accurate.

(4) "Uu keep alive ind" transmission period. The eNB that has received the "Uu keep alive ind" transmission period may set the data monitoring timer to be longer than the "Uu keep alive ind" transmission period. The eNB may be set a DRX cycle as an integral multiple of the "Uu keep alive ind" transmission period or an inverse multiple of the integer (1/integral multiple) thereof. Notification may be made only in the case where the entity that determines the "Uu keep alive ind" transmission period is a UE.

(5) A predetermined number of times to be used in judging an RRC state, which may be notified only in the case where the entity that determines a predetermined number of times is the UE.

(6) A predetermined period to be used in judging an RRC state, which may be notified only in the case where the entity that determines a predetermined number of times is the UE.

(7) Combination of (1) to (6) above.

Even if the "Uu keep alive ind" transmission period is not determined depending on the DRX cycle, "Uu keep alive ind" may be transmitted at the DRX cycle timing or may be transmitted during the active period (on duration period) of the DRX cycle. This causes the DRX cycle, which is a timing at which the UE in RRC_CONNECTED monitors the PDCCH, and the "Uu keep alive ind" transmission period, which is a timing at which the UE transmits "Uu keep alive ind", to agree with each other to the extent possible, achieving an effect that the power consumption of the UE can be reduced.

Disclosed below is a specific example of the method of transmitting "Uu keep alive ind" at the DRX cycle timing in the case where the "Uu keep alive ind" transmission period is not determined depending on a DRX cycle.

At the DRX cycle timing immediately after the expiration of the "Uu keep alive ind" transmission period, "Uu keep alive ind" is transmitted. In that case, the eNB may receive "Uu keep alive ind" at the DRX cycle timing immediately after the expiration of the "Uu keep alive ind" transmission period.

"Uu keep alive ind" described in the second embodiment described above is a message for notifying a connection state. Unlike the transmission of normal user data, thus, the DRX length may not be changed upon data transmission. As a specific example, a relatively long DRX cycle is not shifted to a relatively short DRX cycle in response to "Uu keep alive ind".

Figure 30:
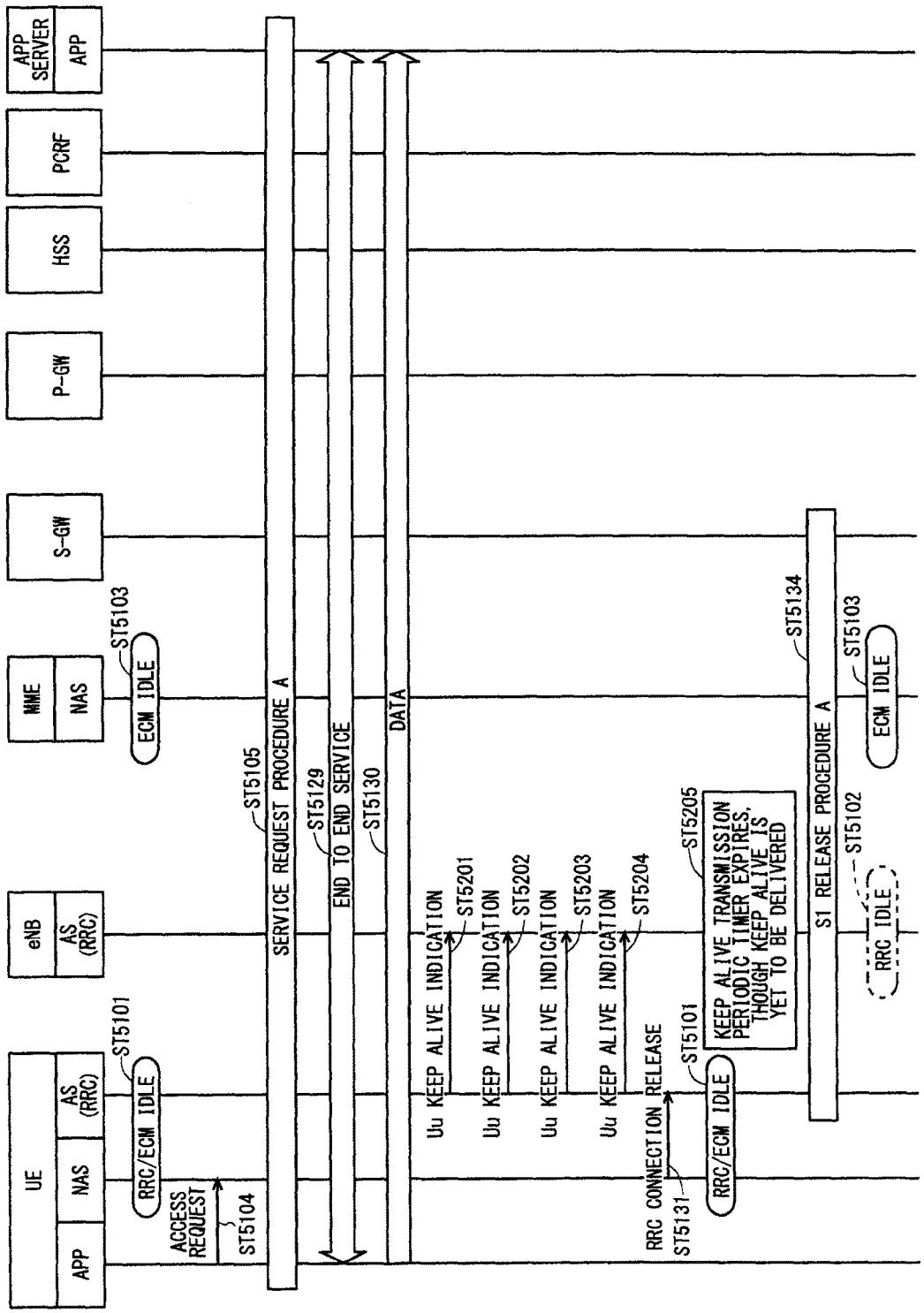
FIG. 30 is a diagram showing an exemplary sequence of a communication system in the second embodiment.

The sequence shown in FIG. 30 is similar to the sequence shown in FIGS. 27 to 29, and thus, the same steps will be denoted by the same step numbers and common description will be skipped.

In Steps ST5101, ST5103 to ST5105, and ST5129 and ST5130, end-to-end service is performed between the UE and application server, so that application data is communicated from the UE to the application server.

In Steps ST5201 to ST5204, the UE notifies the eNB of "Uu keep alive indication" until the RRC connection release procedure is activated in response to an instruction to shift to RRC_IDLE from the NAS.

By notifying "Uu keep alive indication", the UE shows the eNB that the UE is yet to move to RRC_IDLE, that is, it is in the RRC_CONNECTED state. Upon receipt of "Uu keep alive indication" from the UE, the eNB recognizes that the UE is yet to move to RRC_IDLE, that is, it is in the RRC_CONNECTED state.

The eNB judges the RRC connection state between the eNB and UE based on whether or not it has received "Uu keep alive indication" from the UE. The eNB judges whether or not it has received "Uu keep alive indication" from the UE at a timing of the "Uu keep alive indication" transmission period.

The UE periodically transmits "Uu keep alive indication" to the eNB in Steps ST5201 to ST5204. Then, if data is not generated in the application of the UE, the UE performs an RRC connection release procedure in Step ST5131 in response to the instruction from the NAS and, in Step ST5101, moves to RRC_IDLE. After moving to RRC_IDLE, the UE stops the transmission of "Uu keep alive indication".

When the UE stops transmitting "Uu keep alive indication", the eNB cannot receive "Uu keep alive indication" at the timing of the "Uu keep alive indication" transmission period. In other words, in Step ST5205, the keep alive transmission periodic timer expires, though "keep alive" is yet to be delivered. Thus, the eNB can recognize that the state during the RRC connection between the eNB and UE cannot be kept normally because, for example, the UE has moved to RRC_IDLE or has moved out of the coverage of the eNB.

In the case where the eNB fails to receive "Uu keep alive indication" at the timing of the "Uu keep alive indication" transmission period in Step ST5205, the eNB activates an S1 release procedure A of Step ST5134.

When the S1 release procedure is performed in Step ST5134, in Step ST5102, the eNB moves to the RRC_IDLE state to the UE and, in Step ST5103, the MME moves to the ECM_IDLE state to the UE. In the S1 release procedure, the eNB and MME release the system resources for the UE.

The method disclosed in this embodiment allows the E-UTRAN to recognize the RRC connection state of the UE, keeping the period, in which the states disagree with each other, within the "Uu keep alive indication" transmission period at most. This can significantly reduce an influence due to the state disagreement. For example, this eliminates the unnecessary consumption of the resources for the UE in the eNB. Also, the frequency of occurrence at which the UE cannot be called can be reduced.

The "Uu keep alive ind" transmission period is associated with the DRX cycle, causing the DRX cycle, which is a timing at which the UE during RRC_CONNECTED monitors the PDCCH, and the "Uu keep alive ind" transmission period, which is a timing at which the UE transmits "Uu keep alive ind", to agree with each other to the extent possible. This can achieve an effect that the power consumption of the UE can be reduced.

The "Uu keep alive ind" transmission period is associated with the data monitoring timer, preventing, while the UE requests to keep "RRC_CONNECTED", the UE from being activated to move to RRC_IDLE by the eNB upon expiration of the data monitoring timer by the eNB. Therefore, the RRC_CONNECTED state between the UE and eNB can be kept.

Third Embodiment

The problem to be solved in a third embodiment will be described below. As described above, keep-alive packets (hereinafter, also referred to as "APP keep alive packets") regularly transmitted use up the system resources in the radio access network, leading to a problem of increases in the radio resources and the processing load of communication node. There is also another problem of an increased consumption power of the UE.

The above-mentioned problems occur as described below. Although the UE is in connection of the session at an application level, no data is transmitted. Thus, the UE performs the procedures to release RRC connection, a radio access bearer, and the like, and then moves to IDLE. Upon transmission of a keep-alive packet from the application, however, the UE performs the procedures of setting RRC connection and a radio access bearer. The above-mentioned problems occur when the processes of releasing and setting RRC connection and a radio access bearer are repeated as described above.

Figure 31:
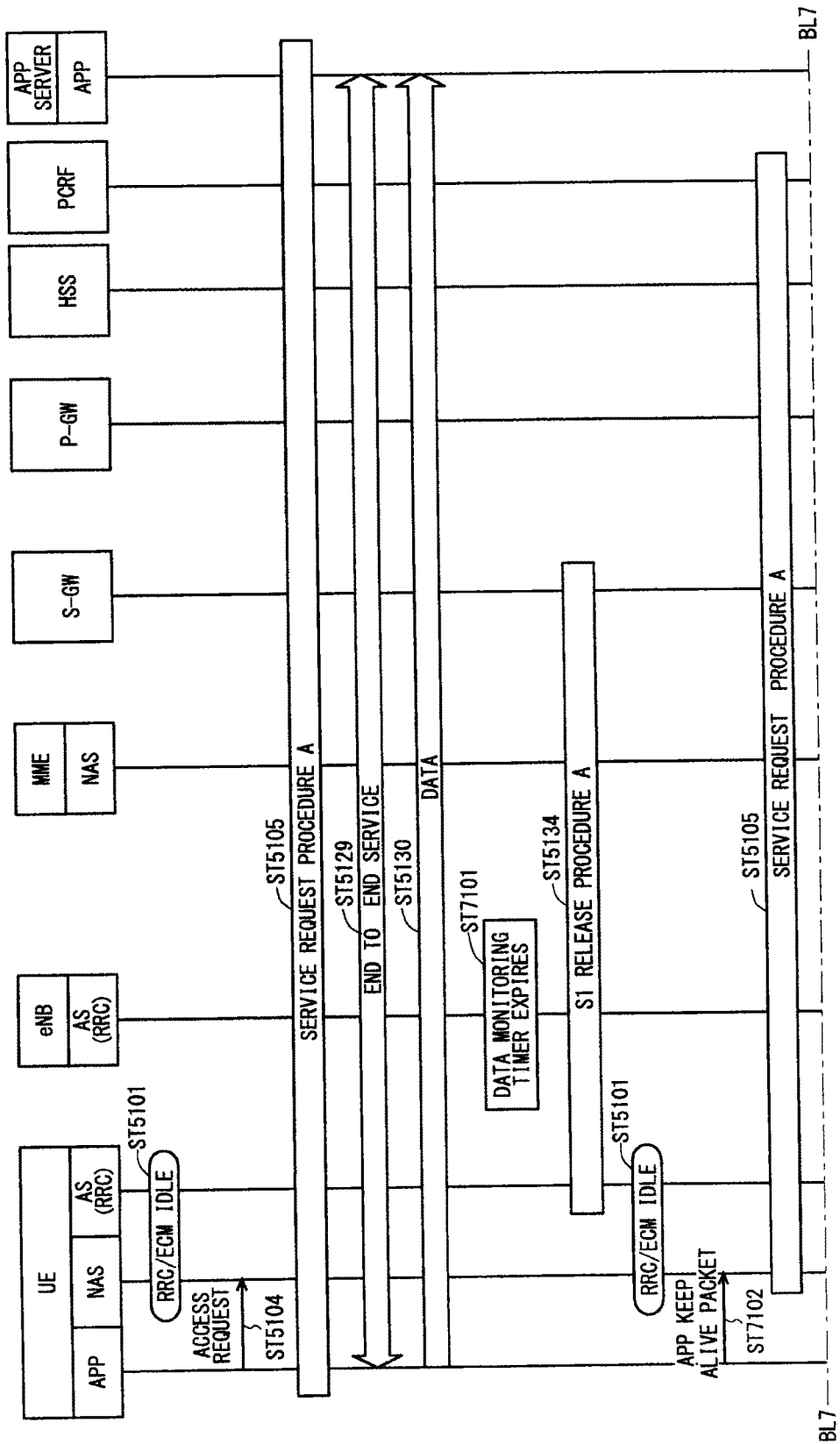
FIG. 31 is a diagram showing a sequence for describing a problem to be solved in a third embodiment.
Figure 32:
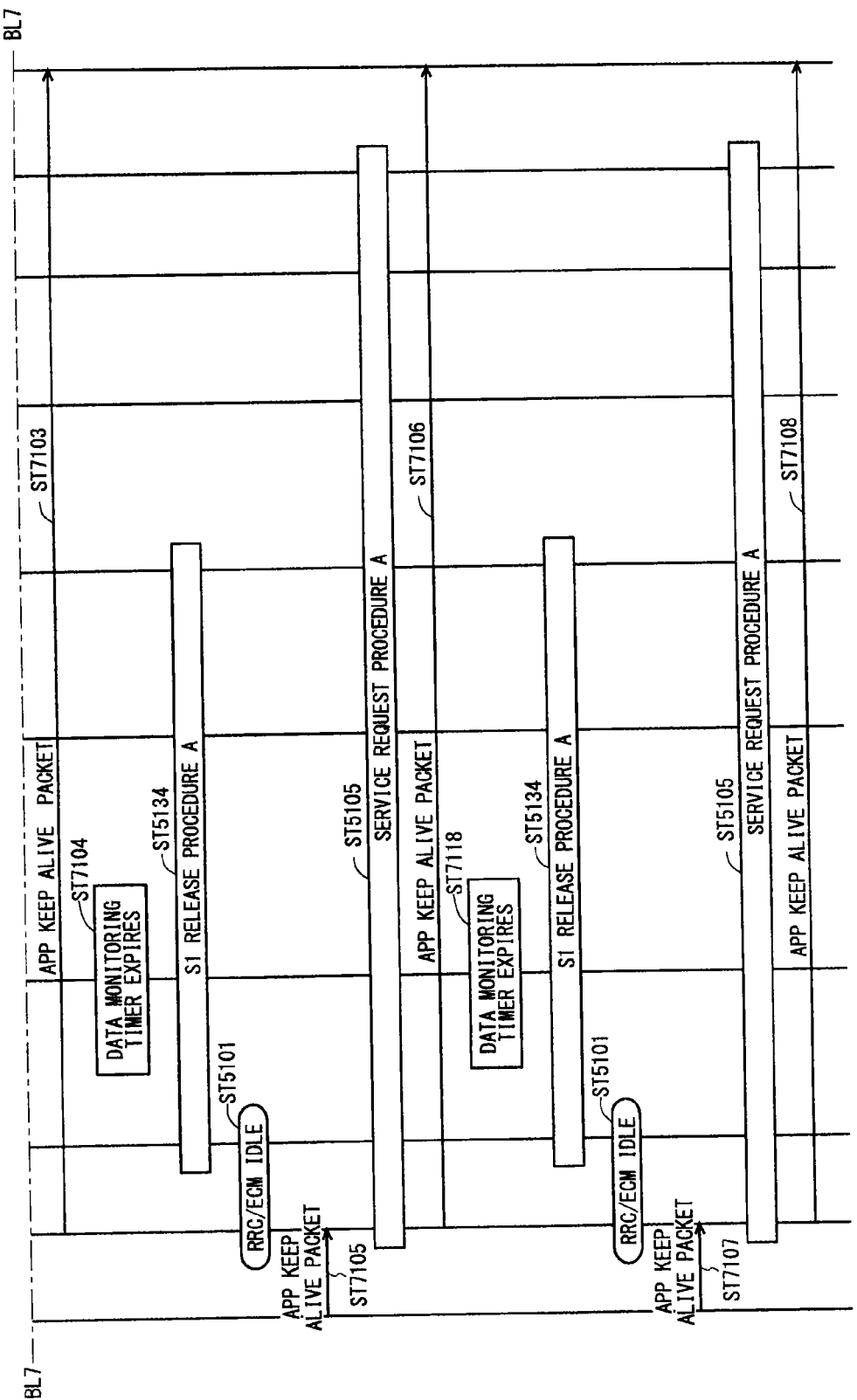
FIG. 32 is another diagram showing the sequence for describing the problem to be solved in the third embodiment.

FIGS. 31 and 32 are diagrams showing the sequence for describing the problems to be solved in the third embodiment. FIGS. 31 and 32 are continuous with each other at a boundary BL7. The sequence shown in FIGS. 31 and 32 is similar to the sequence shown in FIGS. 27 to 29, and thus, the same steps will be denoted by the same step numbers and common description will be skipped.

In Steps ST5101, ST5104 and ST5105, and ST5129 and ST5130, end-to-end service is performed between the UE and application server, so that application data is communicated from the UE to the application server.

The eNB monitors whether or not data has been transmitted and received, and in the case where data has not been transmitted and received during a predetermined period, activates the S1 release procedure A of Step ST5134. A data monitoring timer may be provided as a predetermined period. In Step ST7101, the eNB judges whether or not the data monitoring timer has expired. Through the S1 release procedure of Step ST5134, the radio bearer, the S1 bearer, and the EPS bearer are released. In Step ST5101, the UE moves to the RRC/ECM_IDLE state. The eNB moves to the RRC_IDLE state, and the MME moves to the ECM_IDLE state.

After that, in Step ST7102, "APP keep alive packet" to be regularly transmitted from the application of the UE occurs, and then, the UE activates the service request procedure A of Step ST5105 again in response to "APP keep alive packet". Through the service request procedure A, the UE moves to the RRC/ECM_CONNECTED state. The eNB moves to the RRC_CONNECTED to the UE and the MME moves to the ECM_CONNECTED state to the UE. This allows for communication between the UE and application server.

In Step ST7103, the UE transmits "APP keep alive packet" to the application server.

The eNB monitors whether or not data has been transmitted and received. Data has not been transmitted and received after the transmission of "APP keep alive packet" from the UE to the application server, and in Step ST7104, the data monitoring timer expires. In such a case, in Step ST5134, the eNB activates the S1 release procedure A again. The radio bearer, the S1 bearer, and the EPS bearer are released through the S1 release procedure A, and in Step ST5101, the UE moves to the RRC/ECM_IDLE state again. The eNB moves to the RRC_IDLE state and the MME moves to the ECM_IDLE state.

In many cases, application data is not generated after the transmission of "APP keep alive packet" and "APP keep alive packet" is transmitted regularly. As described above, thus, the transition of the RRC connection between the UE and eNB is frequently repeated. If the transition of the RRC connection state is frequently repeated as described above, the signaling amount for transition of the RRC connection state increases, causing a problem of increases in the system resources in the radio access network and in the power consumption of the UE.

In the UE, the state of the RRC and the state of the ECM shift in association with each other. When the RRC connection is released in the UE in the ECM_CONNECTED state, the UE enters the ECM_IDLE state. When the RRC connection is released, the UE enters the RRC_IDLE state. Thus, upon release of the RRC connection, the UE shifts from RRC_CONNECTED to RRC_IDLE, and in association with that, shifts from ECM_CONNECTED to ECM_IDLE (see Chapter 4.6.4 of Non-Patent Document 13).

In the network, the state of the RRC and the state of the ECM shift in association with each other. Assuming that the RRC state of a target UE has shifted to RRC_IDLE, in the eNB in the ECM_ CONNECTED state, the S1 release procedure is activated. Upon release of the S1 connection, the network shifts from ECM_CONNECTED to ECM_IDLE. Thus, in association with the shift to RRC_IDLE, the S1 connection is released, and the network shifts from ECM_CONNECTED to ECM_IDLE (see Chapter 4.6.4 of Non-Patent Document 13).

The transition of the RRC connection state is frequently repeated as described above, so that the transition of the ECM state is frequently repeated. This results in that, for example, the procedure of controlling to establish and release the S1 bearer is frequently performed, causing a problem of increases in signaling amount and in system resources in the radio access network.

The solution to the problem in third embodiment will be described below. To solve the above-mentioned problem, the RRC state at the Uu point and the connection state of the session of the APP are caused to agree with each other. By recognizing the RRC state of the UE, the eNB recognizes the connection state of the session of the APP and then notifies the network-side entity, for example, S-GW, the information indicating the above. The network-side entity that has been notified, for example, the S-GW controls the transmission of a pseudo keep-alive packet (hereinafter, also referred to as "pseudo APP keep alive packet" or "local APP keep alive packet").

The eNB recognizes the RRC state of the UE in accordance with the current 3GPP specifications.

The UE does not transmit, to a Uu point, a keep-alive packet requested to be transmitted from the application.

Specific examples of the entity that judges whether or not to perform the method of causing the RRC state at the Uu point to agree with the connection state of the session of the APP: (1) UE and (2) network, specifically, S-GW or P-GW.

The following two (1A) and (2A) will be disclosed as specific examples of the judgment.

(1A) The case in which the judgment entity is a UE will be disclosed. The UE makes a judgment based on the application that has requested access. The UE judges whether or not the application requests the transmission of a keep-alive packet.

In the case where the UE judges that, as a result of the judgment, the application requests the transmission of a keep-alive packet, the UE (NAS) notifies the application of the UE of Ack (local Ack) to the transmission of a local APP keep alive packet.

The UE also notifies the network of the judgment results (hereinafter, also referred to as "APP keep alive information"). Specific examples of the network include an entity that transmits a local APP keep alive packet to an application server, such as S-GW.

As a specific example of the notification method, the UE notifies the MME of a request to transmit a local APP keep alive packet. The MME that has received the request to transmit a local APP keep alive packet notifies the S-GW of the request to transmit a local APP keep alive packet.

The following two (1) and (2) will be disclosed as specific examples of the method in which the UE notifies the MME of a request to transmit a local APP keep alive packet.

(1) A NAS signal is newly provided.

(2) The existing NAS signal is used. Compared with the specific example (1), the specific example (2) is effective in that a new signal needs not to be provided. The specific example (2) can prevent the communication system from becoming complicated.

The following five (1) to (5) will be disclosed as specific examples of the parameters to be newly mapped to a NAS signal.

(1) Information for setting so as to cause the RRC state at the Uu point to agree with the connection state of the session of the APP, such as the indication that the parameter is a request to transmit a local APP keep alive packet. This may also be referred to as "APP keep alive information" below.

(2) UE identity, specifically, which may be UE-ID or IMSI.

(3) Information on an application server being a connection destination.

(4) Transmission period of a keep-alive packet.

(5) Combination of (1) to (4) above.

Specific examples of the case in which the existing NAS signal is used include the case in which a service request message is used.

The following three (1) to (3) will be disclosed as specific examples of the parameters required to be added to the existing NAS signaling.

(1) Information for setting so as to cause the RRC state at the Uu point to agree with the connection state of the session of the APP, such as the indication that the parameter is a request to transmit a local APP keep alive packet.

(2) Information on an application server being a connection destination.

(3) Transmission period of a keep-alive packet.

The following two (1) and (2) will be disclosed as specific examples of the method in which the MME notifies the S-GW of a request to transmit a local APP keep alive packet.

(1) An S11 signal is newly provided.

(2) The existing S11 signal is used. Compared with the specific example (1), the specific example (2) is effective in that a new signal needs not to be provided. The specific example (2) can prevent the communication system from becoming complicated.

The following five (1) to (5) will be disclosed as specific examples of the parameters to be newly mapped to the S11 signal.

(1) Information for setting so as to cause the RRC state at the Uu point to agree with the connection state of the session of the AP, such as the indication that the parameter is a request to transmit a local APP keep alive packet.

(2) UE identity, specifically, which may be UE-ID or IMSI.

(3) Information on an application server being a connection destination.

(4) Transmission period of a keep-alive packet. The S-GW that has received the transmission period of a keep-alive packet may set the transmission period of a local APP keep alive packet to agree with the transmission period of a keep-alive packet.

(5) Combination of (1) to (4) above.

Specific examples of the case in which the existing S11 signal is used include the case in which a modify bearer request message is used.

The following three (1) to (3) will be disclosed as specific examples of the parameters required to be added to the existing S11 signaling.

(1) Information for setting so as to cause the RRC state at the Uu point to agree with the connection state of the session of the APP, such as the indication that the parameter is a request to transmit a local APP keep alive packet.

(2) Information on an application server being a connection destination.

(3) Transmission period of a keep-alive packet, or the like.

The S-GW that has received the transmission period of a keep-alive packet may set the transmission period of a local APP keep alive packet to be identical with the transmission period of a keep-alive packet.

(2A) The case in which the judgment entity is a network, for example, S-GW, will be disclosed. The S-GW makes a judgment based on the application that has requested access. The S-GW judges whether or not the application requests to transmit a keep-alive packet.

In the case of judging that, as a result of the judgment, the application requests to transmit a keep-alive packet, the S-GW transmits a local APP keep alive packet to an application server.

The S-GW also notifies the UE of the judgment results (hereinafter, also referred to as "APP keep alive information").

As a specific example of the notification method, the S-GW notifies the MME of a request to transmit Ack (local Ack) to the transmission of the local APP keep alive packet. The MME, which has received the request to transmit Ack (local Ack) to the transmission of the local APP keep alive packet, notifies the UE of the request to transmit Ack (local Ack) to the transmission of the local APP keep alive packet via the eNB.

The following two (1) and (2) will be disclosed as specific examples of the method in which the S-GW notifies the MME of the request to transmit Ack (local Ack) to the transmission of the local APP keep alive packet.

(1) An S11 signal is newly provided.

(2) The existing S11 signal is used. Compared with the specific example (1), the specific example (2) is effective in that a new signal needs not to be provided. The specific example (2) can prevent the communication system from becoming complicated.

The following five (1) to (5) will be disclosed as specific examples of the parameters to be newly mapped to an S11 signal.

(1) Information for setting so as to cause the RRC state at the Uu point to agree with the connection state of the session of the APP, such as the indication that the parameter is a request to transmit Ack (local Ack) to the local APP keep alive packet.

(2) UE identity, specifically, which may be UE-ID or IMSI.

(3) Information on an application server being a connection destination.

(4) Transmission period of a local APP keep alive packet.

(5) Combination of (1) to (4) above.

Specific examples of the case in which the existing S11 signal is used include the case in which a modify bearer response message is used.

The following three (1) to (3) will be disclosed as specific examples of the parameters required to be added to the existing S11 signaling.

(1) Information for setting so as to cause the RRC state at the Uu point to agree with the connection state of the session of the APP, such as the indication that the parameter is a request to transmit Ack (local Ack) to the transmission of a local APP keep alive packet.

(2) Information on an application server being a connection destination.

(3) Transmission period of a local APP keep alive packet.

The following two (1) and (2) will be disclosed as specific examples of the method in which the MME notifies the UE of a request for Ack (local Ack) to the transmission of a local APP keep alive packet.

(1) A signal is newly provided.

(2) The existing signal is used. Compared with the specific example (1), the specific example (2) is effective in that a new single needs not to be provided. The specific example (2) can prevent the communication system from becoming complicated.

The following five (1) to (5) will be disclosed as specific examples of the parameters to be newly mapped to a NAS signal.

(1) Information for causing the RRC state at the Uu point to agree with the connection state of the session of the APP session, such as the indication that the parameter is a request to transmit Ack (local Ack) to the transmission of a local APP keep alive packet. Hereinafter, this may also be referred to as "APP keep alive information".

(2) UE identity, specifically, which may be UE-ID or IMSI.

(3) Information on an application server being a connection destination.

(4) Transmission period of a local APP keep alive packet.

(5) Combination of (1) to (4) above.

Next, a service request procedure is used as a specific example in the case in which the existing signal is used. Specific examples thereof include an initial context setup request during the service request procedure and an RRC connection reconfiguration.

The following three (1) to (3) will be disclosed as specific examples of the parameters required to be added to the existing signaling.

(1) Information for setting so as to cause the RRC state at the Uu point to agree with the connection state of the session of the APP, such as the indication that the parameter is a request to transmit Ack (local Ack) to a local APP keep alive packet.

(2) Information on an application server being a connection destination.

(3) Transmission period of a local APP keep alive packet.

Figure 33:
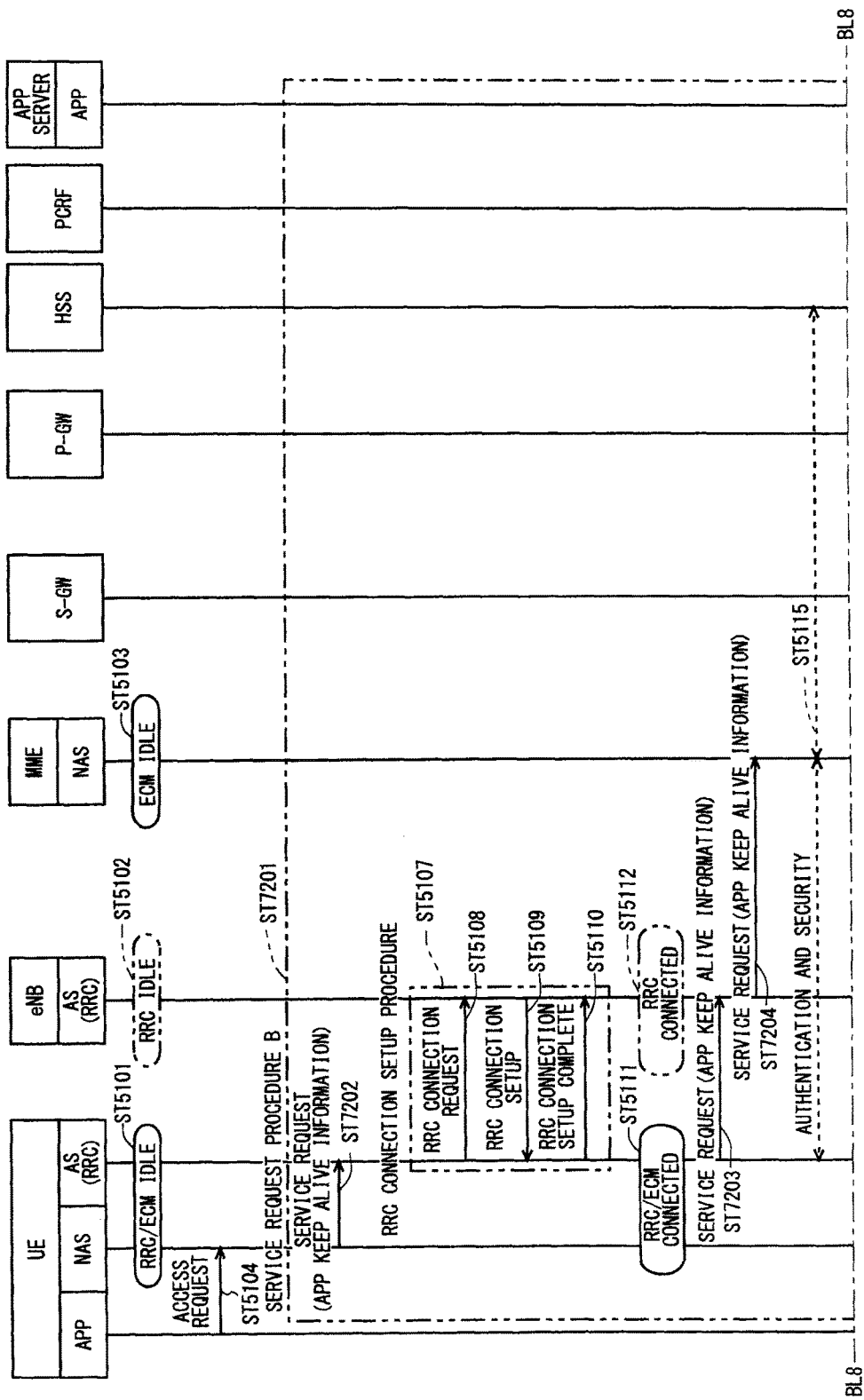
FIG. 33 is a diagram showing an exemplary sequence of a communication system in the third embodiment.
Figure 34:
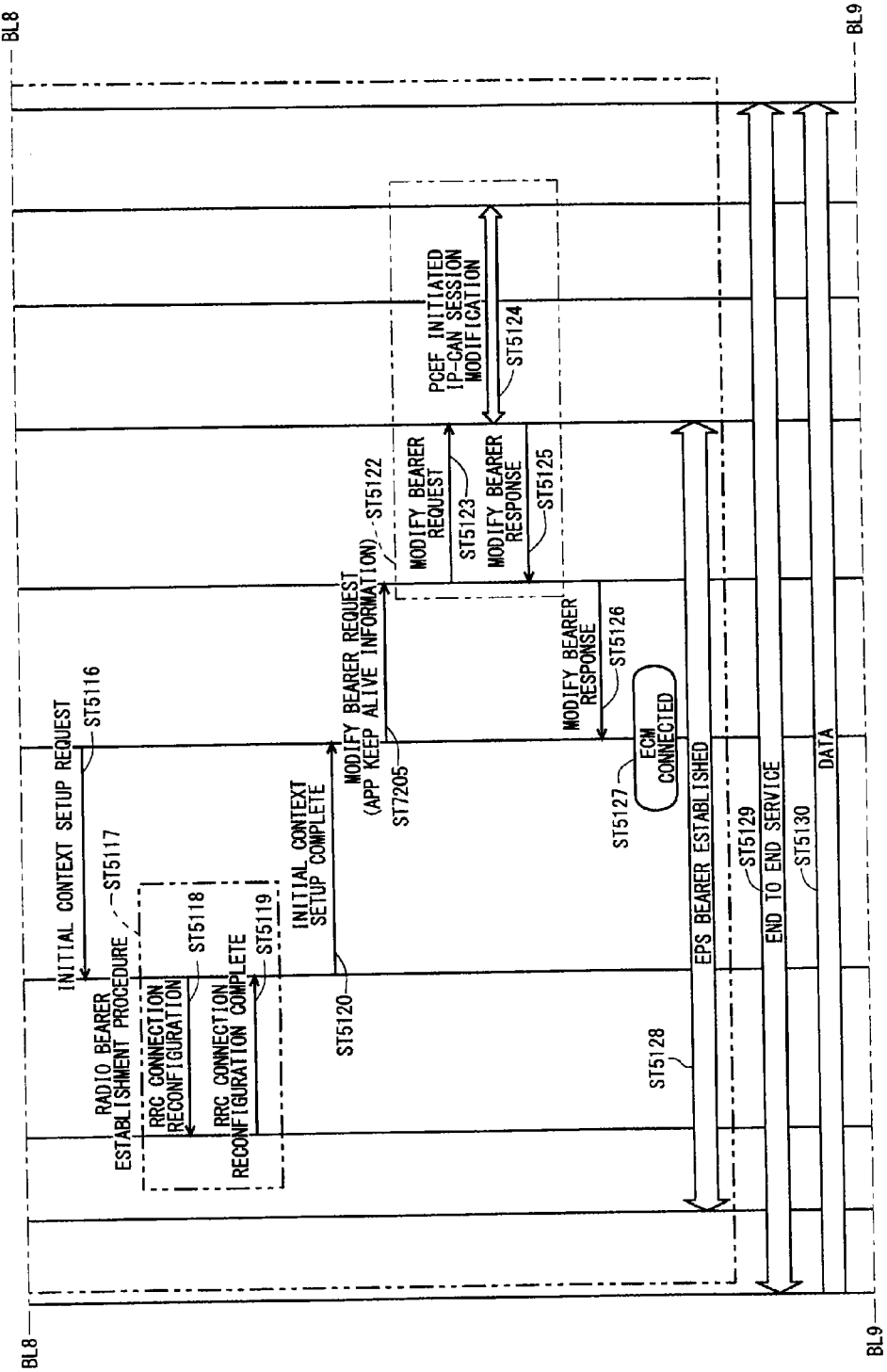
FIG. 34 is another diagram showing the exemplary sequence of the communication system in the third embodiment.
Figure 35:
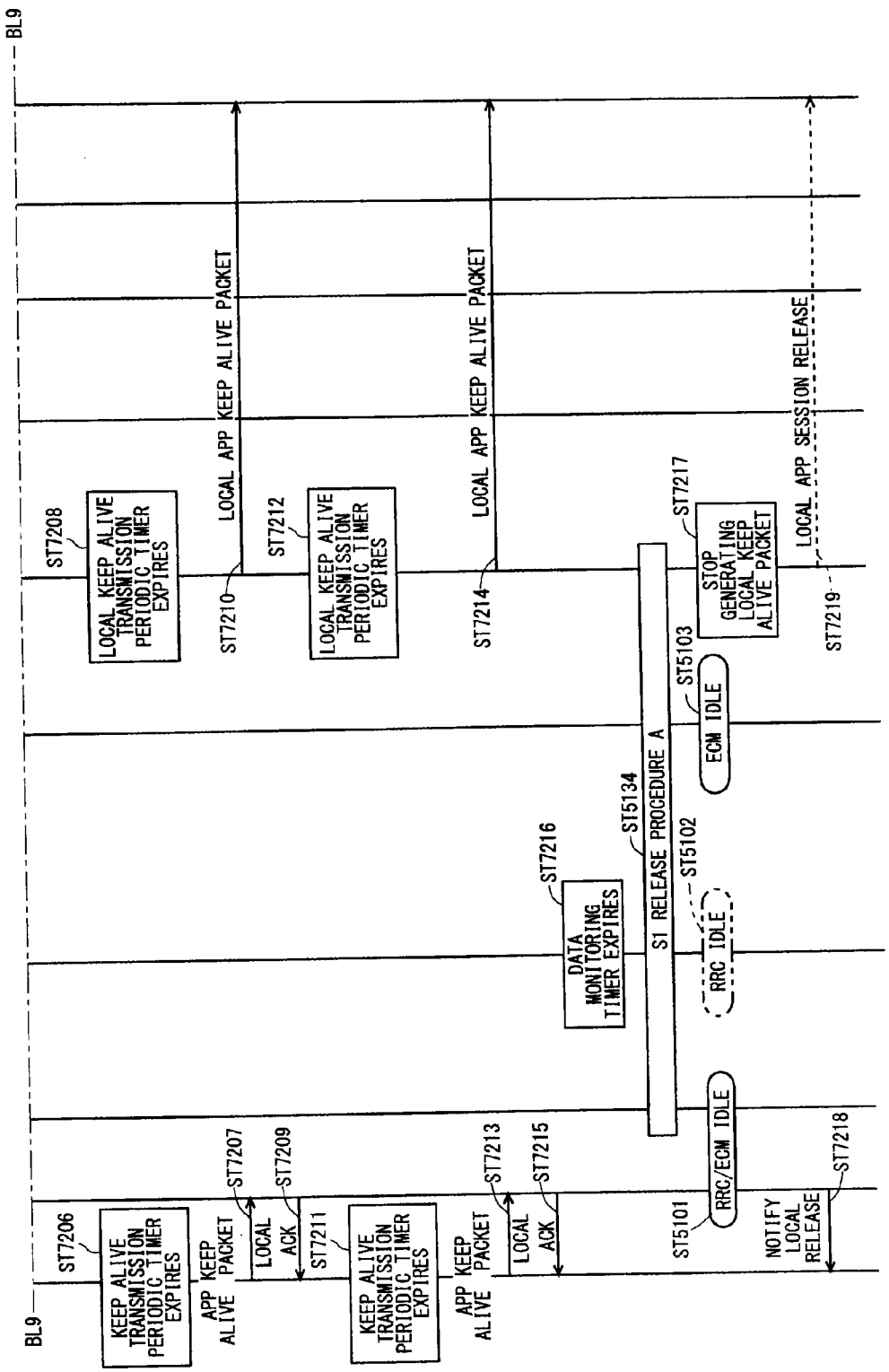
FIG. 35 is still another diagram showing the exemplary sequence of the communication system in the third embodiment.

FIGS. 33 to 35 are diagrams showing an exemplary sequence of a communication system in the third embodiment. FIGS. 33 and 34 are continuous with each other at a boundary BL8. FIGS. 34 and 35 are continuous with each other at a boundary BL9. The sequence shown in FIGS. 33 to 35 is similar to the sequence shown in FIGS. 27 to 29, and thus, the same steps will be denoted by the same step numbers and common description will be skipped.

The UE has an application to be executed on TCP/IP. FIGS. 33 to 35 show the case in which the UE is in the RRC_IDLE state in Step ST5101, the eNB is in the RRC_IDLE state to the UE in Step ST5102, and the MME is in the ECM_IDLE state to the UE in Step ST5103.

When an application of the UE starts access, in Step ST5104, the application of the UE issues an access request to the NAS of the UE. In response to the access request, the UE activates a service request procedure B in Step ST7201.

The service request procedure B of Step ST7201 may be obtained by partly changing the service request procedure A of Step ST5105 in FIG. 27. The changed part will be described below.

The service request message to be notified the AS from the NAS of the UE in Step ST7202 includes "APP keep alive information". "APP keep alive information" is the information for causing the RRC state at the Uu point to agree with the connection state of the session of the APP. For example, this may be the information indicating whether or not setting is made, or this information may be included in a message only in the case where setting is made.

In Step ST7203, the UE includes "APP keep alive information" in the service request message and then notifies the eNB.

The eNB that has received "APP keep alive information" in Step ST7203 includes "APP keep alive information" in the service request message in Step ST7204 and then notifies the MME.

The MME that has received "APP keep alive information" includes "APP keep alive information" in a modify bearer request message in Step ST7205 and then notifies the S-GW. This allows the S-GW being a network-side entity to be notified of whether or not to cause the RRC state at the Uu point to agree with the connection state of the APP session. Therefore, the S-GW can perform the procedure corresponding to whether or not to cause the RRC state at the Uu point to agree with the connection state of the session of the APP.

The example shown in FIGS. 33 to 35 shows the case in which, as "APP keep alive information" in Steps ST7202, ST7203, ST7204, and ST7205, setting is made to cause the RRC state at the Uu point to agree with the connection state of the session of the APP.

The UE does not transmit, to the Uu point, a keep-alive packet requested to be transmitted from the application. In Step ST7206 of FIG. 35, the application of the UE judges whether or not an APP keep alive packet transmission periodic timer (hereinafter, also referred to as a "keep alive transmission periodic timer") has expired. In the case of judging that the keep alive transmission periodic timer has expired, in Step ST7207, the application transmits "APP keep alive packet" to the NAS. Due to the generation of "APP keep alive packet", the UE does not transmit "APP keep alive packet" to the Uu point and thus does not activate the service request procedure.

In the UE, in Step ST7209, the NAS that has received "APP keep alive packet" from the application may notify the application of a response message. This response message is referred to as a local response. The NAS of the UE recognizes the state of the RRC/ECM, and for the RRC/ECM_CONNECTED state, notifies the application of Ack (local Ack). For the RRC/ECM_IDLE state, the NAS notifies the application of Nack (local Nack).

The application of the UE that has received local Ack judges that the RRC/ECM is connected and continues transmitting "APP keep alive packet" to keep the connected state of the session. The application of the UE that has received local Nack judges that the RRC/ECM is not connected and then stops transmitting "APP keep alive packet". The application may disconnect the session.

In the case of judging that the keep alive transmission periodic timer has expired in Step ST7211, in Step ST7213, the application that has received local Ack from the NAS in Step ST7209 continuously transmits "APP keep alive packet". The state of the RRC/ECM of the UE is the connected state, and in Step ST7215, the NAS notifies the application of local Ack.

Meanwhile, the network-side entity, for example, S-GW controls the transmission of a pseudo keep-alive packet (hereinafter, also referred to as a "local APP keep alive packet"). The S-GW, which has received "APP keep alive information" for setting the RRC state at the Uu point to agree with the connection state of the session of the APP, determines to generate a local APP keep alive packet and then transmit it to the application server.

The S-GW regularly or periodically generates a local APP keep alive packet, and as long as an EPS bearer is established, regularly or periodically generates a local APP keep alive packet and transmits it to the application server.

In Step ST7208, the S-GW, which has received "APP keep alive information" for setting the RRC state at the Uu point to agree with the connection state of the APP session in Step ST7205, judges whether or not the local APP keep alive packet transmission periodic timer (hereinafter, also referred to as a "local keep alive transmission periodic timer") has expired.

In the case of judging that the local keep alive transmission periodic timer has expired, in Step ST7210, the S-GW transmits a local APP keep alive packet to the application server.

The S-GW judges whether or not the EPS bearer has been established, and in the case of judging that it has been established, continuously in Step ST7212, judges whether or not the local keep alive transmission periodic timer has expired. In the case of judging that the local keep alive transmission periodic timer has expired, in Step ST7214, the S-GW transmits a local APP keep alive packet to the application server.

The APP server that has received the local APP keep alive packet may transmit a response signal (Ack) to the S-GW. The response signal may be a response message. If the application has ended the session with the UE, the APP server may avoid transmitting the response signal to the S-GW.

In the case of receiving the response signal from the APP server, which corresponds to the local APP keep alive packet, the S-GW may judge that the session with the UE continues. Meanwhile, in the case of receiving no response signal from the APP server, which corresponds to the local APP keep alive packet, the S-GW may judge that the session with the UE has ended. In the case of judging that the session with the UE has ended, the S-GW may activate the procedure of releasing the EPS bearer.

In Step ST7216, the eNB monitors whether or not data will be transmitted and received. In the case where data has not been transmitted and received during a predetermined period, the eNB activates the S1 release procedure A of Step ST5134. In the case of setting the RRC state at the Uu point to agree with the connection state of the APP session, in Step ST7216, the eNB sets the data monitoring timer to a long period. This may be set to be a longer period than the data monitoring timer shown in Steps ST7101, ST7104, and ST7118 of FIGS. 31 and 32.

Through the S1 release procedure A of Step ST5134, the radio bearer, the S1 bearer, and the EPS bearer are released. In Step ST5101, the UE moves to the RRC/ECM_IDLE state. In Step ST5102, the eNB moves to the RRC_IDLE state to the UE. In Step ST5103, the MME moves to the ECM_IDLE state to the UE.

Alternatively, the UE may monitor whether or not data has been transmitted and received. In the case where data has not been transmitted and received during a predetermined period, the NAS of the UE may avoid notifying the application of a local response also in the case of receiving "APP keep alive packet" from the application. As a result, the application of the UE recognizes that the session has been ended.

In the case where data has not been transmitted and received during a predetermined period, the UE notifies the MME of a request to stop transmitting a local APP keep alive packet. The MME, which has received the request to stop transmitting a local APP keep alive packet, may notify the S-GW of the request to stop transmitting a local APP keep alive packet. The S-GW, which has received the request to stop transmitting a local APP keep alive packet, stops transmitting a local APP keep alive packet. As a result, the application of the APP server can end the session to the UE.

In Step ST7218, the UE that has recognized that it has entered the RRC/ECM_IDLE state in Step ST5101 notifies the application that it has entered the RRC/ECM_IDLE state. This message is referred to as a local release. The application that has received the local release judges that the RRC/ECM is not connected and then stops transmitting "APP keep alive packet". The application may disconnect the session.

Meanwhile, in Step ST7217, the S-GW that has recognized that the EPS bearer has been released stops generating a local APP keep alive packet (hereinafter, also referred to as a "local keep alive packet").

In Step ST7219, the S-GW notifies the application server of a release of the application session (local APP session release) message. The release message of the application session may include the information on the cause of stopping the generation of a local APP keep alive packet. Or, there may be newly provided an application session release message in the case where the generation of a local APP keep alive packet is stopped. The application session release message in the case where the generation of a local APP keep alive packet is stopped is referred to as a local application session release message. The application server that has received the local application session release message may judge that the EPS bearer has not been established and disconnect the session. Or, the application server may reactivate the session.

The above-mentioned method causes the RRC state at the Uu point and the connection state of the APP session to agree with each other. This eliminates the need for appropriately changing the states of the RRC and RAB due to the generation of a keep-alive packet from the application at the Uu point.

Setting the data monitoring timer in Step ST7216 to be a long period reduces the frequency of occurrence at which the S1 release procedure A is activated in Step ST5134. This reduces the frequency of occurrence at which the radio bearer, the S1 bearer, and the EPS bearer are released, resulting in a reduction in signaling for shifting the RRC/ECM state to transmit "APP keep alive packet" from the application. This prevents an increase in the unnecessary signaling due to the generation of a keep-alive packet from the application, mitigating an influence on system resources.

First Modification of Third Embodiment

The problem to be solved in a first modification of the third embodiment is the same as the problem in the third embodiment described above, which will be described below. In the third embodiment, the state of the RRC connection between the UE and eNB is used, which may cause a problem that the state of the UE disagrees with that of the eNB, which has been described in the second embodiment.

Figure 36:
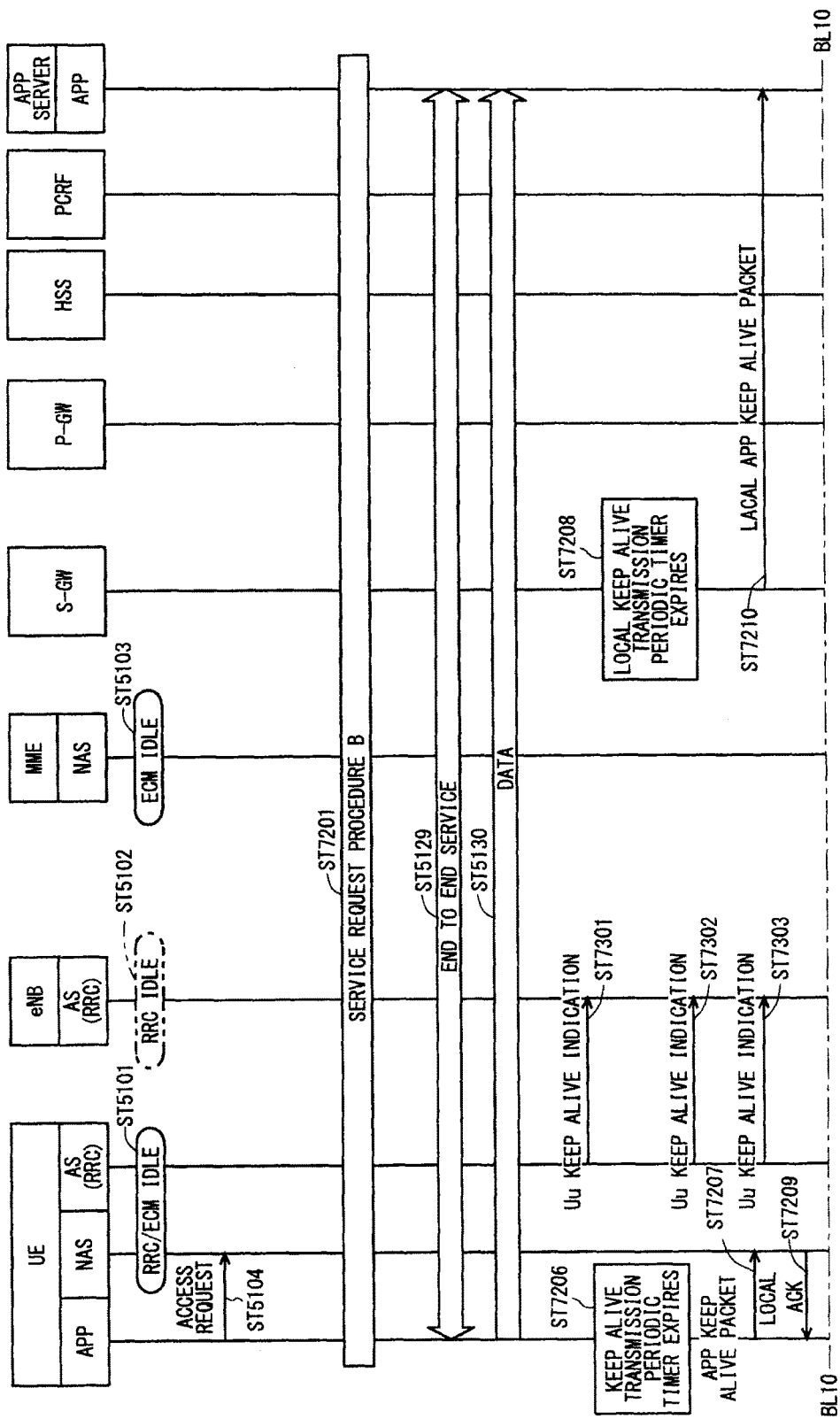
FIG. 36 is a diagram showing an exemplary sequence of a communication system in a first modification of the third embodiment.
Figure 37:
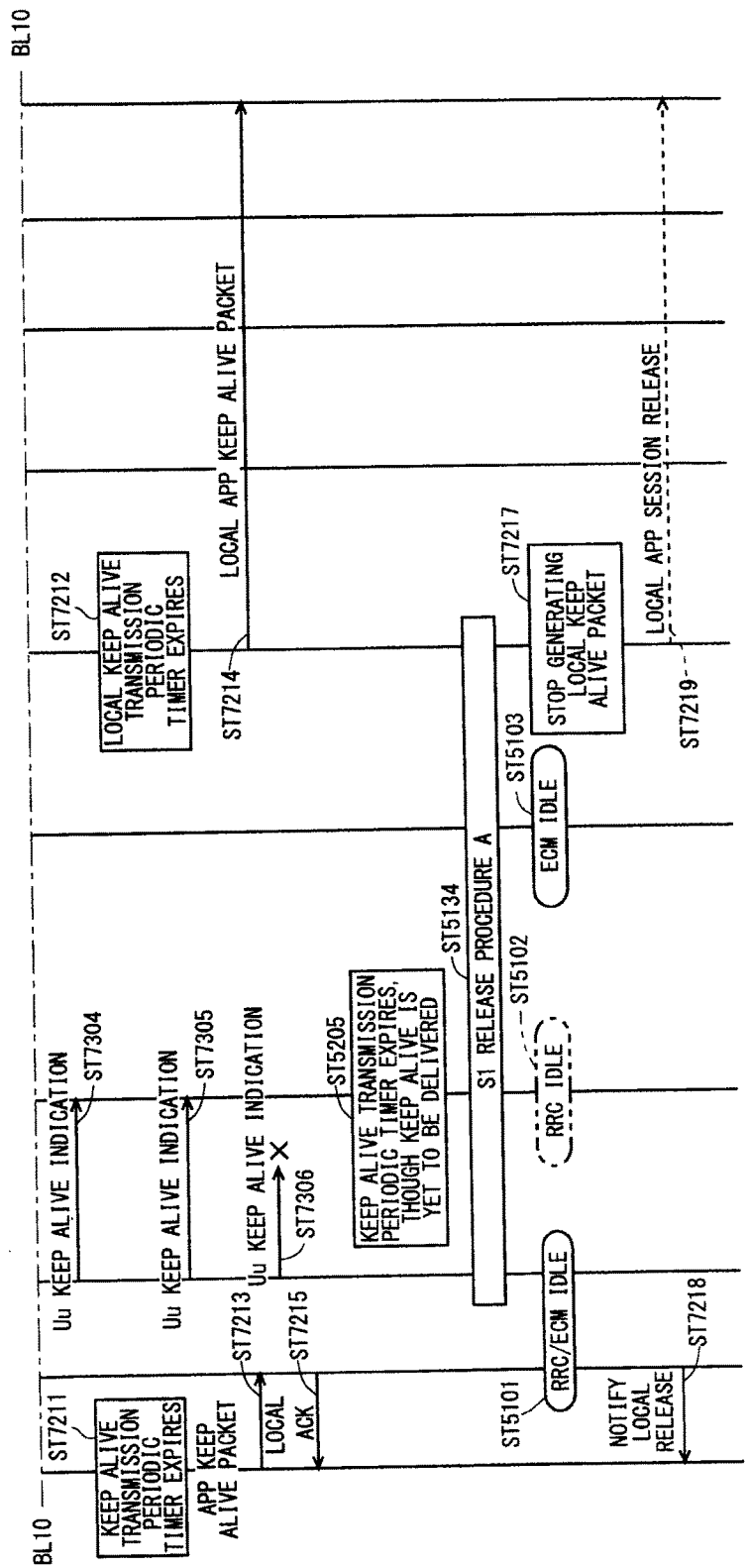
FIG. 37 is another diagram showing the exemplary sequence of the communication system in the first modification of the third embodiment.

To solve the above-mentioned problem, the first modification of the third embodiment applies the measure taken in the second embodiment described above to the third embodiment. FIGS. 36 and 37 are diagrams showing an exemplary sequence of a communication system in the first modification of the third embodiment. FIGS. 36 and 37 are continuous with each other at a boundary BL10. The sequence shown in FIGS. 36 and 37 is similar to the sequence shown in FIGS. 33 to 35, and thus, the same steps will be denoted by the same step numbers and common description will be skipped.

In Steps ST5101 to ST5104, ST7201, and ST5129 and ST5130, end-to-end service is performed between the UE and the application server, so that application data is communicated from the UE to the application server.

This modification uses the method disclosed in the third embodiment described above, and in Step ST7201, the service request procedure B using "APP keep alive information" is performed as the service request procedure. FIGS. 36 and 37 show the sequence in the case where setting is made to cause the RRC state at the Uu point to agree with the connection state of the session of the APP as "APP keep alive information".

As disclosed in the third embodiment, the UE does not transmit, to the Uu point, a keep-alive packet requested to be transmitted from the application. The network-side entity, for example, S-GW controls the transmission of a local APP keep alive packet. The processes of Steps ST7206 to ST7215 are accordingly performed.

In the third embodiment described above, the state of the RRC connection between the UE and eNB is kept until the data monitoring timer expires in Step ST7216 after data transmission in Step ST5130, and the S1 release procedure is performed in Step ST5134. In this state, the state of the UE in RRC connection with the eNB may not be kept normally for some reason, such as moving of the UE to out of the coverage of the eNB or the deterioration in communication quality of the UE. In such a case, the UE shifts the RRC state to RRC_IDLE, whereas the eNB keeps the RRC_CONNECTED state. This causes a problem that the state of the UE disagrees with that of the eNB.

The UE, which has recognized that it has entered the RRC_IDLE state when the state of the UE disagree with that of the eNB, notifies the application that it has entered the RRC_IDLE state. The application that has received this notification judges that RRC has not been connected, stops transmitting "APP keep alive packet", and ends the session. The session ends in the application of the UE as described above. The eNB, however, keeps the RRC_CONNECTED state. Thus, the MME keeps the ECM_CONNECTED state, and the S-GW continuously generates a local keep alive packet and transmits the local keep alive packet to the application server. The application server accordingly recognizes that session is connected. As described above, the states disagree with each other between the application of the UE and the application server.

The second embodiment has disclosed the method in which, to remedy the problem that the states disagree with each other, the message for notifying the state of the UE in RRC connection is provided at the Uu point, and the UE, which is in the RRC_CONNECTED state, regularly or periodically transmits "Uu keep alive indication".

This modification applies the measure taken in the second embodiment. In the example shown in FIGS. 36 and 37, after the data transmission in Step ST5130, as shown in Steps ST7301 to ST7305, the UE in the RRC_CONNECTED state periodically notifies the eNB of "Uu keep alive indication". Through the notification of "Uu keep alive indication", the UE shows the eNB that the UE is yet to move to RRC_IDLE, that is, the UE is in the RRC_CONNECTED state.

Upon receipt of "Uu keep alive indication" from the UE, the eNB recognizes that the UE is yet to move to RRC_IDLE, that is, the UE is in the RRC_CONNECTED state. The eNB judges the state of the RRC connection with the eNB from whether or not it has successively received "Uu keep alive indication" from the UE. At the timing of the "Uu keep alive indication" transmission period, the eNB judges whether or not it has successively received "Uu keep alive indication" from the UE.

In Step ST7304, the UE transmits "Uu keep alive indication" to the eNB, but in some cases, for some reason, the state of the RRC connection between the UE and eNB will not be kept normally and "Uu keep alive indication" will not be delivered to the eNB. In this case, in Step ST5205, the eNB fails to receive "Uu keep alive indication" at the timing of the "Uu keep alive indication" transmission period. The eNB accordingly recognizes that the state of the RRC connection between the eNB and UE is not kept normally for some reason, and then activates the S1 release procedure A of Step ST5134.

After the S1 release procedure is performed in Step ST5134, in Step ST5101, the UE moves to the RRC_IDLE state. In Step ST5102, the eNB moves to the RRC_IDLE state to the UE. In Step ST5103, the MME moves to the ECM_IDLE state to the UE. In the S1 release procedure, the eNB and MME release the system resources for the UE.

In Step ST7218, the UE that has recognized that it has entered the RRC/ECM_IDLE state in Step ST5101 notifies the application that it has entered the RRC/ECM_IDLE state. The application that has received the local release judges that the RRC/ECM is not connected and then stops transmitting "APP keep alive packet". The application may disconnect the session.

The S1 release procedure is performed in Step ST5134. In Step ST7217, the S-GW that has recognized that the EPS bearer has been released stops generating a local APP keep alive packet.

In Step ST7219, the S-GW notifies the application server of a local application session release message. The application server that has received the local application session release message may judge that the EPS bearer has not been established to disconnect the session.

The method disclosed in this embodiment allows the E-UTRAN to recognize the RRC connection state of the UE, eliminating a period in which the states disagree with each other, which occurs in the method disclosed in the third embodiment described above. Thus, an influence due to the state disagreement can be significantly reduced. For example, the eNB will not unnecessarily consume the resources for the UE. Additionally, the frequency of occurrence at which the UE cannot be called can be reduced.

In the example shown in FIGS. 36 and 37, through the S1 release procedure of Step ST5134, the UE moves to the RRC/ECM_IDLE state in Step ST5101. As another method, in the case where the UE in the RRC_CONNECTED state moves to the RRC_IDLE state for some reason such as the deterioration in received quality, the UE may judge that it has moved to the RRC_IDLE state and notify the application of the UE of the local release message. In the case of having moved to the RRC_IDLE state, the UE may judge that it has moved to the ECM_IDLE state simultaneously. In this case, the UE moves to the RRC/ECM_IDLE state prior to the S1 release procedure of Step ST5134, and the application of the UE stops transmitting "APP keep alive packet" or disconnects the session.

Also in this case, the period in which the states disagree with each other, which occurs in the method disclosed in the third embodiment, can be included in the "Uu keep alive indication" transmission period at most. Therefore, an influence due to the state disagreement can be greatly reduced. For example, the unnecessary consumption of resources for the UE can be reduced, and the frequency of occurrence at which the UE cannot be called can be reduced.

Fourth Embodiment

The problem to be solved in a fourth embodiment is the same as the problem in the third embodiment described above, which will be described below.

In the third embodiment described above, in order that the state of the RRC connection agrees with the state of the session at the application level, the RRC connection needs to be kept during the connection of the session at the application level. This is highly effective in avoiding an influence of a keep-alive packet, but in compensation for that, uses the radio resources for keeping RRC connection.

The solution to the above-mentioned problem in the fourth embodiment will be described below. To solve the above-mentioned problem, a Uu point message (uu keep alive packet) is provided, which notifies the connection state of the session of the application in the RRC_IDLE state. The UE regularly or periodically transmits "uu keep alive packet" after shifting to the RRC_IDLE state. The eNB recognizes the connection state of the session of the application of the UE from the reception of "uu keep alive packet" from the UE and from the RRC state for the UE, and then notifies any network device, for example, the S-GW of that information. The S-GW, being the network device that has been notified, controls the transmission of a local APP keep alive packet. The UE transmits "uu keep alive packet" only when the UE is in RRC_IDLE. The RRC state remains unchanged in the transmission of "uu keep alive packet". That is, during IDLE, the eNB notifies without establishing an RRC connection, for example, notifies using the RACH. As in the third embodiment described above, the UE does not transmit, to the Uu point, a keep-alive packet requested to be transmitted from the application.

Figure 38:
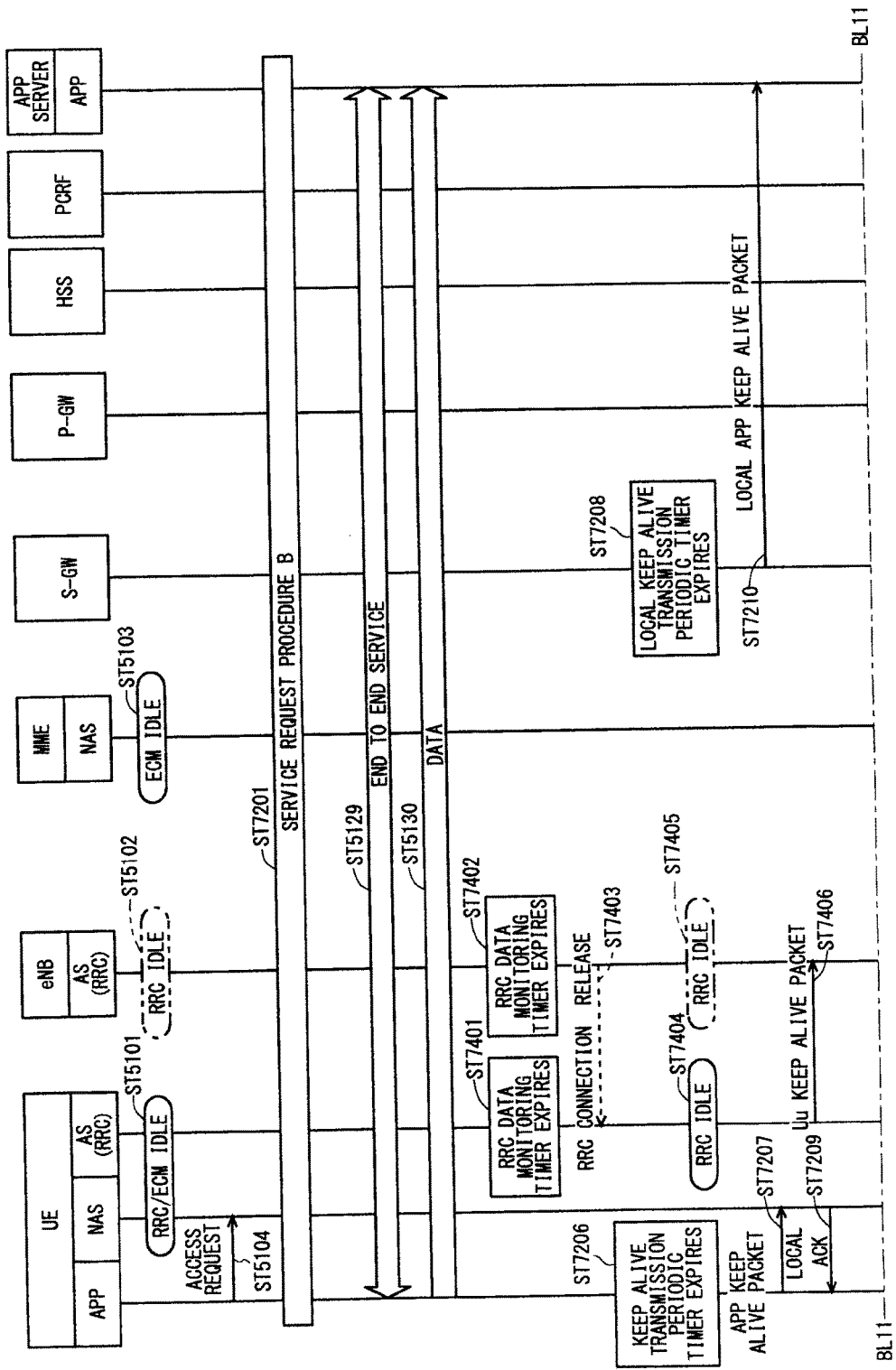
FIG. 38 is a diagram showing an exemplary sequence of a communication system in a fourth embodiment.

FIGS. 38 and 39 are diagrams showing an exemplary sequence of a communication system in the fourth embodiment. FIGS. 38 and 39 are continuous with each other at a boundary BL11. The sequence shown in FIGS. 38 and 39 is similar to the sequence shown in FIGS. 33 to 35, and thus, the same steps will be denoted by the same step numbers and common description will be skipped.

In Steps ST5101 to ST5104, ST7201, and ST5129 and ST5130, end-to-end service is performed between the UE and the application server, so that application data is communicated from the UE to the application server.

This modification uses the method disclosed in the third embodiment, and performs the service request procedure B using "APP keep alive information" in Step ST7201 as the service request procedure. FIGS. 38 and 39 show the sequence in the case where setting is made to cause the RRC state at the Uu point to agree with the connection state of the session of the APP as "APP keep alive information".

As disclosed in the third embodiment, the UE does not transmit, to the Uu point, a keep-alive packet requested to be transmitted from the application. The network-side entity, for example, S-GW controls the transmission of a local APP keep alive packet. Thus, the processes of Steps ST7206 to ST7215 are performed.

In the third embodiment, in order that the state of the RRC connection agrees with the state of the session at the application level, the RRC connection needs to be kept during the connection of the session connection at an application level. For this reason, the RRC connection state between the UE and eNB is kept until the data monitoring timer expires in Step ST7216 after the data transmission of Step ST5130, and the S1 release procedure is performed in Step ST5134. This is highly effective in avoiding an influence of a keep-alive packet, but in compensation for that, uses the radio resources for keeping RRC connection.

This embodiment will disclose the method of remedying such a problem. After the data transmission of Step ST5130 in FIG. 38, the eNB whose RRC connection to the UE is in the RRC_CONNECTED state monitors whether the data for the UE will be generated during a predetermined period. Or, the eNB may monitor whether or not it will need an individual radio bearer with the UE. A timer may be provided as the means for measuring a predetermined period. Hereinafter, this timer is referred to as an "RRC data monitoring timer".

In the case where the data for the UE has not been generated and the RRC data monitoring timer has expired in Step ST7402, the eNB activates the procedure of releasing the RRC connection in Step ST7403. As a result of this procedure, the eNB and UE move to the RRC_IDLE state in Steps ST7404 and ST7405.

In the above-mentioned procedure, only the state of the RRC connection between the UE and eNB is moved from the RRC_CONNECTED state to the RRC_IDLE state. As a result, the UE and eNB can release the radio resources for RRC connection.

Although it has been disclosed that the UE moves to the RRC_IDLE state in accordance with the RRC connection release message from the eNB, as another method, the UE may also monitor whether the data for the eNB will be generated. Or, the UE may monitor whether or not it will need an individual radio bearer with the eNB. In the case where no data has been generated and the UE-side RRC data monitoring timer has expired, the UE activates the procedure of releasing an RRC connection and then moves to the RRC_IDLE state. As another method, the UE may move to the RRC_IDLE state according to the RRC regulations. Examples of the RRC regulations include a radio link failure (RLF).

In this embodiment, the UE that has moved to the RRC_IDLE state in Step ST7404 avoids notifying the application that it has entered the RRC_IDLE state. Or, although the UE that has moved to the RRC_IDLE state notifies the application that it has entered the RRC_IDLE state, the application may avoid stopping transmitting "APP keep alive packet" or disconnecting session when it is notified that the UE has entered the RRC_IDLE state. The notification indicating that the UE has entered the RRC_IDLE state may include the information indicating that only the RRC state has moved to the RRC_IDLE state. Or, the notification may be the information as to which state, for example, RRC state, or ECM state has entered IDLE in the UE. Or, the notification may be the information indicating which bearer, for example, a radio bearer, an S1 bearer, or an EPS bearer has been released. Based on the information, the application of the UE can judge whether or not to stop transmitting "APP keep alive packet" or disconnect the session.

In Step ST7207, the UE that has shifted to the RRC_IDLE state in Step ST7404 transmits "uu keep alive packet" to the eNB to notify the eNB that the session of the application is connected. As long as the session of the application is connected, "uu keep alive packet" is continuously and periodically transmitted in Steps ST7406 to ST7408.

The eNB judges the RRC state and receives "uu keep alive packet" in the RRC_IDLE state, to thereby recognize the connection state of the session of the application of the UE. In the case where the session of the application of the UE is connected, the eNB does not perform the procedure of releasing an S1 bearer and an EPS bearer, such as the S1 release procedure. The S1 release procedure is not performed, and thus, the S-GW generates a local keep alive packet and notifies the application server. This allows the application server to recognize the connection with the UE to keep the session in the connected state.

Although "uu keep alive packet" is transmitted only when the UE is in RRC_IDLE, the RRC state remains unchanged in the transmission of "uu keep alive packet". That is, in IDLE, "uu keep alive packet" is notified without establishing an RRC connection, for example, it is notified using the RACH. As a result, the RRC state needs not to be shifted in the transmission of "uu keep alive packet", reducing a signaling amount.

In the case where the application session is connected, UE transmits "uu keep alive packet" to the eNB in Step ST7409. In some cases, however, "uu keep alive packet" is not delivered to the eNB for some reason, for example, in the case where the UE has moved out of the coverage of the eNB. In this case, in Step ST7410, the eNB fails to receive "uu keep alive packet" at the timing of the "uu keep alive packet" transmission period.

The eNB therefore recognizes that the UE cannot establish the RRC connection between the eNB and UE for some reason, and then activates the S1 release procedure A of Step ST5134.

Not limited to the existing S1 release procedure, there may be newly provided a message by which the eNB notifies the S-GW that the UE moves to the RRC_IDLE state.

A specific example of the message to be newly provided is a message indicating that in the case where the eNB releases the radio resources for the UE, the RRC connection procedure is not performed but the procedure of releasing the S1 bearer is performed. Or, the information indicative of the presence or absence of the radio resources for the UE may be newly provided in the existing S1 release procedure. The information may be an active flag.

After the S1 release procedure A is performed in Step ST5134, in Step ST5101, the UE moves to the RRC/ECM_IDLE state. In Step ST5102, the eNB keeps the RRC_IDLE state with the UE. In Step ST5103, the MME moves to the ECM_IDLE state to the UE. In the S1 release procedure, the eNB and MME release the system resources for the UE.

In Step ST7218, the UE, which has recognized that it has entered the RRC/ECM_IDLE state in Step ST5101, notifies the application that it has entered the RRC/ECM_IDLE state. The application that has received a local release judges that the RRC/ECM is not connected and then stops transmitting "APP keep alive packet". The application may disconnect the session.

In Step ST7217, the S-GW, which has recognized that the S1 release procedure has been performed and the EPS bearer has been released in Step ST5134, stops generating a local APP keep alive packet.

In Step ST7219, the S-GW notifies the application server of a local application session release message. The application server that has received the local application session release message judges that the EPS bearer is not established and may disconnect the session.

The method disclosed in this embodiment allows the UE to shift to RRC_IDLE while keeping the session of the application in the connected state. As a result, the RRC connection needs not to be kept between the UE and eNB, reducing unnecessary use of radio resources.

The method disclosed in this embodiment needs to transmit "uu keep alive packet" in the RRC_IDLE state, and thus uses radio resources therefor. Thus, an appropriate method may be selected from the methods including those of other embodiments depending on the operation status.

First Modification of Fourth Embodiment

The problem to be solved in a first modification of the fourth embodiment is the same as the problem of the fourth embodiment above, which will be described below. Also in the fourth embodiment, the state of the RRC connection is used until the procedure of releasing the RRC connection is performed upon expiration of the RRC data monitoring timer. Consequently, a state disagreement between the UE and eNB may occur, which has been described as a problem in the second embodiment. The session state at the application level is judged from the information on "uu keep alive packet" in IDLE and from two pieces of information on the RRC state, resulting in complicated implementation.

To solve the above-mentioned problem in the first modification of the fourth embodiment, the measure taken in the second embodiment above is applied in the fourth embodiment. As in the second embodiment, the DRX length is not to be changed depending on the transmission of "Uu keep alive indication" in the RRC_CONNECTED state. The transmission of "Uu keep alive indication" in the RRC_CONNECTED state is operated independently of the RRC data monitoring timer. In other words, the UE notifies "Uu keep alive indication" or "Uu keep alive packet" no matter in which state the RRC connection is, to thereby notify the eNB that the application session is connected. "Uu keep alive indication" is used for the RRC_CONNECTED state, whereas "Uu keep alive packet" is used for the RRC_IDLE state. "Uu keep alive indication" and "Uu keep alive packet" may be made available as the message with the same name, for example, as "Uu keep alive", irrespective of the RRC connection state.

Figure 40:
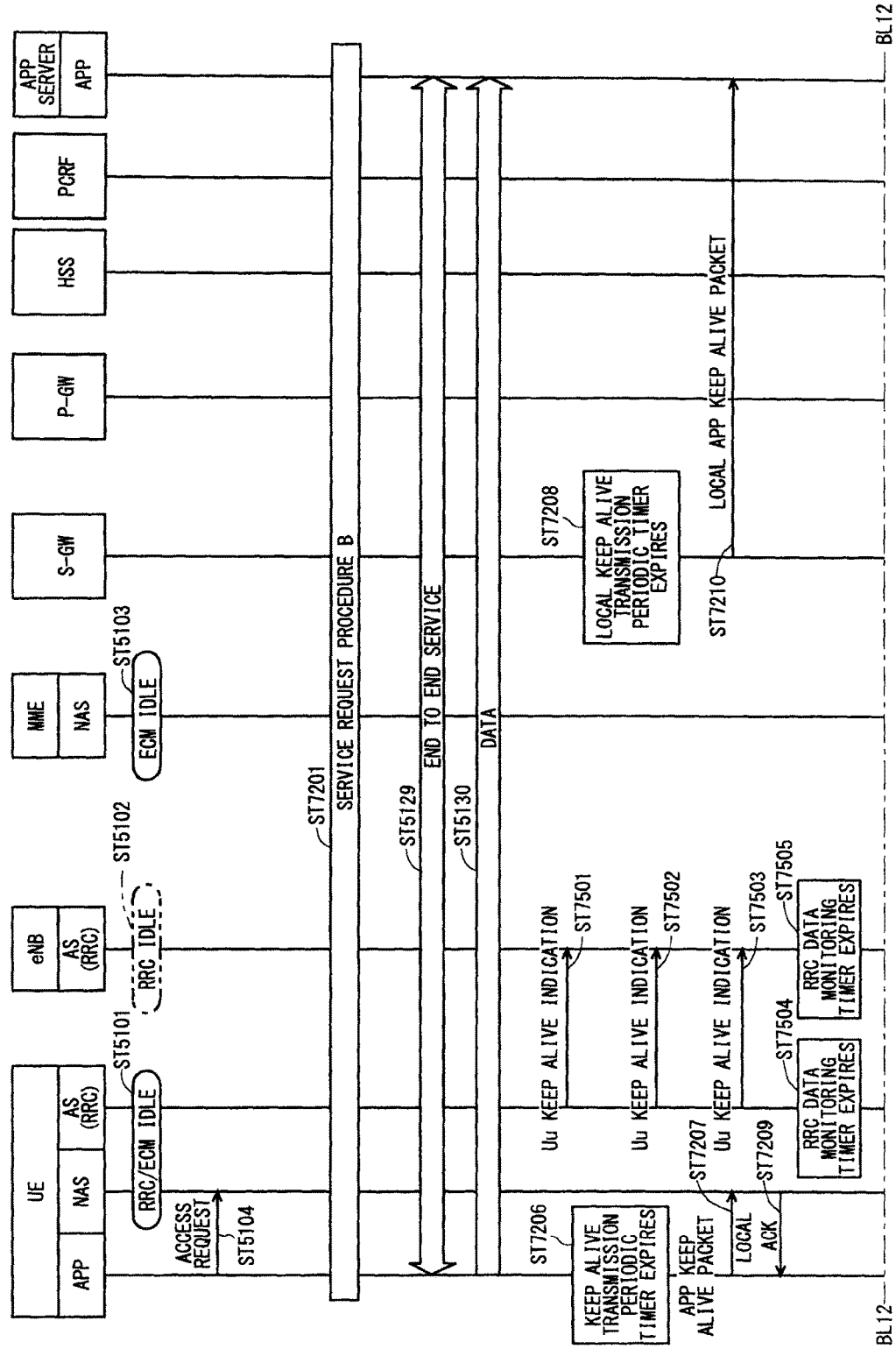
FIG. 40 is a diagram showing an exemplary sequence of a communication system in a first modification of the fourth embodiment.
Figure 41:
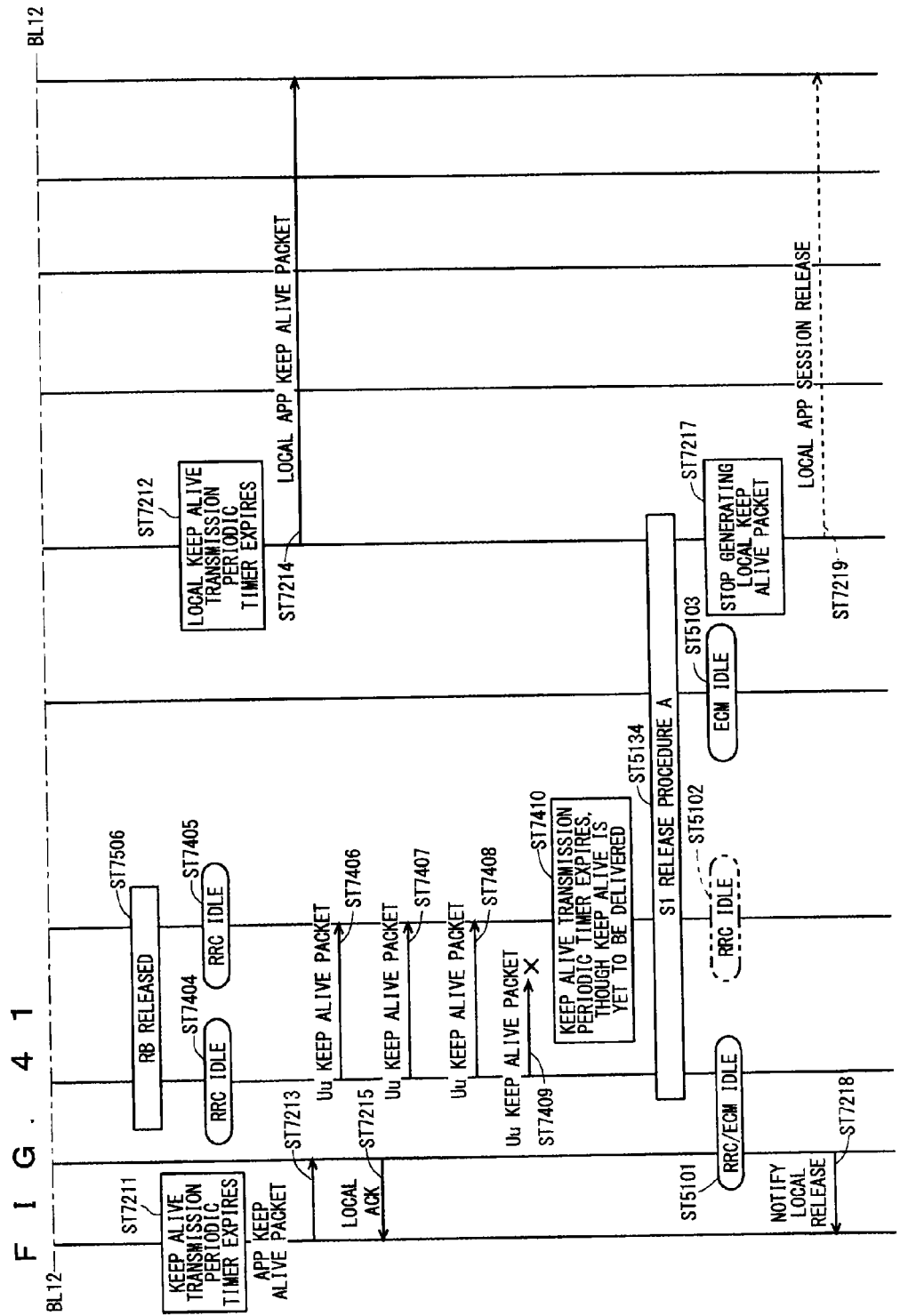
FIG. 41 is another diagram showing the exemplary sequence of the communication system in the first modification of the fourth embodiment.

FIGS. 40 and 41 are diagrams showing an exemplary sequence of a communication system in the first modification of the fourth embodiment. FIGS. 40 and 41 are continuous with each other at a boundary BL12. The sequence shown in FIGS. 40 and 41 is similar to the sequence shown in FIGS. 38 and 39, and thus, the same steps will be denoted by the same step numbers and common description will be skipped.

In the service request procedure B of Step ST7201, the UE and eNB move to the RRC_CONNECTED state and the ECM_CONNECTED state.

In Step ST5130, end-to-end service is performed between the UE and application server, so that application data is communicated from the UE to the application server.

To keep the connection of the application session, in Step ST7501, the UE transmits "Uu keep alive indication" in the RRC_CONNECTED state to the eNB to notify that the application session is connected.

To notify that the application session is connected, the UE in the RRC_CONNECTED state continuously and periodically transmits "Uu keep alive indication" to the eNB. Upon receipt of this notification, the eNB recognizes that the application session is connected.

While the eNB receives this notification, the procedure of releasing the S1 bearer and the EPS bearer is not accordingly performed, such as the S1 release procedure. The S1 release procedure is not performed, and thus, the S-GW generates a local keep alive packet and notifies the application server. This allows the application server to recognize the connection with the UE, to thereby keep the session in the connected state.

Meanwhile, the eNB monitors whether data will be generated for the UE during a predetermined period. Or, the eNB may monitor whether or not it will need an individual radio bearer with the UE. A timer may be provided as the means for measuring a predetermined period. Hereinafter, this timer is referred to as an "RRC data monitoring timer".

In the case where data has not been generated for the UE and the RRC data monitoring timer has expired in Step ST7505, in Step ST7506, the eNB activates the procedure of releasing the RRC connection. Through this procedure, the radio bearer between the eNB and UE is released, and then in Steps ST7404 and ST7405, the UE and eNB move to the RRC_IDLE state.

In the procedure described above, only the RRC connection state between the UE and eNB is moved from the RRC_CONNECTED state to the RRC_IDLE state. This allows the UE and eNB to release the radio resources for RRC connection.

Although it has been disclosed that the UE moves to the RRC_IDLE state in response to the RRC connection release message from the eNB, as another method, the UE may monitor whether or not data will be generated for the eNB. Or, the UE may monitor whether or not it will need an individual radio bearer with the eNB. In the case where data has not been generated and the UE-side RRC data monitoring timer has expired in Step ST7404, the UE activates the procedure of releasing the RRC connection and then moves to the RRC_IDLE state. Or, as another method, the UE may move to the RRC_IDLE state according to the RRC regulations. Examples of the RRC regulations include rasdio radio link failure (RLF).

The UE that has moved to the RRC_IDLE state transmits "Uu keep alive packet" in the RRC_IDLE state to the eNB in Step ST7406 to keep the connection of the application session, and then notifies that the application session is connected. To notify that the application session is connected, the UE in the RRC_CONNECTED state continuously and periodically transmits "Uu keep alive indication" to the eNB. Upon receipt of this notification, the eNB recognizes that the application session is connected.

While the eNB receives this notification, the procedure of releasing the S1 bearer and the EPS bearer is not performed, such as the S1 release procedure. The S1 release procedure is not performed, and thus, the S-GW generates a local keep alive packet and notifies the application server. This allows the application server to recognize the connection with the UE, to thereby keep the session in the connected state.

The fourth embodiment described above is applicable to the procedure to be performed in the case where the eNB confirms that "keep alive packet" is yet to be delivered in Step ST7409, which will not be described here.

The method disclosed in this embodiment can reduce the state disagreement between the UE and eNB, mitigating an influence on system resources. The eNB can judge the session state at the application level from the message indicating that the application session is connected, specifically, from "uu keep alive indication" alone for the RRC_CONNECTED state and from "uu keep alive packet" alone for the RRC_IDLE state. This enables easy implementation.

The method disclosed in this embodiment requires to transmit "uu keep alive indication" and "uu keep alive packet" in the RRC_IDLE state and the RRC_CONNECTED state, and thus, the radio resources are used therefor. Thus, an appropriate method may be selected from the methods including those in other embodiments depending on the operation status.

Fifth Embodiment

The problem to be solved in the fifth embodiment is the same as the problems of the third embodiment, the first modification of the third embodiment, the fourth embodiment, and the first modification of the fourth embodiment, which will be described below.

In the embodiments and modifications described above, "uu keep alive" being a message at a Uu point is used as a measure against the problem attributable to a keep-alive packet to be regularly transmitted. In this case, radio resources are used to keep RRC connection.

This embodiment will disclose the method of avoiding using "uu keep alive" being a message at a Uu point and keeping RRC connection to solve the above-mentioned problem.

The eNB and UE monitor whether or not data will be generated during a predetermined period. The eNB and UE have a session connection judging function of judging that the session at an application level has been disconnected in the case where data has not been generated during a predetermined period, or judging that session has been connected in the case where data has been generated during a predetermined period.

The eNB notifies any network device, for example, S-GW, of the information on the session connected state. The S-GW, which is the network device that has been notified the information of the session connected state, controls the transmission of a local APP keep alive packet.

Figure 42:
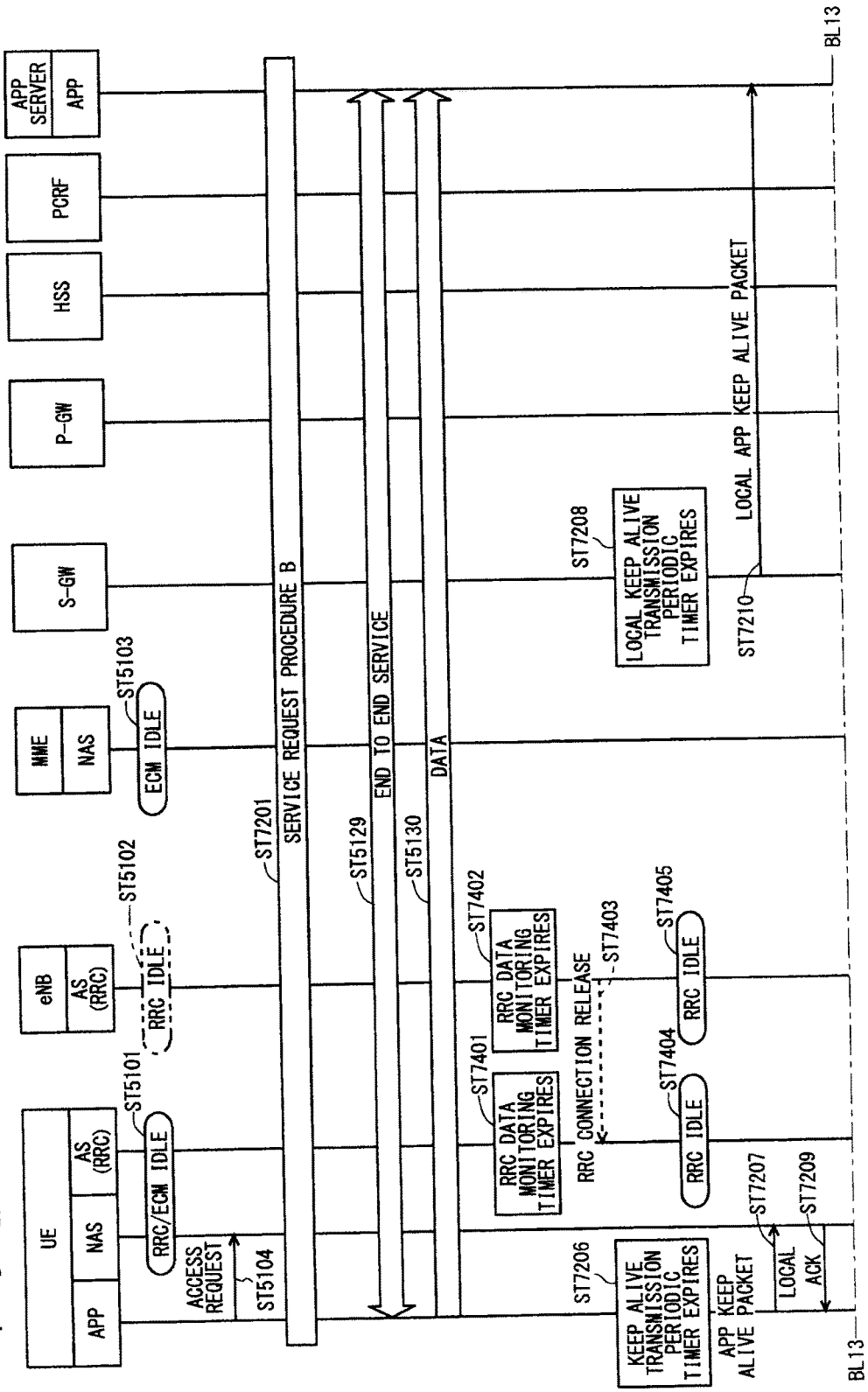
FIG. 42 is a diagram showing an exemplary sequence of a communication system in a fifth embodiment.
Figure 43:
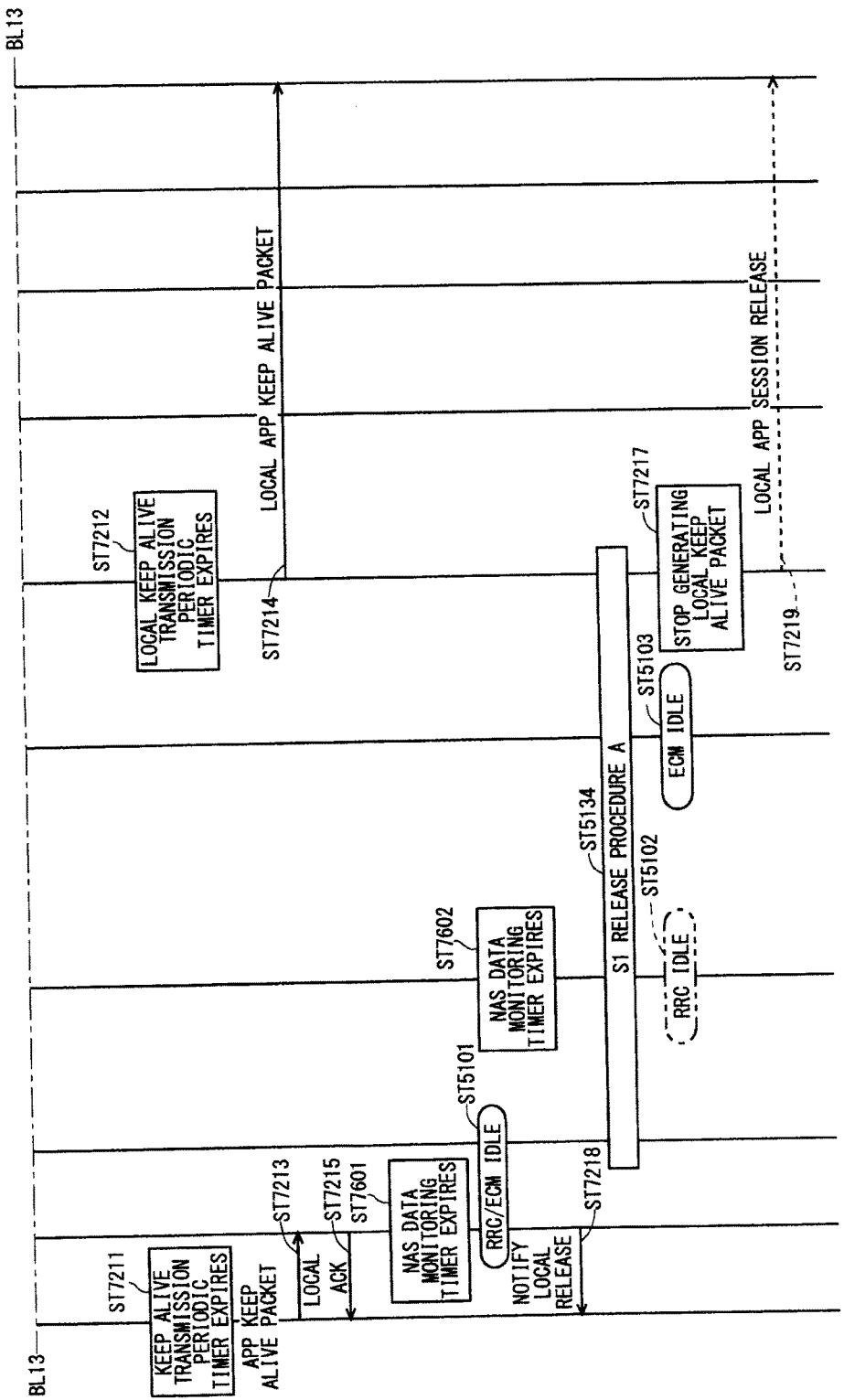
FIG. 43 is another diagram showing the exemplary sequence of the communication system in the fifth embodiment.

FIGS. 42 and 43 are diagrams showing an exemplary sequence of a communication system in the fifth embodiment. FIGS. 42 and 43 are continuous with each other at a boundary BL13. The sequence shown in FIGS. 42 and 43 is similar to the sequence shown in FIGS. 38 and 39, and thus, the same steps will be denoted by the same step numbers and common description will be skipped.

After the data transmission of Step ST5130, the eNB whose RRC connection with the UE is in the RRC_CONNECTED state monitors whether or not data will be generated for the UE. As disclosed in the fourth embodiment, in the case where data has not been generated for the UE during a predetermined period and the RRC data monitoring timer has expired, in Steps ST7404 and ST7405, the eNB and UE move to the RRC_IDLE state.

In the procedure described above, only the RRC connection state between the UE and eNB is moved from the RRC_CONNECTED state to the RRC_IDLE state. This allows the UE and eNB to release the radio resources for RRC connection.

Unlike the fourth embodiment described above, in this embodiment, the UE that has shifted to the RRC_IDLE state does not transmit, to the eNB, "uu keep alive" being a message at a Uu point for notifying session connection.

In this embodiment, the UE and eNB monitor whether or not data will be generated during a predetermined period. The eNB and UE has a session connection judging function of judging that the session at an application level has been disconnected in the case where data has not been generated during a predetermined period or judging that session is connected in the case where data has been generated during a predetermined period.

Although the eNB and UE monitor whether data will be generated during a predetermined period, it may monitor whether the S1 bearer for the UE will be required. Or, the eNB and UE may monitor whether or not the ECM_CONNECTED state will be required for the UE. A timer may be provided as the means for measuring a predetermined period. Hereinafter, this timer is referred to as a "NAS data monitoring timer". The UE may have the session connection judging function as a NAS function or as an AS function. For the AS function, when the NAS data monitoring timer has expired, the AS may notify the NAS of the expiration. The eNB may have the session connection judging function as an AS function.

The UE monitors whether or not data has been generated. In the case where the NAS data monitoring timer expires in Step ST7601, in Step ST5101, the UE moves to the RRC/ECM_IDLE state. In Step ST7218, the UE that has recognized that it has entered the RRC/ECM_IDLE state in Step ST5101 notifies the application that it has entered the RRC/ECM_IDLE state.

The application that has received a local release judges that the RRC/ECM is not connected and then stops transmitting "APP keep alive packet". The application may disconnect the session.

The eNB monitors whether or not data has been generated, and in the case where the NAS data monitoring timer has expired in Step ST7602, activates the S1 release procedure A in Step ST5134.

After the S1 release procedure A is performed in Step ST5134, in Step ST5102, the eNB keeps the RRC_IDLE state to the UE. In Step ST5103, the MME moves to the ECM_IDLE state to the UE. In the S1 release procedure, the eNB and MME release the system resources for the UE.

The S1 release procedure A is performed in Step ST5134. In Step ST7217, the S-GW that has recognized that the EPS bearer has been released stops generating a local APP keep alive packet.

In Step ST7219, the S-GW notifies the application server of a local application session release message. The application server that has received the local application session release message judges that the EPS bearer has not been established and may disconnect the session.

The above-mentioned method has disclosed that the UE and eNB have the session connection judging function. As another method, the UE may has no session connection judging function and the eNB may have the session connection judging function. In this case, the eNB monitors whether or not data has been generated, and in the case where the NAS data monitoring timer has expired, activates the S1 release procedure.

After the S1 release procedure is performed, the UE moves to the RRC/ECM_IDLE state. The UE that has recognized that it has entered the RRC/ECM_IDLE state notifies the application that it has entered the RRC/ECM_IDLE state. The application that has received a local release judges that the RRC/ECM is not connected and then stops transmitting "APP keep alive packet". The application may disconnect the session.

Therefore, the UE needs not to monitor the NAS data, simplifying control.

The method disclosed in this embodiment allows for session connection judgment without using "uu keep alive" being a message at a Uu point for notifying session connection and without keeping RRC connection. This reduces the amount of radio resources to be used. The transition of the RRC connection state and the transition of the application session connection state can be controlled by only the data monitoring timer such as an RRC data monitoring timer or a NAS data monitoring timer, leading to easy implementation.

The NAS data monitoring timer, which has been disclosed in this embodiment, may agree with the session timer of the application. The UE may notify the eNB of the session timer. As a result, the time for controlling the connection of the application agrees with the time for controlling the connection in the communication system, reducing malfunctions of the system. Causing the NAS data monitoring timer to agree with the session timer of the application is also applicable in other embodiments including modifications.

The method disclosed in this embodiment is more effectively used in consideration of application characteristics, for example, it is more effectively used in an application that is assumed to be connected less frequently and is capable of setting a value of the NAS data monitoring timer to be small.

Sixth Embodiment

The problem to be solved in a sixth embodiment will be described below. A problem similar to that in the third embodiment occurs for an application that is always activated and regularly transmits and receives a relatively small size data, such as an instant message or social networking service (SNS). In this case, information needs to be transmitted to the server being an actual transmission destination, and thus, the solutions in the third to fifth embodiments cannot be used without a change.

For example, Non-Patent Documents 15 and 16 propose the concept that transmission is performed using a bearer for NAS signaling without establishing a radio access bearer dedicated to user data. In this proposal, if the end to end of the communication is a UE and a server in a public data network (PDN), a session for data transmission is set between the P-GW corresponding to the PDN and the MME having a coverage in which a target UE is located, and communication is performed using the path for data transmission and the bearer for NAS signaling.

Figure 1:
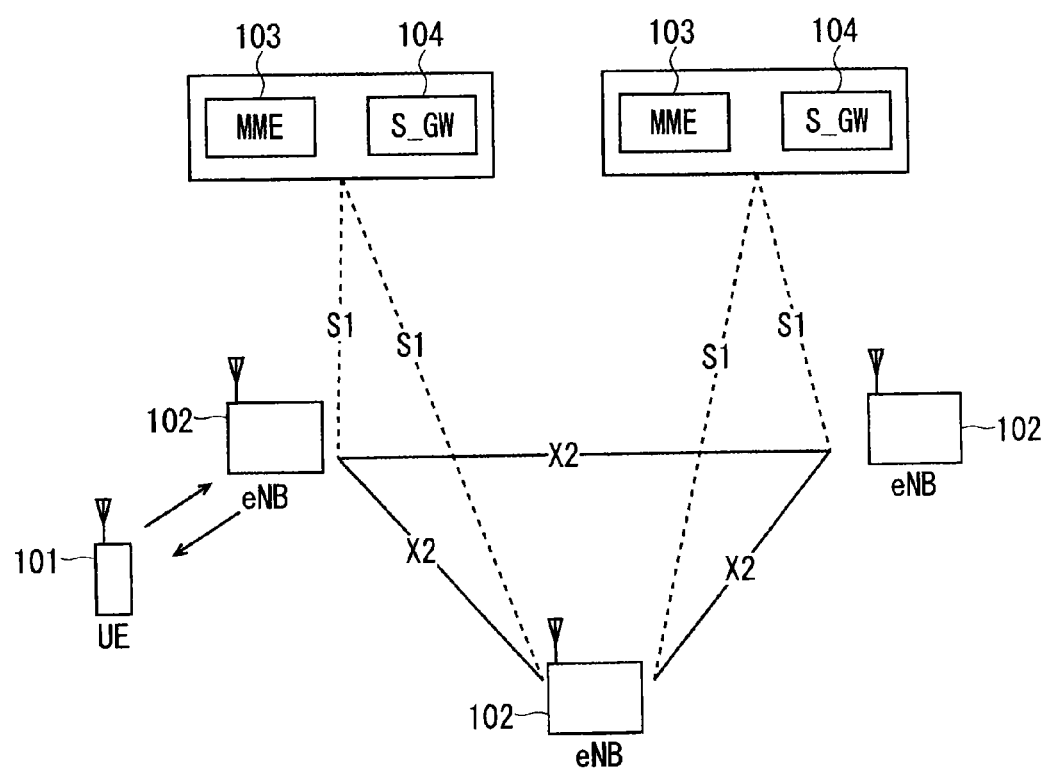
FIG. 1 is a diagram illustrating the configuration of an LTE communication system.

Part (a) of FIG. 1 of Non-Patent Document 15 is a concept diagram. The communication with the configuration of part (a) of FIG. 1 is referred to as connection-lite communication, and the communication with the configuration of part (b) of FIG. 1 is referred to as connection-oriented communication.

FIG. 1 of Non-Patent Document 16 discloses the procedure for connection with the PDN, which is set when part (a) of FIG. 1 of Non-Patent Document 15 is applied to be executed. Here, the session of the IP connectivity access network (IP-CAN) is established in response to a PDN connectivity request from the UE.

Non-Patent Document 15 mentioned above suggests the use of both the connection-lite and connection-oriented approaches. Non-Patent Document 15 suggests that in the case of transmitting large size data, which should not be transmitted in connection-lite, a normal transmission path (connection-oriented) is used.

However, nothing is explicitly stated about the method of enabling the above, for example, the method of switching between connection-lite and connection-oriented. Thus, the connection-lite and connection-oriented approaches cannot be switched to be used, causing a problem that a stable communication system cannot be constructed.

The solution in the sixth embodiment will be described below. This embodiment discloses the method of switching between connection-lite and connection-oriented. The UE, P-GW, or S-GW judges whether transmission is made in connection-lite or connection-oriented. The following three (1) to (3) will be disclosed as specific examples of the judgment method.

(1) Judgment is made depending on data, specifically, depending on the data size.

(2) Judgment is made depending on the state.

(3) Combination of (1) and (2) above.

The same or different switching between connection-lite and connection-oriented may be used between the case in which the UE transmits data and the case in which the APP server transmits data. As a specific example of the case in which switching is different, connection-lite is used in the case where the UE transmits data, and connection-oriented is used in the case where the APP server transmits data.

The following two (1) and (2) will be disclosed as specific examples of the method of making judgment depending on data.

(1) Data is judged to be transmitted in connection-oriented for the data volume larger than a threshold or to be transmitted in connection-lite for the data volume equal to or smaller than the threshold.

(2) Data is judged to be transmitted in connection-oriented if a traffic volume is larger than a threshold or to be transmitted in connection-lite if a traffic volume is equal to or smaller than the threshold. Whether or not the traffic is low may be judged. Specific examples of the traffic volume include a data volume per unit time. As disclosed in Non-Patent Document 16, in the case where judgment is made depending on a data volume, switching between connection-lite and connection-oriented may occur per packet. In the case where judgment is made depending on a traffic volume, meanwhile, switching between connection-lite and connection-oriented does not occur during a unit time, resulting in an effect that control overhead is reduced.

The above-mentioned threshold may be set as a different value between the UE and the P-GW or S-GW. The threshold may be set as a different value between uplink and downlink. The data volume or traffic volume to be handled as small size data can be optimized for the configuration of the P-GW or S-GW or the configuration of the UE. The data volume or traffic volume to be handled as small size data can be optimized depending on the uplink or downlink load status.

Hereinafter, the data judged to be transmitted in connection-oriented will also be referred to as normal size data. The data judged to be transmitted in connection-lite will also be referred to as small size data or small data.

The following nine (1) to (9) will be disclosed as specific examples of the method of determining the threshold, for example, the threshold for data volume or the threshold for traffic volume.

(1) The threshold may be determined depending on an application. The threshold may be determined depending on a connection destination required by an application. The NAS of the UE, P-GW, or S-GW may determine a threshold from, for example, the QoS, QCI, or bearer information required from an application.

(2) The eNB or MME may determine the threshold depending on the state of the communication system between the eNB and MME. The threshold may be the state of the communication system of the S1 interface. Specific examples of the state of the communication system include a maximum transmission capability to be determined statically and a load status.

(3) The MME or S-GW may determine a threshold depending on the state of the communication system between the MME and S-GW. The threshold may be the state of the communication system of the S11 interface. Specific examples of the state of the communication system include a maximum transmission power to be determined statically and a load status.

(4) The threshold may be determined depending on an operator policy. The threshold may be determined depending on a small data transmission policy. The small data transmission policy may be set by an operator.

(5) The threshold may be determined depending on the state of the communication system of an S5/S8 interface being an interface between the S-GW and P-GW. The P-GW or S-GW may determine the threshold.

(6) The threshold may be determined by the OAM.

(7) The threshold may be determined depending on the capability of the UE.

(8) Combination of (1) to (7) above.

(9) The threshold is determined statically.

The following eight (1) to (8) will be disclosed as specific examples of the method of notifying a threshold.

(1) A threshold is not notified. In the case where the method (1) of determining a threshold is used, the UE and the S-GW or P-GW may each determine a threshold depending on the same application. A threshold needs not to be notified also in the case where the method (5) of determining a threshold is used. Compared with the notification methods (2) to (4) below, the notification method (1) is effective in that a communication error needs not to be taken into account and that a control load can be reduced.

(2) The value determined by the eNB is notified the UE and the S-GW or P-GW.

(3) The value determined by the MME is notified the UE and the S-GW or P-GW.

(4) The value determined by the S-GW is notified the UE and the P-GW, which may be notified in traffic flow templates (TFTs). The small data transmission policy and the threshold are notified in the TFTs, achieving the following effects. The small data transmission policy can be notified together with the threshold for judging whether or not the data is the small data to be transmitted in connection-lite or the normal size data to be transmitted in connection-oriented. "Small data transmission policy" required for judging the use of connection-lite or connection-oriented can be received together with the "threshold", simplifying the procedure.

(5) The value determined by the P-GW is notified the UE, which may be notified in traffic flow templates (TFTs). The small data transmission policy and the threshold are notified in the TFTs, achieving the following effects. The small data transmission policy can be notified together with the threshold for judging whether the data is the small data to be transmitted in connection-lite or the normal size data to be transmitted in connection-oriented. "Small data transmission policy" required to judge the use of connection-lite or connection-oriented can be received with the "threshold", simplifying the procedure.

(6) The value determined by the operator is notified the P-GW or the S-GW and the UE.

(7) The value determined by the OAM is notified the P-GW or S-GW and the UE.

(8) The thresholds are exchanged concomitantly with the exchange of the small data transmission policy between the network-side entities and the UE. "Small data transmission policy" required for judging the use of connection-lite or connection-oriented can be received together with the "threshold", simplifying the procedure.

A specific example of the method of judging depending on a state will be disclosed below. It is judged to perform communication in connection-lite or perform communication in connection-oriented from the ECM connection state and the RRC connection state of the target UE. Even if the EPS bearer has been established, the UE may be in the ECM_IDLE state and the RRC_IDLE state. Therefore, differently from the method in which whether the EPS bearer has been established is used as the criteria for judging to make a switch, the method in which the ECM connection state and the RRC connection state with the target UE are used as the criteria for judging to make a switch can prevent the situation in which a large number of signalings are required in bearer connection.

A specific example will be described below. Communication may be made in connection-oriented in the case of ECM_CONNECTED and RRC_CONNECTED. Communication may be made in connection-oriented irrespective of a data volume or a traffic volume to be generated. Even if small data is generated, communication is performed in connection-oriented.

For ECM_IDLE or RRC_IDLE, communication may be performed in connection-lite in the case where small data has been generated, and communication may be performed in connection-oriented in the case where normal data has been generated. Even when the EPS bearer has been established, in the case of the ECM_IDLE state, the S1-U or RRC is not always connected. Communication is made in connection-lite in the case where small data has been generated, reducing an amount of signaling required in connection of the U-plane. The communication in connection-lite in the case of RRC_IDLE may be made without moving to the RRC_CONNECTED state. This eliminates the need for activating the RRC connection setup procedure. Specific examples include transmitting small data in the RACH procedure and transmitting small data in the paging procedure. The method of transmitting small data in the RACH procedure is similar to that of the fourth modification of the first embodiment described above, which will not be described here. The method of transmitting small data in the paging procedure is similar to that of the fifth modification of the first embodiment described above, which will not be described here.

The criteria for judgment disclosed above may be added to the small data transmission policy to be possessed by the UE and the S-GW or P-GW. The criteria for judgment may be possessed by the UE and the S-GW or P-GW as the data transmission policy, aside from the small data transmission policy.

It has been disclosed that performing communication in connection-lite or performing communication in connection-oriented is judged from the ECM connection state and the RRC connection with the target UE. However, not limited thereto, performing communication in connection-lite or performing communication in connection-oriented may be judged from the establishment state of the S1-U bearer with the target UE and the establishment state of the radio bearer therewith. It suffices to replace the ECM connection state with the establishment state of the S1-U bearer and replace the RRC connection state with the establishment state of the radio bearer.

In the case where the UE transmits data (also referred to as MO), the UE judges to perform communication in connection-lite or perform communication in connection-oriented. The UE thus needs to recognize the RRC state or ECM state.

The UE recognizes the RRC state. The UE can also recognize the ECM state because the RRC state has traditionally agreed with the ECM state. As disclosed in the fourth embodiment, the fifth embodiment, or a seventh embodiment described below, however, the RRC state differs from the ECM state in some cases. In such cases, the UE fails to recognize the ECM state.

This problem can be solved by the method described below. In the case where the RRC state differs from the ECM state, the MME or the eNB may notify the UE of the information indicative of the ECM state.

In the case where the APP server transmits data (also referred to as MT), the P-GW or S-GW judges to perform communication in connection-lite or perform communication in connection-oriented. The P-GW or S-GW accordingly needs to recognize the RRC state or ECM state.

The S-GW recognizes the ECM state. The S-GW can also recognize the RRC state because the RRC state has traditionally agreed with the ECM state. As disclosed in the fourth embodiment, the fifth embodiment, or the seventh embodiment described below, however, the RRC state differs from the ECM state in some cases. In such cases, the UE fails to recognize the RRC state.

This problem can be solved by the following method. In the case where the RRC state differs from the ECM state, the eNB may notify the S-GW of the information indicative of the RRC state. Or, the UE may notify the S-GW of the information indicative of the RRC state.

The P-GW does not always recognize the RRC state and the ECM state. The MME may notify the P-GW of the information indicative of the ECM state. The S-GW may notify the P-GW of the information indicative of the ECM state. The eNB may notify the P-GW of the information indicative of the RRC state. The UE may notify the P-GW of the information indicative of the RRC state.

As a result, the UE in MO or the P-GW or S-GW in MT can judge to perform communication in connection-lite or perform communication in connection-oriented.

The method of switching from connection-lite to connection-oriented will be disclosed below. In the connection-lite state, in the case of judging to perform transmission in connection-oriented, the UE activates a service request procedure. This procedure is similar to a normal calling procedure, resulting in an effect that the communication system can be prevented from becoming complicated.

In the connection-lite state, in the case where the network side such as the P-GW or S-GW judges to perform transmission in connection-oriented, the P-GW activates the dedicated bearer activation procedure (see Chapter 5.4.1 of Non-Patent Document 13). This procedure is similar to a normal calling procedure, achieving an effect that the communication system can be prevented from becoming complicated.

In the case where switching is made from connection-lite to connection-oriented, the function and setting of transmitting small data on the S1-MME and S11 need not to be deactivated. For example, the function and setting of including small data in a NAS message and the function and setting of including small data in GTP-C need not to be deactivated. In the case where signaling occurs separately or switching is made to connection-lite again, resetting becomes unnecessary, achieving an effect that the processing load can be reduced as a communication system.

Figure 44:
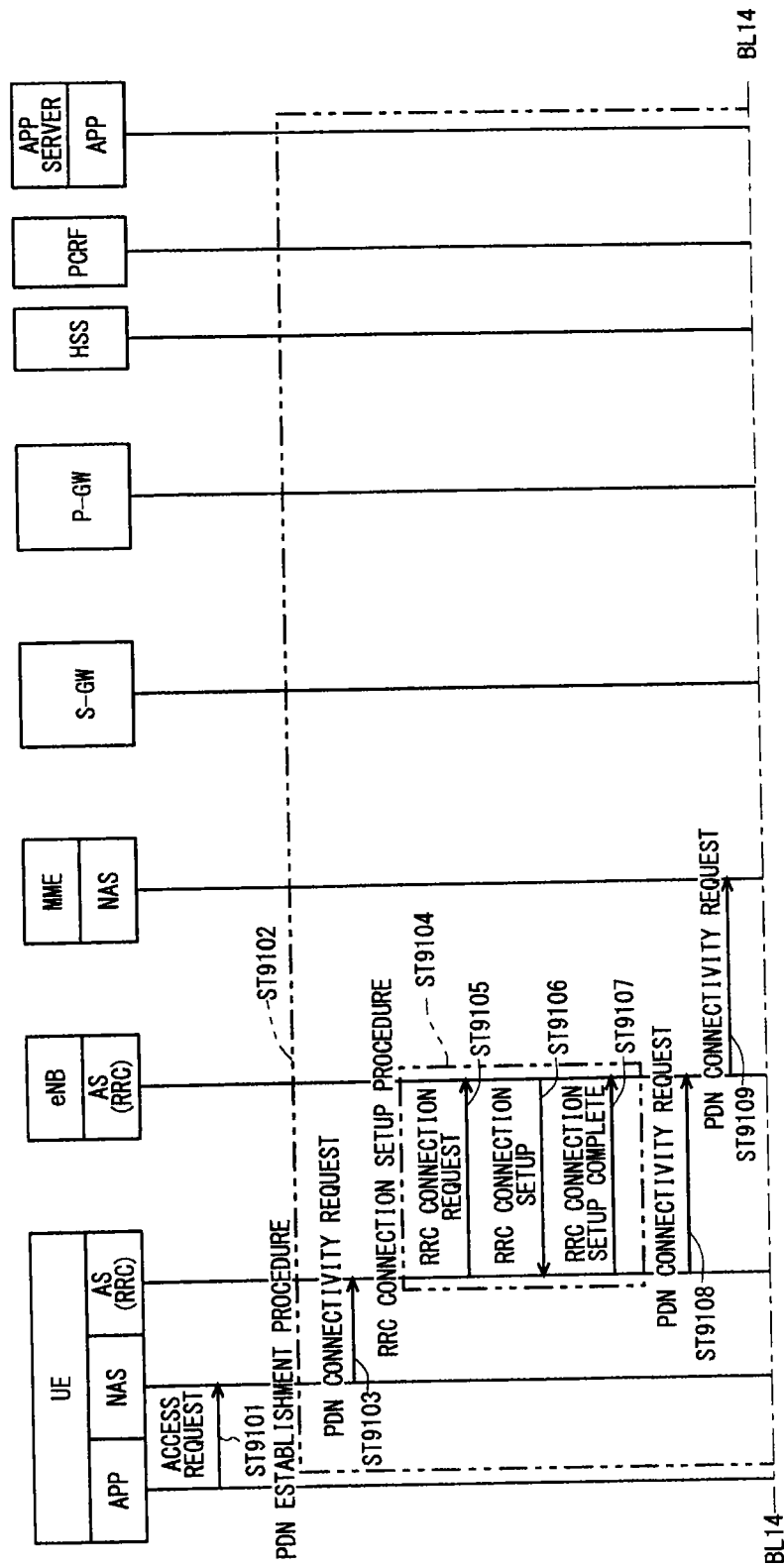
FIG. 44 is a diagram showing an exemplary sequence of a communication system in a sixth embodiment.
Figure 45:
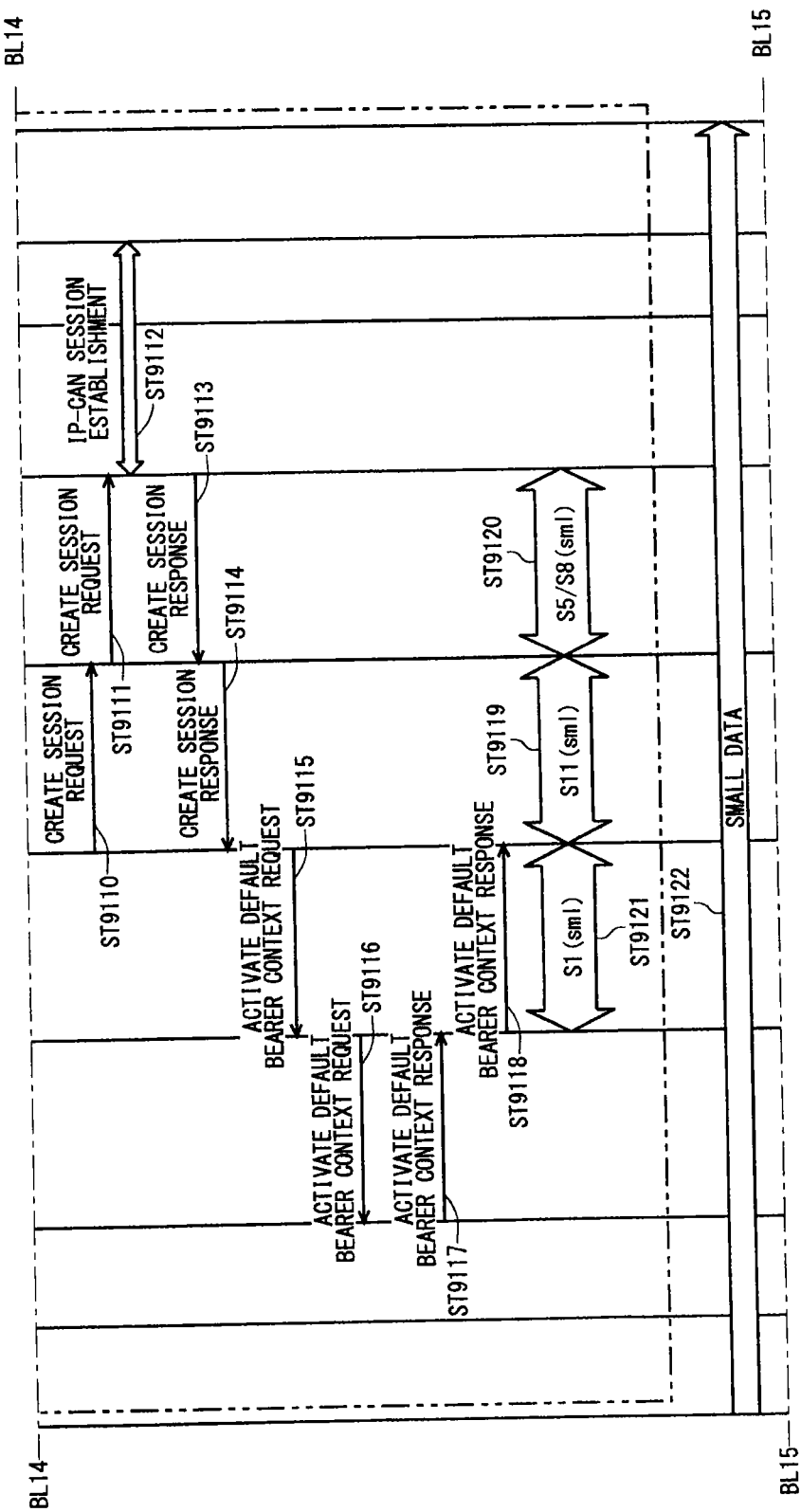
FIG. 45 is another diagram showing the exemplary sequence of the communication system in the sixth embodiment.
Figure 46:
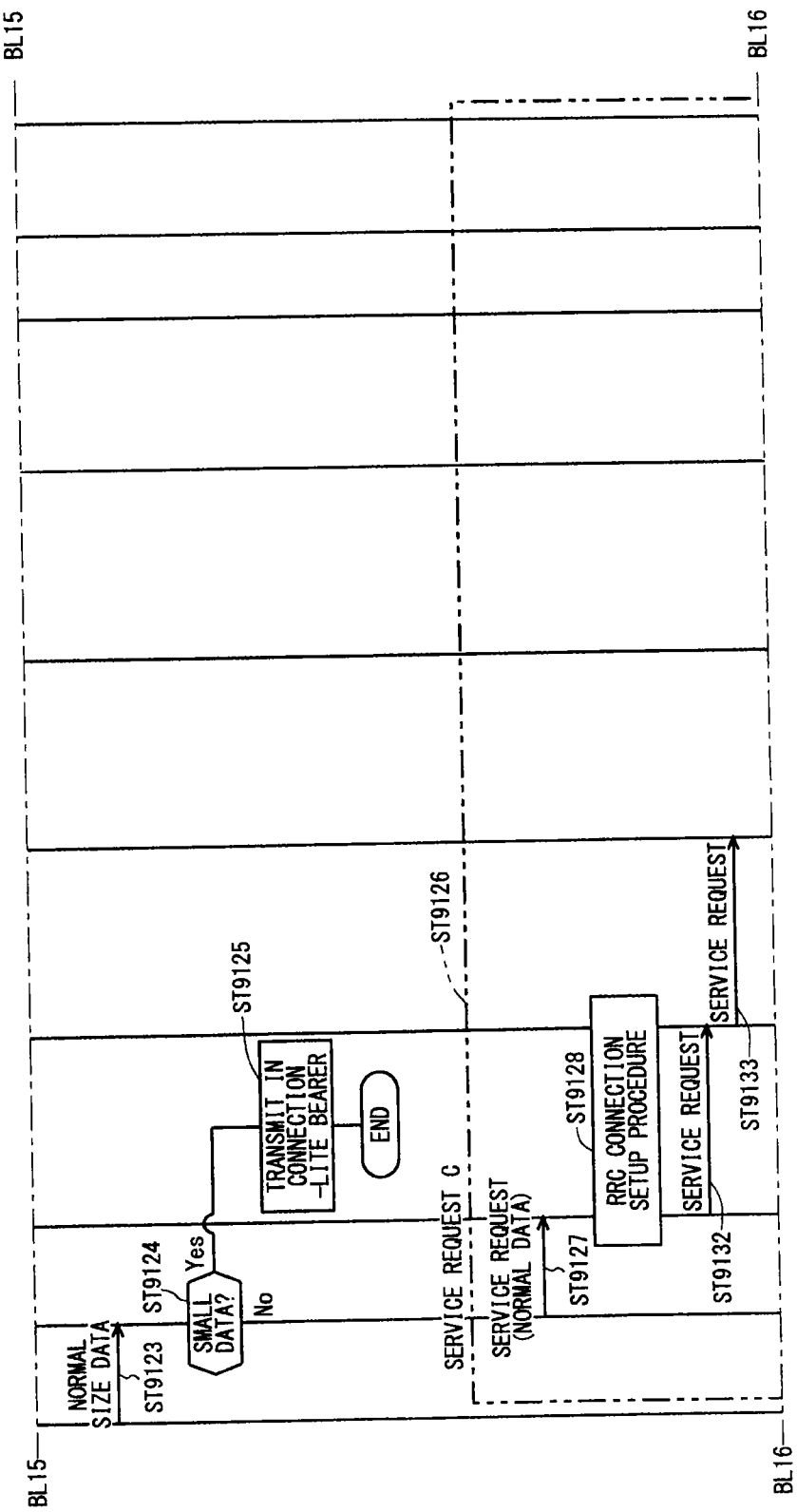
FIG. 46 is still another diagram showing the exemplary sequence of the communication system in the sixth embodiment.
Figure 47:
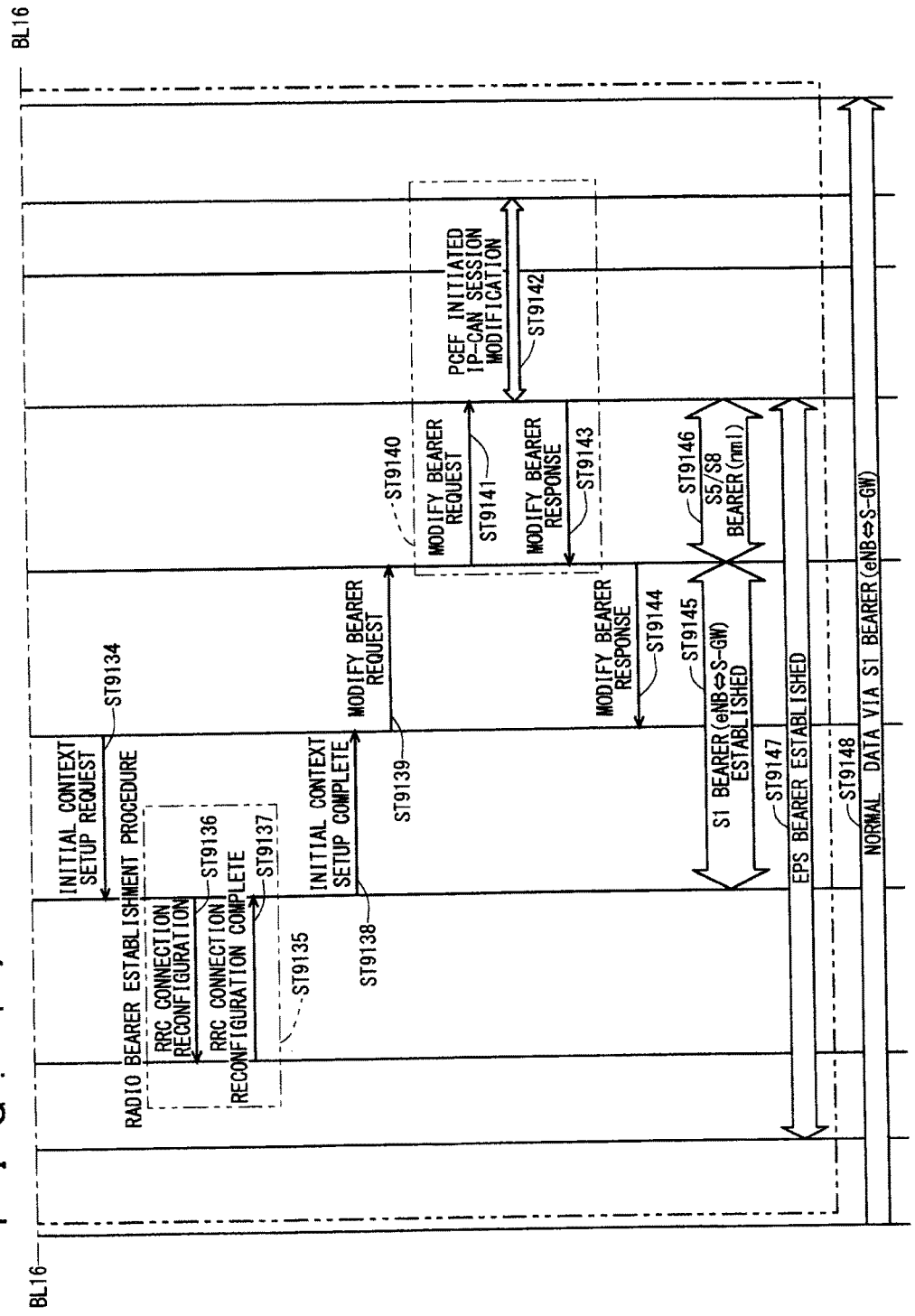
FIG. 47 is yet still another diagram showing the exemplary sequence of the communication system in the sixth embodiment.

Next, a specific example of the sequence of a communication system in the sixth embodiment will be described with reference FIG. 44 to FIG. 47. FIGS. 44 to 47 are views showing an exemplary sequence of the communication system in the sixth embodiment. FIGS. 44 and 45 are continuous with each other at a boundary BL14. FIGS. 45 and 46 are continuous with each other at a boundary BL15. FIGS. 46 and 47 are continuous with each other at a boundary BL16. FIGS. 44 to 47 show the sequence in which in the connection-lite state, state is shifted to the connection-oriented state in the case where the UE transmits large size data.

First, Steps ST9101 to ST9122 of FIGS. 44 and 45 show the PDN connection procedure to be set in the case of executing connection-lite, disclosed in Non-Patent Document 16.

In Step ST9101, the application of the UE or the TPC/IP issues an access request to the NAS.

In Step ST9102, the NAS of the UE activates the PDN establishment procedure. The PDN establishment procedure of Step ST9102 includes the processes of Steps ST9103 to ST9121.

In Step ST9103, the NAS of the UE transmits a PDN connectivity request message to the access stratum (AS). The NAS of the UE may notify the RRC layer.

In Step ST9104, the RRC layer of the UE activates an RRC connection setup procedure. The RRC connection setup procedure of Step ST9104 includes the processes of Steps ST9105 to ST9107.

In Step ST9105, the RRC layer of the UE transmits an RRC connection setup request message to the eNB.

In Step ST9106, the eNB that has received the RRC connection setup request message in Step ST9105 transmits an RRC connection setup message to the RRC layer of the UE.

In Step ST9107, the UE that has received the RRC connection setup message in Step ST9106 transmits an RRC connection setup complete message to the eNB.

In Step ST9108, the RRC layer of the UE transmits a PDN connectivity request message to the eNB.

In Step ST9109, the eNB that has received the PDN connectivity request message in Step ST9108 transmits the PDN connectivity request message to the MME.

In Step ST9110, the MME transmits a create session request message to the S-GW.

In Step ST9111, the S-GW that has received the create session request message in Step ST9110 transmits the create session request message to the P-GW.

In Step ST9112, the P-GW performs IP connectivity access network (IP-CAN) session establishment.

In the case where the IP-CAN session establishment has been completed in Step ST9112, in Step ST9113, the P-GW transmits a create session response message to the S-GW.

In Step ST9114, the S-GW that has received the create session response message in Step ST9113 transmits the create session response message to the MME.

In Step ST9115, the MME transmits an activate default bearer context request message to the eNB.

In Step ST9116, the eNB that has received the activate default bearer context request message in Step ST9115 transmits the activate default bearer context request message to the UE.

In Step ST9117, the UE that has received the activate default bearer context request message in Step ST9116 transmits an activate default bearer context response message to the eNB.

In Step ST9118, the eNB that has received the activate default bearer context request message in Step ST9117 transmits the activate default bearer context request message to the MME.

Then, the small data transmission policy is exchanged between the network-side entities and the UE through the above-mentioned PDN connectivity procedure. This enables the transmission of small data between the UE and the application server via the eNB, MME, S-GW, and P-GW in the transmission of small data.

In Step ST9119, an S11 bearer is established between the MME and S-GW. The small data can be transmitted on the S11 between the MME and S-GW (S11 (sml)).

In Step ST9120, an S5/S8 bearer is established between the S-GW and P-GW. The small data can be transmitted on the S5/S8 between the S-GW and P-GW (S5/S8 (sml)).

In Step ST9121, an S1 bearer is established between the eNB and MME. The small data can be transmitted on the S1 between the eNB and MME (S1(sml)).

As a result, in Step ST9122, the UE can transmit data to the application server (APP server) via the eNB, MME, S-GW, and P-GW.

The above-mentioned state will also be referred to as a "connection-lite state" below, where small data can be transmitted.

In Step ST9123 of FIG. 46, the application of the UE requests the NAS to transmit normal size data, whereby the transmission data is transmitted.

In Step ST9124, the NAS of the UE that has received the normal size data in Step ST9123 judges to perform transmission in connection-lite or perform transmission in connection-oriented. Though not shown in the drawing, the NAS may make judgment depending on the above-mentioned state. Specifically, the NAS judges whether or not the transmission data is small data. In the case of judging that the transmission data is small data in Step ST9124, the NAS judges to perform transmission in connection-lite and then moves to Step ST9125. In the case of judging that the transmission data is not small data in Step ST9124, the NAS judges to perform transmission in connection-oriented and then moves to Step ST9126.

In Step ST9125, the NAS of the UE transmits the transmission data in the connection-lite state. The NAS may transmit the transmission data using the bearer established for small data, that is, the bearer that has been established in connection-lite (hereinafter, also referred to as "connection lite bearer").

In Step ST9126, the NAS of the UE starts preparing for connection-oriented transmission. As a specific example, the NAS activates a service request procedure C.

The service request procedure C of Step ST9126 includes the processes of Steps ST9127 to ST9147.

In Step ST9127, the NAS of the UE transmits a service request message to the AS. The NAS of the UE may notify the RRC layer.

In Step ST9128, the UE that has received the service request message in Step ST9127 activates the RRC connection setup procedure. The details of the RRC connection setup procedure are similar to those of the process of Step ST9104 in FIG. 44, which will not be described here.

In Step ST9132, the RRC layer of the UE transmits a service request message to the eNB.

In Step ST9133, the eNB that has received the service request message in Step ST9132 transmits the service request message to the MME.

In Step ST9134 of FIG. 47, the MME that has received the service request message in Step ST9133 transmits an initial context setup request message to the eNB.

In Step ST9135, the eNB that has received the initial context setup request message in Step ST9134 activates a radio bearer establishment procedure.

The radio bearer establishment procedure of Step ST9135 includes the processes of Steps ST9136 and ST9137.

In Step ST9136, the eNB transmits an RRC connection reconfiguration message to the UE.

In Step ST9137, the UE that has received the RRC connection reconfiguration message in Step ST9136 transmits an RRC connection reconfiguration complete message to the eNB.

In Step ST9138, the eNB that has received the RRC connection reconfiguration complete message in Step ST9137 transmits an initial context setup complete message to the MME.

In Step ST9139, the MME transmits a modify bearer request message to the S-GW.

In Step ST9141, the S-GW that has received the modify bearer request message in Step ST9139 transmits the modify bearer request message to the P-GW.

In Step ST9142, the P-GW makes an IP connectivity access network (IP-CAN) session modification. The IP-CAN session modification is also referred to as "PCEF initiated IP-CAN session modification".

In the case where the IP-CAN session modification has been completed in Step ST9142, in Step ST9143, the P-GW transmits a modify bearer response message to the S-GW.

In Step ST9144, the S-GW that has received the modify bearer response message in Step ST9143 transmits a modify bearer response message to the MME.

In Step ST9145, the S1 bearer is established between the eNB and S-GW.

In Step ST9146, an S5/S8 bearer is established between the S-GW and P-GW.

In Step ST9147, an EPS bearer is established between the UE and P-GW.

As a result, in Step ST9148, the UE can transmit data to the application server (APP server) via the eNB, S-GW, and P-GW. Hereinafter, this state is also referred to as a connection-oriented state, where the normal size data can be transmitted.

Figure 48:
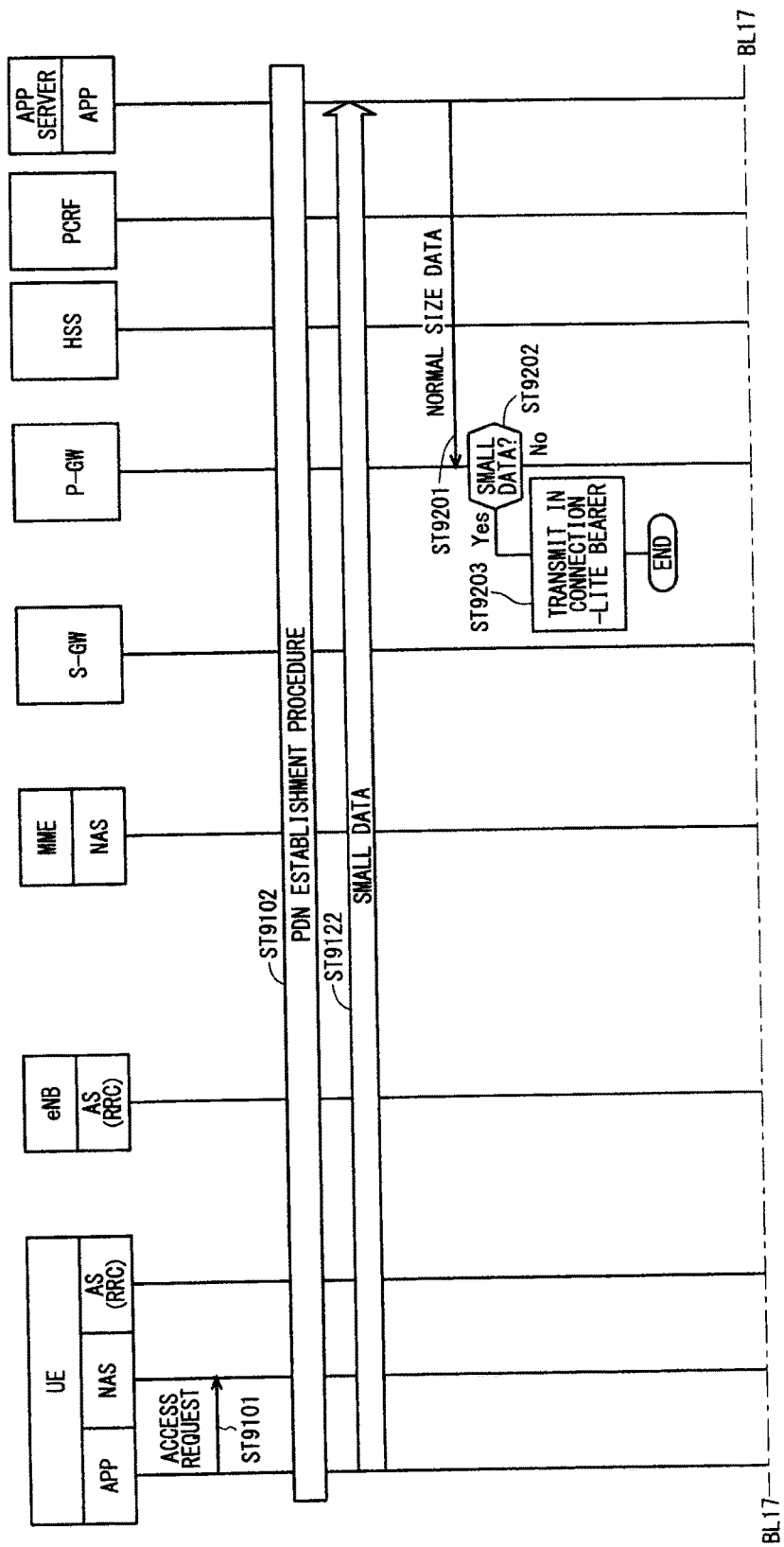
FIG. 48 is a diagram showing another exemplary sequence of the communication system in the sixth embodiment.
Figure 49:
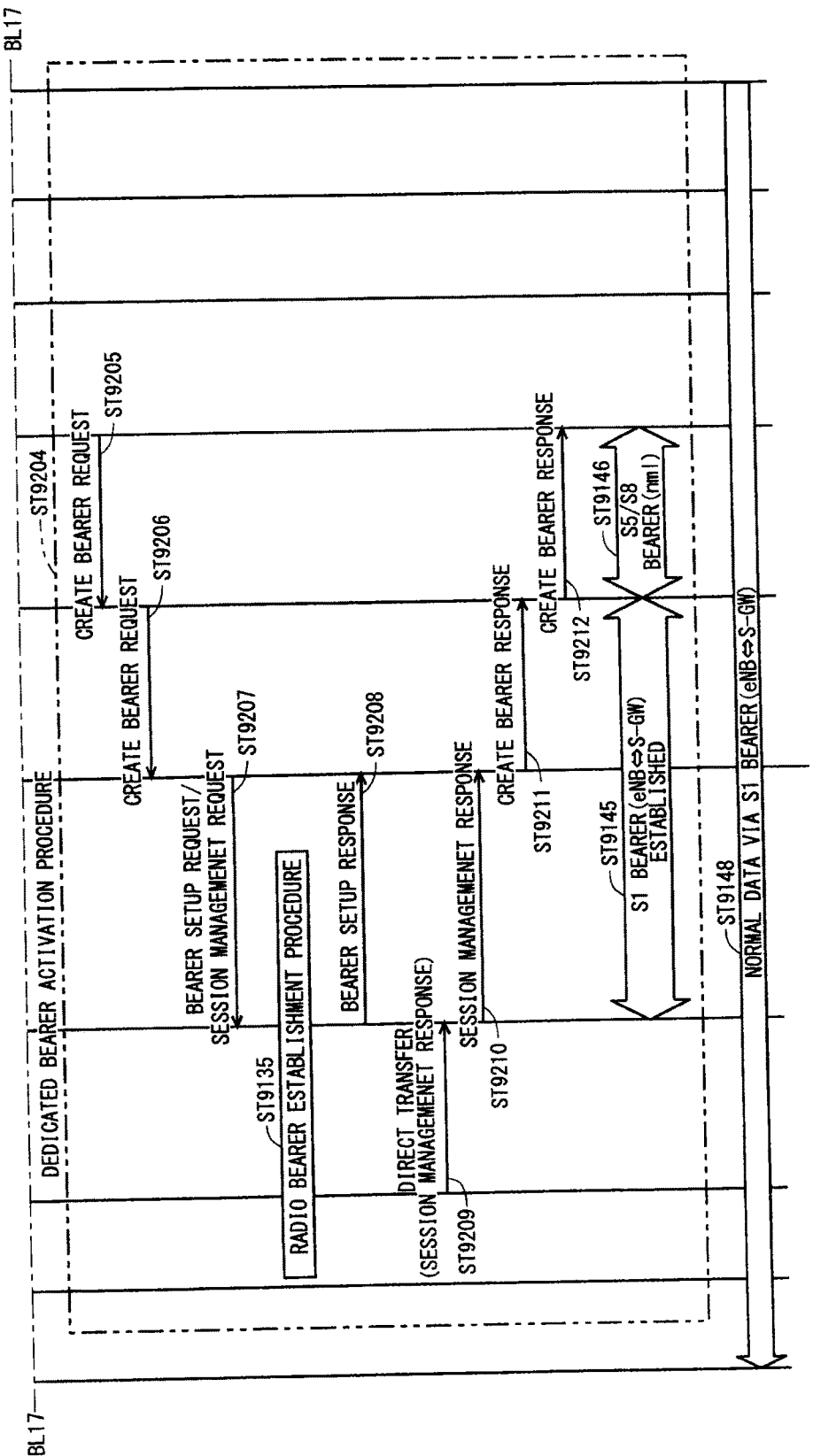
FIG. 49 is another diagram showing the other exemplary sequence of the communication system in the sixth embodiment.

Next, a specific example of the sequence of the communication system in the sixth embodiment will be described with reference to FIGS. 48 and 49. FIGS. 48 and 49 are diagrams showing another exemplary sequence of the communication system in the sixth embodiment. FIGS. 48 and 49 are continuous with each other at a boundary BL17. The sequence shown in FIGS. 48 and 49 is similar to the sequence shown in FIGS. 44 to 47, and thus, the same steps will be denoted by the same step numbers and common description will be skipped. FIGS. 48 and 49 show the sequence in the case where in the connection-lite state, the state is shifted to the connection-oriented state when the network (NW) transmits large size data.

In Step ST9201, the application server requests the P-GW to transmit normal size data, whereby the transmission data is transmitted.

In Step ST9202, the P-GW that has received the normal size data in Step ST9201 judges to transmit the data in connection-lite or connection-oriented. Specifically, the P-GW judges whether or not the transmission data is small data. Though not shown, the P-GW may make judgment depending on the above-mentioned state. In the case of judging that the transmission data is small data in Step ST9202, the P-GW judges to transmit the data in connection-lite and then moves to Step ST9203. In the case of judging that the transmission data is not small data in Step ST9202, the P-GW judges to transmit the data in connection-oriented and then moves to Step ST9204.

In Step ST9203, the P-GW transmits the transmission data in the connection-lite state. The P-GW may transmit the data using the connection-lite bearer.

In Step ST9204, the P-GW starts preparing for connection-oriented transmission. As a specific example, the P-GW activates a dedicated bearer activation procedure.

The dedicated bearer activation procedure of Step ST9204 includes the processes of Steps ST9205 to ST9146.

In Step ST9205, the P-GW transmits a create bearer request message to the S-GW.

In Step ST9206, the S-GW that has received the create bearer request message in Step ST9205 transmits the create bearer request message to the MME.

In Step ST9135, the MME that has received the create bearer request message in Step ST9206 activates a radio bearer establishment procedure.

In Step ST9208, the eNB transmits a bearer setup response message to the MME.

In Step ST9209, the UE transmits "direct transfer" to the eNB. Or, the UE may transmit a session management response message.

In Step ST9210, the eNB that has received the session management response message in Step ST9209 transmits the session management response message to the MME.

In Step ST9211, the MME that has received the session management response message in Step ST9210 transmits a create bearer response message to the S-GW.

In Step ST9212, the S-GW that has received the create bearer response message in Step ST9211 transmits the create bearer response message to the P-GW.

The sixth embodiment described above can achieve the following effects. Connection-lite and connection-oriented can be used together. Once the method to be used is determined, a stable communication system can be constructed.

First Modification of Sixth Embodiment

The problem to be solved in a first modification of the sixth embodiment will be described below. In the case where the sixth embodiment described above is performed, the following problem arises.

For example, in the case where the sequence shown in FIGS. 44 to 47 is performed, although the connection is made to the same application server, the session of the IP connectivity access network (IP-CAN) is established duplicately in, for example, Step ST9112 of FIG. 45 and in Step ST9142 of FIG. 47. This means that an unnecessary procedure may be performed on the session of the same application. Also, in some cases, the PDN may regard the request as illegal and may not permit the connection, leading to a problem.

Additionally, the following problem occurs in the case where the UE and the NW both transmit normal size data in the connection-lite state.

The radio bearer establishment procedure is activated in response to a service request from the UE, resulting in that a radio bearer may be set again in response to a create bearer request from the P-GW, though the bearer is the same.

Figure 50:
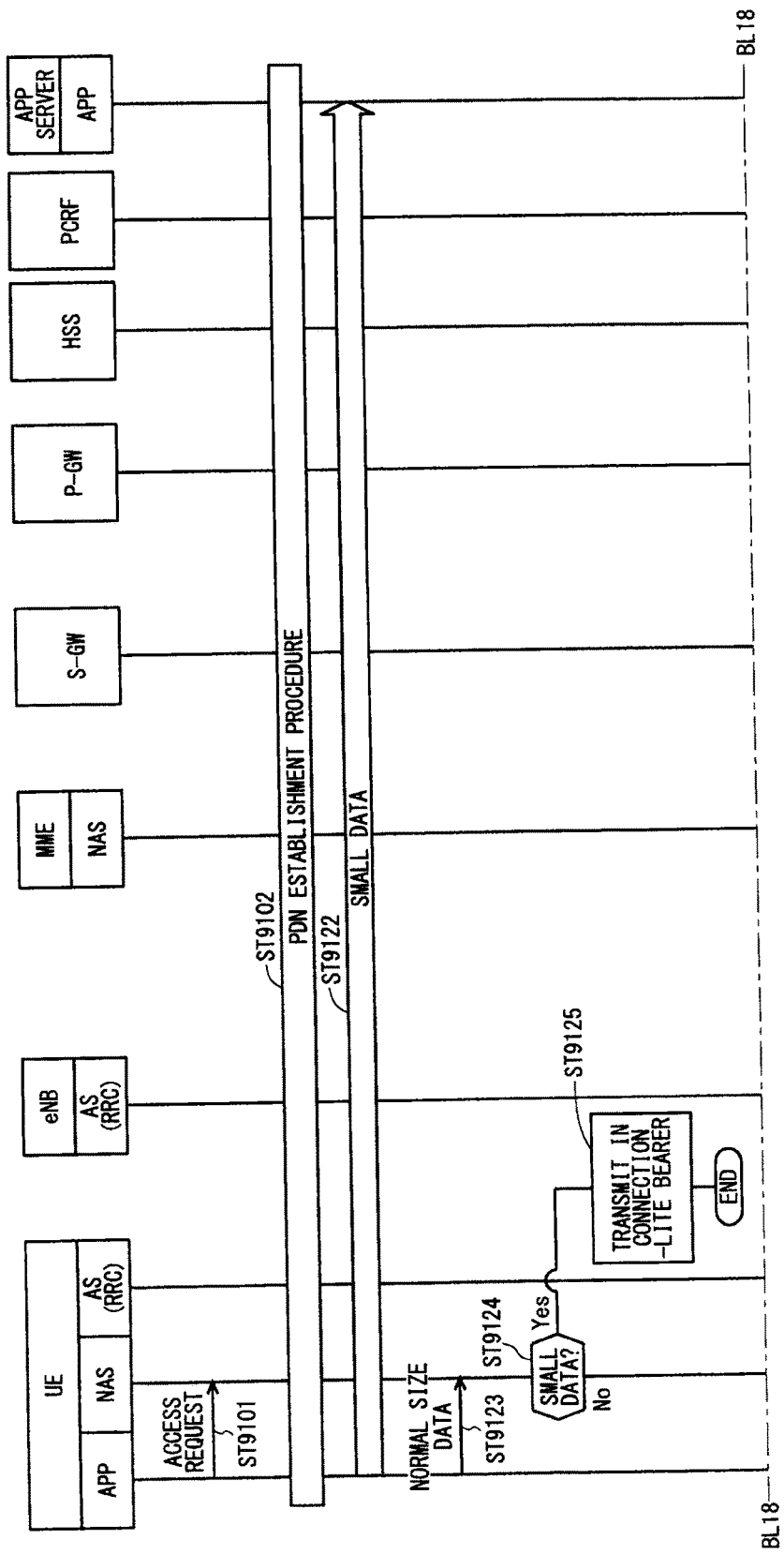
FIG. 50 is a diagram showing a sequence for describing a problem to be solved in a first modification of the sixth embodiment.
Figure 51:
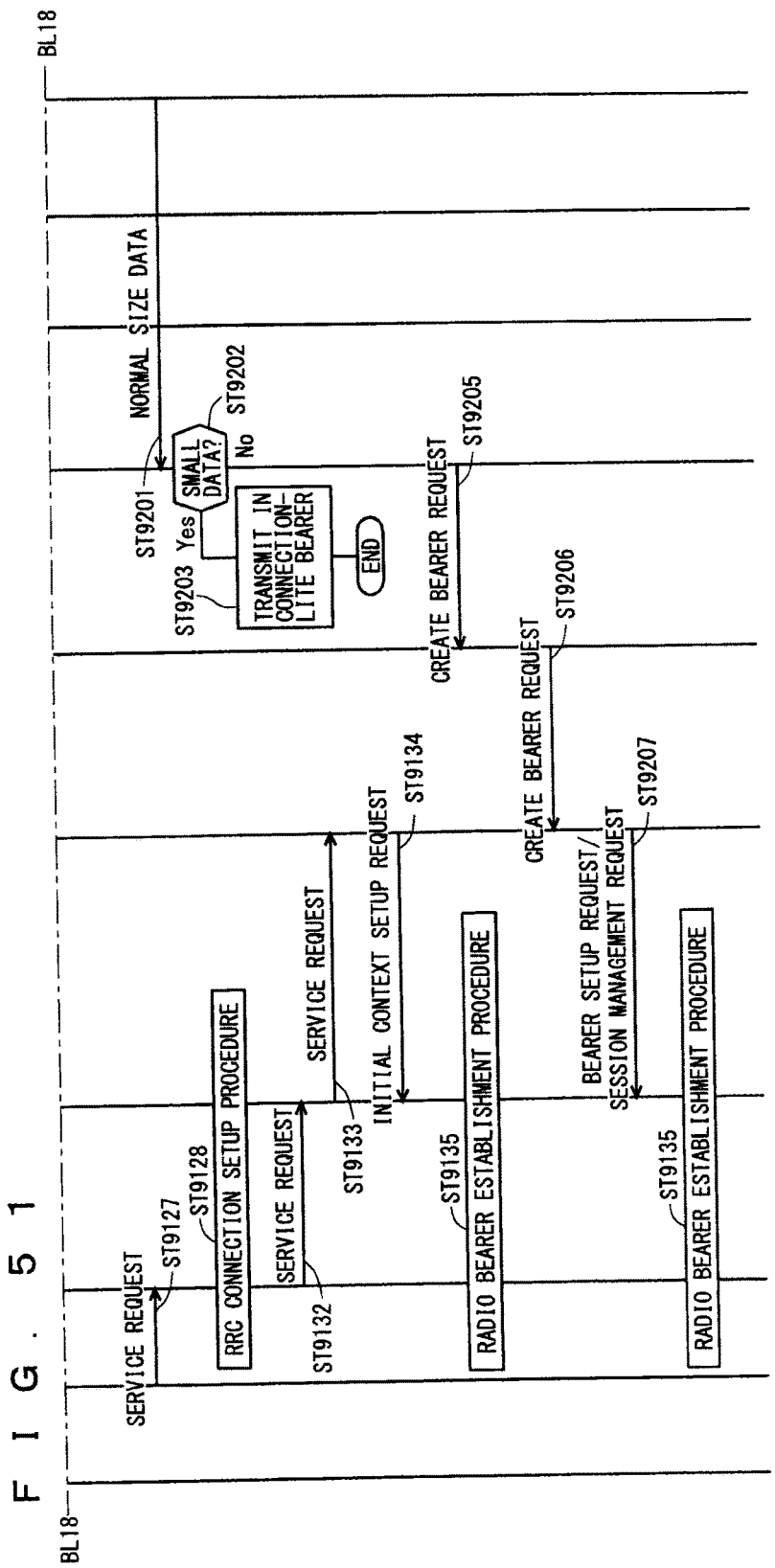
FIG. 51 is another diagram showing the sequence for describing the problem to be solved in the first modification of the sixth embodiment.

A specific example of the problem of the first modification in the sixth embodiment will be described with reference to FIGS. 50 and 51. FIGS. 50 and 51 are diagrams showing the sequence for describing the problem to be solved in the first modification of the sixth embodiment. FIGS. 50 and 51 are continuous with each other at a boundary BL18. The sequence shown in FIGS. 50 and 51 is similar to the sequences shown in FIGS. 44 to 47 and FIGS. 48 and 49, and thus, the same steps will be denoted by the same step numbers and common description will be skipped.

With reference to FIGS. 50 and 51, to establish the same radio bearer, the radio bearer establishment procedure is activated duplicately in Step ST9135.

The solution in the first modification of the sixth embodiment will be described below. The P-GW does not perform the procedure regarding the IP-CAN session if the connection lite bearer has been present or if the bearer which has been established in connection-oriented (hereinafter, also referred to as "connection oriented bearer") has been present. Or, the session of the IP connectivity access network (IP-CAN) is kept in response to the PDN connectivity request that has been initially set, and the P-GW does not perform the procedure regarding the IP-CAN session. This can prevent an unnecessary procedure from being performed on the session of the same application.

Then, the MME judges whether the bearer to be used in connection-oriented is in the procedure to be established, is in the procedure to be changed, or has already been established. Hereinafter, this judgment is also referred to as "bearer establishment presence/absence judgment". If the bearer is not in the procedure to be established, is not in the procedure to be changed, or has not been established, the MME activates the procedure of establishing a bearer to be used in connection-oriented. Or, the MME judges whether the RRC/ECM state is in connected or idle, and if it is in idle, activates the procedure of establishing the bearer to be used in connection-oriented. If the bearer is in the procedure to be established, is in the procedure to be changed, or has already been established, the MME does not activate the procedure of establishing the bearer to be used in connection-oriented. Or, the MME judges whether the RRC/ECM state is connected or idle, and if it is connected, does not activate the procedure of establishing the bearer to be used in connection-oriented. This prevents the setup of a bearer in a duplicate manner.

The case in which the UE transmits data will be disclosed. Upon receipt of the service request, the MME may activate the bearer establishment presence/absence judgment.

If the bearer is not in the procedure to be established or has not been established, the MME activates the procedure of establishing the bearer to be used in connection-oriented. As a specific example, the process according to the normal service request procedure is performed. For example, the MME transmits an initial context setup request message to the eNB.

If the bearer is in the procedure to be established or has already been established, the MME notifies the UE. Or, the MME may end the procedure without notification.

Disclosed below is the case in which the APP server transmits data. When the transmission of data is requested from the application server and the transmission data is transmitted, the P-GW or S-GW activates the existing bearer presence/absence judgment.

In the case of judging that the existing bearer is present, the P-GW or S-GW notifies the MME. The P-GW or S-GW may notify the MME only in the case where the existing bearer is present.

As the notification method, a new message to be notified from the P-GW to the MME is newly provided. Examples of the new message include a bearer change request message. Or, an information element indicative of the presence of the existing bearer may be added to the existing create bearer request message.

The MME that has received the bearer change request message may activate the bearer establishment presence/absence judgment.

If the bearer is not in the procedure to be established or has not been established, the procedure of establishing a bearer to be used in connection-oriented is activated. As a specific example, the MME requests the P-GW to activate a normal dedicated bearer activation procedure. Specific examples of the request method include newly providing a create bearer response or a bearer change response or newly providing a bearer set request.

A reject signal may be transmitted in response to a bearer change request, and the indication that the bearer is in the procedure to be established or has already been established may be notified as the cause of the reject signal. Or, the MME per se may transmit a bearer setup request/session management request to the eNB to activate a dedicated bearer activation procedure.

If the bearer is in the procedure to be established or has already been established, the MME notifies the P-GW. Specific examples of the notification method include a modify bearer request and a bearer change response.

The P-GW, which has received the indication that the bearer is in the procedure to be established or has already been established, transmits downlink data to the UE using the bearer to be newly established.

In the method disclosed above, the MME judges whether the bearer to be used in connection-oriented is in the procedure to be established or has already been established, between the UE and P-GW.

As another method, the UE, or P-GW or S-GW may judge whether or not the bearer to be used in connection-oriented has been established between the UE and P-GW to notify the P-GW or MME.

The case in which the UE transmits data will be disclosed. The UE judges whether or not a connection lite bearer or a connection oriented bearer is present. Hereinafter, this judgment is also referred to as "existing bearer presence/absence judgment". The UE notifies the network of the result of the existing bearer presence/absence judgment. Specifically, the UE notifies the P-GW or S-GW.

The following three (1) to (3) will be disclosed as specific examples of the details of the notification of the result on the existing bearer presence/absence judgment.

(1) Presence/absence of the existing bearer, indication that only the existing bearer is present, or the indication that no existing bearer is present.

(2) Whether or not the EPS bearer needs to be changed, only the indication that the EPS bearer needs to be changed, or only the indication that the EPS bearer needs not to be changed. The EPS bearer needs not to be changed if the existing bearer is present, whereas the EPS bearer needs to be changed if no existing bearer is present.

(3) Whether or not the procedure for the IP-CAN session is required, only the indication that the procedure for the IP-CAN session is required, or only the indication that the procedure for the IP-CAN session is not required. The procedure for the IP-CAN session is not required if the existing bearer is present, whereas the procedure for the IP-CAN session is required if no existing bearer is present.

Disclosed below is a specific example of the method of notifying the result on the existing bearer presence/absence judgment.

The UE notifies the P-GW or S-GW via the MME. For example, the UE notifies the MME of the result on the existing bearer presence/absence judgment, using a NAS signal. The following two (1) and (2) will be disclosed as specific examples of this case.

(1) A NAS signal is newly provided.

(2) The existing NAS signal is used. An information element for the existing bearer presence/absence judgment may be added to the existing signal. Specific examples of the existing signal include a service request message.

The MME that has received the result on the existing bearer presence/absence judgment notifies the S-GW or P-GW of the result on the existing bearer presence/absence judgment received from the UE. The following two (1) and (2) will be disclosed as specific examples in this case.

(1) A signal is newly provided.

(2) The existing signal is used. An information element for the existing bearer presence/absence judgment may be added to the existing signal. Specific examples of the existing signal include a modify bearer request message and a delete bearer request message.

The S-GW or P-GW, which has received the result on the existing bearer presence/absence judgment, judges whether or not to perform the procedure regarding the IP-CAN session based on the received result on the existing bearer presence/absence judgment. Specifically, the S-GW or P-GW judges as in (1) and (2) below.

(1) In the case where it is notified that the existing bearer is present, that the EPS bearer needs not to be changed, or that the procedure for the IP-CAN session is not required, the S-GW or P-GW judges that the procedure regarding the IP-CAN session is not required. The P-GW may judge that the procedure regarding the IP-CAN session is not required irrespective of the dynamic PCC to be referred to in, for example, a modify bearer request.

(2) In the case where it is notified that no existing bearer is present, that the EPS bearer needs to be changed, or that the procedure regarding the IP-CAN session is required, the S-GW or P-GW judges that the procedure regarding the IP-CAN session is required.

Disclosed below is the case in which the APP server transmits data. In this case, the P-GW or S-GW makes the existing bearer presence/absence judgment. Based on the result, the S-GW or P-GW judges whether or not to perform the procedure regarding the IP-CAN session. Specifically, the S-GW or P-GW judges as in (1) and (2) below.

(1) If the existing bearer is present, the S-GW or P-GW judges that the procedure for the IP-CAN session is not required.

(2) If no existing bearer is present, the S-GW or P-GW judges that the procedure regarding the IP-CAN session is required. As a specific example, the S-GW or P-GW activates a normal dedicated bearer activation procedure.

Figure 52:
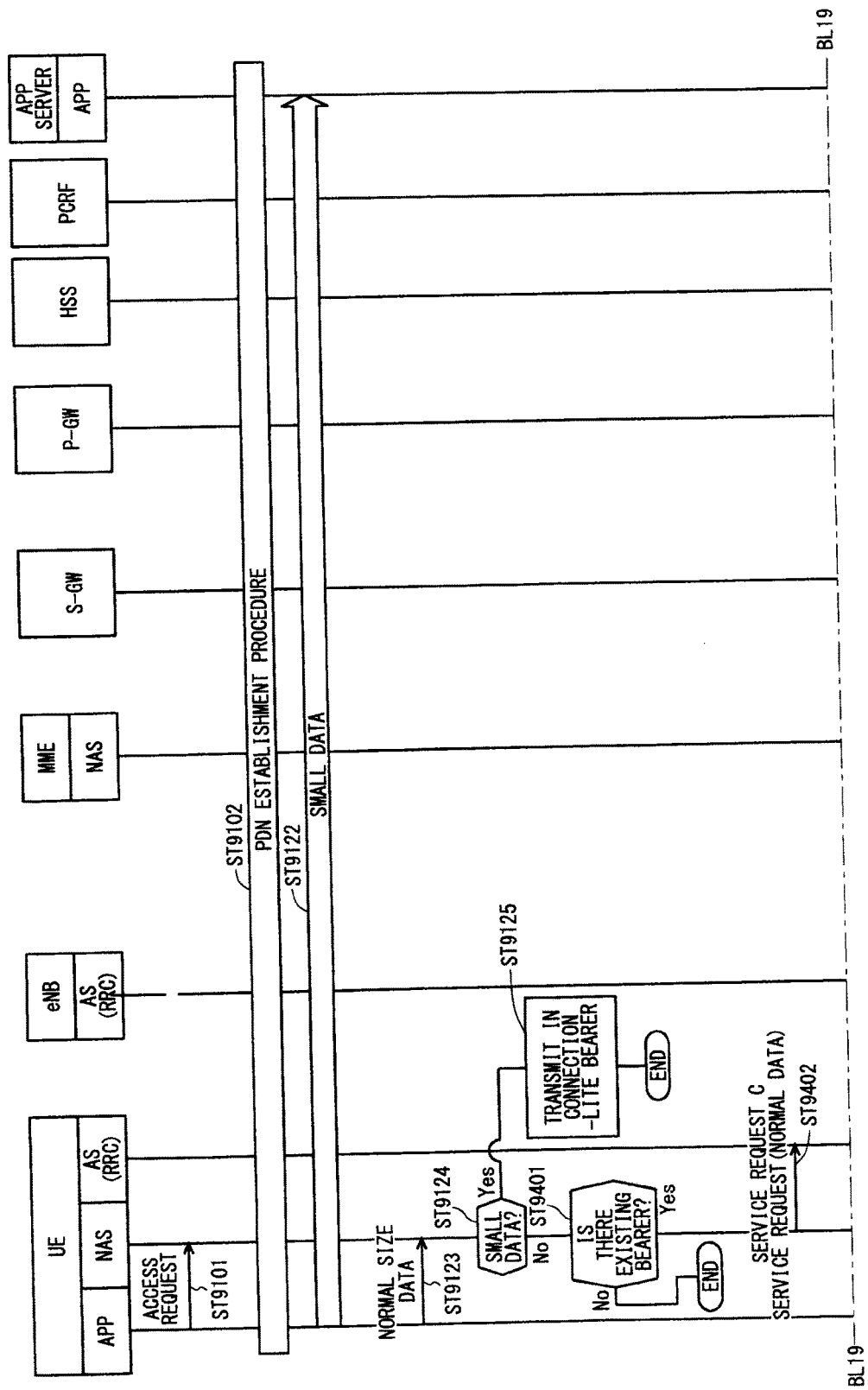
FIG. 52 is a diagram showing an exemplary sequence of a communication system in the first modification of the sixth embodiment.
Figure 53:
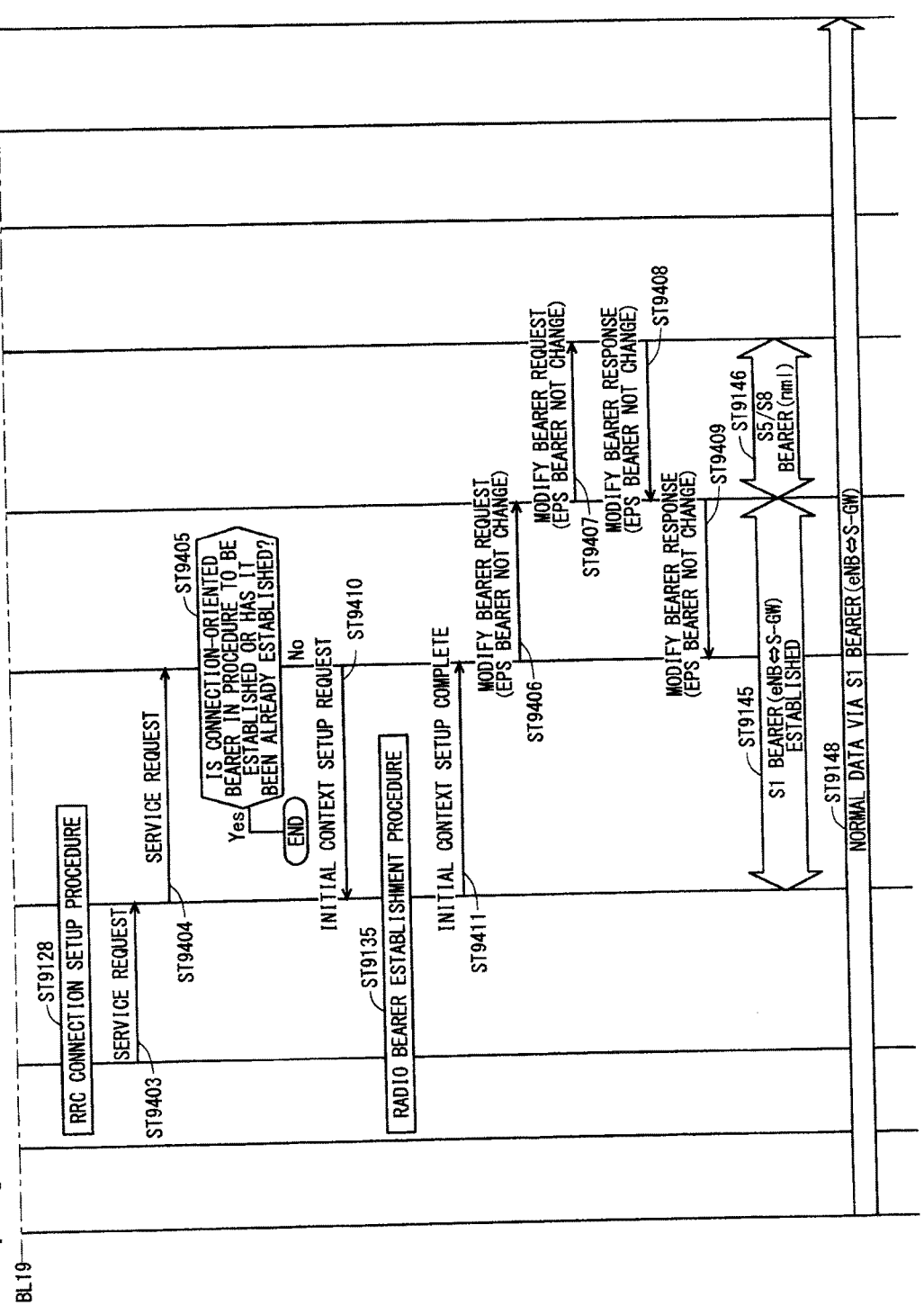
FIG. 53 is another diagram showing the exemplary sequence of the communication system in the first modification of the sixth embodiment.

Next, a specific example of the sequence of a communication system in the first modification of the sixth embodiment will be described with reference to FIGS. 52 and 53. FIGS. 52 and 53 are diagrams showing an exemplary sequence of the communication system in the first modification of the sixth embodiment. FIGS. 52 and 53 are continuous with each other at a boundary BL19. The sequence shown in FIGS. 52 and 53 is similar to the sequence shown in FIGS. 44 to 47, and thus, the same steps will be denoted by the same step numbers and common description will be skipped. FIGS. 52 and 53 show the sequence in the case where in the connection-lite state, the state shifts to the connection-oriented state when the UE transmits large size data.

In Step ST9401, the UE makes the existing bearer presence/absence judgment. The NAS of the UE may make judgment. In the case of judging that no existing bearer is present, the UE activates a normal service request procedure. FIGS. 52 and 53 omit the description on the normal service request procedure, which will be described as "end". In the case of judging that the existing bearer is present, the UE moves to Step ST9402.

In Step ST9402, the NAS of the UE transmits, to the AS, the service request to which an information element of the existing bearer presence/absence judgment has been added. The NAS of the UE may notify the RRC layer.

In Step ST9403 of FIG. 53, the RRC layer of the UE transmits, to the eNB, a service request message to which an information element of the existing bearer presence/absence judgment has been added.

In Step ST9404, the eNB, which has received the service request message to which the information element of the existing bearer presence/absence judgment has been added in Step ST9403, transmits, to the MME, the service request message to which the information element of the existing bearer presence/absence judgment has been added.

The MME that has received the service request message in Step ST9404 judges whether or not the connection oriented bearer is in the procedure to be established or has already been established. That is, the MME makes the bearer establishment presence/absence judgment. Upon receipt of the notification indicating that the existing bearer is present based on the result on the existing bearer presence/absence judgment, the MME may make the bearer establishment presence/absence judgment.

If the bearer is in the procedure to be established or has already been established, the MME ends the procedure. The MME may transmit a response message to the UE via the eNB as required. The UE that has received the response message waits until the RRC connection of the bearer being established is set, and then transmits normal data. If there is no response message, the MME is also capable of transmission through setting of the RRC connection of the bearer that is being established or has been established.

In the case where the bearer is not in the procedure to be established or has not been already established, the MME moves to Step ST9410 to transmit an initial context setup request message to the eNB. The information element of the existing bearer presence/absence judgment may be added to the initial context setup request message.

In Step ST9411, the eNB transmits an initial context setup complete message to the MME. The information element of the existing bearer presence/absence judgment may be added to the initial context setup complete message.

In Step ST9406, the MME transmits, to the S-GW, a modify bearer request to which the information element of the existing bearer presence/absence judgment has been added.

In Step ST9407, the S-GW, which has received the modify bearer request message to which the information element of the existing bearer presence/absence judgment has been added in Step ST9406, transmits, to the P-GW, the modify bearer request message to which the information element of the existing bearer presence/absence judgment has been added.

The P-GW, which has received the modify bearer request message to which the information element of the existing bearer presence/absence judgment has been added in Step ST9407, does not perform the procedure regarding the IP-CAN session.

In Step ST9408, the P-GW transmits a modify bearer response to the S-GW. The P-GW may also notify that the EPS bearer has not been changed or that the procedure regarding the IP-CAN session has not been performed.

In Step ST9409, the S-GW that has received the modify bearer response message in Step ST9408 transmits a modify bearer response message to the MME.

Figure 54:
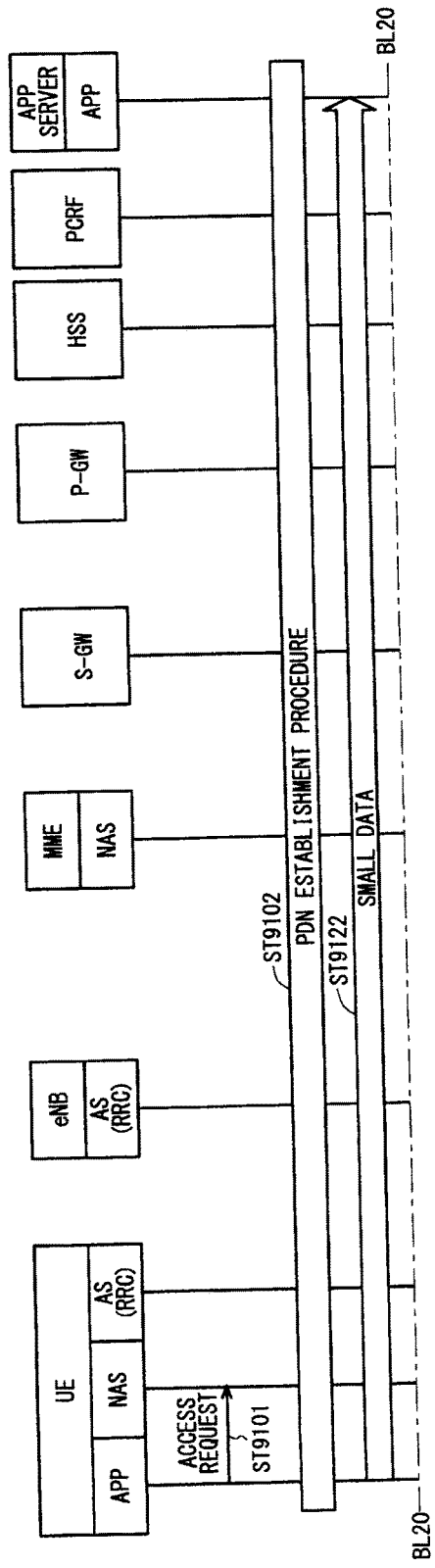
FIG. 54 is a diagram showing another exemplary sequence of the communication system in the first modification of the sixth embodiment.
Figure 55:
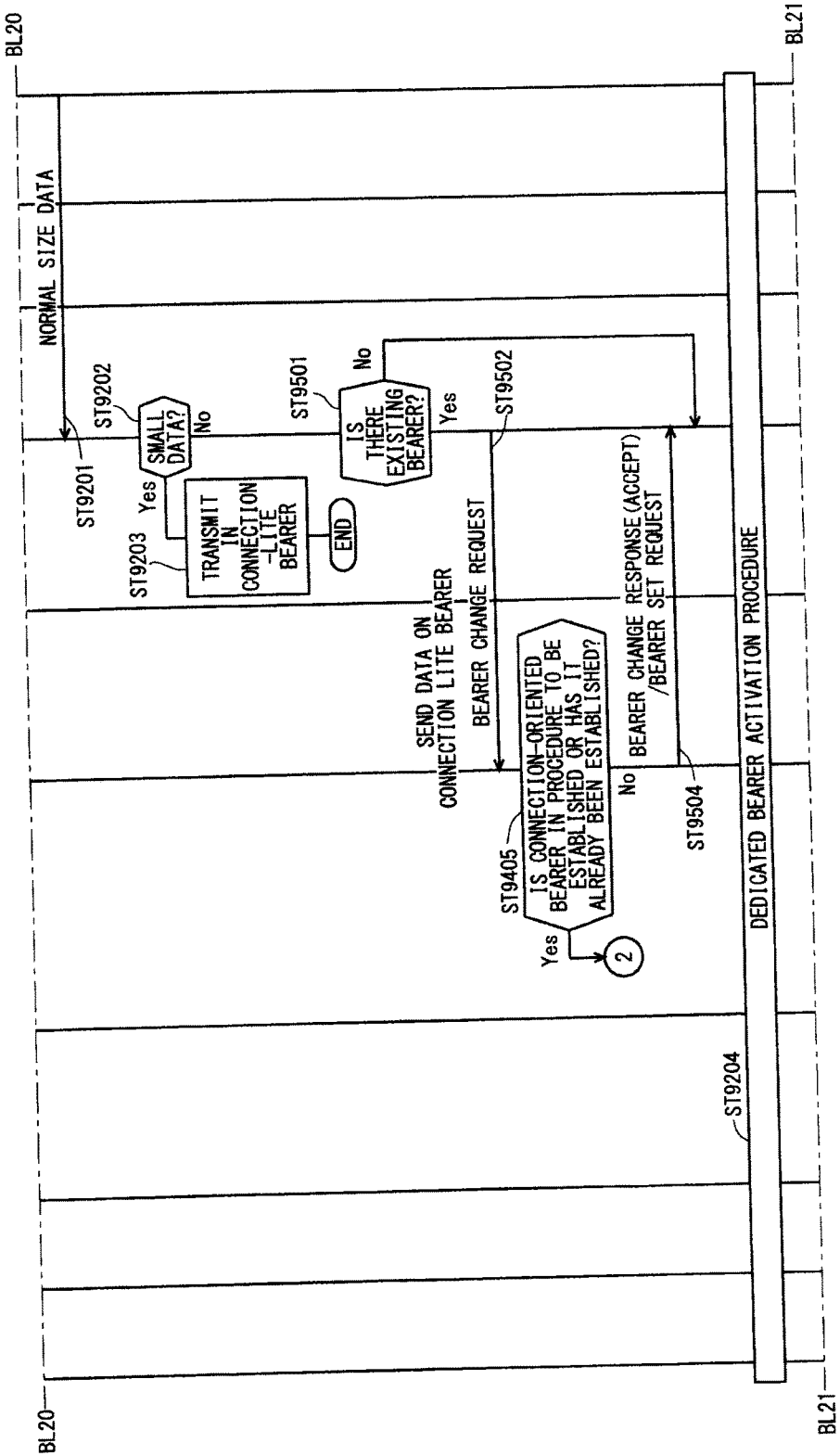
FIG. 55 is another diagram showing the other exemplary sequence of the communication system in the first modification of the sixth embodiment.

Next, a specific example of the sequence of the communication system in the first modification of the sixth embodiment will be described with reference to FIGS. 54 to 56. FIGS. 54 to 56 are diagrams showing another exemplary sequence of the communication system in the first modification of the sixth embodiment. FIGS. 54 and 55 are continuous with each other at a boundary BL20. FIGS. 55 and 56 are continuous with each other at a boundary BL21. The sequence shown in FIGS. 54 to 56 is similar to the sequences shown in FIGS. 44 to 49, and thus, the same steps will be denoted by the same step numbers and common description will be skipped. FIGS. 54 to 56 show the sequence in the case where the state is shifted to the connection-oriented state when the network (NW) transmits large size data in the connection-lite state.

In Step ST9501 of FIG. 55, the P-GW makes the existing bearer presence/absence judgment. In the case of judging that no existing bearer is present, the P-GW moves to Step ST9204 to activate a normal dedicated bearer activation procedure. In the case of judging that the existing bearer is present, the P-GW moves to Step ST9502.

In Step ST9502, the P-GW notifies the MME that the existing bearer is present. Specifically, the P-GW notifies the MME of a bearer change request message.

In Step ST9405, the MME that has received the indication that the existing bearer is present in Step ST9502 judges whether or not the connection oriented bearer is in the procedure to be established or has already been established. In other words, the MME makes the bearer establishment presence/absence judgment.

In the case where the bearer is in the procedure to be established or has already been established, the MME moves to Step ST9501 to notify the P-GW.

In the case where the bearer is not in the procedure to be established or has not already been established, the MME moves to Step ST9504 to request the P-GW to activate a normal dedicated bearer activation procedure.

In Step ST9505 of FIG. 56, the P-GW transmits data to the UE using the bearer established in Step ST9148. In other words, the P-GW transmits normal size data and then ends the process.

In Step ST9506, the P-GW judges whether or not a new bearer has been established. In the case of judging that a new bearer has not been established, the P-GW repeats the judgment of Step ST9506. In the case of judging that a new bearer has been established, the P-GW moves to Step ST9507.

In Step ST9507, the P-GW transmits data to the UE using the newly established bearer. In other words, the P-GW transmits normal size data and then ends the process.

The first modification of the sixth embodiment described above can achieve the following effects in addition to the effects of the first embodiment described above.

An unnecessary procedure for the IP connectivity access network can be avoided. The procedure of duplicately establishing an EPS bearer is performed, avoiding a risk that the PDN may reject the connection as an illegal request.

Setup of an unnecessary radio bearer can be avoided, preventing an overlap of the control processes and also preventing the communication system from becoming unstable due to the overlap of the control processes.

This enables switching of a communication bearer in a safe procedure and also alleviates an influence of the operation of the external network on communication.

Second Modification of Sixth Embodiment

The problem to be solved in a second modification of the sixth embodiment will be described below. The transmission in connection-lite of the sixth embodiment is assumed to be used in the case where the data volume of each transmission is small. However, assuming that transmission is performed in IP packets, for example, the IP header of the Internet protocol version 6 (IPv6) described in, for example, RFC2460 is 40 bytes. In this case, the header overhead for the volume of transmission data is not small even considering header compression in the PDCP.

It is assumed in the above-mentioned state that one IP address is assigned to the UE, and the IP address can be regarded to be equivalent to the ID of the UE. For this reason, also, radio resources are unnecessarily used in at least the transmission of the information on the IP address of the UE. Also, the IP address of the device being a communication partner of the UE is limited, so that radio resources may be used unnecessarily also in the transmission of the information on the IP address of the device to become a communication partner.

The following measure is taken to solve the above-mentioned problem. In transmission at a Uu point in connection-lite, the network address information of the IP header or the like is not transmitted but the element indicating a higher-layer protocol, the address of a transmission source, and the like of the IP address are degenerated and are reconstructed as another header.

Specific examples of the entity that degenerates an IP header and reconstructs another header include MME.

The following seven (1) to (7) will be disclosed as specific examples of the degeneration target parameters to be degenerated and reconstructed as another header.

(1) Source address. It is assumed that one IP address is assigned to the UE, and thus the source address can be degenerated and then reconstructed. The device to become a communication partner of the UE is assumed to be limited, and thus, the source address can be degenerated and then reconstructed.

(2) Destination address. It is assumed that one IP address is assigned to the UE, and thus the destination address can be degenerated and then reconstructed. The device to become a communication partner of the UE is assumed to be limited, and thus, the destination address can be degenerated and then reconstructed.

(3) Version. The version of an IP header to be used in a communication scheme defined in 3GPP is determined statically, and thus communication can be performed with no problem even if the version is degenerated.

(4) Traffic class. This is determined statically in EPS bearer setting (also referred to as "call setting"), and thus, communication can be performed with no problem even if the traffic class is degenerated.

(5) Hop limit. In the case where communication is terminated at the user equipment, that is, in the case where there is no hop beyond the user equipment, communication can be performed with no problem even if the hop limit is degenerated.

(6) Flow label.

(7) Combination of (1) to (6) above.

This modification can be used in combination with the sixth embodiment and the first modification of the sixth embodiment.

The second modification of the sixth embodiment described above can achieve the following effects. The transmission amount can be reduced for an amount of IP addresses, leading to a reduction in radio resources to be used.

Third Modification of Sixth Embodiment

The problem to be solved in a third modification of the sixth embodiment will be described below. The transmission in connection-lite, proposed in Non-Patent Document 15, is configured such that RRC connection between radio areas is set and then data is transmitted. However, assuming that one packet of small data is transmitted, the connection of radio areas greatly affects the power consumption of the communication terminal device and radio resources.

To solve the above-mentioned problem, the measure similar to that of the fourth modification of the first embodiment described above is taken as follows.

In connection-lite, small data is transmitted using the fourth modification of the first embodiment described above. In the RRC_idle state (RRC_IDLE), small data is transmitted to the eNB. Small data is transmitted during the random access procedure. Details thereof are similar to those of the fourth modification of the first embodiment described above, which will not be described here.

This modification can be used in combination with the sixth embodiment, the first modification of the sixth embodiment, and the second modification of the sixth embodiment described above.

The third modification of the sixth embodiment can achieve the following effects. The RRC connection is not set, and thus, the procedure therefor can be skipped. This leads to reductions in the power consumption of the communication terminal device and radio resources.

Fourth Modification of Sixth Embodiment

The problem to be solved in a fourth modification of the sixth embodiment is similar to that of the third modification of the sixth embodiment described above.

To solve the above-mentioned problem, a measure is taken as in the fifth modification of the first embodiment as follows.

In connection-lite, small data is transmitted using the fifth modification of the first embodiment described above. In the RRC_idle state (RRC_IDLE), small data is transmitted to the eNB. Small data is transmitted during the paging procedure. Details thereof are similar to those of the fifth modification of the first embodiment described above, which will not be described here.

This modification can be used in combination with the sixth embodiment, the first modification of the sixth embodiment, the second modification of the sixth embodiment, and the third modification of the sixth embodiment.

The fourth modification of the sixth embodiment can achieve the following effects. The RRC connection is not set, and thus, the procedure therefor can be omitted. This leads to reductions in the power consumption of the communication terminal device and radio resources.

Fifth Modification of Sixth Embodiment

The problem to be solved in a fifth modification of the sixth embodiment will be described below. If the EMC (RRC) connection state between the UE and eNB is used in the sixth embodiment and the first to fourth modifications thereof, the states of the UE and eNB may disagree with each other, which has been described as a problem in the second embodiment above.

To solve the above-mentioned problem, as in the second embodiment described above, in the RRC_CONNECTED state, the function of regularly transmitting "uu-keep-alive" and notifying the network of the transmission state is added to the sixth embodiment and the first to third modifications thereof described above. Details thereof are similar to those of the second embodiment described above, which will not be described here.

This modification can be used in combination with the sixth embodiment, the first modification of the sixth embodiment, the second modification of the sixth embodiment, the third modification of the sixth embodiment, and the fourth modification of the sixth embodiment described above.

The fourth modification of the sixth embodiment described above can achieve the following effect. The state disagreement between the UE and eNB can be reduced, reducing an influence on the system resources.

Seventh Embodiment

The problem to be solved in a seventh embodiment is basically the same as the problem in the sixth embodiment. The measures described in, for example, Non-Patent Documents 15 and 16 and the measure in the sixth embodiment described above need to switch between the configuration in connection lite and the configuration in connection oriented depending on the transmission data. This method described above, however, needs to set up a bearer or the like in switching the configurations, leading to a problem of an increased number of signaling processes and a problem of the generation of a delay in data transmission.

Figure 58:
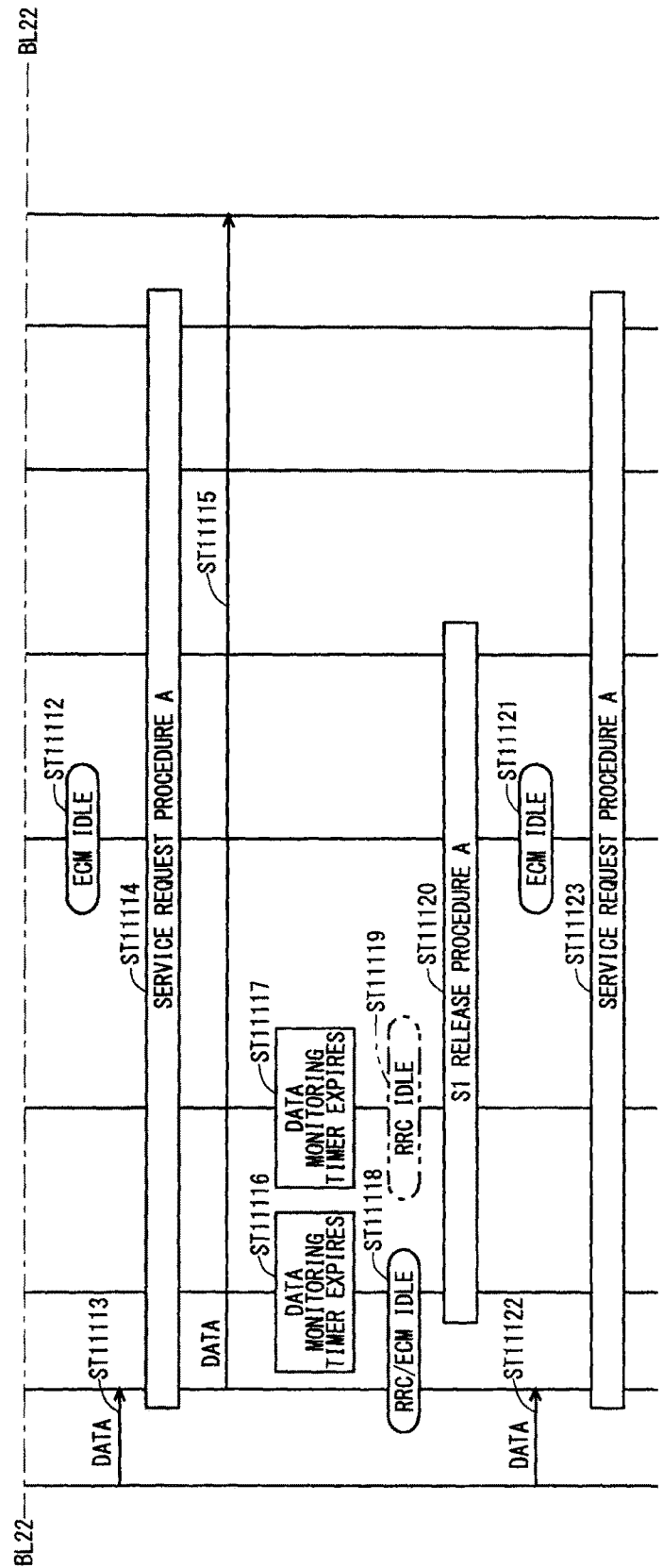
FIG. 58 is another diagram showing the sequence for describing the problem in the seventh embodiment.

FIGS. 57 and 58 are diagrams showing the sequence for describing the problem of the seventh embodiment. FIGS. 57 and 58 are continuous with each other at a boundary BL22. FIGS. 57 and 58 show the sequence of such an application that regularly transmits and receives a relatively small size data. The sequence shown in FIGS. 57 and 58 is similar to the sequence shown in FIGS. 27 to 29, and thus, the same steps will be denoted by the same step numbers and common description will be skipped.

In Step ST11107, the data monitoring timer expires, which measures the period in which data has not been transmitted at the RRC level in the UE, and then, the UE moves to Step ST11109.

In Step ST11108, the data monitoring timer expires, which measures the period in which data has not been transmitted at the RRC level in the eNB, and then, the eNB moves to Step ST11110. Upon expiration of the timer, the RRC state of a target UE is assumed to enter IDLE.

In Step ST11109, the UE enters the RRC_IDLE state as well as the ECM_IDLE state.

In Step STI 1110, the eNB enters the RRC_IDLE state and then moves to Step ST11111.

In Step ST11111, an S1 release procedure A is activated. Details thereof are similar to those of the procedure of Step ST5134 of FIG. 29, which will not be described here.

The procedure of Step ST11111 is completed, and in Step ST11112, the MME enters the ECM_IDLE state.

After the S1 release procedure A is completed in Step ST11111, in Step ST11113, the application of the UE requests the NAS to transmit data, whereby the transmission data is transmitted.

In Step ST11114, a service request procedure A is activated. Details thereof are similar to those of the procedure of Step ST5105 of FIG. 27, which will not be described here.

In Step ST11115, the UE transmits data to the application server via the P-GW using the EPS bearer established in Step ST11114.

In Step ST11116, the data monitoring timer expires, which measures the period in which data has not been transmitted at the RRC level in the UE, and then, the UE moves to Step ST11118.

In Step ST11117, the data monitoring timer expires, which measures the period in which data has not been transmitted at the RRC level in the eNB, and then, the eNB moves to Step ST11119.

In Step ST11118, the UE enters the RRC_IDLE state as well as the ECM_IDLE state.

In Step ST11119, the eNB enters the RRC_IDLE state. The eNB also enters the ECM_IDLE state and then moves to Step ST11120.

In Step ST11120, an S1 release procedure A is activated. Details thereof are similar to those of the procedure of Step ST5134 of FIG. 29, which will not be described here.

The procedure of Step ST11120 is completed, and in Step ST11121, the MME enters the ECM_IDLE state.

In Step ST11122, the application of the UE requests the NAS to transmit data, whereby the transmission data is transmitted.

In Step ST11123, a service request procedure A is activated. Details thereof are similar to those of the procedure of Step ST5105 of FIG. 27, which will not be described here.

As described above, every transmission of small size data, the service request procedure A of Step ST11114 and the service request procedure A of Step ST11120 are repeated. This requires many procedures, and accordingly, the power for the network resources and the communication terminal device is consumed.

The following measure is taken to solve the above-mentioned problem.

The RRC state and the NAS state are not shifted in association with each other. Hereinafter, the NAS state is also referred to as an ECM state.

This will be described specifically with reference to FIGS. 57 and 58. Unlike Step ST11109, even if the UE shifts to the RRC_IDLE state, the UE does not shift to the ECM_IDLE state in association with the above-mentioned shifting. The UE does not shift to the ECM_IDLE state even when the RRC connection is released, and keeps the ECM_CONNECTED state.

Unlike Step ST11110, even if the eNB shifts to the RRC_IDLE state, the eNB does not activate the S1 release procedure in association with the above-mentioned shifting. In other words, even if the eNB shifts to the RRC_IDLE state, the MME does not shift to the ECM_IDLE state in association with the above-mentioned shifting. In other words, even if the eNB shifts to the RRC_IDLE state, the eNB does not activate the S1 release procedure, to thereby keep the ECM_CONNECTED state with the MME.

The following mechanism is adopted, which, in the state where the E-UTRAN radio access bearer (E-RAB) for U-plane is set, allows only the connection between radio areas to be released and set while keeping the connection at the NAS level (S1 level).

This allows the resources between the radio areas to be released while keeping a bearer of higher level, for example, S1 bearer. The purpose of releasing the resources between radio areas can be achieved, solving a problem that the bearer of higher level needs to be reset.

In the UE, the RRC state and the ECM state are normally shifted in association with each other. In the case where the RRC connection is released in the UE in the ECM_CONNECTED state, the UE enters the ECM_ IDLE state. When the RRC connection is released, the UE enters the RRC_IDLE state. Upon release of the RRC connection, the UE is shifted from RRC_CONNECTED to RRC_IDLE, and in association with this, the state is shifted from ECM_CONNECTED to ECM_IDLE (see Chapter 4.6.4 of Non-Patent Document 13).

In the normal network, the RRC state and the ECM state are shifted in association with each other. Assuming that in the eNB in the ECM_CONNECTED state, the RRC state of the target UE has shifted to RRC_IDLE, the S1 release procedure is activated. The S1 connection is released, so that the network is shifted from ECM_CONNECTED to ECM_IDLE. Thus, the S1 connection is released in association with the shifting to RRC_IDLE, and the state is shifted from ECM_CONNECTED to ECM_IDLE (see Chapter 4.6.4 of Non-Patent Document 13).

The UE is an example of the entity that judges whether the normal RRC state and the ECM state are shifted in association with each other or the RRC state and the ECM state are not shifted in association with each other, which is the solution in this embodiment. This judgment is also referred to as "judgment on state shifting method".

The following two (1) and (2) will be disclosed as specific examples of the judgment on state shifting method.

(1) The UE makes judgment based on the application that has requested access.

(1-1) The UE judges whether or not the application regularly transmits relatively small size data. In the case of judging that the application regularly transmits relatively small size data, the UE determines not to shift the RRC state and the ECM state in association with each other. In the case of judging that the application does not regularly transmit relatively small size data, the UE determines to shift the normal RRC state and the ECM state in association with each other. In the traditional technology, the application that regularly transmits relatively small size data repeatedly releases and establishes a radio bearer. In other words, shifting between the RRC_IDLE state and the RRC_CONNECTED state is repeated. In association with shifting, shifting between the ECM_IDLE state and the ECM_CONNECTED state is repeated. The use of this embodiment achieves such a significant effect that the process procedure can be simplified.

(1-2) The UE judges whether or not the application requests the transmission of a keep-alive packet. In the case of judging that the application requests the transmission of a keep-alive packet, the UE determines not to shift the RRC state and the ECM state in association with each other. In the case of judging that the application does not request the transmission of a keep-alive packet, the UE determines to shift the normal RRC state and the ECM state in association with each other. In the traditional technology, the application that requests the transmission of a keep-alive packet repeatedly releases and establishes a radio bearer. In other words, shifting between the RRC_IDLE state and the RRC_CONNECTED state is repeated. In association with this shifting, shifting between the ECM_IDLE state and the ECM_CONNECTED state is repeated. The use of this embodiment achieves such a significant effect that the process procedure can be simplified.

(2) The UE judges whether or not the transmission is repeatedly performed. The UE may judge whether or not the transmission is repeatedly performed in the period less than a threshold. Specific examples of the transmission to be repeatedly performed include "Uu keep alive ind", a UE monitoring message, a periodic measurement report, and a periodic TAU. In the case of judging that the transmission is repeatedly performed, the UE determines not to shift the RRC state and the ECM state in association with each other. In the case of judging that the transmission is not repeatedly performed, the UE determines to shift the normal RRC state and the ECM state in association with each other. In the traditional technology, the transmission to be periodically repeated involves repeatedly releasing and establishing a radio bearer. In other words, shifting between the RRC_IDLE state and the RRC_CONNECTED state is repeated. In association with this shifting, shifting between the ECM_IDLE state and the ECM_CONNECTED state is repeated. The use of this embodiment achieves such a significant effect that the process procedure can be simplified.

The UE notifies the network of the result of the judgment on state shifting. The following two (1) and (2) will be disclosed as specific examples of the method of notifying the network of the result of the judgment on state shifting.

(1) A signal or message is newly provided.
(1-1) An RRC signal or RRC message is newly provided.
(1-2) A NAS signal or NAS message is newly provided.
(1-3) An RRC signal and a NAS signal are both newly provided.
(2) The existing signal or message is used. Compared with the specific example (1), the specific example (2) is effective in that a new signal needs not to be provided. The specific example (2) can prevent the communication system from becoming complicated.

The following three (1) to (3) will be disclosed as specific examples of the parameters to be mapped to a new signal.

(1) Result of judgment on state shifting. This may be notified only in the case where it is judged not to shift the RRC state and the ECM state in association with each other. In the description below, the case where it is judged that the RRC state and the ECM state are not shifted in association with each other may be referred to as being "RRC-independent" and the parameter to be added may be referred to as being "RRC-independent".

(2) UE identity, specifically, which may be UE-ID or IMSI.

(3) Combination of (1) and (2) above.

Next, as a specific example in the case where the existing RRC signal is used, an RRC connection request message is used. In the description below, the case where it is judged that the RRC state and the ECM state are not shifted in association with each other may be referred to as being "RRC-independent", and the parameter to be added may be referred to as being "RRC independent".

Specific examples of the parameters required to be added to the existing RRC signaling include the result of the judgment on state shifting.

Next, a service request message is used as a specific example in the case where the existing NAS signal is used.

Specific examples of the parameters required to be added to the existing NAS signaling include the result of the judgment on state shifting. Parameters may be added to both of the existing RRC signal and the existing NAS signal.

In setting the S1 bearer, the eNB that has obtained the result of the judgment on state shifting associates the result of the judgment on state shifting with the S1 bearer and stores the result. As a specific example, in setting the S1 bearer, the eNB stores whether the S1 bearer is a bearer that shifts the normal RRC state and the ECM state in association with each other or a bearer that does not shift the RRC state and the ECM state in association with each other. Or, the eNB stores whether to manage the S1 bearer and the RRC bearer in association with each other or to manage the S1 bearer and the RRC bearer independently of each other. Or, the eNB stores whether to start the procedure of releasing the S1 bearer (S1 release procedure) in the case where the RRC bearer has been released or not to start the procedure of releasing the S1 bearer in the case where the RRC bearer has been released.

The eNB may operate as follows based on the memory of the result of judgment on state shifting. In the case where the result of the judgment on state shifting indicates that the RRC state and the ECM state are shifted in association with each other, the eNB judges whether or not the RRC data is transmitted and received during a predetermined period. The predetermined period is referred to as "RRC data monitoring timer (eNB)".

In the case where the RRC data is transmitted and received until the RRC data monitoring timer (eNB) expires, the eNB keeps the RRC_CONNECTED state and also keeps the ECM_CONNECTED state. Meanwhile, in the case where the RRC data is not transmitted and received until the RRC data monitoring timer (eNB) expires, the eNB shifts to the RRC_IDLE state and also shifts to the ECM_IDLE state. In other words, the eNB activates the S1 release procedure.

The result of the judgment on state shifting indicates that the RRC state and the ECM state are not shifted in association with each other, the eNB judges whether or not the RRC data is transmitted and received during a predetermined period. Additionally, the eNB separately judges whether or not to transmit and receive the NAS data during a predetermined period. The predetermined period is referred to as "NAS data monitoring timer (eNB)".

In the case where the RRC data is transmitted and received until the RRC data monitoring timer (eNB) expires, the eNB keeps the RRC_CONNECTED state. Meanwhile, in the case where the RRC data is not transmitted and received until the RRC data monitoring timer (eNB) expires, the eNB shifts to the RRC_IDLE state. In other words, the resources of the radio bear are released. Specific examples of the resources of the radio bearer include the resource for a scheduling request to the UE. However, the eNB does not shift to the ECM_IDLE state. In other words, the eNB does not activate the S1 release procedure.

In the case where the NAS data is transmitted and received until the NAS data monitoring timer (eNB) expires, the eNB keeps the ECM_CONNECTED state. Meanwhile, in the case where the NAS data is not transmitted and received until the NAS data monitoring timer (eNB) expires, the eNB shifts to the ECM_IDLE state. In other words, the resources of the S1 bearer and EPS bearer are released. The eNB may activate the S1 release procedure.

The UE may store the result of judgment on state shifting. The result of judgment on state shifting may be associated with the S1 bearer to be stored.

In the case where the result of judgment on state shifting indicates that the normal RRC state and the ECM state are shifted in association with each other, whether or not the RRC data is transmitted and received during a predetermined period is judged. The predetermined period is referred to as "RRC data monitoring timer (UE)".

In the case where the RRC data is transmitted and received until the RRC data monitoring timer (UE) expires, the UE keeps the RRC_CONNECTED state and also keeps the ECM_CONNECTED state. Meanwhile, in the case where the RRC data is not transmitted and received until the RRC data monitoring timer (UE) expires, the UE shifts to the RRC_IDLE state and also shifts to the ECM_IDLE state.

In the case where the result of judgment on state shifting indicates that the RRC state and the ECM state are not shifted in association with each other, whether or not the RRC data is transmitted and received during a predetermined period is judged. Also, whether or not the NAS data is transmitted and received during a predetermined period is separately judged. The predetermined period is referred to as "NAS data monitoring timer (UE)".

In the case where the RRC data is transmitted and received until the RRC data monitoring timer (UE) expires, the UE keeps the RRC_CONNECTED state. Meanwhile, in the case where the RRC data is not transmitted and received until the RRC data monitoring timer (UE) expires, the UE shifts to the RRC_IDLE state but does not shift to the ECM_IDLE state.

In the case where the NAS data is transmitted and received until the NAS data monitoring timer (UE) expires, the UE keeps the ECM_CONNECTED state. Meanwhile, in the case where the NAS data is not transmitted and received until the NAS data monitoring timer (UE) expires, the UE shifts to the ECM_IDLE state.

The NAS data monitoring timer (eNB) may be the same as the NAS data monitoring timer (UE). The same timer may also be referred to as "NAS data monitoring timer". This achieves an effect that the period in which the state of the UE disagrees with the state of the eNB can be shortened.

Specific examples of the entity that determines the NAS data monitoring timer include the UE and the eNB. The following three (1) to (3) will be disclosed as specific examples of the method of determining a NAS data monitoring timer.

(1) The NAS data monitoring timer may be determined depending on an application.

(1-1) The NAS data monitoring timer may be determined from the QoS, QCI, bearer information, or the like requested by the application.

(1-2) In the case where the application transmits a keep-alive packet, a value longer than the period for the transmission. A keep-alive packet is transmitted until the NAS data monitoring timer expires. Thus, while the application is kept, the ECM_CONNECTED state between the UE and eNB can be kept.

(2) Situation of S1 resource. The NAS data monitoring timer may be set shorter in the case where the S1 resource is scarce or may be set longer in the case where the S1 resource is not scarce.

(3) The NAS data monitoring timer is determined statically. This leads to an effect that notification is not required between the UE and the eNB.

The following four (1) to (4) will be disclosed as specific examples of the method of notifying the eNB in the case where the UE determines a NAS data monitoring timer.

(1) Notification is made in the TAU procedure. As a specific example, the eNB is notified in the TAU request or the like.

(2) Notification is made in the attach procedure. As a specific example, the eNB is notified in an attach request, RRC connection reconfiguration complete, or the like.

(3) Notification is made in the RRC connection setup procedure. As a specific example, the eNB is notified in, for example, an RRC connection setup request.

(4) Notification is made in the service request procedure. As a specific example, the eNB is notified in, for example, the service request or RRV RRC connection reconfiguration complete.

The following six (1) to (6) will be disclosed as specific examples of the method of notifying the UE in the case where the eNB determines a NAS data monitoring timer.

(1) Notification is made in the broadcast information.

(2) Notification is made in the dedicated information.

(3) Notification is made in the TAU procedure. As a specific example, notification is made in TAU accept or the like.

(4) Notification is made in the attach procedure. As a specific example, notification is made in attach accept, RRC connection reconfiguration, or the like.

(5) Notification is made in the RRC connection setup procedure. As a specific example, notification is made in RRC connection setup or the like.

(6) Notification is made in the service request procedure. As a specific example, notification is made in the RRC connection reconfiguration or the like.

The RRC data monitoring timer (eNB) and the RRC data monitoring timer (UE) may be the same. The same timer is referred to as "RRC data monitoring timer". This leads to an effect that a period in which the state of the UE disagrees with the state of the eNB can be shortened.

Specific examples of the entity that determines an RRC data monitoring timer include the UE and the eNB. The following two (1) and (2) will be disclosed as specific examples of the method of determining the RRC data monitoring timer.

(1) Situation of radio resources. The timer may be set shorter in the case where the radio resources are scarce or may be set longer in the case where the radio resources are not scarce.

(2) The timer is determined statically. This leads to an effect that notification is not required between the UE and the eNB.

The following three (1) to (3) will be disclosed as specific examples of the method of notifying the eNB in the case where the UE determines the RRC data monitoring timer.

(1) Notification is made in the TAU procedure. As a specific example, notification is made in a TAU request or the like.

(2) Notification is made in the attach procedure. As a specific example, notification is made in an attach request, RRC connection reconfiguration complete, or the like.

(3) Notification is made in the RRC connection setup procedure. As a specific example, notification is made in an RRC connection setup request or the like.

The following five (1) to (5) will be disclosed as specific examples of the method of notifying the UE in the case where the eNB determines the RRC data monitoring timer.

(1) Notification is made in the broadcast information.

(2) Notification is made in the dedicated information.

(3) Notification is made in the TAU procedure. As a specific example, notification is made in TAU accept or the like.

(4) Notification is made in the attach procedure. As a specific example, notification is made in attach accept, RRC connection reconfiguration, or the like.

(5) Notification is made in the RRC connection setup procedure. As a specific example, notification is made in RRC connection setup or the like.

In the case where an access request is made from the application in the RRC_IDLE state, the UE may judge whether or not ECM_CONNECTED is kept. Or, the UE may judge whether or not there is an S1 bearer kept.

In the case of judging that ECM_CONNECTED is not kept or judging that there is no S1 bearer kept, the UE may make the judgment on state shifting method, in response to the access request.

In the case of judging that ECM_CONNECTED is kept or judging that there is an S1 bearer kept, the UE judges whether or not the data can be transmitted in the EPS bearer associated with ECM_CONNECTED kept. The UE may judge whether or not the transmission request is made from the application as in the case where the EPS bearer associated with ECM_CONNECTED is established.

In the case of judging that the data cannot be transmitted in the EPS bearer, the UE may make the judgment on state shifting method, in response to the access request.

In the case of judging that the data can be transmitted in the EPS bearer, the UE requests to establish RRC connection. In that case, the UE also notifies that ECM_CONNECTED is kept. As a specific example, the UE activates the RRC connection setup procedure to notify that ECM_CONNECTED is kept as well. The UE may avoid activating the service request procedure.

A specific example of the notification method will be disclosed below. The existing RRC signal or RRC message is used. As a specific example, an RRC connection request is used. This is similar to the message to be used in the existing RRC connection setup procedure, preventing the communication system from becoming complicated.

The following three (1) to (3) will be disclosed as specific examples of the parameters required to be added to the existing RRC signaling.

(1) Indication that the existing S1 bearer is used, or that ECM_CONNECTED is kept. Indication that an S1 bearer needs not to be established.

(2) Information that can identify the existing S1 bearer, such as an index number.

(3) Combination of (1) and (2) above.

The eNB, which has been notified that the existing S1 bearer is used in the RRC connection setup procedure, does not activate the setup of the S1 bearer. Or, the eNB may recognize that the UE does not notify a service request. The eNB associates RRC connection with the S1 bearer, to thereby transmit RRC connection setup to the UE. This enables data transmission only through the procedure for RRC connection, without setup of the S1 bearer.

In the case of prohibiting the RRC state and the ECM state from shifting in association with each other, the UE may notify the eNB of an S1 bearer release request upon receipt of a service disconnection request or a service release request from the application. Or, the UE may notify a resource release request at the NAS level.

The following two (1) and (2) will be disclosed as specific examples of the notification method.

(1) An RRC signal or RRC message is newly provided, which may be referred to as "NAS release request" below.

(2) A NAS signal or NAS message is newly provided, which may be referred to as "NAS release request" below.

The following four (1) to (4) will be disclosed as specific examples of the parameters to be mapped to a new signal.

(1) Indication that a parameter is an S1 bearer release request, that the parameter is a resource release request at a NAS level, or that a parameter is a request to shift to ECM_IDLE.

(2) UE identity, specifically, which may be UE-ID or IMSI.

(3) Information that can identify the existing S1 bearer, such as an index number.

(4) Combination of (1) to (3) above.

Figure 59:
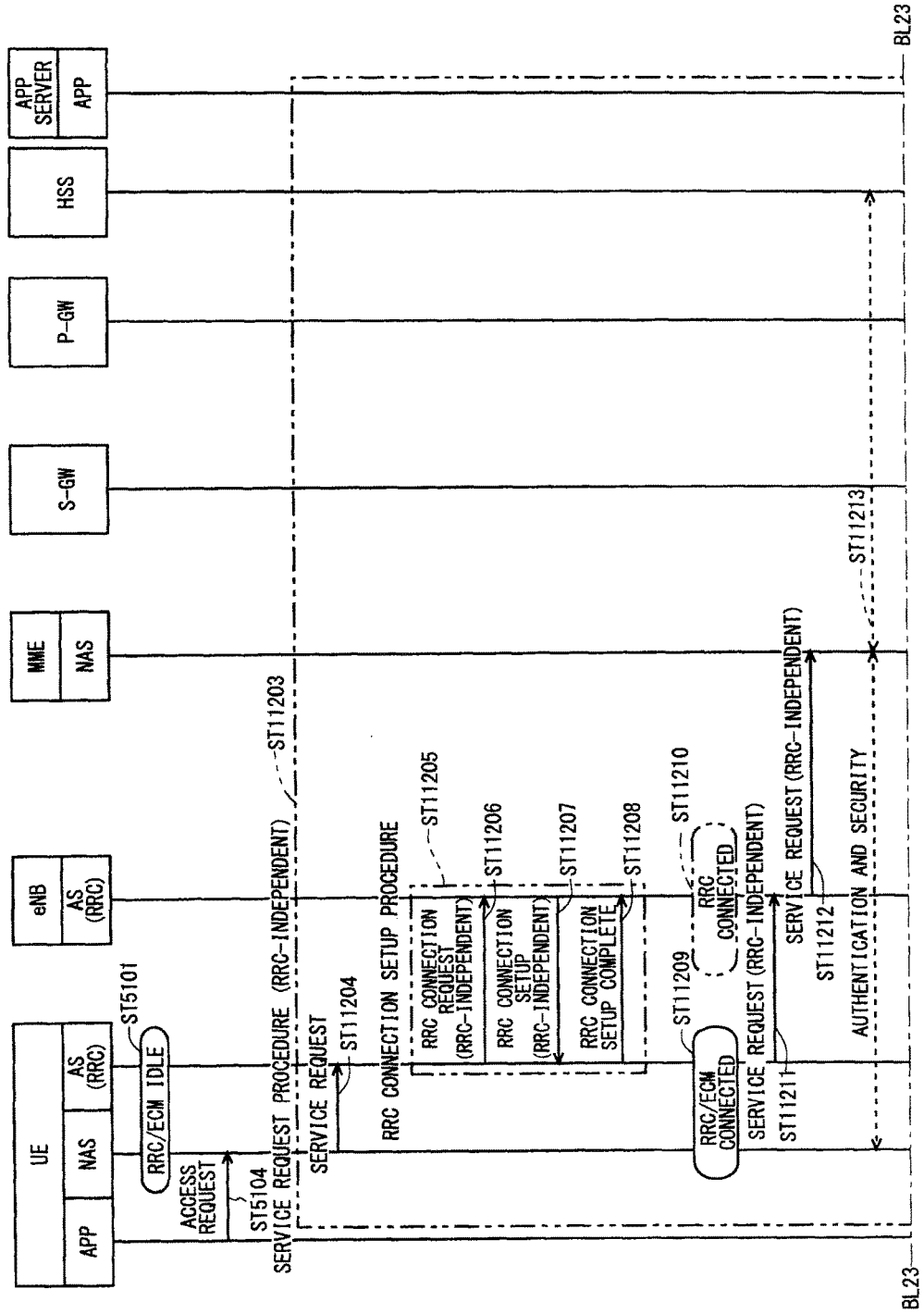
FIG. 59 is a diagram showing an exemplary sequence of a communication system in the seventh embodiment.
Figure 60:
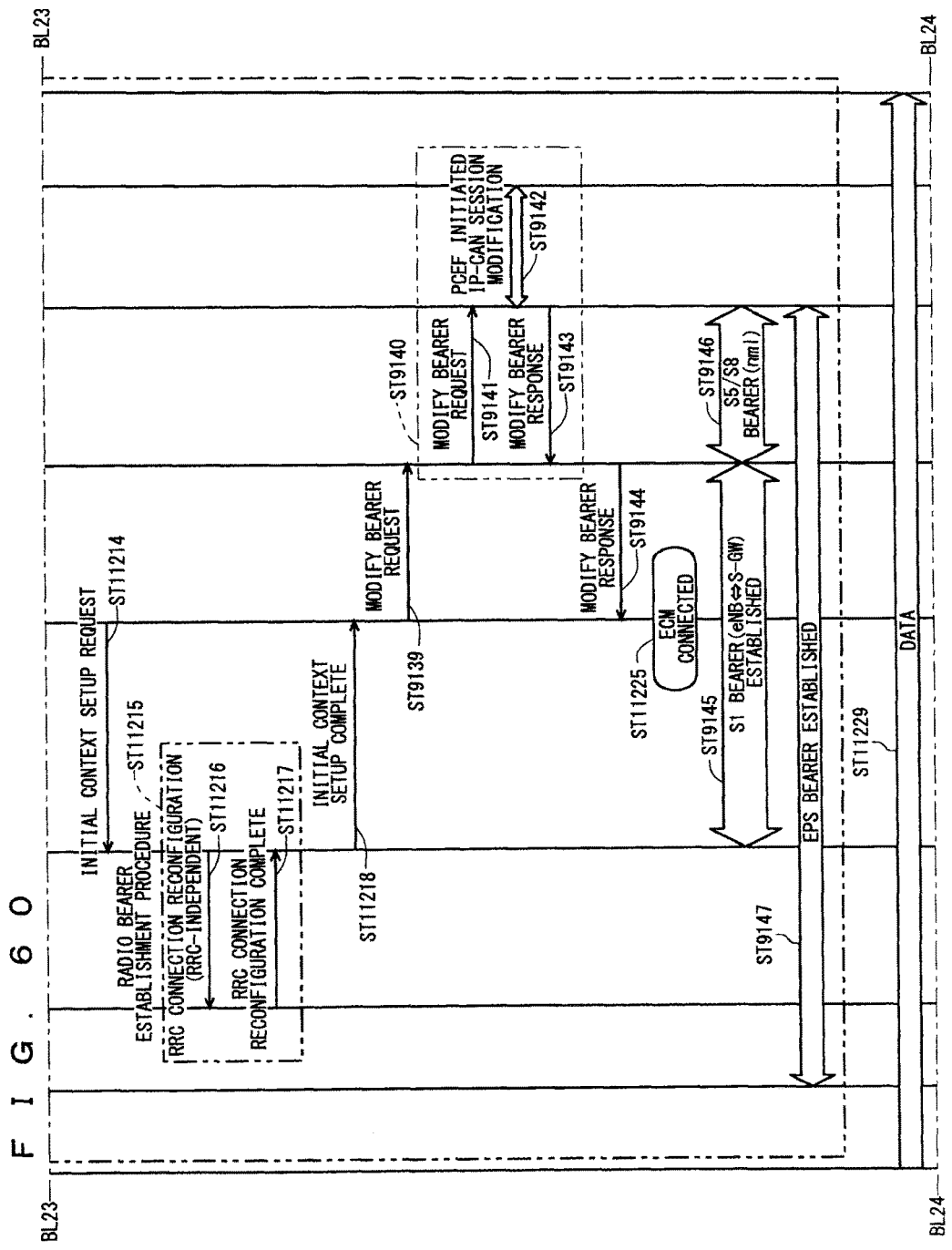
FIG. 60 is another diagram showing the exemplary sequence of the communication system in the seventh embodiment.
Figure 61:
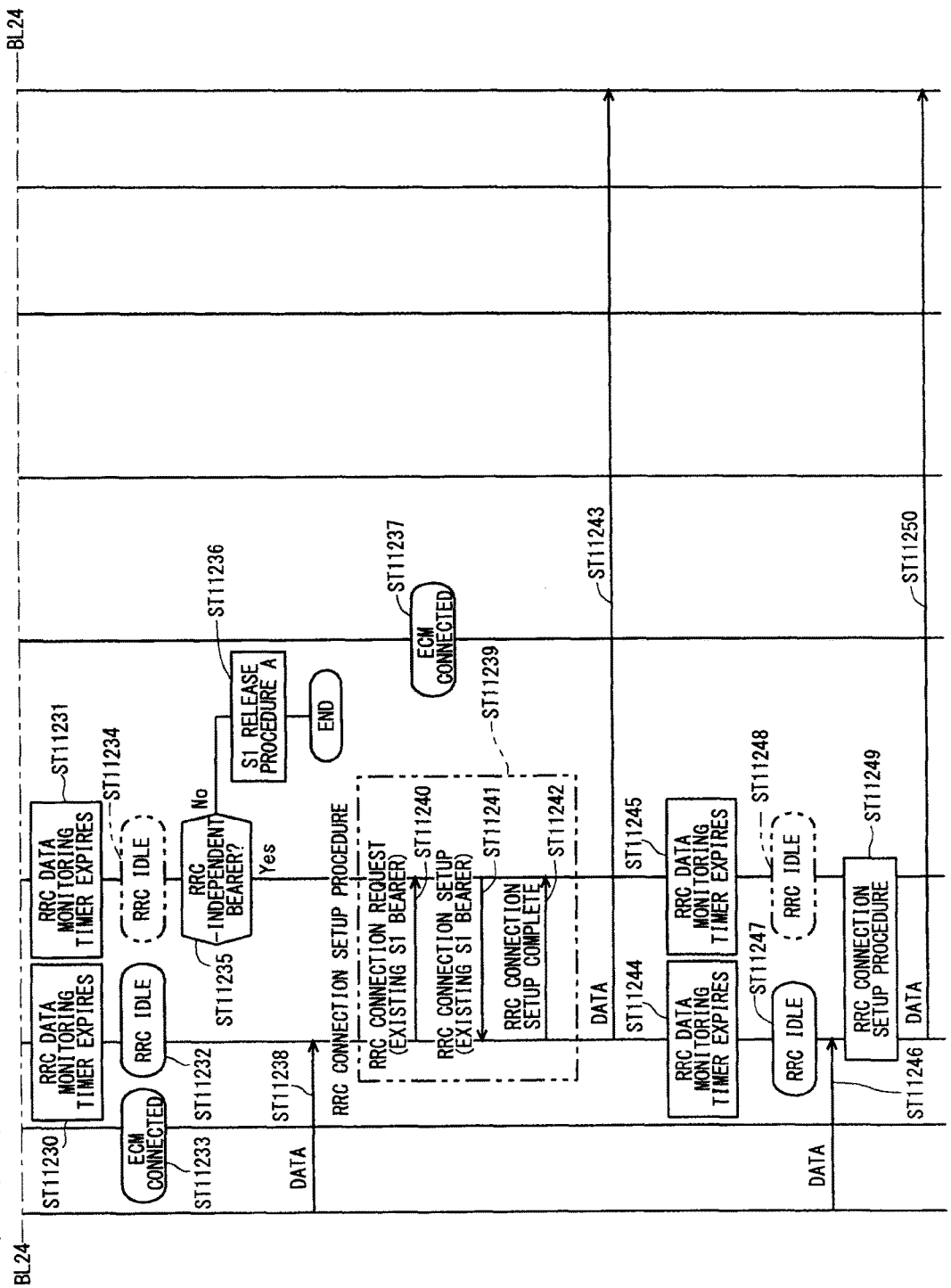
FIG. 61 is still another diagram showing the exemplary sequence of the communication system in the seventh embodiment.

Next, a specific example of the sequence of a communication system in the seventh embodiment will be described with reference to FIGS. 59 to 61. FIGS. 59 to 61 are diagrams showing an exemplary sequence of the communication system in the seventh embodiment. FIGS. 59 and 60 are continuous with each other at a boundary BL23. FIGS. 60 and 61 are continuous with each other at a boundary BL24. The sequence shown in FIGS. 59 to 61 is similar to the sequences shown in FIGS. 27 to 29 and FIGS. 44 to 47, and thus, the same steps will be denoted by the same step numbers and common description will be skipped.

The NAS of the UE that has received an access request in Step ST5104 makes judgment on state shifting method. In the case where the result of the judgment on state shifting method indicates that the RRC state and the ECM state are not shifted in association with each other, that is, indicates "RRC-independent", in Step ST11203, the NAS activates a service request procedure (RRC-independent).

The service request procedure (RRC-independent) of Step ST11203 includes the processes of Steps ST11204 to ST9147.

In Step ST11204, the NAS of the UE transmits a service request message to an access stratum (AS). The NAS of the UE may notify the RRC layer. The service request message of Step ST11204 may include the result of judgment on state shifting.

In Step ST11205, the RRC layer of the UE, which has received in Step ST11204 the service request message including the information (RRC-independent) indicating that the RRC state and the ECM state are not shifted in association with each other, activates the RRC connection setup procedure (RRC-independent).

The RRC connection setup procedure (RRC-independent) of Step ST11205 includes the processes of Steps ST11206 to ST11208.

In Step ST11206, the RRC layer of the UE transmits an RRC connection setup request message to the eNB. The RRC connection setup request message may include the information (RRC-independent) indicating that the RRC state and the ECM state are not shifted in association with each other.

In Step ST11207, the eNB, which has received the RRC connection setup request message in Step ST11206, transmits an RRC connection setup message to the RRC layer of the UE. The RRC connection setup message may include the information indicating that the RRC state and the ECM state are not shifted in association with each other.

In Step ST11208, the UE, which has received the RRC connection setup message in Step ST11207, transmits an RRC connection setup complete message to the eNB. The RRC connection setup complete message may include the information indicating that the RRC state and the ECM state are not shifted in association with each other.

The RRC connection setup procedure (RRC-independent) of Step ST11205 is completed, so that in Step ST11209, the UE enters the RRC_CONNECTED state. The UE enters the ECM_ CONNECTED state.

Similarly, in Step ST11210, the eNB assumes the RRC state of the UE as the RRC_CONNECTED state. Hereinafter, this is merely referred to as "the eNB enters the RRC_CONNECTED state".

In Step ST11211, the RRC layer of the UE transmits a service request message to the eNB. The service request message may include the information indicating that the RRC state and the ECM state are not shifted in association with each other.

In Step ST11212, the eNB, which has received the service request message in Step ST11211, transmits a service request message to the MME. The service request message may include the information indicating that the RRC state and the ECM state are not shifted in association with each other.

In Step ST11213, the MME uses the information of the HSS to perform the authentication and security control of the UE.

In Step ST11214, the MME transmits an initial context setup request message to the eNB. The initial context setup request message may include the information indicating that the RRC state and the ECM state are not shifted in association with each other.

In Step ST11215, the eNB, which has received the initial context setup request message in Step ST11214, activates a radio bearer establishment procedure (RRC-independent).

The radio bearer establishment procedure (RRC-independent) of Step ST11215 includes the processes of Steps ST11216 and ST11217.

In Step ST11216, the eNB transmits an RRC connection reconfiguration message to the UE. The RRC connection reconfiguration message may include the information indicating that the RRC state and the ECM state are not shifted in association with each other.

In Step ST11217, the UE, which has received the RRC connection reconfiguration message in Step ST11216, transmits an RRC connection reconfiguration complete message to the eNB. The RRC connection reconfiguration complete message may include the information indicating that the RRC state and the ECM state are not shifted in association with each other.

In Step ST11218, the eNB, which has received the RRC connection reconfiguration complete message in Step ST11217, transmits an initial context setup complete message to the MME. The initial context setup complete message may include the information indicating that the RRC state and the ECM state are not shifted in association with each other.

In Step ST11225, the MME that has received the modify bearer response message moves to the ECM_CONNECTED state with the UE. Or, after the completion of the establishment of the S1 connection to the UE, the MME may move to the ECM_CONNECTED state to the UE. The MME recognizes that the S1 connection to the UE has been completed, upon receipt of the initial context setup complete message in Step ST11218.

After the service request procedure (RRC-independent) is completed in Step ST11203, in Step ST11229, the UE can transmit data to the application server (APP server) via the eNB, MME, S-GW, and P-GW.

In Step ST11230 of FIG. 61, the data monitoring timer expires, which measures the period in which data has not been transmitted at the RRC level in the UE. The UE judges whether or not the current RRC connection is the bearer that does not shift the RRC state and the ECM state in association with each other (RRC-independent). In the case where the UE judges that the current RRC connection is the bearer that does not shift the RRC state and the ECM state in association with each other (RRC-independent), only the RRC moves to the IDLE state and the ECM keeps CONNECTED. In the case where the UE judges that the current RRC connection is not the bearer that does not shift the RRC state and the ECM state in association with each other (RRC-independent), the RRC and the ECM both move to the IDLE state. In this sequence, the current RRC connection is the RRC-independent bearer, so that the RRC and the ECM move to Steps ST11232 and ST11233.

In Step STI 1231, the data monitoring timer expires, which measures the period in which data has not been transmitted at the RRC level in the eNB, and then, the eNB moves to Step ST11234. The timer has expired, so that the eNB assumes or presumes that the RRC state of the target UE has entered IDLE.

In Step ST11232, the UE enters the RRC_IDLE state.

In Step ST11233, the UE may refer to the stored result of judgment on state shifting. In the case where the result of judgment on state shifting indicates that the normal RRC state and the ECM state are shifted in association with each other, the UE shifts the ECM state in association with the RRC state. In other words, the UE shifts the ECM state to ECM_IDLE. Meanwhile, in the case where the result of judgment on state shifting does not indicate that the RRC state and the ECM state are not shifted in association with each other, the UE does not shift the ECM state in association with the RRC state but keeps the ECM_CONNECTED state. In this operation example, in Step ST11233, the UE keeps the ECM_CONNECTED state.

In Step ST11234, the eNB enters the RRC_IDLE state and then moves to Step ST11235.

In Step ST11235, the eNB may refer to the stored result of judgment on state shifting. In the case where the result of judgment on state shifting indicates that the RRC state and the ECM state are not shifted in association with each other, the eNB keeps the ECM_CONNECTED state. In other words, the eNB does not activate the S1 release procedure A.

In the case where the result of judgment on state shifting indicates that the normal RRC state and the ECM state are shifted in association with each other, the eNB also causes the ECM state to move to IDLE. In other words, the eNB moves to Step ST11236 and then activates the S1 release procedure A. Details of the S1 release procedure A are similar to those of the procedure of Step ST5105 of FIG. 27, which will not be described here. In FIGS. 59 to 61, the description of the procedure thereafter is omitted but is described as "end".

In the case of judging in Step ST11235 that the result of judgment on state shifting indicates that the RRC state and the ECM state are not shifted in association with each other, the S1 release procedure A is not activated. Thus, ECM_ CONNECTED is kept in Step ST11237.

In Step ST11238, the application of the UE requests the NAS to transmit data, whereby the transmission data is transmitted.

The NAS of the UE may judge whether or not ECM_ CONNECTED is kept. In the case where ECM_CONNECTED is not kept, the NAS activates the normal service request procedure A. Details of the normal service request procedure A are similar to those of the procedure of Step ST11114, which will not be described here.

In the case where ECM_CONNECTED is kept, the UE judges whether or not data can be transmitted in the EPS bearer associated with ECM_CONNECTED kept. In other words, the UE judges whether or not the transmission request is issued from the application similar to that in the case where the EPS bearer associated with ECM_CONNECTED has been established. In the case where the data cannot be transmitted in the EPS bearer, the UE activates the normal service request procedure A. Details of the normal service request procedure A are similar to those of the procedure of Step ST11114, which will not be described here. In the case where the data can be transmitted in the EPS bearer, the UE moves to Step ST11239.

In Step ST11239, the UE activates the RRC connection setup procedure. In that case, the UE also notifies that ECM_CONNECTED is kept (hereinafter, also referred to as "existing S1 bearer"). Or, identifiable information may be notified as the existing S1 bearer. The UE activates the RRC connection setup procedure (existing S1 bearer).

The RRC connection setup procedure (existing S1 bearer) of Step ST11239 includes the processes of Steps ST11240 to ST11242.

In Step ST11240, the RRC layer of the UE transmits an RRC connection request message to the eNB. The RRC connection request message may include the information indicating that ECM_CONNECTED is kept or the information that identifies the S1 bearer for the corresponding connection.

In Step ST11241, the eNB, which has received the RRC connection request message in Step ST11240, transmits an RRC connection setup message to the RRC layer of the UE. The RRC connection setup message may include the information indicating that ECM_CONNECTED is kept or the information that identifies the S1 bearer for the corresponding connection.

In Step ST11242, the UE, which has received the RRC connection setup message in Step ST11241, transmits an RRC connection setup complete message to the eNB. The RRC connection setup complete message may include the information indicating that ECM_CONNECTED is kept or the information that identifies the S1 bearer for the corresponding connection.

In Step ST11243, the UE transmits data to the application server via the P-GW, using the corresponding connection. Specifically, the UE transmits data using the corresponding EPS bearer.

In Step ST11244, the data monitoring timer expires, which measures the period in which data has not been transmitted at the RRC level in the UE. Details of the process of Step ST11244 are similar to those of the process of Step ST11230, which will not be described here.

In Step ST11245, the data monitoring timer expires, which measures the period in which data has not been transmitted at the RRC level in the eNB. Details of the process of Step STI 1245 are similar to those of the process of Step ST11231, which will not be described here.

In Step ST11247, the UE enters the RRC_IDLE state. In Step ST11248, the eNB enters the RRC_IDLE state and performs the process similar to the process of Step ST11235. As a result of the process similar to that of Step ST1235 being performed, in the case where the result of judgment on state shifting indicates that the RRC state and the ECM state are not shifted in association with each other, the S1 release procedure A is not activated, keeping ECM_CONNECTED.

In Step ST11246, the application of the UE requests the NAS to transmit data, whereby the transmission data is transmitted. Details of the process of Step ST11246 are similar to those of the process of Step ST11238, which will not be described here.

In Step ST11249, the UE activates the RRC connection setup procedure (existing S1 bearer). Details of the procedure of Step ST11249 are similar to those of the procedure of Step ST11239, which will not be described here.

In Step ST11250, the UE transmits data to the application server via the P-GW, using the corresponding connection. Specifically, the UE transmits data using the corresponding EPS bearer. The above-mentioned procedures are repeated below.

Figure 62:
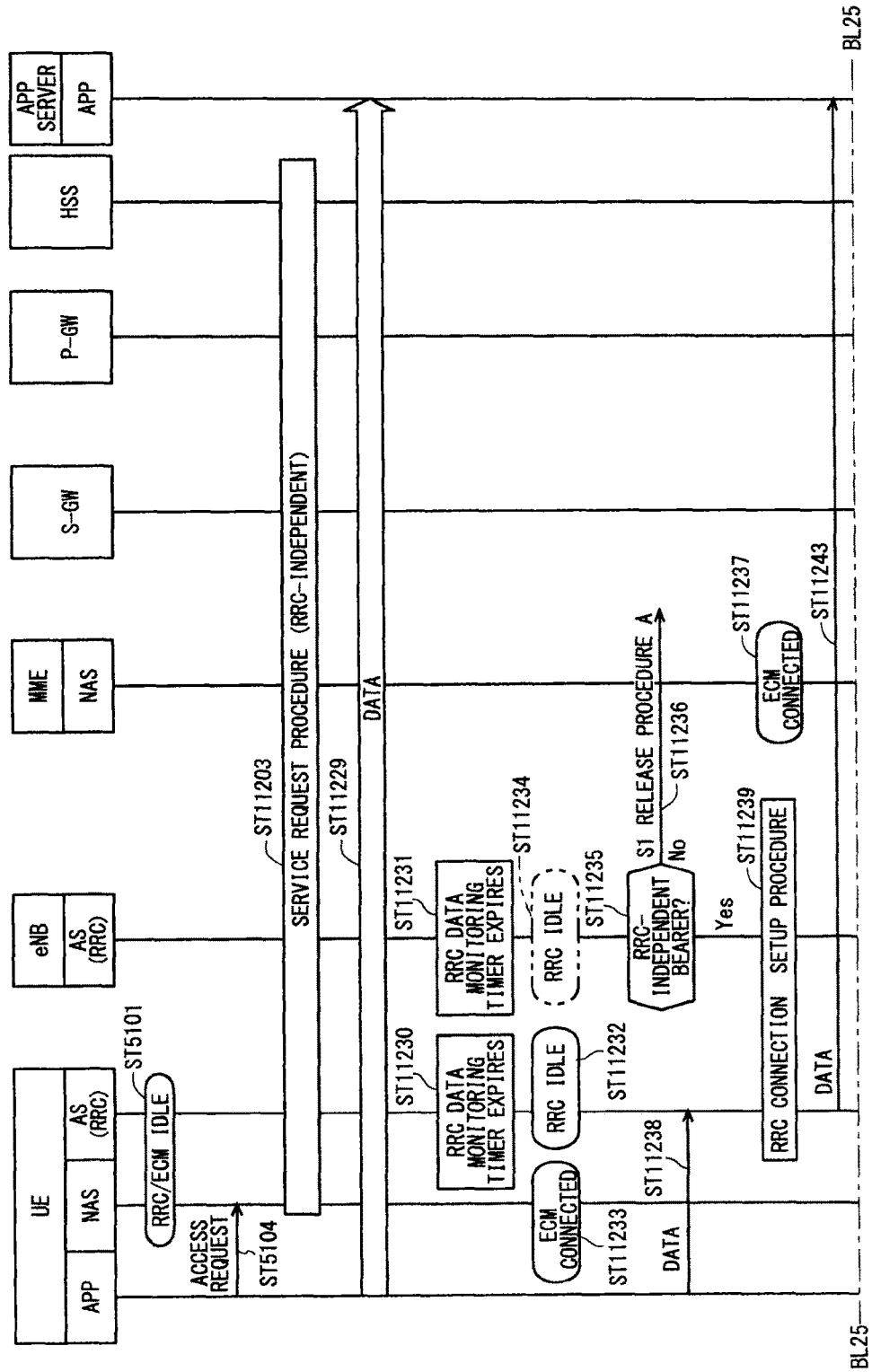
FIG. 62 is a diagram showing another exemplary sequence of the communication system in the seventh embodiment.
Figure 63:
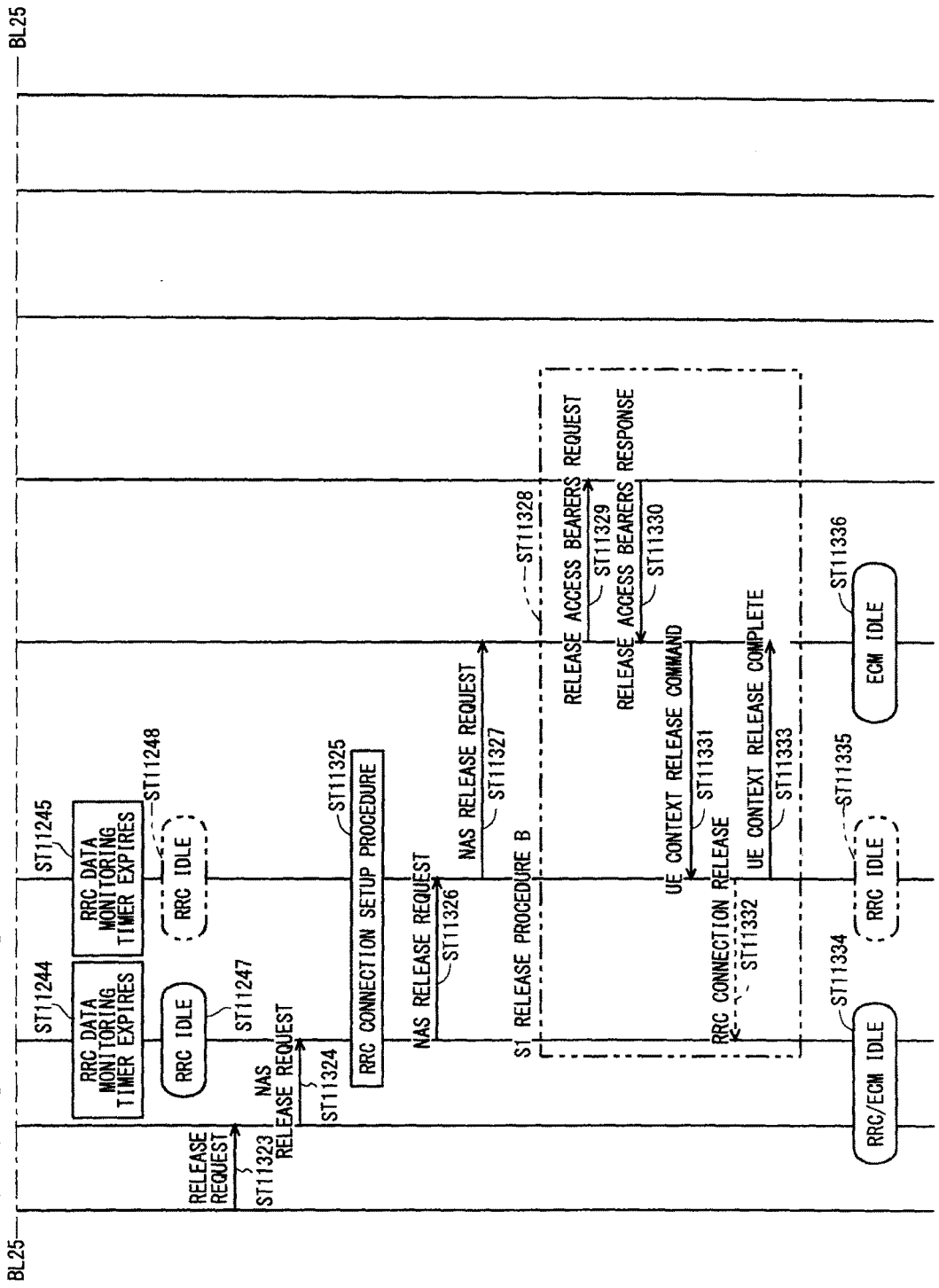
FIG. 63 is another diagram showing the other exemplary sequence of the communication system in the seventh embodiment.

Next, a specific example of the sequence of the communication system in the seventh embodiment will be described with reference to FIGS. 62 and 63. FIGS. 62 and 63 are diagrams showing another exemplary sequence of the communication system in the seventh embodiment. FIGS. 62 and 63 are continuous with each other at a boundary BL25. FIGS. 62 and 63 show the sequence in the case where the S1 bearer, which has been established based on the result of judgment on state shifting indicating that the RRC state and the ECM state are not shifted in association with each other, is released in the procedure of releasing a UE origin. The sequence shown in FIGS. 62 and 63 is similar to the sequences shown in FIGS. 27 to 29 and 59 to 61, and thus, the same steps will be denoted by the same step numbers and common description will be skipped.

In Step ST11323 of FIG. 63, the application of the UE transmits a service disconnection request or service release request to the NAS of the UE.

The NAS of the UE may judge whether or not ECM_CONNECTED is kept. In the case of judging that ECM_CONNECTED is not kept, the NAS performs the process of shifting the state of the UE to RRC_IDLE and ECM_IDLE. In the case of judging that ECM_CONNECTED is kept, the NAS may move to Step ST11324.

In Step ST11324, the NAS of the UE requests an access stratum (AS) to release the connection at the NAS level (S1 bearer). Specifically, the NAS requests the transmission of a NAS release request message. The NAS of the UE may notify the RRC layer.

In Step ST11325, the UE performs an RRC connection setup procedure. Details of the RRC connection setup procedure are similar to those of Step ST9104, which will not be described here. Or, in Step ST11325, the UE activates the RRC connection setup procedure (existing S1 bearer). Details of the RRC connection setup procedure (existing S1 bear bearer) are similar to those of the procedure of Step ST11239, which will not be described here.

In Step ST11326, the UE transmits a release request of the connection at the NAS level (S1 bearer) to the eNB. Specifically, the UE transmits a NAS release request message. The NAS release request message may include the information that identifies the S1 bearer for the corresponding connection.

In Step ST11327, the eNB, which has received the NAS release request message in Step ST11326, transmits the NAS release request message to the MME. The NAS release request message may include the information that identifies the S1 bearer for the corresponding connection.

In Step ST11328, the MME, which has received the NAS release request message in Step ST11327, activates the process of releasing the S1 bearer. Specifically, the MME activates the S1 release procedure B. The S1 release procedure B differs from the S1 release procedure A in that the S1 release procedure B has no UE context release request originating from the eNB.

The S1 release procedure B of Step ST11328 includes the processes of Steps ST11329 to ST11333.

In Step ST11329, the MME transmits a release access bearers request message to the S-GW. The release access bearers request message may include the information that identifies the S1 bearer for the corresponding connection or may include the information indicating that the process is for releasing the S1 bearer that does not shift the RRC state and the ECM state in association with each other.

In Step ST11330, the S-GW, which has received the release access bearers request message in Step ST11329, transmits a release access bearers response message to the MME. The release access bearers request message may include the information that identifies the S1 bearer for the corresponding connection or may include the information indicating that the process is for releasing the S1 bearer that does not shift the RRC state and the ECM state in association with each other.

In Step ST11331, the MME, which has received the release access bearers request message in Step ST11330, transmits a UE context release command to the eNB. The UE context release command may include the information that identifies the S1 bearer for the corresponding connection or may include the information indicating that the process is for releasing the S1 bearer that does not shift the RRC state and the ECM state in association with each other.

In Step ST11332, the eNB, which has received the UE context release command in Step ST11331, notifies the UE of an RRC connection release message.

In Step ST11333, the eNB notifies the MME of a UE context release complete message. The UE context release complete message may include the information that identifies the S1 bearer for the corresponding connection or may include the information indicating that the process is for releasing the S1 bearer that does not shift the RRC state and the ECM state in association with each other.

The above-mentioned operation allows the S1 bearer established for the RRC-independent bearer to be released by the timer.

Figure 64:
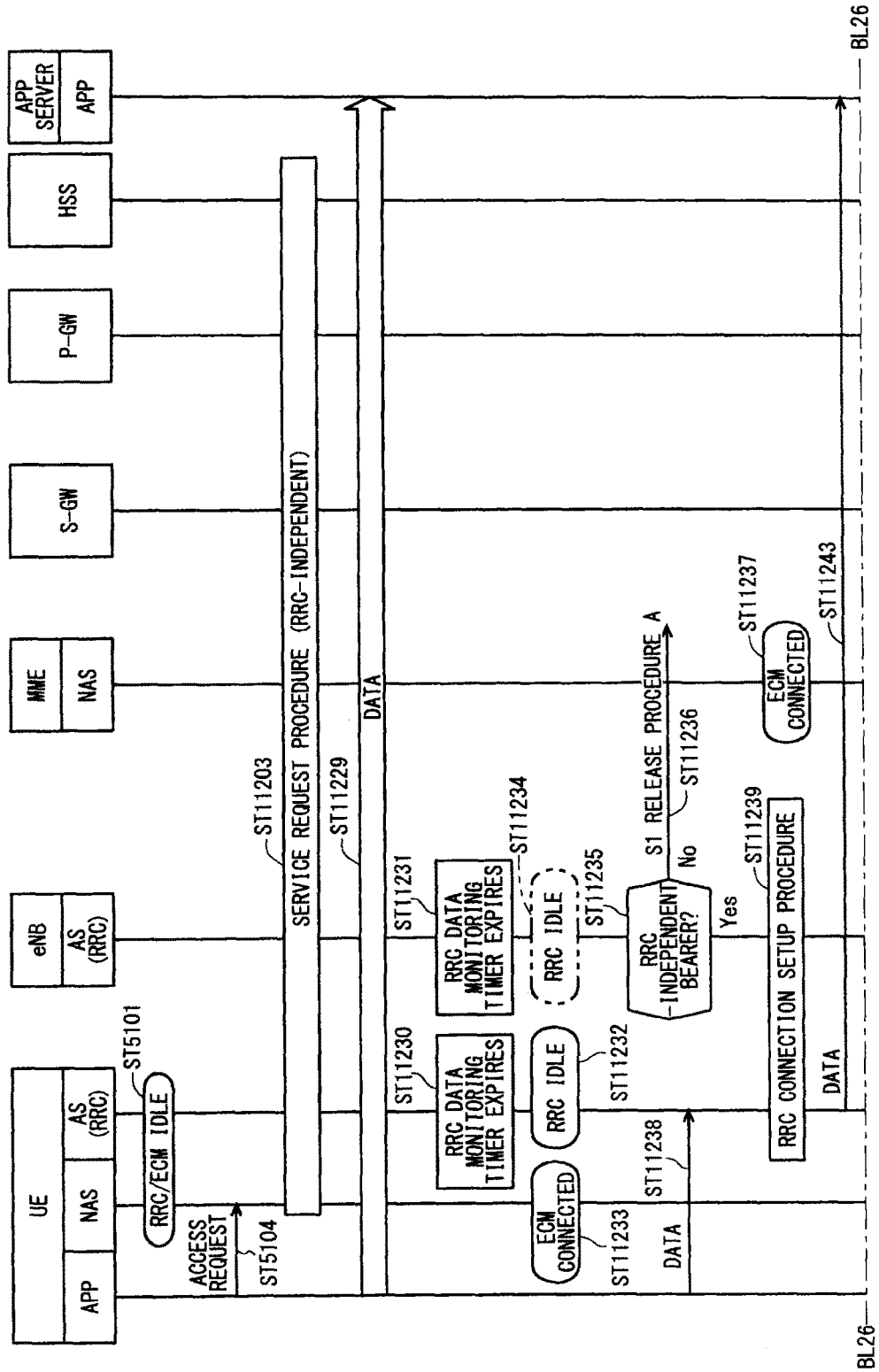
FIG. 64 is a diagram showing still another exemplary sequence of the communication system in the seventh embodiment.
Figure 65:
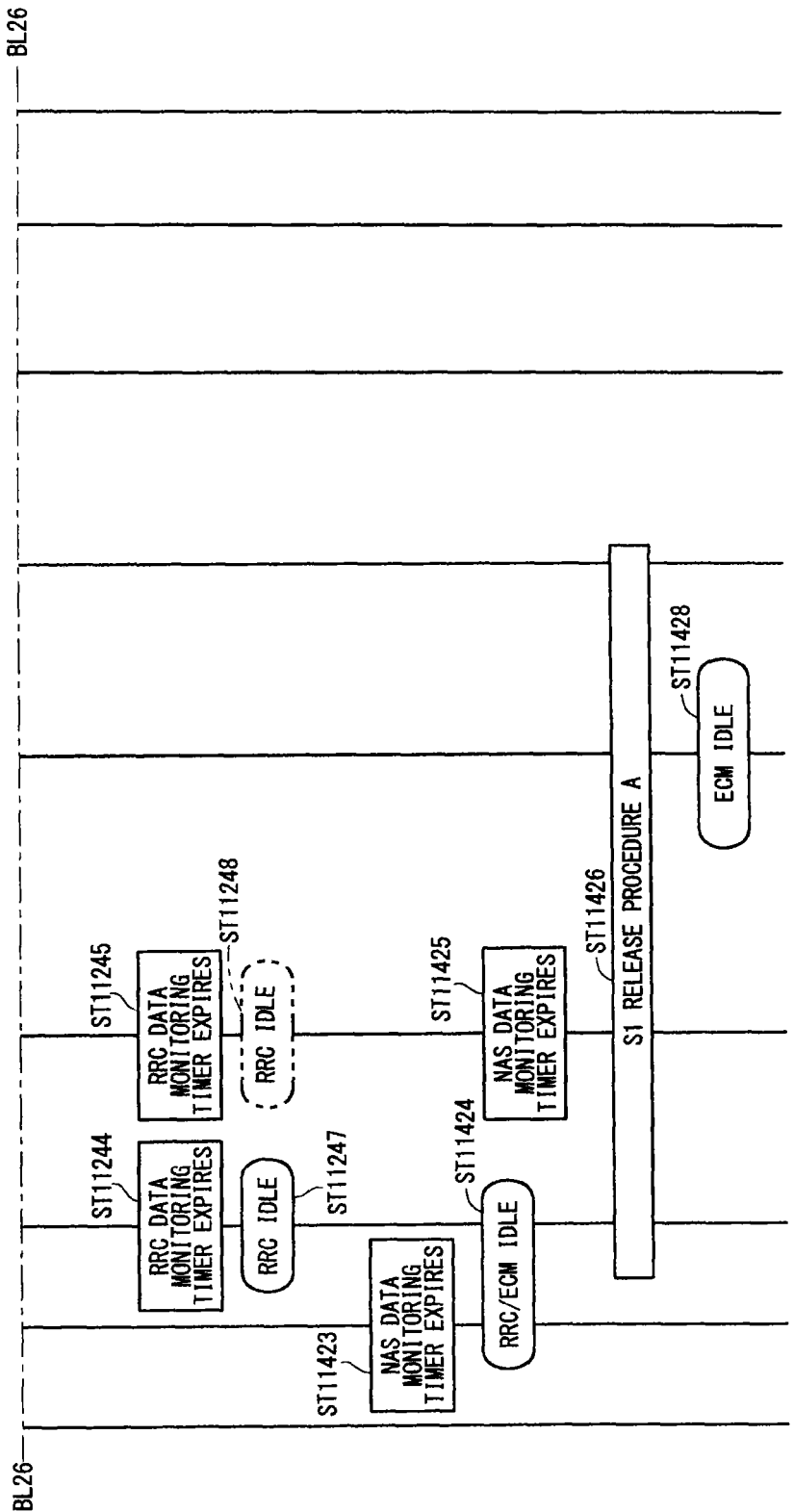
FIG. 65 is another diagram showing the still another exemplary sequence of the communication system in the seventh embodiment.

Next, a specific example of the sequence of the communication system in the seventh embodiment will be described with reference to FIGS. 64 and 65. FIGS. 64 and 65 are diagrams showing another exemplary sequence of the communication system in the seventh embodiment. FIGS. 64 and 65 are continuous with each other at a boundary BL26. FIGS. 64 and 65 show the sequence in the case where the S1 bearer, which has been established so as not to shift the RRC state and the ECM state in association with each other, is released through the release procedure by the timer. The sequence shown in FIGS. 64 and 65 is similar to the sequences shown in FIGS. 27 to 29 and 59 to 61, and thus, the same steps will be denoted by the same step numbers and common description will be skipped.

In Step ST11423 of FIG. 65, the data monitoring timer expires, which measures the period in which data has not been transmitted at the NAS level in the UE. The period in which data has not been transmitted at the NAS level may be measured only in the case where the S1 bearer is established when the result of judgment on state shifting method indicates that the RRC state and the ECM state have not been shifted in association with each other. In Step ST11424, the UE enters the ECM_IDLE state.

In Step ST11425, the data monitoring timer expires, which measures the period in which data has not been transmitted at the NAS level in the eNB, and then, the eNB moves to Step ST11426. It is presumed that the ECM state of the target UE enters IDLE upon expiration of the timer. The period in which data has not been transmitted at the NAS level may be measured only in the case where the S1 bearer is established when the result of judgment on state shifting method indicates that the RRC state and the ECM state have not been shifted in association with each other.

In Step ST11426, the eNB activates the S1 release procedure A. Details of the procedure of Step ST11426 are similar to those of the procedure of Step ST5134 of FIG. 29, which will not be described here.

After the procedure of Step ST11426 is completed, in Step ST11428, the MME enters the ECM_IDLE state.

Through the above-mentioned operation, the S1 bearer can be released by the timer in the case where the result of judgment on state shifting method indicates that the RRC state and the ECM state have not been shifted in association with each other.

The seventh embodiment described above can achieve the following effects. A mechanism can be achieved, which is capable of releasing and setting only the connection between radio areas while keeping the connection at the NAS level.

The transition of the RRC state and the setting of the bearer of higher level, for example, the S1 bearer are performed independently of each other. This alleviates a problem that the system resources in the radio access network, specifically, radio resources, the processing load in the communication node, and the like are used, and a problem that the power consumption of the UE is increased. The setup of the S1 bearer as described in the sixth embodiment is not included but the RRC connection can manage the setup of the S1 bearer, simplifying the procedure.

First Modification of Seventh Embodiment

The problem to be solved in a first modification of the seventh embodiment will be described below. The seventh embodiment described above needs to establish RRC connection, at the time of establishing an RRC-independent bearer, in the case where the UE transmits data in the RRC_IDLE state. Assuming that one packet of small data is transmitted, connection between radio areas severely affects the consumption power of the communication terminal device and the radio resources.

To solve the above-mentioned problem, the measure described below is taken as in the fourth modification of the first embodiment described above. In connection-lite, the small data is transmitted in the random access procedure without establishing the RRC connection. The transmission procedure is as in the fourth modification of the first embodiment described above.

The RRC connection is not set in the measure above, and thus, the procedure therefor can be omitted. This leads to reductions in the power consumption of the communication terminal device and radio resources.

Second Modification of Seventh Embodiment

The problem to be solved in a second modification of the seventh embodiment is similar to that of the first modification of the seventh embodiment.

To solve the above-mentioned problem, the measure described below is taken as in the fifth modification of the first embodiment described above. In connection-lite, small data is transmitted in the paging procedure without establishing the RRC connection. The transmission procedure is as in the fifth modification of the first embodiment described above.

The RRC connection is not set in the measure above, and thus, the procedure therefor can be omitted. This leads to reductions in the power consumption of the communication terminal device and radio resources.

Third Modification of Seventh Embodiment

The problem to be solved in a third modification of the seventh embodiment will be described below. In the case where the state of the EMC (RRC) connection between the UE and the eNB is used in the seventh embodiment and the first and second modifications thereof described above, a problem of the state disagreement between the UE and the eNB, which has been described in the second embodiment, may occur.

To solve the above-mentioned problem, as in the second embodiment described above, in the RRC_CONNECTED state, "uu-keep-alive" is transmitted regularly, and the function of notifying the network of the state is added to the sixth embodiment and the first to third modifications thereof described above. The procedure of transmitting "uu-keep-alive" is as in the second embodiment described above.

This modification reduces a degree of the disagreement between the state of the UE and the state of the eNB, reducing an effect on system resources.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

71 communication terminal device (UE), 72 base station device, 72-1 eNB, 72-2 Home-eNB, 73 MME/S-GW section (MME section), 74 HeNBGW.

The invention claimed is:

1. A communication system comprising:
a base station device configured to be connected to a network; and
a communication terminal device configured to be connected to said base station device to perform radio communication,
wherein
said base station device and said communication terminal device transmit a monitoring message, for confirming a state of said communication terminal device, to each other in a predetermined monitoring period,
said base station device judges that said communication terminal device has not been detected when said monitoring message has not been received from said communication terminal device a predetermined number of times within the predetermined monitoring period,
said predetermined number of times is determined semi-statically, and
when said base station device has not received the monitoring message within said predetermined monitoring period, the base station transmits monitoring message parameters to a base station neighbor to determine whether the communication terminal device has been detected based on whether the monitoring message is received by the base station neighbor within said predetermined monitoring period.

2. The communication system according to claim 1, wherein the predetermined number of times is greater than one.

3. The communication system according to claim 2, wherein said base station device notifies the communication terminal device of the predetermined number of times via broadcast information from a broadcast control channel.

4. The communication system according to claim 2, wherein said base station device notifies the communication terminal device of the predetermined number of times via dedicated information from a dedicated control channel.

5. The communication system according to claim 2, wherein said base station device notifies the communication terminal device of the predetermined number of times via a tracking area update procedure.

6. The communication system according to claim 1, wherein when said base station device has not received the monitoring message within the predetermined monitoring period, said base station device requests the state of the communication terminal device from a mobility management entity.

7. The communication system according to claim 6, wherein said mobility management entity determines the state of the communication terminal device based on a tracking area update procedure.

8. The communication system according to claim 1, wherein
said monitoring message is transmitted from said communication terminal device to said base station device.

9. The communication system according to claim 1, wherein
said monitoring message is transmitted from said base station device to said communication terminal device, and
upon receipt of said monitoring message, said communication terminal device transmits, to said base station device, delivery confirmation information indicating that said monitoring message has been delivered.

10. The communication system according to claim 1, wherein
said monitoring message is a state notification message for notifying that said communication terminal device is in a radio-resource-control connection state, and
in said radio-resource-control connection state, said communication terminal device transmits said state notification message to said base station device.

11. The communication system according to claim 1, wherein
the communication between said communication terminal device and said base station device is switchable between connection-lite communication and connection-oriented communication, and
said connection-lite communication and said connection-oriented communication are switched based on a data volume transmitted and received between said communication terminal device and said base station device or a traffic volume between said communication terminal device and said base station device.

12. The communication system according to claim 1, wherein said base station device notifies the communication terminal device of the predetermined number of times via broadcast information from a broadcast control channel.

13. The communication system according to claim 1, wherein said base station device notifies the communication terminal device of the predetermined number of times via dedicated information from a dedicated control channel.

14. The communication system according to claim 1, wherein said base station device notifies the communication terminal device of the predetermined number of times via a tracking area update procedure.

15. The communication system according to claim 1, wherein when the monitoring message parameters are not received by the base station neighbor within the predetermined monitoring period, the base station device judges that the communication terminal device has not been detected.

16. The communication system according to claim 1, wherein the base station device judges that the communication terminal has not been detected when the base station device receives notification from the base station neighbor that the base station neighbor will not receive the monitoring message parameters.

17. A communication method between a base station device and a communication terminal device, the method comprising:

transmitting, between said base station device and said communication terminal device in a predetermined monitoring period, a monitoring message for confirming a state of said communication terminal device; and judging, at the base station device, that said communication terminal device has not been detected when said monitoring message has not been received from said communication terminal device a predetermined number of times within the predetermined monitoring period, transmitting, at the base station device and when the base station device has not received the monitoring message within said predetermined monitoring period, monitoring message parameters to a base station neighbor to determine whether the communication terminal device has been detected based on whether the monitoring message is received by the base station neighbor within said predetermined monitoring period, wherein said predetermined number of times is determined semi-statically.

* * * * *